(12) United States Patent
Madisetti et al.

(10) Patent No.: US 11,528,147 B2
(45) Date of Patent: Dec. 13, 2022

(54) VERIFYING INTEGRITY AND SECURE OPERATIONS OF CLOUD-BASED SOFTWARE SERVICES

(71) Applicant: Vijay Madisetti, Johns Creek, GA (US)

(72) Inventors: Vijay Madisetti, Johns Creek, GA (US); Arshdeep Bahga, Chandigarh (IN)

(73) Assignee: Vijay Madisetti, Johns Creek, GA (US)

( * ) Notice: Subject to any disclaimer, the term of this patent is extended or adjusted under 35 U.S.C. 154(b) by 0 days.

(21) Appl. No.: 17/650,680

(22) Filed: Feb. 11, 2022

(65) Prior Publication Data

US 2022/0166626 A1    May 26, 2022

Related U.S. Application Data

(63) Continuation-in-part of application No. 17/458,842, filed on Aug. 27, 2021, now Pat. No. 11,316,690, which is a continuation-in-part of application No. 17/304,693, filed on Jun. 24, 2021, now Pat. No. 11,316,933, which is a continuation-in-part of application No. 17/302,552, filed on May 6, 2021, now Pat. No. 11,283,865, which is a continuation-in-part of application No. 16/286,932, filed on Feb. 27, 2019, which is a continuation-in-part (Continued)

(51) Int. Cl.
*H04L 9/32* (2006.01)
*H04L 9/30* (2006.01)
*G06Q 20/42* (2012.01)

(52) U.S. Cl.
CPC .............. *H04L 9/3236* (2013.01); *H04L 9/30* (2013.01); *G06Q 20/42* (2013.01)

(58) Field of Classification Search
CPC ............................... H04L 9/3236; H04L 9/30
USPC .......................................................... 709/227
See application file for complete search history.

(56) References Cited

U.S. PATENT DOCUMENTS 10,832,247 B2 * 11/2020 Durvasula ............ G06Q 20/389
2013/0339498 A1 * 12/2013 Johnson ................ H04L 67/104
709/221

(Continued)

OTHER PUBLICATIONS

United States Patent and Trademark Office, Non-Final Office action, U.S. Appl. No. 16/286,932, dated Mar. 25, 2022.

*Primary Examiner* — Dung K Chau
(74) *Attorney, Agent, or Firm* — Daniel C. Pierron; Widerman Malek, PL

(57) ABSTRACT

A blockchain-enabled network and application service mesh network architecture including a network service mesh network that includes a plurality of network service domains configured to communicate with each other, each network service domain including a plurality of network service endpoints configured to communicate with a network service client, and a network service manager that broadcasts the availability of the endpoints to network service clients. The architecture further includes an application service mesh network that includes a plurality of applications configured to communicate with each other and a network service domain. A plurality of smart contracts comprising network slicing information from the network service mesh network and the application service mesh network are recorded to a blockchain network.

25 Claims, 95 Drawing Sheets

Related U.S. Application Data of application No. 16/127,283, filed on Sep. 11, 2018, now Pat. No. 10,243,743.

(60) Provisional application No. 63/290,671, filed on Dec. 17, 2021, provisional application No. 63/289,739, filed on Dec. 15, 2021, provisional application No. 63/238,246, filed on Aug. 30, 2021, provisional application No. 63/221,511, filed on Jul. 14, 2021, provisional application No. 63/219,390, filed on Jul. 8, 2021, provisional application No. 63/213,254, filed on Jun. 22, 2021, provisional application No. 63/175,069, filed on Apr. 15, 2021, provisional application No. 63/172,743, filed on Apr. 9, 2021, provisional application No. 63/166,301, filed on Mar. 26, 2021, provisional application No. 63/080,051, filed on Sep. 18, 2020, provisional application No. 62/618,784, filed on Jan. 18, 2018, provisional application No. 62/557,820, filed on Sep. 13, 2017.

(56) References Cited

U.S. PATENT DOCUMENTS

| | | | | |
|---|---|---|---|---|
| 2016/0092179 | A1* | 3/2016 | Straub | G06F 8/71 717/107 |
| 2017/0046689 | A1* | 2/2017 | Lohe | G06Q 20/065 |
| 2017/0132630 | A1* | 5/2017 | Castinado | G06Q 20/4014 |
| 2017/0221052 | A1 | 8/2017 | Sheng | |
| 2017/0330159 | A1 | 11/2017 | Castinado | |
| 2017/0345011 | A1* | 11/2017 | Salami | G06Q 20/42 |
| 2018/0069798 | A1* | 3/2018 | Bacik | H04L 43/026 |
| 2018/0096752 | A1* | 4/2018 | Ovalle | H04W 4/60 |
| 2018/0197173 | A1* | 7/2018 | Durvasula | G06Q 20/34 |
| 2018/0262493 | A1 | 9/2018 | Andrade | |
| 2018/0315145 | A1* | 11/2018 | Darnell | H04L 9/3239 |
| 2018/0316716 | A1* | 11/2018 | Kozloski | A63F 13/33 |
| 2018/0323979 | A1* | 11/2018 | Ahn | H04L 9/3297 |
| 2018/0362405 | A1* | 12/2018 | Tsujii | C08K 7/02 |
| 2019/0065685 | A1* | 2/2019 | Pickover | H04L 9/3239 |
| 2019/0289019 | A1* | 9/2019 | Thekadath | G06F 16/27 |
| 2019/0334920 | A1* | 10/2019 | Kelly | H04L 9/3239 |
| 2021/0287288 | A1* | 9/2021 | Madisetti | H04L 9/30 |
| 2022/0023742 | A1* | 1/2022 | Tran | G06F 1/1694 |

* cited by examiner

Publisher/Producer Client

```
import bulletinboard client=bulletinboard.client()

client.connect(server='127.0.0.1', port='8884',
               clientID='client123', secret='123456')

message={
    topics: ["lending", "loans"],
    payload: {"loanRequest":"12"
              "amount":"100", "interest":.01},
    headers:{"from":"exe","priority":1,
             "persistent":True}
    ttl: 100,
    nonce: 123
} client.publish(message)
```

Consumer/Subscriber Client

```
import bulletinboard client=bulletinboard.client()
client.on_connect = on_connect
client.on_message = on_message client.connect(server='127.0.0.1', port='8884',
               clientID='client123', secret='123456')

def on_connect(client):
    print("Connected to Bulletin Board Server")
    client.subscribe("#")

def on_message(client, msg):
    print("topic: "+ msg.topic)
    print("payload: "+ str(msg.payload))

client.loop_forever()
```

```
pragma solidity ^0.4.22;
import "provableAPI_0.4.25.sol";
contract AuthTokenContract is usingProvable {
    string public AuthToken;
    mapping(bytes32=>bool) validIds;
    event LogConstructorInitiated(string nextStep);
    event LogTokenUpdated(string token);
    event LogNewProvableQuery(string description);
    function AuthTokenContract() payable {
        LogConstructorInitiated("Constructor was initiated. Call 'updateAuthToken()' to send the Provable Query.");
    }
    function __callback(bytes32 myid, string result) {
        if (!validIds[myid]) revert();
        if (msg.sender != provable_cbAddress()) revert();
        AuthToken = result;
        LogTokenUpdated(result);
        delete validIds[myid];
        updateAuthToken();
    }
    function updateAuthToken() payable {
        if (provable_getPrice("URL") > this.balance) {
            LogNewProvableQuery("Provable query was NOT sent, please add some ETH to cover for the query fee");
        } else {
            LogNewProvableQuery("Provable query was sent, standing by for the answer..");
            bytes32 queryId =
                provable_query(60, "URL", "json(https://api.becnx.io/auth).token");
            validIds[queryId] = true;
        }
    }
}
```

FIG. 77

```
apiVersion: v1
kind: List
items:
- apiVersion: v1
  kind: ResourceQuota
  metadata:
    name: pods-high
  spec:
    hard:
      cpu: "2000m"
      memory: 2G
      pods: "2"
    scopeSelector:
      matchExpressions:
      - operator : In
        scopeName: PriorityClass
        values: ["high-priority"]
```
6350

```
- apiVersion: v1
  kind: ResourceQuota
  metadata:
    name: pods-medium
  spec:
    hard:
      cpu: "1000m"
      memory: 1G
      pods: "2"
    scopeSelector:
      matchExpressions:
      - operator : In
        scopeName: PriorityClass
        values: ["medium-priority"]
```
6352

```
- apiVersion: v1
  kind: ResourceQuota
  metadata:
    name: pods-low
  spec:
    hard:
      cpu: "500m"
      memory: 512M
      pods: "2"
    scopeSelector:
      matchExpressions:
      - operator : In
        scopeName: PriorityClass
        values: ["low-priority"]
```
6354

FIG. 81

```
apiVersion: scheduling.k8s.io/v1
kind: PriorityClass
metadata:
  name: high-priority
value: 10000000
globalDefault: false
description: "This priority class should be used for high priority pods only."
---
apiVersion: scheduling.k8s.io/v1
kind: PriorityClass
metadata:
  name: medium-priority
value: 1000000
globalDefault: false
description: "This priority class should be used for medium priority pods only."
---
apiVersion: scheduling.k8s.io/v1
kind: PriorityClass
metadata:
  name: low-priority
value: 100000
globalDefault: false
description: "This priority class should be used for low priority pods only."
```

FIG. 82

```
6382
apiVersion: apps/v1
kind: Deployment
metadata:
  name: slice1
spec:
  replicas: 1
  selector:
    matchLabels:
      app: slice1
  template:
    metadata:
      labels:
        app: slice1
    spec:
      containers:
      - name: slice1
        image: myhub/slice1:v1.0
        ports:
        - containerPort: 5000
        resources:
          requests:
            memory: "512M"
            cpu: "500m"
          limits:
            memory: "1G"
            cpu: "1000m"
      priorityClassName: high-priority
```

```
6380
apiVersion: v1
kind: Service
metadata:
  name: slice1-service
spec:
  selector:
    app: slice1
  ports:
  - protocol: "TCP"
    port: 6000
    targetPort: 5000
  type: NodePort
```

FIG. 83

SliceCoin Orchestrator

6402

Services

| NAME | TYPE | CLUSTER-IP | IP | PORTS | START TIME | STATUS |
|---|---|---|---|---|---|---|
| highpriorityslice-service | NodePort | 10.109.22.13 | 192.168.99.105 | [{'nodePort': 32963, 'port': 6900, 'protocol': 'TCP', 'targetPort': 5900}] | 2021-08-05T09:34:41Z | |
| kubernetes | ClusterIP | 10.96.0.1 | | [{'name': 'https', 'port': 443, 'protocol': 'TCP', 'targetPort': 8443}] | | |

Deployments

| NAME | READY REPLICAS | AVAILABLE REPLICAS | REPLICAS | START TIME |
|---|---|---|---|---|
| highpriorityslice | 1 | 1 | 1 | 2021-08-05T09:34:42Z |

Slices

| NAME | TEMPLATE | SLICEID | DURATION | COINS CHARGED | START TIME | STATUS |
|---|---|---|---|---|---|---|
| highpriorityslice | SliceTemplate-1 | d9c3d85d-6fc7-433e-96a5-a14bc7483443 | 2 | 100 | Aug. 5, 2021, 9:34 a.m. | |

Resource Quota

| NAME | RESOURCE - HARD | RESOURCE - USED |
|---|---|---|
| pods-high | CPU: 2, Memory: 2G, Pods: 2 | CPU: 500m, Memory: 512M, Pods: 1 |
| pods-low | CPU: 500m, Memory: 512M, Pods: 2 | CPU: 0, Memory: 0, Pods: 0 |
| pods-medium | CPU: 1, Memory: 1G, Pods: 2 | CPU: 0, Memory: 0, Pods: 0 |

FIG. 85

VERIFYING INTEGRITY AND SECURE OPERATIONS OF CLOUD-BASED SOFTWARE SERVICES

RELATED APPLICATIONS

This application claims priority under 35 U.S.C. § 119(e) of U.S. Provisional Patent Application Ser. Nos. 63/289,739 filed on Dec. 15, 2021 and titled *SliceCoins for Security and Network Slicing on a Cloud*, 63/238,246 filed on Aug. 30, 2021 and titled *Slicecoin Orchestration of CNF Applications on Cloud*, 63/221,511 filed on Jul. 14, 2021 and titled *On-Demand Network Slicing using Blockchain-Based Cross-Layer Orchestrator*, 63/219,390 filed on Jul. 8, 2021 and titled *Cross-layer analysis using smart contracts for container native function (CNF) and network slice security*, and 63/290,671 filed on Dec. 17, 2021 and titled Buildcoins and Integrity Coins for Software Security. This application is also a continuation-in-part application of and claims priority under 35 U.S.C. § 120 of U.S. patent application Ser. No. 17/304,693 filed on Jun. 24, 2021 and titled SERVICE MESHES AND SMART CONTRACTS FOR ZERO-TRUST SYSTEMS, which in turn claims priority under 35 U.S.C. § 119(e) of U.S. Provisional Patent Application Ser. No. 63/213,254 filed on Jun. 22, 2021 and titled Blockchain Smart Contracts to Monitor, Supervise and Control 5G Core through Standardized APIs to CNFs, and is a continuation-in-part application of and claims priority under 35 U.S.C. § 120 of U.S. patent application Ser. No. 17/302,552 filed on May 6, 2021 and titled SERVICE MESHES AND SMART CONTRACTS FOR ZERO-TRUST SYSTEMS, which in turn is a continuation-in-part application of and claims priority under 35 U.S.C. § 120 of U.S. patent application Ser. No. 16/286,932 filed on Feb. 27, 2019 and titled Transaction Pools Using Smart Contracts and Blockchains, which in turn is a continuation-in-part application of and claims priority under 35 U.S.C. § 120 of U.S. patent application Ser. No. 16/127,283, now U.S. Pat. No. 10,243,743, issued Mar. 26, 2019 filed on Sep. 11, 2018 and titled Tokens or Crypto Currency Using Smart Contracts and Blockchains, which in turn claims priority under 35 U.S.C. § 119(e) of U.S. Provisional Patent Application Ser. No. 62/557,820 filed on Sep. 13, 2017 and titled Tokens or Crypto Currency for Change Using Smart Contracts and Blockchains, which in turn claims priority under 35 U.S.C. § 119(e) of U.S. Provisional Patent Application Ser. No. 62/618,784 filed on Jan. 18, 2018 and titled Additional Features of CoinBank and nCash NCC Tokens, which in turn claims priority under 35 U.S.C. § 119(e) of U.S. Provisional Patent Application Ser. No. 63/175,069 filed on Apr. 15, 2021 and titled Blockchain-Based Multi-Layer Protection for Cloud-Native 5G Networks, which in turn claims priority under 35 U.S.C. § 119(e) of U.S. Provisional Patent Application Ser. No. 63/166,301 filed on Mar. 26, 2021 and titled Blockchain-Secured Secure Service Mesh for Decentralized Zero-Trust 5G Core Networks, which in turn claims priority under 35 U.S.C. § 119(e) of U.S. Provisional Patent Application Ser. No. 63/172,743 filed on Apr. 9, 2021 and titled Blockchain-based Multi-Layer Protection for Cloud-Native 5G Networks, which in turn claims priority under 35 U.S.C. § 119(e) of U.S. Provisional Patent Application Ser. No. 63/080,051 filed on Sep. 18, 2020 and titled Decentralized 5G Networks Using Blockchains. The contents of these applications are incorporated herein by reference.

FIELD OF THE INVENTION

The present invention relates to systems and methods for improving the linking smart contracts in transactions on a blockchain network.

BACKGROUND

Blockchain is a distributed and public ledger which maintains records of all the transactions. A blockchain network is a truly peer-to-peer network and it does not require a trusted central authority or intermediaries to authenticate or to settle the transactions or to control the network infrastructure. Users can interact and transact with the blockchain networks through Externally Owned Account (EOAs), which are owned and controlled by the users. Each EOA has a balance (in certain units of a Cryptocurrency associated with the Blockchain network) associated with it. EOAs do not have any associated code. All transactions on a blockchain network are initiated by EOAs. These accounts can send transactions to other EOAs or contract accounts. Another type of accounts support by second generation programmable Blockchain platforms are the Contract Accounts. A Contract Account is created and owned by an EOA and is controlled by the associated contract code which is stored with the account. The contract code execution is triggered by transactions sent by EOAs or messages sent by other contracts.

Blockchain networks can either be public or private. Public blockchain networks are free and open to all and any user can create an account and participate in the consensus mechanism on a public blockchain and view all the transactions on the network. Private blockchain networks are usually controlled and operated by a single organization and the transactions can be viewed only by the users within the organization. Public blockchain networks are usually unpermissioned or permissionless, as any node can participate in consensus process. Some public blockchain networks adopt a permissioned model where the consensus process is controlled by a pre-selected set of nodes. Private blockchain networks usually adopt the permissioned model. While public blockchain networks can be considered as fully decentralized, private blockchain networks are partially decentralized.

Organizations can have multiple private blockchain networks where each network is dedicated to a specific use case or department or business vertical. The blockchain networks within an organization may be created either using the same blockchain platform or technology or with different platforms or technologies.

On each blockchain network, a user can create multiple Externally Owned Accounts (EOAs). Each Externally Owned Account (EOA) has a public-private keypair associated with it. The account address is derived from the public key. When a new EOA is created, a keyfile is created which has the public and private keys associated with the account. The private key is encrypted with the password which is provided while creating the account. For sending transactions to other accounts, the private key and the account password are required.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are directed to a system and associated methods for exchange of information, value or tokens within and between blockchain networks and the real physical world.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a blockchain-enabled service-based cloud native function (CNF) architecture. The blockchain-enabled service-based cloud native function also includes an application service mesh network may include a plurality of applications configured to communicate with each other. The function also includes where a plurality of smart contracts may include network slicing information from the application service mesh network are recorded to a blockchain network. The function also includes where the network slicing information may include by the plurality of smart contracts is related to one or more of a standard protocol network exposure function (NEF), a standard protocol service communication proxy (SCP), and a standard protocol network repository function (NRF). Other embodiments of this aspect include corresponding computer systems, apparatus, and computer programs recorded on one or more computer storage devices, each configured to perform the actions of the methods.

Implementations may include one or more of the following features. The architecture where the network slicing information may include information about the security of CNFs may include a service-based architecture. Each network slice is assigned an identifier that is stored on the blockchain and utilized by the smart contracts for resource assignment. The plurality of applications may include at least one of a containerized network function, a virtual network function, a worker node, a server, a container, a pod, and a virtual machine. The standard protocol NEF is a 3rd generation partnership project (3GPP) NEF, the standard protocol SCP is a 3GPP SCP, and the standard protocol NRF is a 3GPP NRF. Access to selected information elements provided by services utilizes the smart contracts. The application service mesh supports a plurality of network slices may include a shared set of CNFs and an unshared set of CNFs. The network slicing information may include information about one or more of performance, network load, and availability of the network associated with the network slicing information. Implementations of the described techniques may include hardware, a method or process, or computer software on a computer-accessible medium.

BRIEF DESCRIPTION OF THE DRAWINGS

FIG. 40 is an exemplary implementation of a Bulletin Board Publisher/Producer client and Consumer/Subscriber client, according to an embodiment of the invention.

FIG. 45 is an illustration of the nCash mobile application features for different types of accounts, according to an embodiment of the invention.

FIG. 77 is an illustration of exemplary reference smart contract that uses a data oracle to update OAuth token within the smart contract, according to an embodiment of the invention.

FIG. 81 is an illustration of a reference implementation of resource quotas used by SliceCoin Orchestrator, according to an embodiment of the invention.

FIG. 82 is an illustration of a reference implementation of priority classes used by SliceCoin Orchestrator, according to an embodiment of the invention.

FIG. 83 is an illustration a reference implementation of a slice template used by SliceCoin Orchestrator, according to an embodiment of the invention.

FIG. 85 is an illustration of an exemplary interface of SliceCoin Orchestrator, according to an embodiment of the invention.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Figure 1:
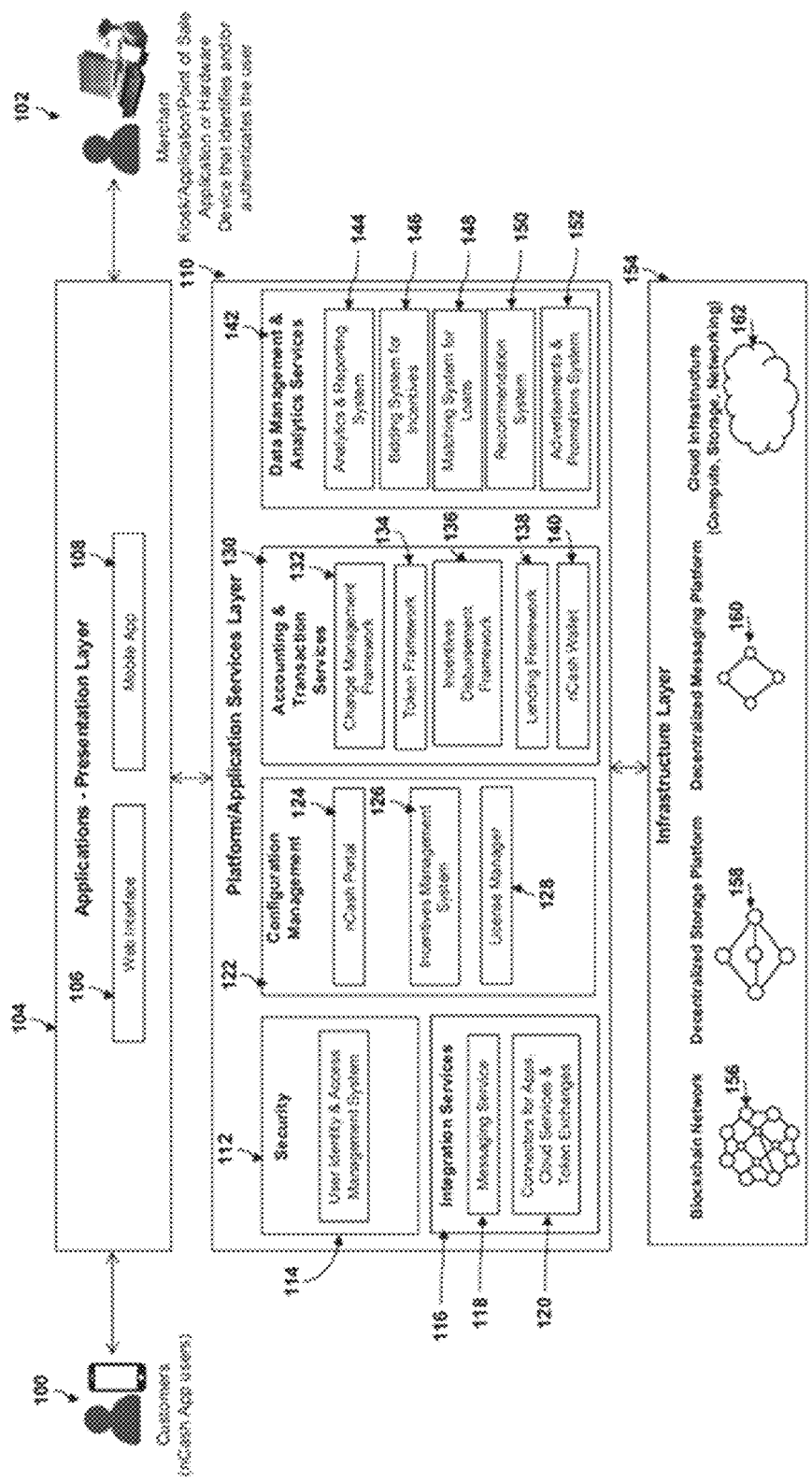
FIG. 1 is a schematic diagram of a retail payments, loyalty rewards and peer-to-peer lending system that uses smart contracts and blockchain.

Referring now to FIG. 1 a schematic diagram of a retail payments, loyalty rewards and peer-to-peer lending system that uses smart contracts and blockchain, is described in more detail. A user 100 and a merchant 102 may complete a transaction through use of an application and presentation layer 104. The application and presentation layer 104 may comprise a web interface 106 and/or a mobile application 108. Elements of the application and presentation layer 104 may be the client-facing element of a platform/application services layer 110. The platform/application services layer 110 may comprise security features 112, such as a user identity and access management system 114. The platform/application services layer 110 may further comprise integration services 116, such as, for example, a messaging service 118 or a connector service for applications, cloud services, and token exchanges 120. The platform/application services layer 110 may further comprise configuration management features 122. The configuration management features 122 may include an nCash portal 124, an incentives management system 126, and a license manager 128. The platform/application services layer 110 may further comprise accounting and transaction services 130, such as a change management framework 132, a token framework 469, an incentives disbursement framework 136, a lending framework 138, and an nCash wallet 140. The platform/application services layer 110 may further comprise data management and analytics services 142, such as analytics and reporting systems 144, an incentives bidding system 146, a loan matching system 148, a recommendation system 150, and an advertisement and promotions system 152. The platform/application services layer 110 may function on an infrastructure layer 154 that may comprise one or more of blockchain networks 156, decentralized storage platforms 158, decentralized messaging platforms 160, or cloud infrastructure 162, such as cloud computational resources, cloud storage resources, or cloud networking resources.

Figure 2:
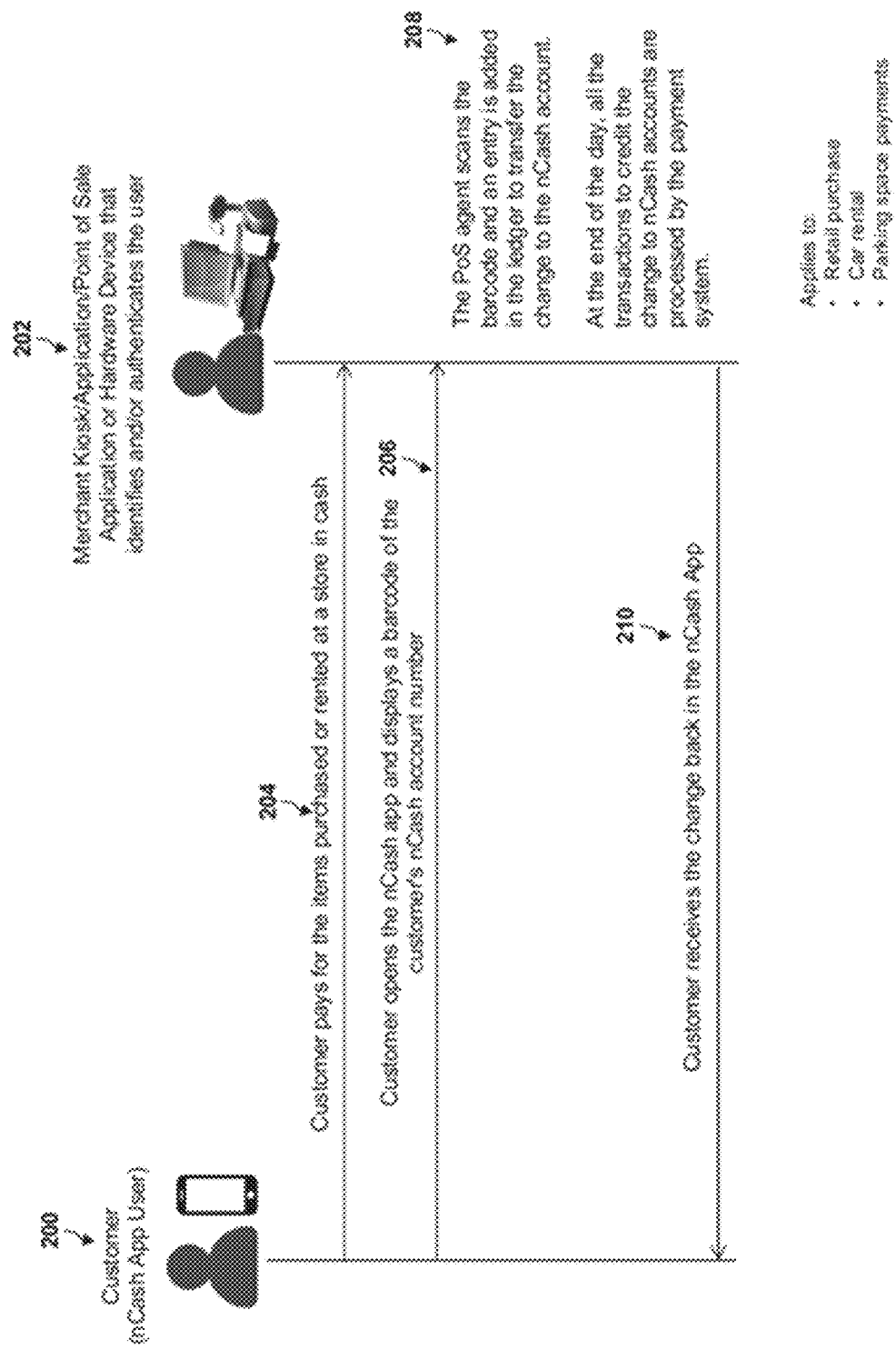
FIG. 2 is an illustration of a process for retail payments where a customer pays in cash at a merchant kiosk/application/point of sale application or hardware device that is aware of the nCash platform, and instead of receiving loose change back receives digital tokens in the nCash mobile application wallet, according to an embodiment of the invention.

Referring now to FIG. 2 a process flow for retail payments where a customer pays in cash and instead of receiving loose change back, receives the change as digital tokens (nCash coins—"NCC") in the nCash mobile application, is described in more detail. Customer 200 pays for the items purchased or rented at a store in cash at step 204. Customer 200 opens the nCash app and displays a barcode of the customer's nCash account number at step 206. The merchant kiosk/application/point of sale application or hardware device that is aware of the nCash platform 202 scans the barcode and an entry is added in the ledger to transfer the change to the nCash account at step 208. At some periodic interval, for example, at the end of the day, all the transactions to credit the change to nCash accounts are processed by the payment system. Customer 200 receives the change back in the nCash App at step 210.

Figure 3:
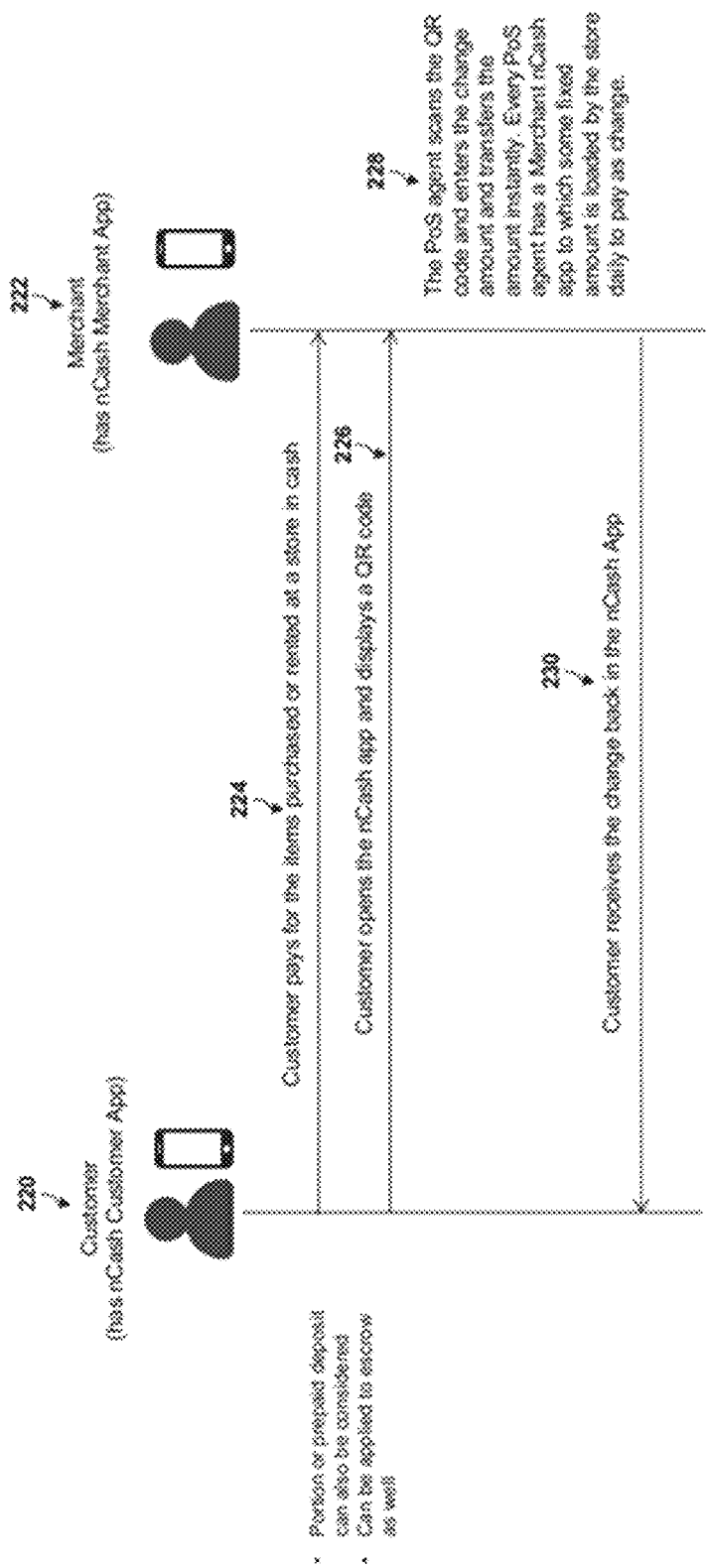
FIG. 3 is an illustration of a process for retail payments where a customer pays in cash and instead of receiving loose change back receives digital tokens from a merchant account in the nCash mobile application, according to an embodiment of the invention.

Referring now to FIG. 3 a process flow for retail payments where a customer pays in cash and instead of receiving loose change back receives digital tokens from a merchant account in the nCash mobile application, is described in more detail. Customer 220 pays for the items purchased or rented at a store in cash at step 224. Customer 220 opens the nCash app and displays a QR code at step 226. The merchant/PoS agent 222 that has a mobile/tablet device with nCash mobile application installed scans the QR code and enters the change amount and transfers the amount instantly from the merchant administrator or operator account at step 228. Every PoS agent 222 has a Merchant nCash app to which some fixed amount is loaded by the store daily to pay as change. Customer 220 receives the change back in the nCash App at step 230.

Figure 4:
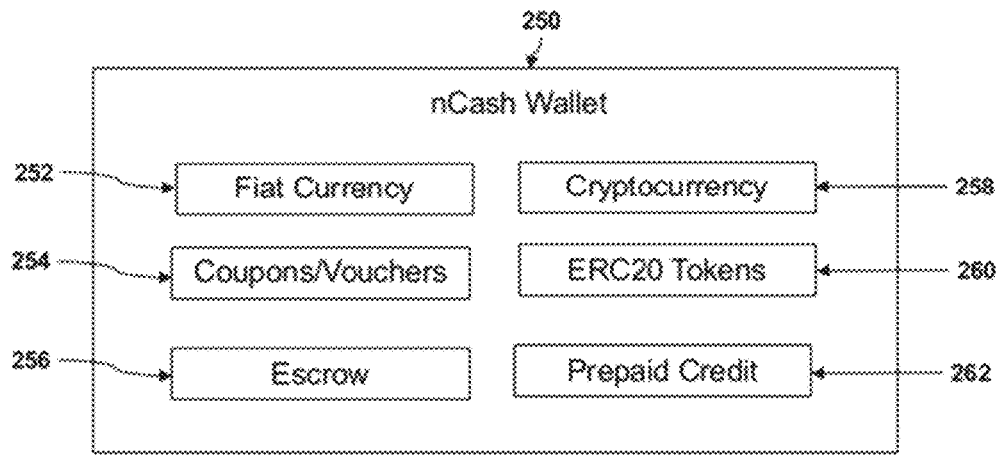
FIG. 4 is an illustration of the components of the nCash mobile application wallet, according to an embodiment of the invention.

Referring now to FIG. 4 components of an nCash mobile application wallet 250 are described in more detail. The nCash wallet 250 may comprise a Fiat currency wallet 252, a cryptocurrency wallet 258, a coupons and voucher management system 254, and ERC-20 token wallet 260, Escrow accounts 256, and prepaid credit accounts 262. For making retail payments, a portion or prepaid deposit in fiat or cryptocurrency wallets 252, 258 can be considered. The wallet balance of one or both of the fiat and cryptocurrency wallets 252, 258 may be applied to Escrow 256 as well where the payment sent by a customer to a merchant is held in an Escrow account and released when an order is fulfilled.

Figure 5:
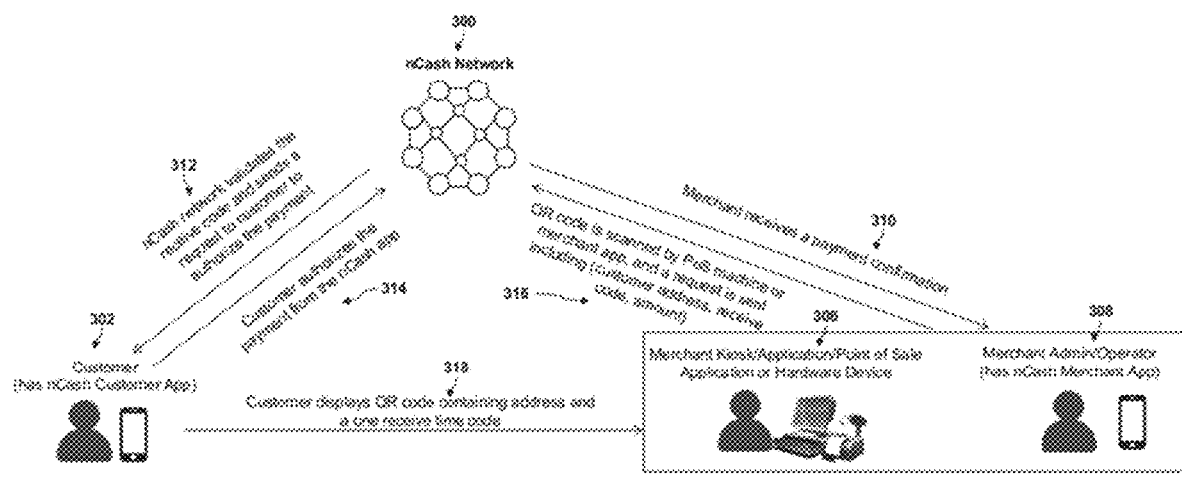
FIG. 5 is an illustration a process for QR-code based payment request and authorization, according to an embodiment of the invention.

Referring now to FIG. 5 a process flow for QR-code based payment request and authorization, is described in more detail. Customer 302 uses nCash mobile application to display a QR code containing customer's nCash wallet address and a one-time receive code at step 318. The QR code is scanned by a PoS machine 306 or nCash app with merchant account 308, and a request is sent including the customer address, the receive code, and the amount to the nCash network 300 at step 316. The nCash network 300 validates the receive code and sends a request to customer to authorize the payment at step 312. Customer 302 authorizes the payment from the nCash app at step 314. A payment confirmation is sent to the PoS machine 306 or nCash app with merchant account 308, at step 310.

Figure 6:
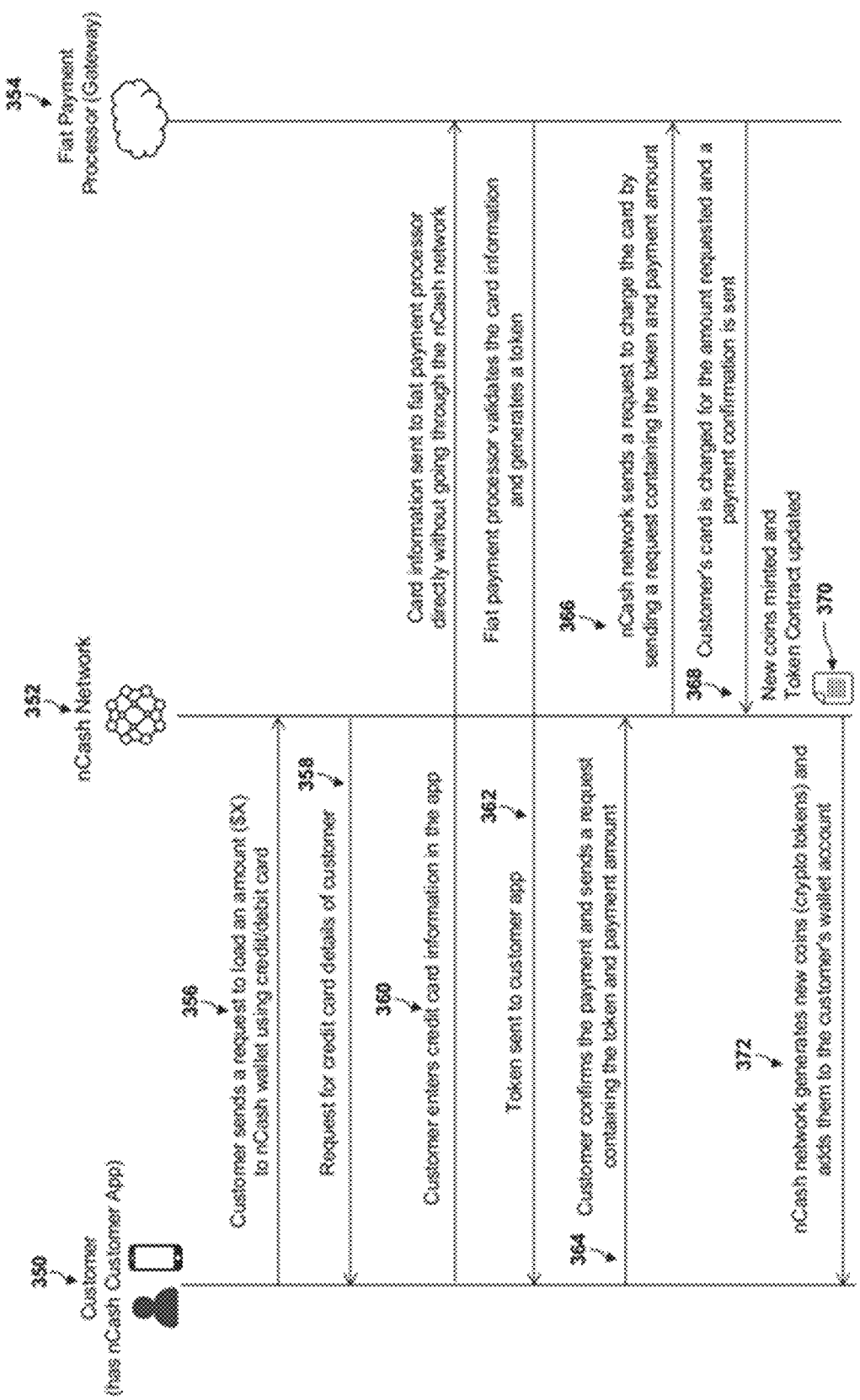
FIG. 6 is an illustration of a process for buying coins with credit or debit card, according to an embodiment of the invention.

Referring now to FIG. 6 a process flow for buying coins with credit or debit card is described in more detail. Customer 350 sends a request to load an amount to nCash wallet using credit or debit card at step 356. The nCash network 352 requests for credit or debit card details of customer 350 at step 358. Customer 350 enters credit or debit card information in the nCash mobile application at step 360. The card information is then sent to the fiat payment processor 354 directly without going through the nCash network 352 at step 360. The fiat payment processor 354 validates the card information and generates a token which is then sent to customer's nCash mobile application at step 362. Customer 350 confirms the payment and sends a request containing the card token and payment amount at step 364. The nCash network 352 sends a request containing the token and the payment amount to charge the card to the fiat payment processor 354 at step 366. The fiat payment processor 354 charges the customer's card for the amount requested and a payment confirmation is sent to the nCash network 352 at step 368. The nCash network 352 mints new coins (digital tokens defined in the nCash Token smart contract) and the token smart contract 370. The nCash network 352 adds these new coins (digital tokens) the customer's nCash wallet account at step 372.

Figure 7:
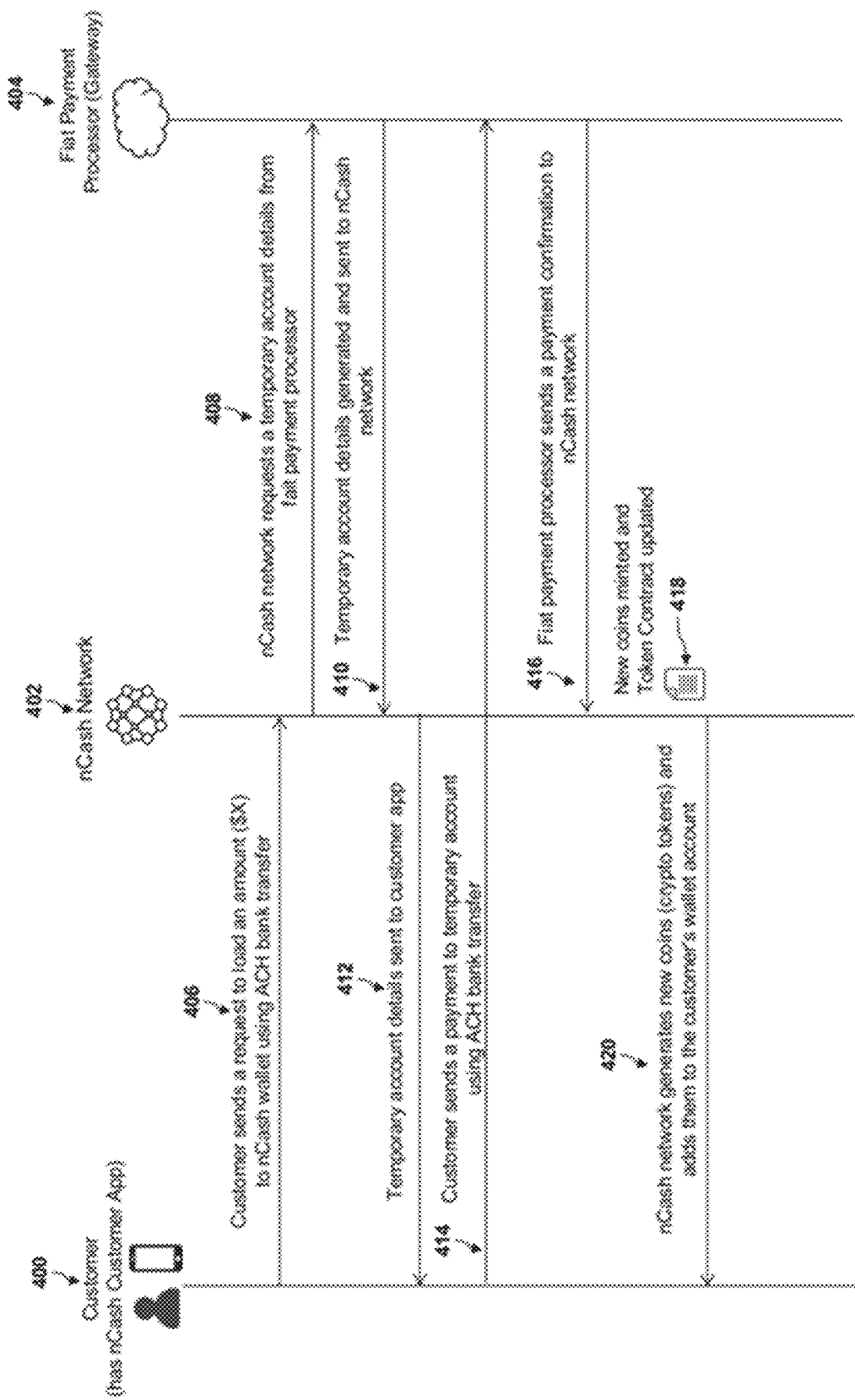
FIG. 7 is an illustration of a process for buying coins with ACH Bank Transfer, according to an embodiment of the invention.

Referring now to FIG. 7 a process flow for buying coins with ACH Bank Transfer is described in more detail. Customer 400 sends a request to an nCash network 402 to load an amount to nCash wallet using ACH bank transfer at step 406. The nCash network 402 requests a temporary account details from a fiat payment processor 404 at step 408. The fiat payment processor 404 generates a temporary account and sends details about the temporary account to the nCash network 402 at step 410. The nCash network 402 then sends the temporary account details to the customer's nCash mobile application. Customer 400 sends a payment to the temporary account using ACH bank transfer at step 414. On receiving the payment, the fiat payment processor 404 sends a payment confirmation to nCash network 402 at step 416. The nCash network 402 mints new coins (digital tokens defined in the nCash Token smart contract) and the token smart contract 418. The nCash network 402 adds these new coins (digital tokens) the customer's nCash wallet account at step 420.

Figure 8:
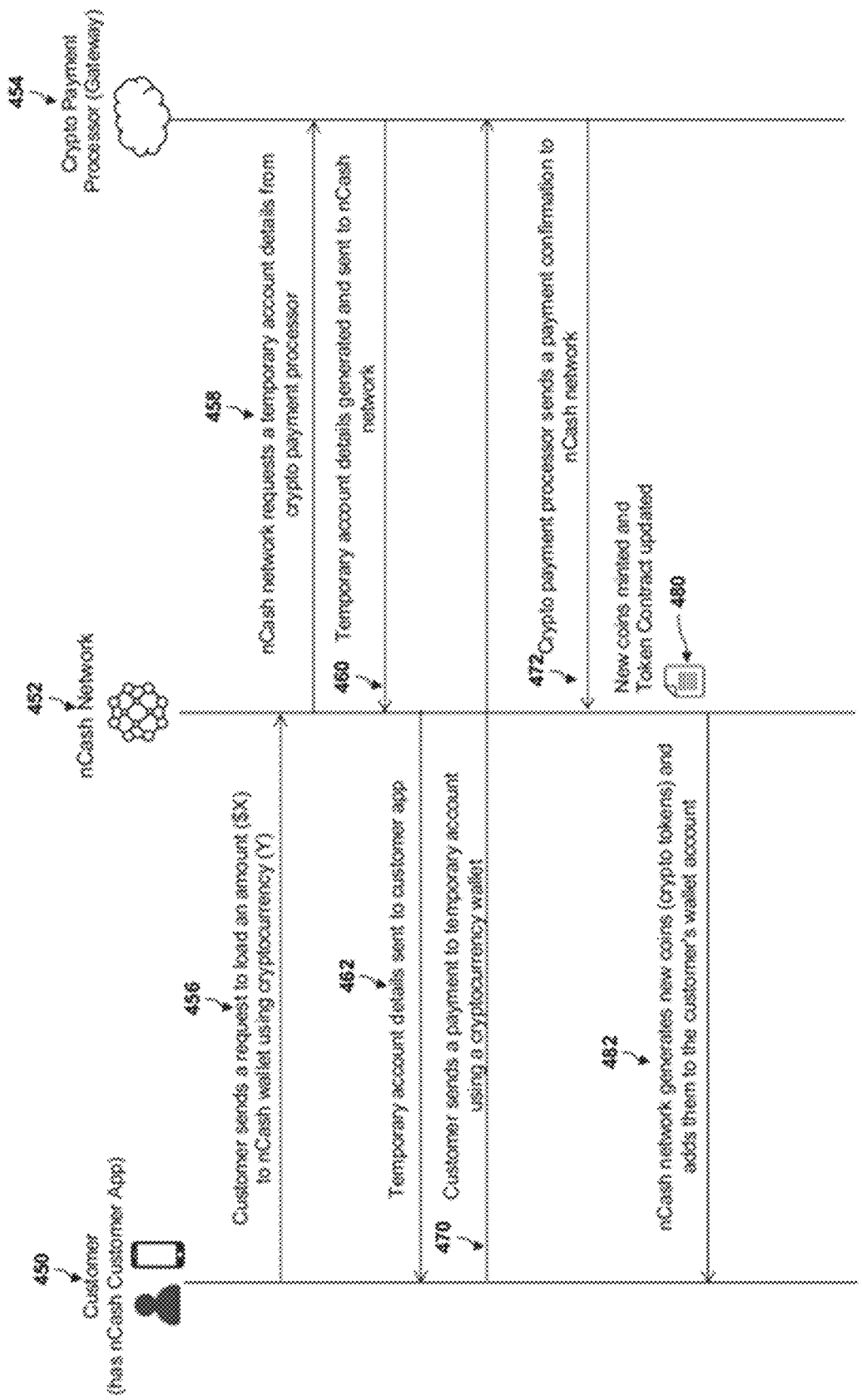
FIG. 8 is an illustration of a process for buying coins with Cryptocurrencies, according to an embodiment of the invention.

Referring now to FIG. 8 a process flow for buying coins with Cryptocurrencies is described in more detail. Customer 450 sends a request to an nCash network 452 to load an amount to nCash wallet using cryptocurrency at step 456. The nCash network 452 requests a temporary account details from a crypto payment processor 454 at step 458. The crypto payment processor 454 generates temporary account and sends them to the nCash network 452 at step 460. The nCash network 452 then sends the temporary account details to the customer's nCash mobile application at step 462. Customer 450 sends a payment to the temporary account using a cryptocurrency wallet at step 470. On receiving the payment, the crypto payment processor 454 sends a payment confirmation to nCash network 452 at step 472. The nCash network 452 mints new coins (digital tokens defined in the nCash Token smart contract) and the token smart contract 480. The nCash network 452 adds these new coins (digital tokens) the customer's nCash wallet account at step 482.

Figure 9:
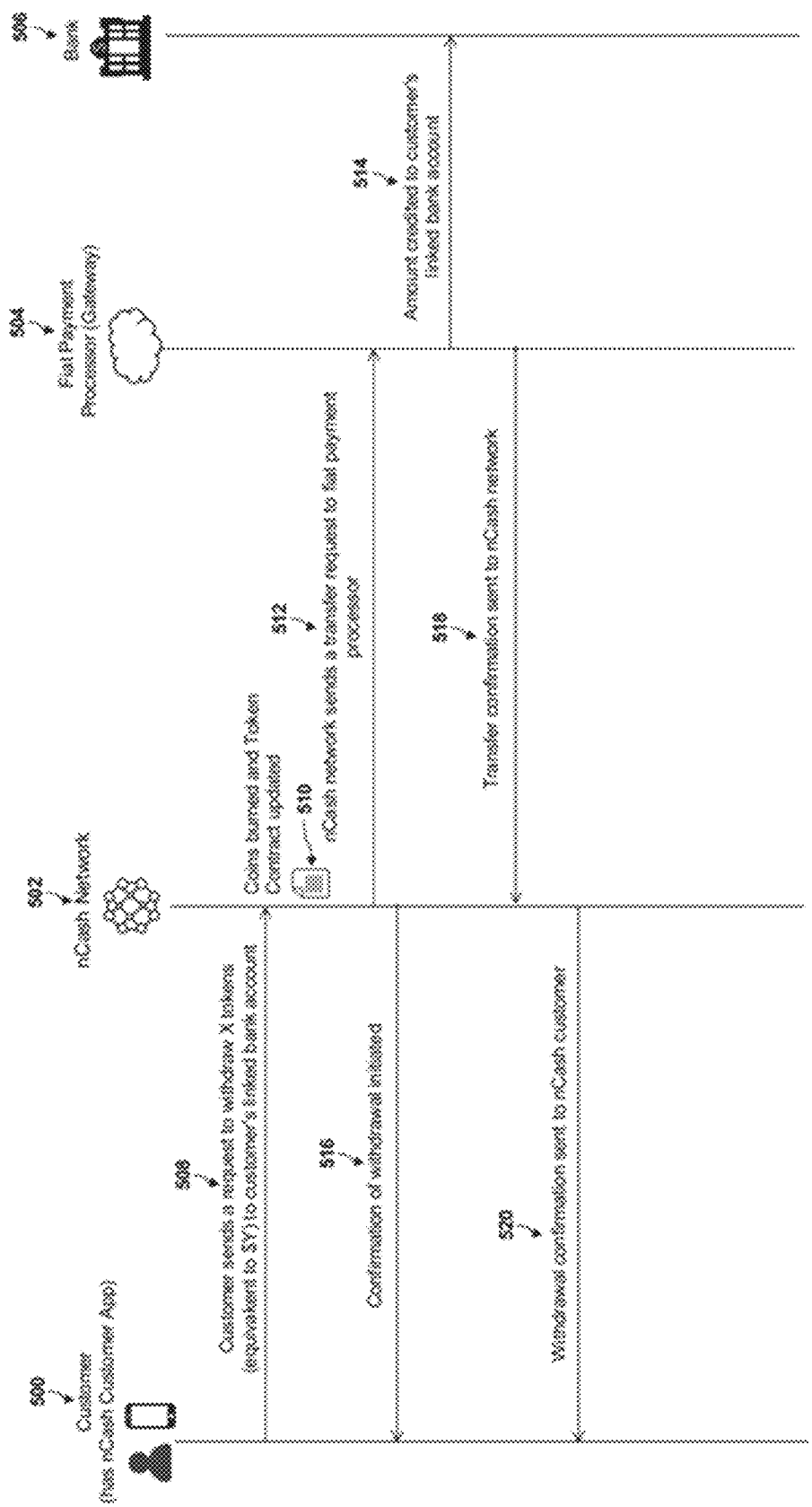
FIG. 9 is an illustration a process for withdrawing coins to a linked bank account, according to an embodiment of the invention.

Referring now to FIG. 9 a process flow for withdrawing coins to a linked bank account is described in more detail. Customer 500 sends a request to a nCash network 502 to withdraw a certain amount of tokens to customer's linked bank account in a bank 506 at step 508. On receiving the withdrawal request the nCash network 502 burns coins equivalent to the withdrawal amount from the customer's account and updates the token smart contract 510. The nCash network 502 then sends a transfer request to the fiat payment processor 504 at step 512. The withdrawal amount is credited by the fiat payment processor 504 to the customer's linked bank account at the bank 506 at step 514. The fiat payment processor 504 then sends a transfer confirmation to nCash network 502 at step 518. A withdrawal confirmation is then sent to customer 500 at step 520.

Figure 10:
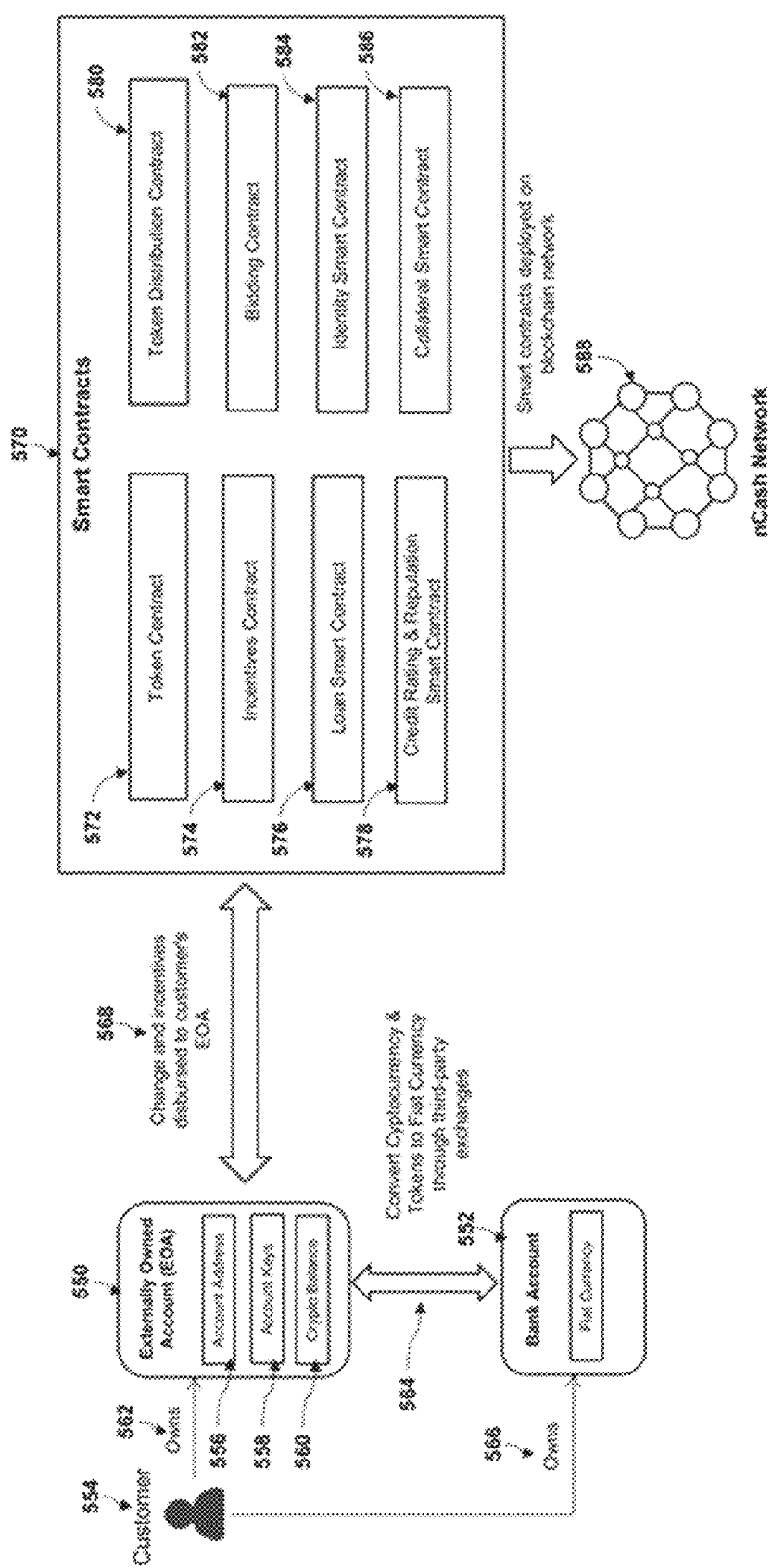
FIG. 10 is an illustration of the smart contracts involved in the nCash retail payments, loyalty rewards and peer-to-peer lending platform, according to an embodiment of the invention.

Referring now to FIG. 10 examples of smart contracts involved in the nCash retail payments, loyalty rewards, and peer-to-peer lending platform are described in more detail. The nCash blockchain network 588 is a distributed ledger which maintains records of all the transactions on the nCash network. Users 554 interact and transact with the blockchain network 588 through Externally Owned Account (EOAs) 550, which are owned and controlled by the users. Each EOA 550 has an account address 556, account public-private keys 558 and a balance 560 (in certain units of a Cryptocurrency associated with the Blockchain network) associated with it. EOAs do not have any associated code. EOAs may interact 564 with bank accounts 552 also owned 566 by the user 554 via third party exchanges operable to exchange cryptocurrencies for fiat currency, which may be deposited in or withdrawn from the bank account 552.

All transactions on a blockchain network are initiated by EOAs. These accounts can send transactions to other EOAs or contract accounts. Another type of accounts support by second generation programmable Blockchain platforms are the Contract Accounts. Smart contracts 570 contain the contract code which control the associated contract accounts. The smart contracts 570 are deployed on the blockchain network 588. The smart contracts 570 involved in the nCash network are as follows:

Token Contract 572: Token Contract provides the nCash token definition including token name, symbol, decimal places, token supply, method for token transfer, and method for checking token balance of an account.

Token Distribution Contract 580: Token Distribution Contract defines the token distribution and pricing model and contains methods for purchasing and claiming tokens, and methods for withdrawing token sale proceeds.

Incentives Contract 574: Incentives Contract defines the incentives and triggers and methods for distributing incentives.

Bidding Contract 582: Bidding Contract defines the bidding mechanism for allowing merchants to compete, bid, or pay for the right to add incentives.

Loan Smart Contract 576: Loan Smart Contract is used to enforce loan terms, manage release, repayment or extension of loans.

Identity Smart Contract 584: Identity Smart Contract is used to link blockchain accounts to real users (borrowers or lenders).

Credit Rating & Reputation Smart Contract 578: Credit Rating & Reputation Smart Contract is Used to track credit scores and reputation of borrowers.

Collateral Smart Contract 586: Collateral Smart Contract is used to manage locking up and release of collateral, such as cryptocurrency tokens or physical assets which may be represented in a tokenized form.

Figure 11:
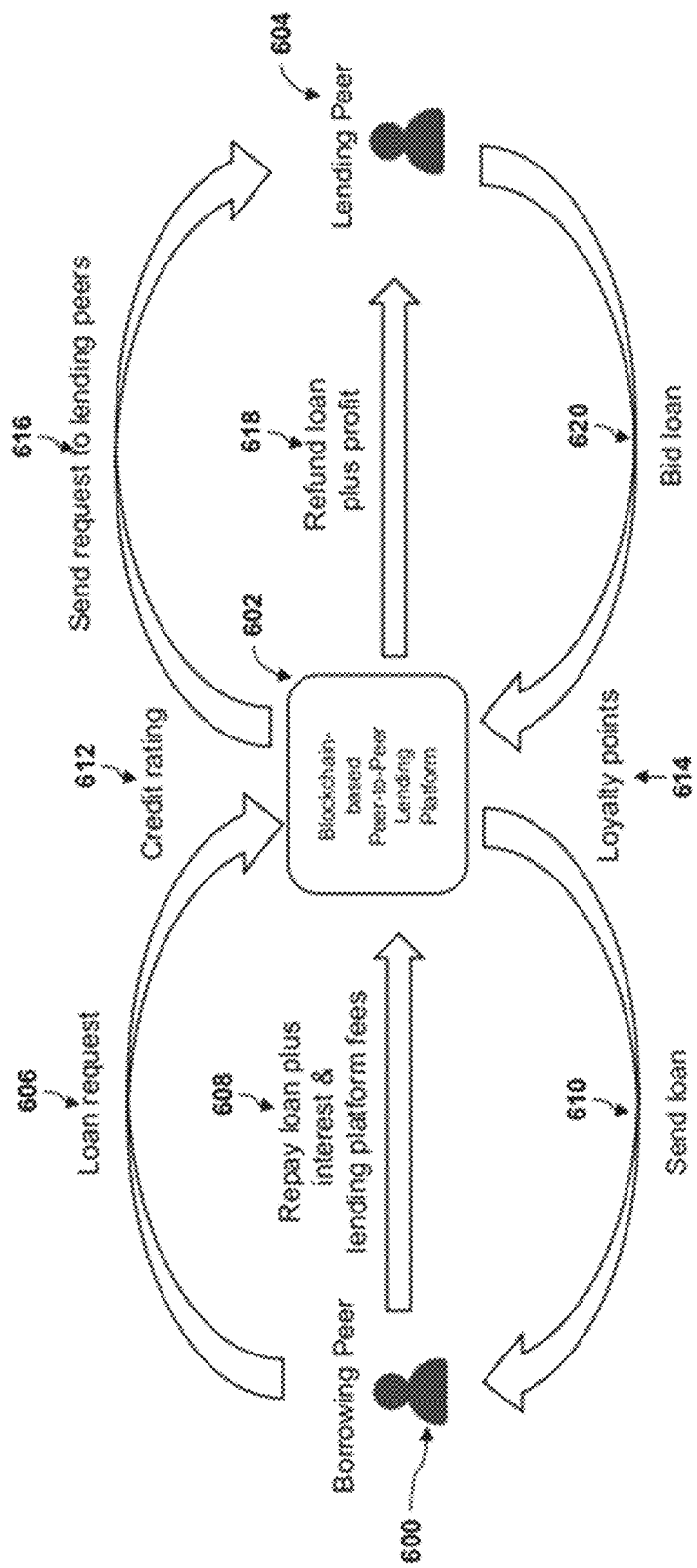
FIG. 11 is an illustration of a process for peer-to-peer lending, according to an embodiment of the invention.

Referring now to FIG. 11 a process flow for peer-to-peer lending is described in more detail. A borrowing peer (borrower) 600 creates a first transaction smart contract in the form of a loan request at step 606. The lending platform 602 advertises the loan requests to the lending peers (lenders) 604 at step 616. The lending platform 602 may acquire a credit rating 612 associated with the borrowing peer 600 and include the credit rating with the request. The lending peers 604 bid for loans by sending second transaction smart contracts in the form of loan offers to the lending platform 602 at step 620. The borrowing peer 600 selects the best offer and the loan amount is sent to the borrowing peer at step 610. The borrowing peer 600 repays the loan amount plus the interest and lending platform fees to the lending platform 602 at step 608. The lending platform 602 returns the loan amount plus the profit to the lending peer 604 at step 618. The lending platform 602 may issue loyalty points 614 to borrowing peers 600 and lending peers 604 upon successful repayment of loans, to incentivize the borrowing and lending peers 600, 604 to use the lending platform again for borrowing and lending.

Figure 12:
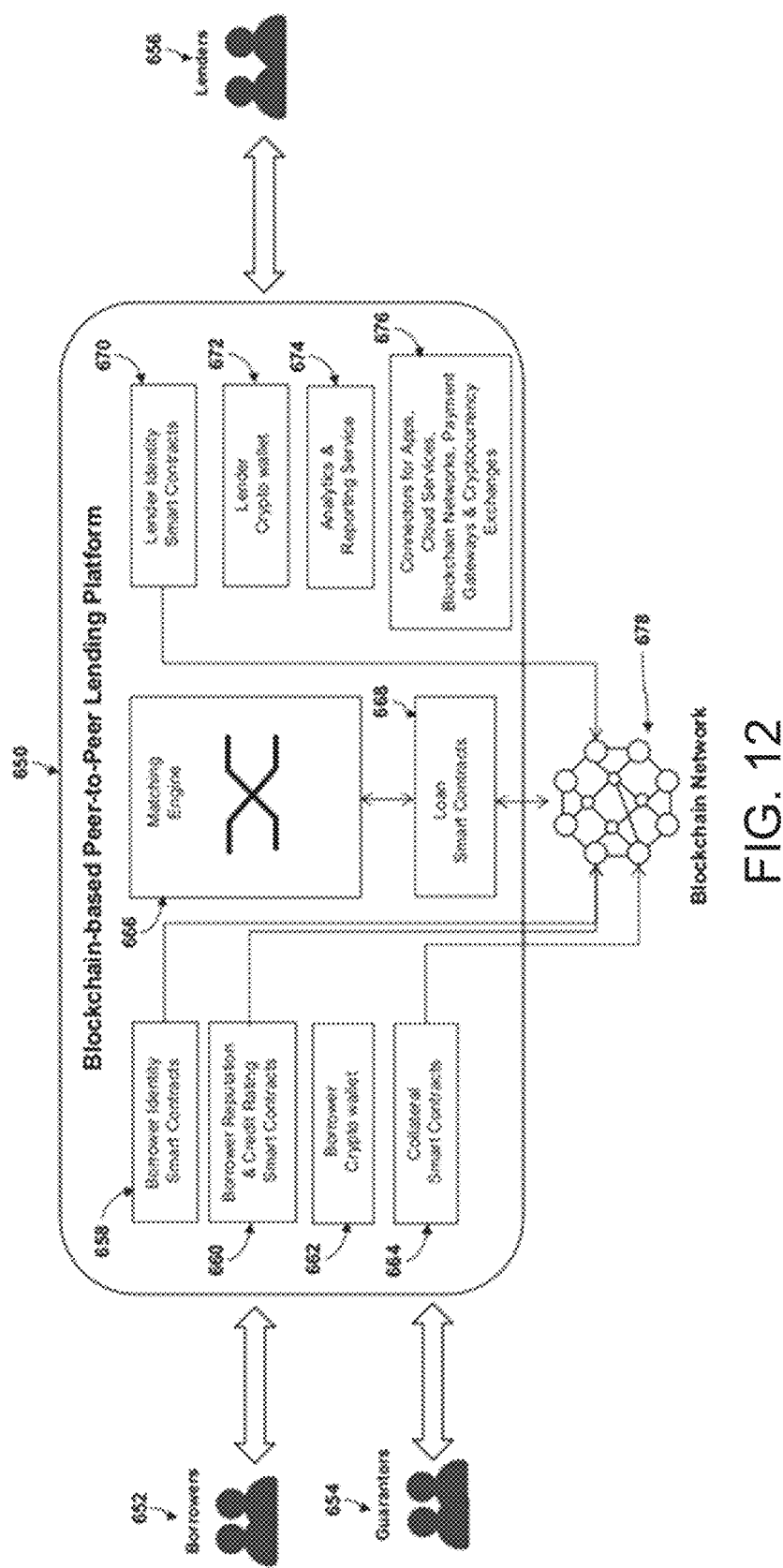
FIG. 12 is a schematic diagram of the blockchain-based peer-to-peer lending system, according to an embodiment of the invention.

Referring now to FIG. 12 a schematic diagram of the blockchain-based peer-to-peer lending system is described in more detail. The blockchain-based peer-to-peer lending system allows borrowing peers or borrowers 652 to send loan requests to a platform 650 which are advertised to lending peers or lenders 656. Lenders 656 can bid to send a loan at a particular rate and terms, including settlement date, that is enforced by a loan smart contract 668 deployed on a blockchain network 678. The lending platform 650 can co-exist with an electronic payments platform. A Borrowers 652 post loan requests to the platform and rates they can pay and lenders bid for loans with terms and rates. Platform 650 allows borrowers 652 to automatically repay loans from their nCash mobile application wallets (Borrower Crypto wallet) 662 or extend loan for another term if agreed to. Platform 650 can disburse loans in fiat or crypto currencies. When a loan is disbursed, the loan amount is transferred from the Lender Crypto wallet 672 (nCash mobile application wallet of the lender) to the Borrower Crypto wallet 662 (nCash mobile application wallet of the borrower). The interest rate is driven by the market. Higher risk means larger rate. Platform 650 may charge a percentage of the interest rate on every transaction. Borrower Identity Smart Contracts 658 comprised by the platform 650 maintain the identity information of the borrowers 652. Lender Identity Smart Contracts 670 comprised by the platform 650 maintain the identity information of the lenders 656. Borrower Reputation and Credit Rating Smart Contracts 660 comprised by the platform 650 maintain the reputation information of the borrowers 652 and their credit ratings. Collateral Smart Contracts 664 comprised by the platform 650 maintain collateral information for the loans. A reputation system and collaterals for loans makes the lending process more reliable. The lending platform 650 uses smart contracts to create a credit rating and reputation system for borrowers. Each repayment and successful loan adds points to the borrower's credit rating and if a loan is not repaid then points are deducted from the borrower's credit rating. Such payments may be transferred to a cryptocurrency wallet 672 for the lender 656. If a borrower 652 requesting a loan does not repay as per conditions their credit rating/reputation drops and lenders 656 will charge extremely high rates and higher guarantees for any subsequent loan requests. The amount of loans could be against a collateral account by the borrower 652 or having pledges from guarantor 654 or other peers that they will guarantee a certain portion of loan. The risk score gets lower of a borrower has pledges to support him. If risk score suddenly changes existing lenders get an alert that they can opt for a higher rate or a shorter repayment term. This forces the borrower to borrow wisely to protect against these margin calls. Loans issued through the platform 650 may be secured (backed by collateral) or unsecured. A Matching Engine 666 of the platform 650 matches loan requests to loan offers and connects the borrowers to lenders. The platform matches borrowers to lenders by risk reputation, loan value and interest terms. For secured loans, borrowers 652 or their guarantors 654 may present collateral in the form of Cryptocurrency Tokens or Tokenized Assets. When Cryptocurrency Tokens are presented as collateral such tokens are transferred by the borrower to a collateral contract where the tokens are held until the loan is not repaid. When the loan is repaid, the tokens are released to the borrower 652. If the loan in not repaid, the tokens are released to the lender 656. Physical assets (such as gold, diamonds, real-estate property) may be tokenized and presented as a collateral. For such cases, a third party may be engaged to verify the physical assets or keep the assets in their possession till the loan is repaid. The lending platform 602 may issue loyalty points 614 to borrowing peers 600 and lending peers 604 upon successful repayment of loans, to incentivize the borrowing and lending peers 600, 604 to use the lending platform again for borrowing and lending.

Figure 13:
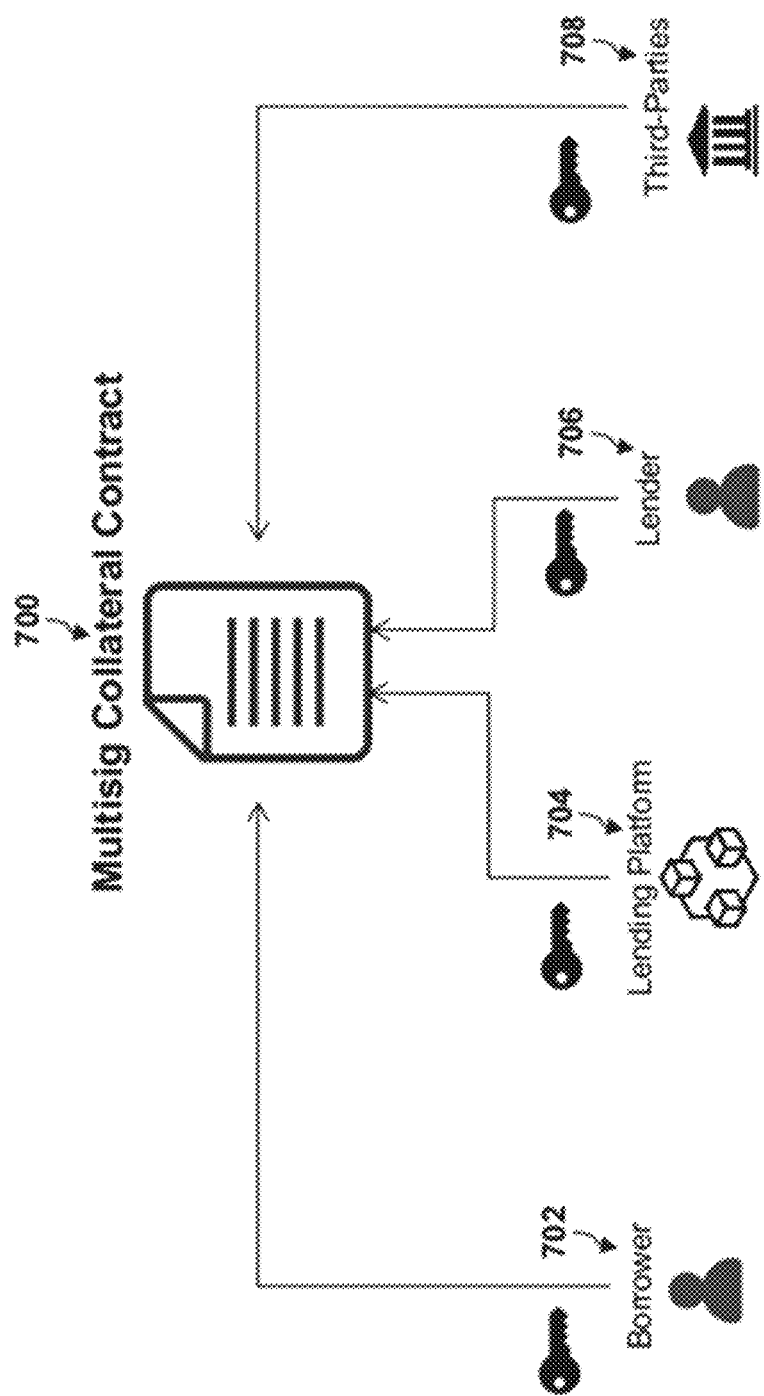
FIG. 13 is an illustration the multi-signature collateral contract used by the peer-to-peer lending system, according to an embodiment of the invention.

Referring now to FIG. 13 the multi-signature collateral contract used by the peer-to-peer lending system shown in FIG. 12 is described in more detail. Collateral tokens are stored in a multi-signature wallet contract 700. Borrower 702, Lender 706, Lending Platform 704 and optional third-parties 708 hold keys to the multisig wallet contract 700. The contract requires M-of-N signatures, typically a majority, (e.g. 2-of-3 or 3-of-5) to release collateral.

Figure 14:
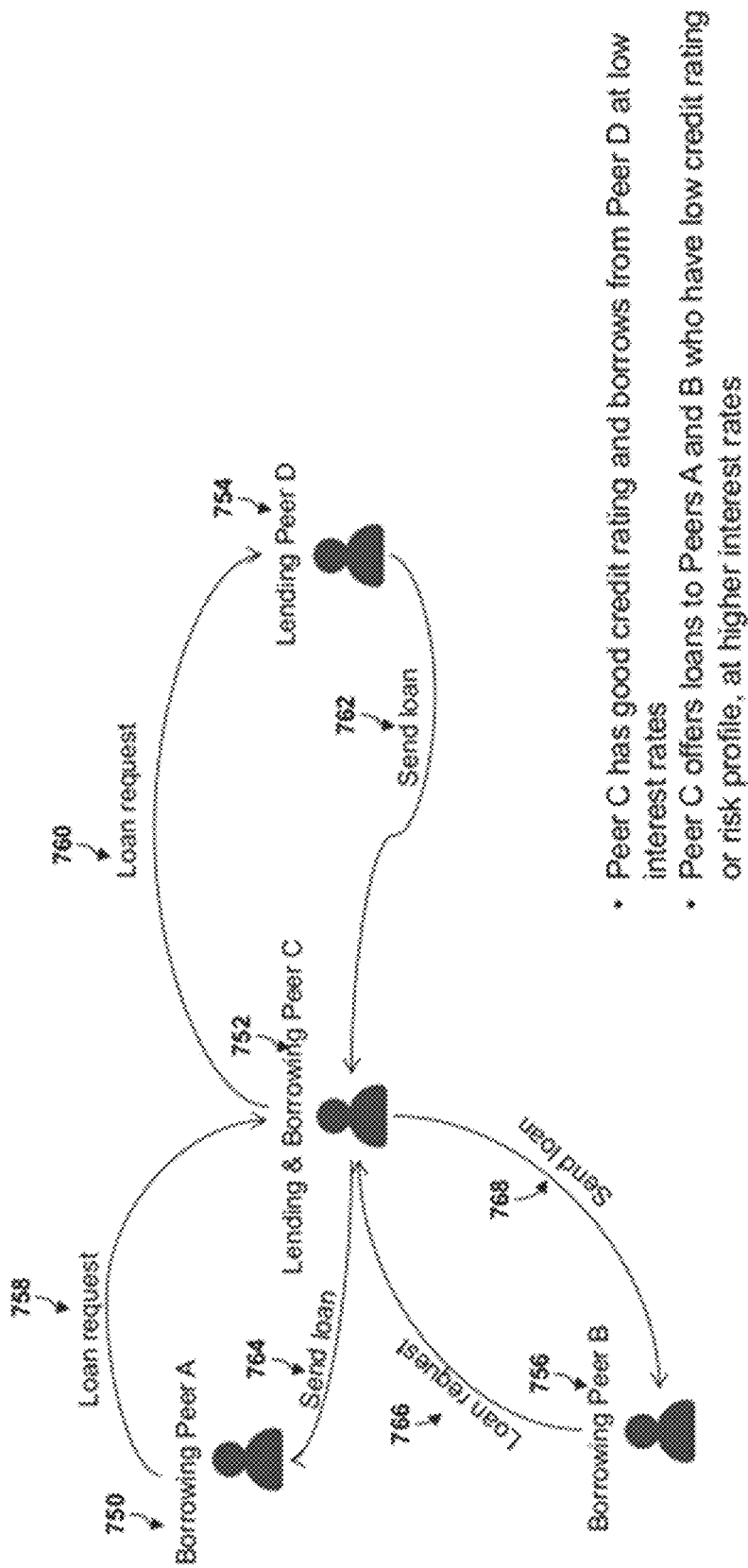
FIG. 14 is an illustration of a process for chaining of loans, according to an embodiment of the invention.

Referring now to FIG. 14 a process flow for the chaining of loans is described in more detail. The lending platform supports chaining loans where a borrowing/lending peer who has a good credit rating can borrow at low interest rates and lend to one or more peers who have low credit rating at higher interest rates. For example, Peer C 752 has good credit rating and sends a loan request 760 and borrows 762 from Peer D 754 at low interest rates. Peer C 752 receives loan requests 758, 766 from Peers A and B 750, 756 who have low credit rating or risk profile, and then send loans 764, 768 to Peers A and B 750, 756, respectively, at higher interest rates. A loan can be partitioned into subloans with different terms. Lenders can fund a portion or fraction of a loan request. Thus a loan could be satisfied with a dozen microloans each at different rates. For example, once a big lender jumps in for 30% of loan, small lenders can jump in to lend at a lower interest rate. A borrower with low risk can float a loan but open only 25% for bid to a high value lenders (such as institutions or banks). The borrower may then open up the loan to the smaller lenders who know the high value lenders will have vetted this borrower. Lending peers can buy a bundle of loans at a particular risk for a price or resell loans. The lending platform allows creating a market for users to buy, pool and resell loans. The lending platform may allow a loan to be written off if certain conditions may be met. For example, if a philanthropist funds a clinic and they treat five hundred patients in a month, then their loans can get a reduced rate, or if a farmer creates two jobs his loan may be forgiven.

Figure 15:
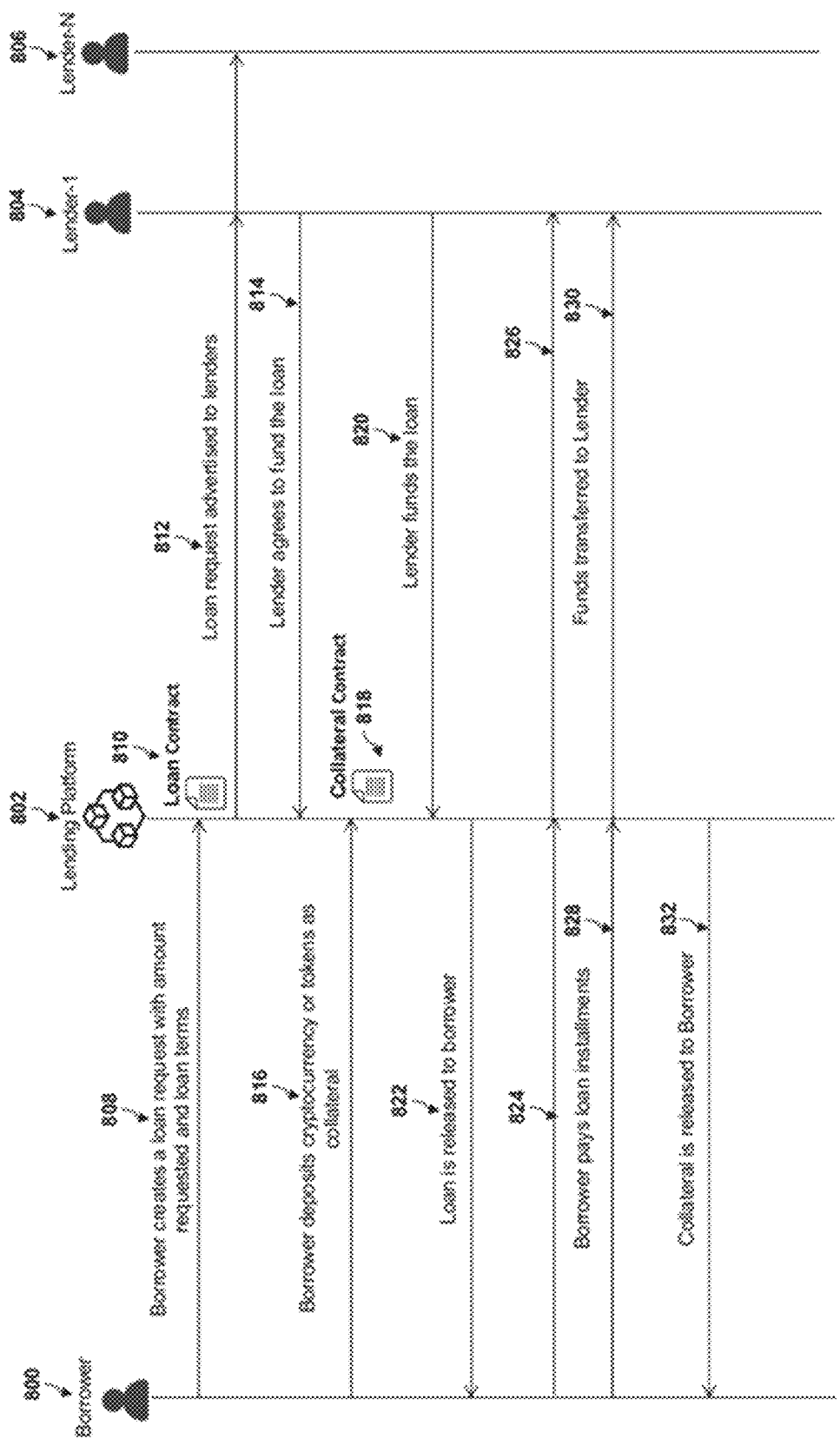
FIG. 15 is an illustration of a process for lending with cryptocurrency or tokens as collateral where the borrower successfully repays the loan, according to an embodiment of the invention.

Referring now to FIG. 15 a process for lending with cryptocurrency or tokens as collateral where the borrower successfully repays the loan is described in more detail. A Borrower 800 creates a loan request with amount requested and loan terms at step 808. The lending platform 802 creates a loan contract 810 and advertises the loan request to lenders at step 812. A Lender 804 agrees to fund the loan at step 814. Next, the Borrower 800 deposits cryptocurrency or tokens as collateral in a collateral contract 818 at step 816. The Lender 804 funds the loan at step 820. The loan amount is released to the Borrower 800 at step 822. The Borrower 800 pays loan installments to the Lending Platform 802 at steps 824 and 828 which are released to the Lender 804 at steps 826 and 830. When the loan repayment is complete, the Collateral is released to the Borrower 800 at step 832, such release being recorded to the collateral contract 818.

Figure 16:
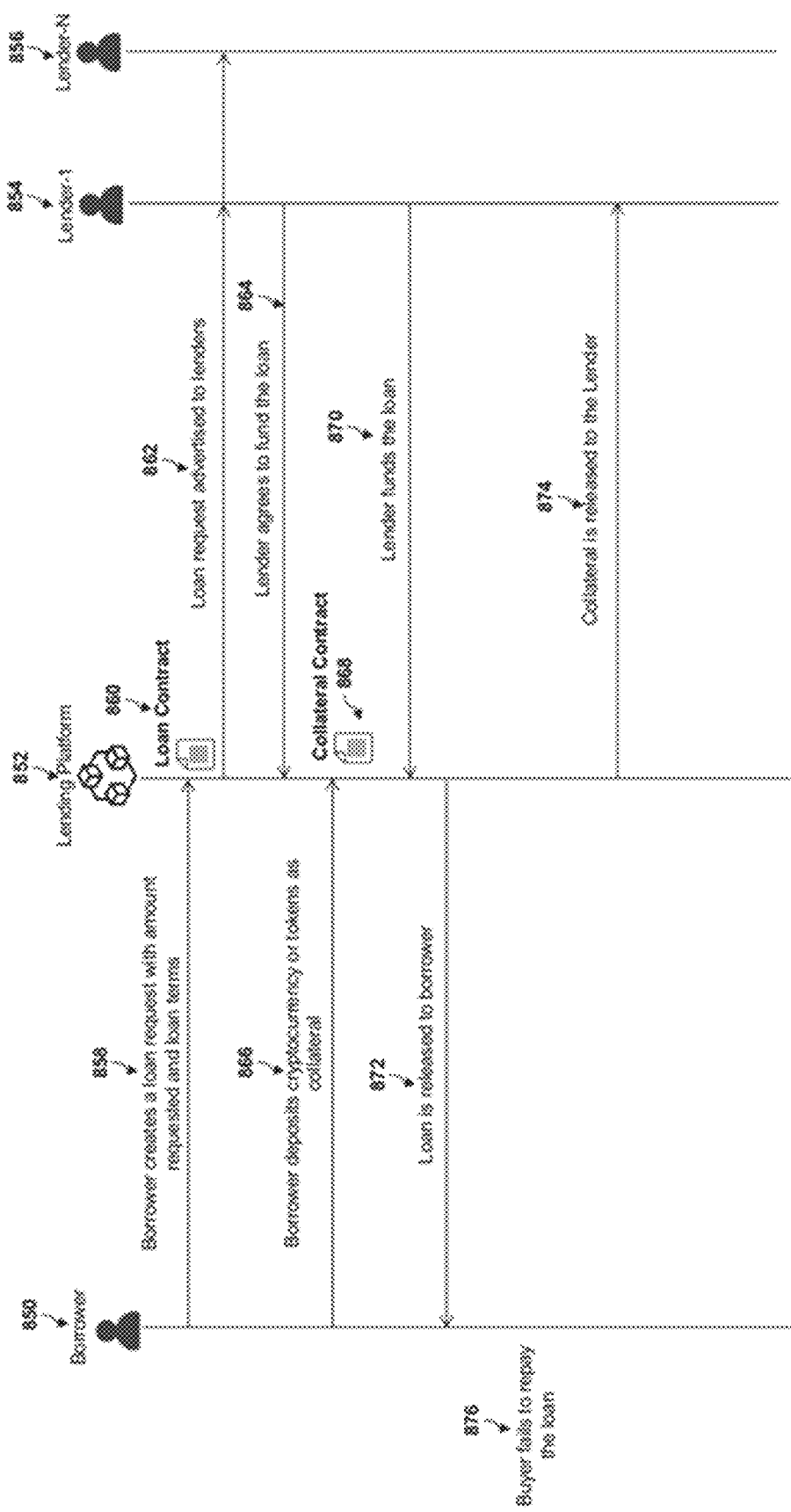
FIG. 16 is an illustration of a process for lending with cryptocurrency or tokens as collateral where the borrower fails to repay the loan, according to an embodiment of the invention.

Referring now to FIG. 16 a process for lending with cryptocurrency or tokens as collateral where the borrower fails to repay the loan, is described in more detail. A Borrower 850 creates a loan request on a lending platform 852 with an amount requested and loan terms at step 858. The lending platform 852 creates a loan contract 860 and advertises the loan request to lenders at step 862. A Lender 854 of N lenders 856 to whom the loan request is advertised agrees to fund the loan at step 864. Next, the Borrower 850 deposits cryptocurrency or tokens as collateral in a collateral contract 868 at step 866. The Lender 854 funds the loan at step 870. The loan amount is released to the borrower at step 872. When the Borrower 850 fails to repay the loan as indicated at step 876, the Collateral is released to the Lender at step 874.

Figure 17:
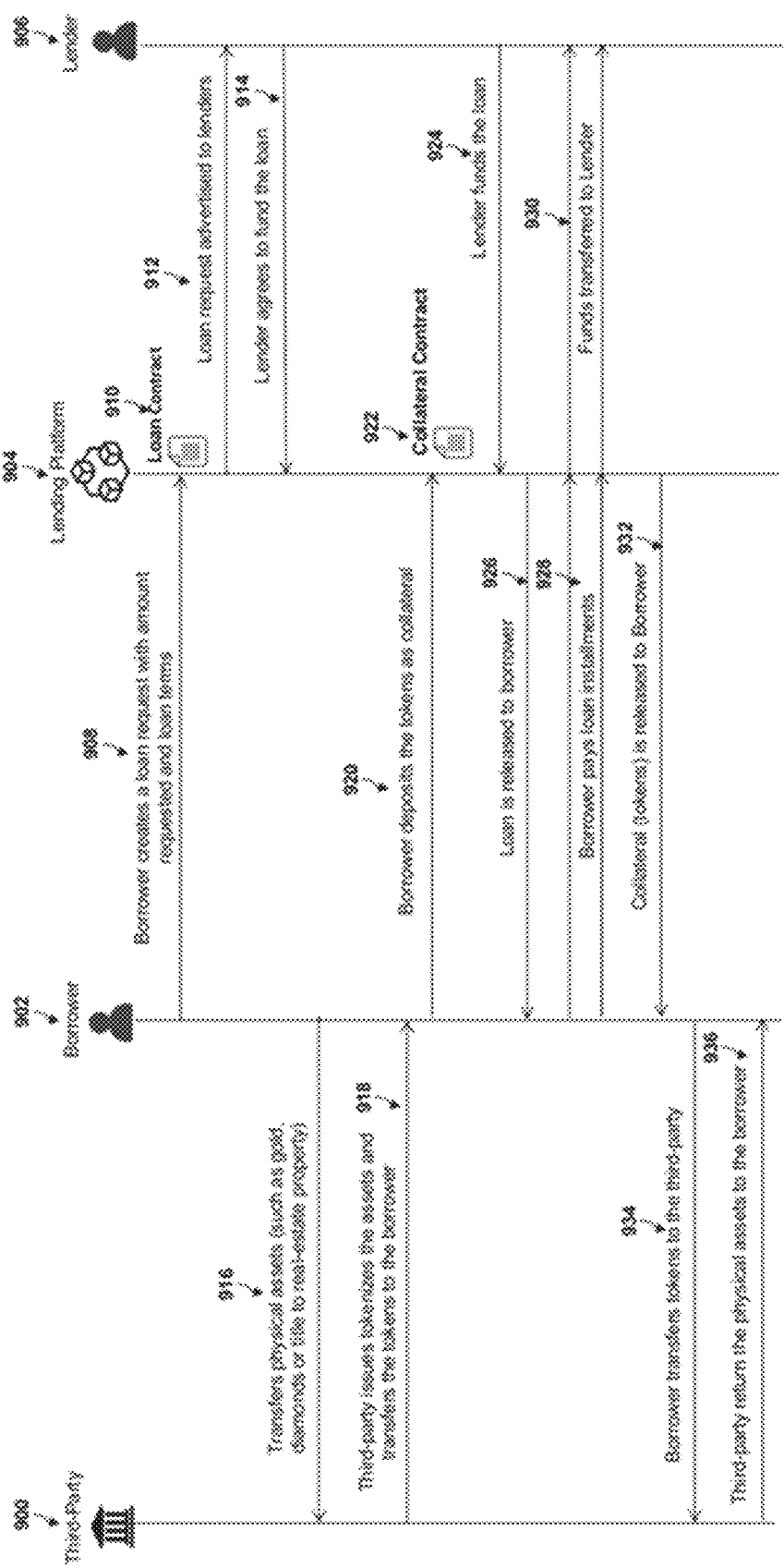
FIG. 17 is an illustration of a process for lending with physical assets as collateral, according to an embodiment of the invention.

Referring now to FIG. 17 a process flow for lending with physical assets as collateral, is described in more detail. A Borrower 902 creates a loan request on a lending platform 904 with an amount requested and loan terms at step 858. The lending platform 904 creates a loan contract 910 and advertises the loan request to lenders at step 912. A Lender 906 agrees to fund the loan at step 914. Next, the Borrower 902 transfers physical assets (such as gold, diamonds or title to real-estate property) to a Third Party 900 at step 916. The Third Party 900 tokenizes the assets and transfers the tokens to the borrower at step 918. The Borrower 902 deposits these tokens as collateral to the lending platform 904 in a Collateral Contract 922 at step 920. The Lender 906 funds the loan at step 924. The loan amount is released to Borrower at step 926. The Borrower repays the loan installment to the lending platform 904 at step 931 and the funds are released to the lender 906 at step 930. When the loan repayment is complete the lending platform 904 releases the Collateral (tokens) is released to the Borrower 902 at step 932. Next, the Borrower 902 transfers tokens to the third-party 900 at step 934. The third-party 900 then returns the physical assets to the Borrower 902 at step 936.

Figure 18:
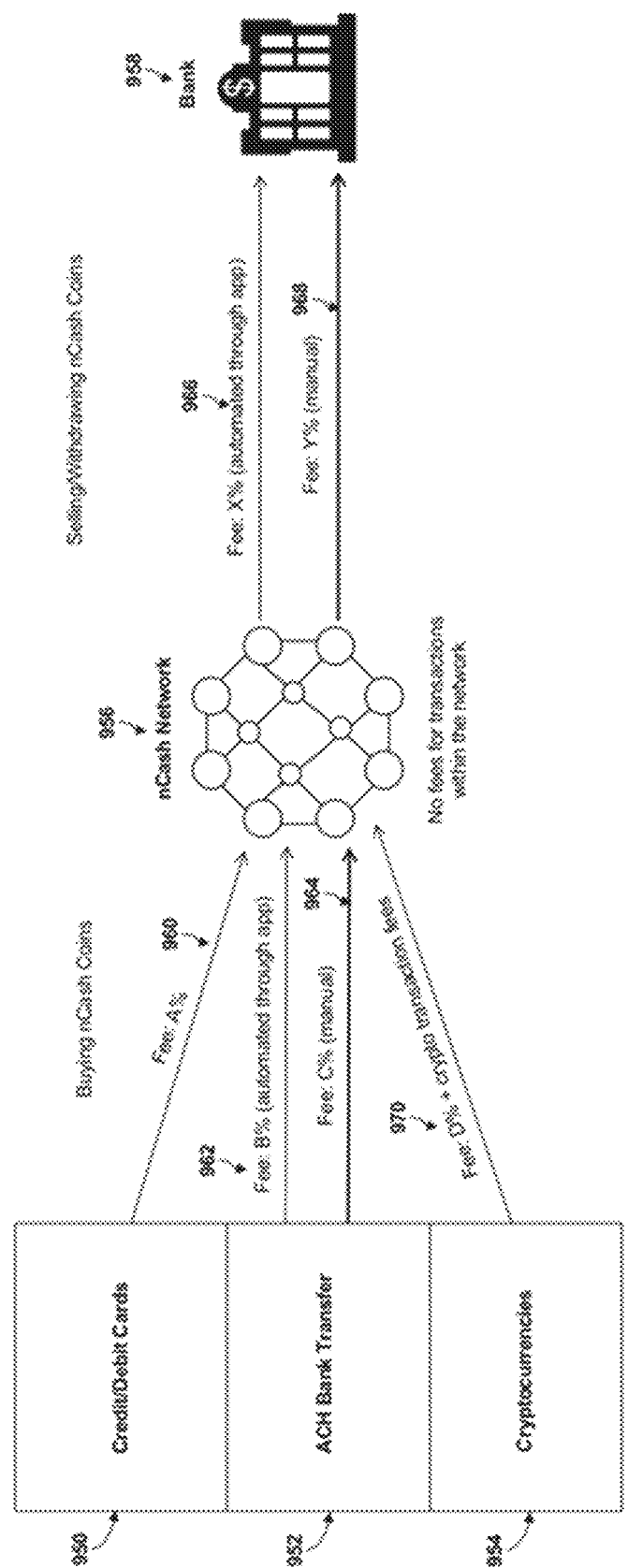
FIG. 18 is an illustration of the transaction fee involved for buying and selling of coins, according to an embodiment of the invention.

Referring now to FIG. 18 transaction fees involved for buying and selling of nCash coins is described in more detail. nCash coins can be purchased by paying in a fiat currency (such as USD) using credit/debit card 950 or ACH bank transfer 952, or by paying in a cryptocurrency 954 (such as Bitcoin, Ether). There are different transaction fees for buying coins with credit/debit card 960, ACH bank transfer, whether automated through an app 962 or manually 964, or cryptocurrency 970. For transactions between the nCash network 956 (such as sending coins to another user or merchant) does not involve any transaction fee. For selling coins and withdrawing coins to a linked bank account 958, a transaction fee. for automated transactions through an app 866 or manual transactions 968. is involved.

Figure 19:
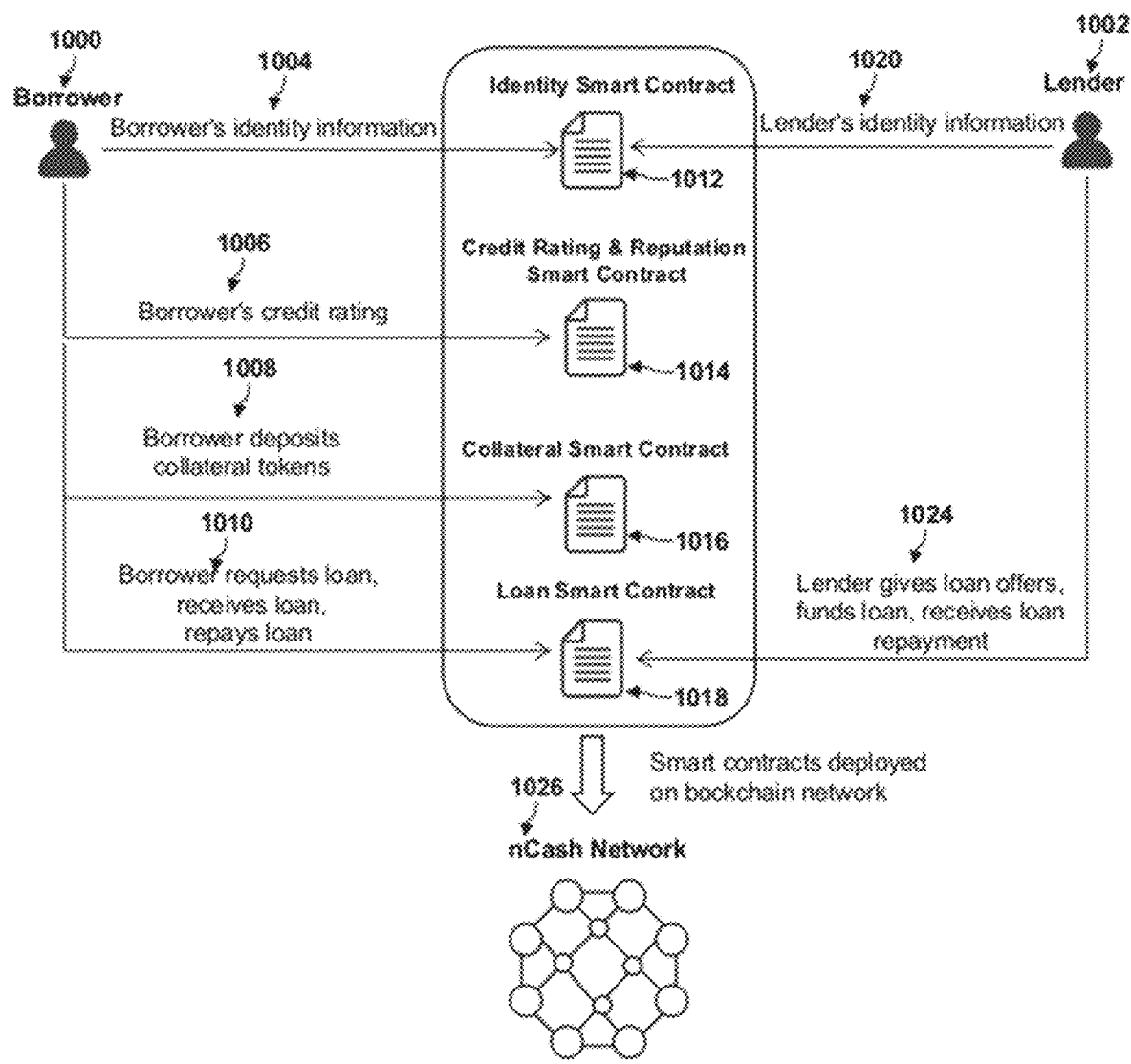
FIG. 19 is an illustration of the smart contracts related to the lending platform and the interactions of borrowers and lenders with the smart contracts, according to an embodiment of the invention.

Referring now to FIG. 19 an illustration of smart contracts related to the lending platform and the interactions of borrowers and lenders with the smart contracts is described in more detail. An Identity Smart Contract 1012 is used to link blockchain accounts to real users, such as an account of a borrower 1000 or a lender 1002. The identity information provided by the borrower 1000 at step 1004 is recorded in the identity smart contract 1012 in original or hashed form. Similarly the identity information provided by the lender 1002 at step 1020 is recorded in the identity smart contract 1012 in original or hashed form. A Credit Rating & Reputation Smart Contract 1014 is used to track credit scores and reputation of a borrower 1000. The credit score of the borrower 1000 is recorded at step 1006 and updated on each new loan request, loan repayment or loan default. A Collateral Smart Contract 1016 is used to manage locking up and release of collateral, such as cryptocurrency tokens or physical assets which may be represented in a tokenized form. The borrower 1000 deposits the collateral tokens to the collateral smart contract 1016 at step 1008. A Loan Smart Contract 1018 is used to enforce loan terms and manage release, repayment or extension of loans. The information related to the borrower's 1000 loan requests, loan disbursement received or loan repayment completion is recorded in the loan smart contract 1018. Similarly, the information related to the lender's 1002 loan offers, loan disbursement completion, or loan repayment received is recorded in the loan smart contract 1018. The smart contracts 1012, 1014, 1016 and 1018 are deployed on the blockchain network 1026.

Figure 20:
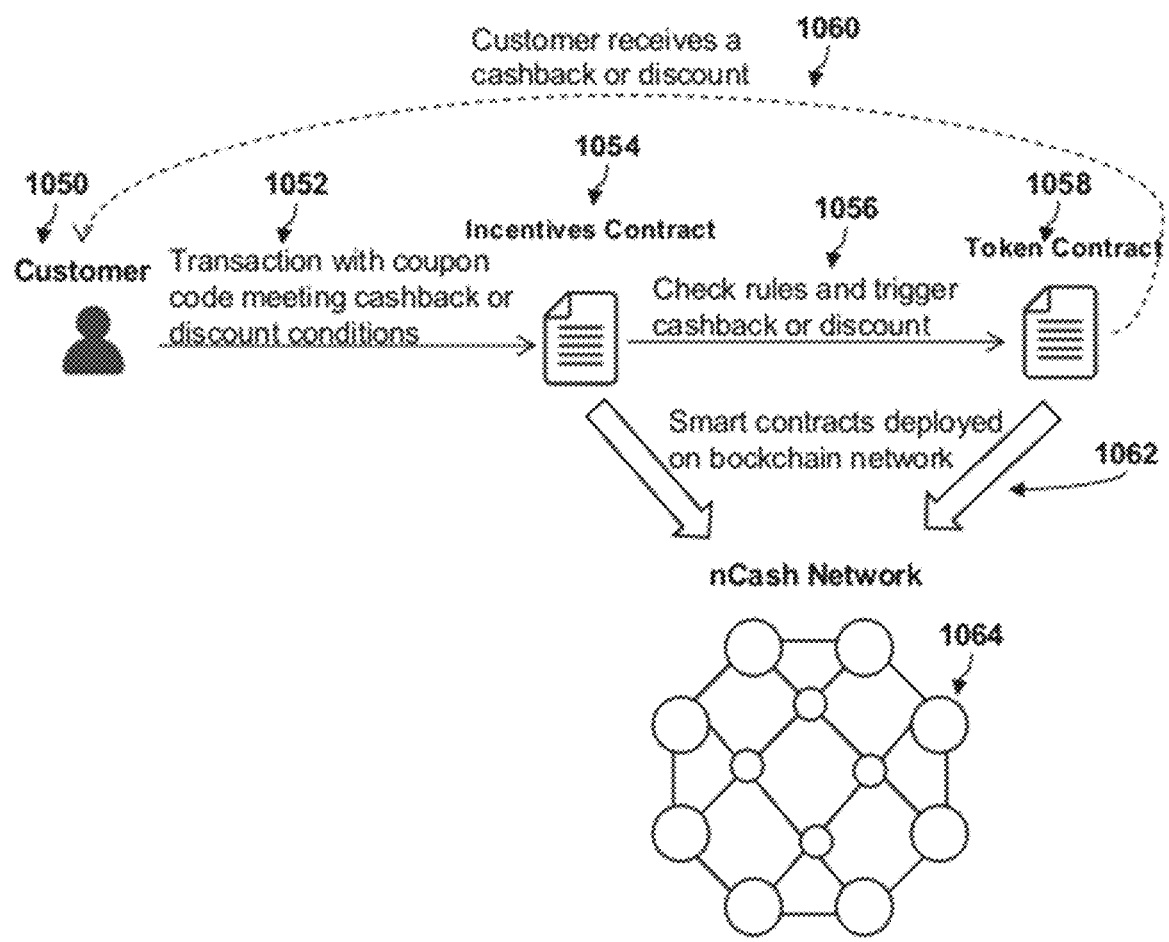
FIG. 20 is an illustration of a process for issuing cashback and discounts using smart contracts, according to an embodiment of the invention.

Referring now to FIG. 20 an illustration of a process for issuing cashback and discounts using smart contracts, is described in more detail. A customer 1050 makes a transaction to a merchant with coupon code meeting cashback or discount conditions at step 1052. An incentives smart contract 1054 checks cashback or discount rules comprised thereby and triggers a cashback or discount if the transaction meets the cashback or discount criteria at step 1056. When a cashback or discount is triggered, the token contract 1058 is updated and tokens are transferred from the merchant's account to the customer's account. The customer 1050 receives a cashback or discount notification at step 1060. The smart contracts 1054 and 1058 are deployed on the blockchain network 1064 at step 1062.

Figure 21:
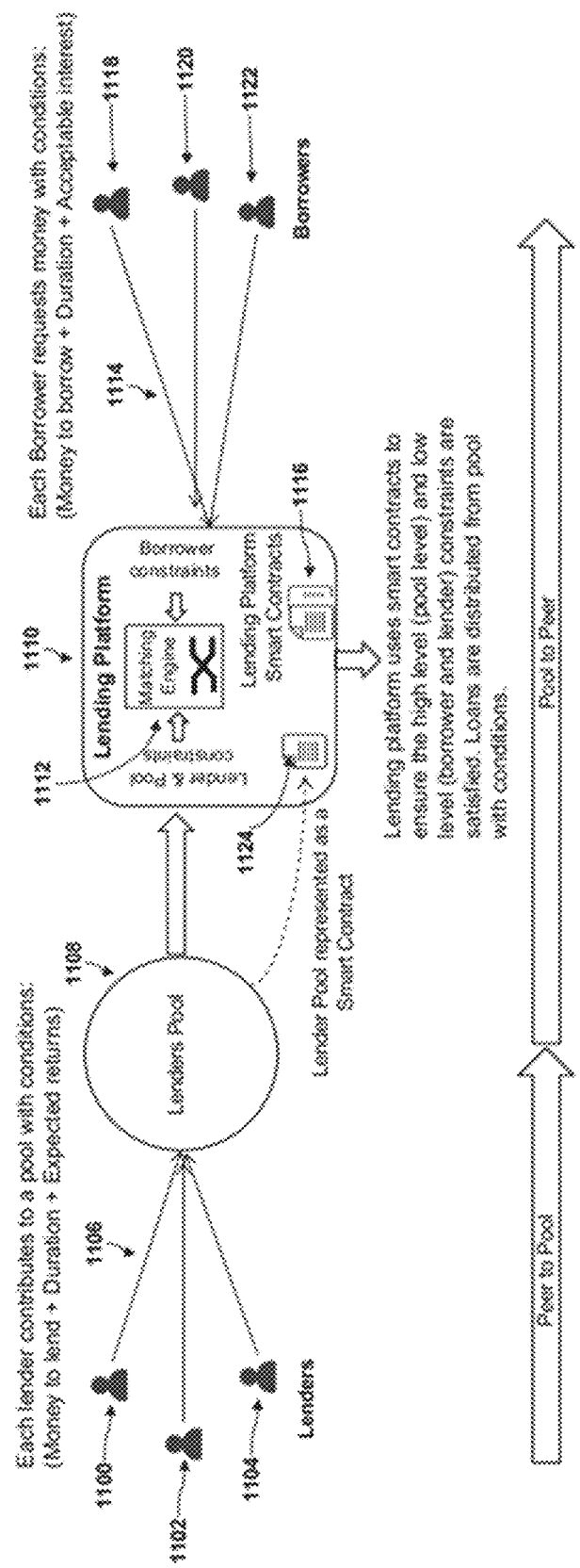
FIG. 21 is an illustration of a peer-to-pool-to-peer (P2P2P) lending model, according to an embodiment of the invention.

Referring now to FIG. 21 an illustration of the peer-to-pool-to-peer (P2P2P) lending model, is described in more detail. The lenders 1100, 1102, 1104 contribute to a lenders pool 1108 with conditions. A lender's condition to lend money may include the amount to lend, the duration of the loans, expected returns, and loan settlement dates. The loans are distributed from the lenders pool 1108 with conditions. Borrowers 1118, 1120, 1122 may submit borrower's requests 1114 from the lenders pool 1108 through a lending platform 1110. Each borrower request may comprise the borrower's conditions for a loan. A borrower's condition for borrowing money may include the amount to borrow, the duration of the loan, and an acceptable interest rate.

A matching engine 1112 in the lending platform 1110 uses smart contracts 1116 to ensure the high level (pool level) and low level (borrower and lender) constraints are satisfied. A borrower's requests to borrow money are matched automatically to the lenders 1100, 1102, 1104 and lending pool's 1108 conditions using smart contracts 1116. Each lender pool (such as pool 1108) is represented by a smart contract (such as smart contract 1124) in the lending platform 1110 which controls the pool level behavior and handles conditions such as different time periods and expected returns for the lenders 1100, 1102, 1104 and substitution of lenders who exit the pool 1108 with new lenders, as some of the lenders to the pool 1108 may have different time periods and they will exit and be substituted by new lenders. Loans are distributed from lender pools 1108 with conditions.

The peer-to-pool-to-peer (P2P2P) lending model is more efficient than the existing peer-to-peer (P2P) lending models, especially when there are large number of lenders/investors who want to lend loans. Each lender/investor contributes a different amount of money and specifies the minimum interest they would like to receive and the period of their loan amounts. Similarly, the borrowers specify similar terms such as the amount of money to borrow, duration and acceptable rate of interest. In the P2P2P lending model the lender's money is pooled into one lending pool and then lent out to multiple borrowers, while smart contracts assure payouts to lenders and payments to borrowers, while some lenders exist and some borrowers' payback. This allows the "pool" of money that is used for lending, while at the lower level smart contracts ensure all lower agreements are kept. Lenders' and borrowers' contributions and withdrawals continually occur, while the pool remains active as new borrowers and lenders join and others may leave. A lender may end up lending to N loans and a borrower may end up borrowing from M lenders over a period where only P lenders are active at any time (where M>N and M>P). The smart contracts are thus critical to maintain the integrity of the records. In the P2P2P lending model, the transactions for pools merge lower level transactions between peers inside the blockchain.

Furthermore, it is contemplated and included within the scope of the invention that a variety of loans may be executed utilizing this systems and other systems disclosed herein. The types of loans requested by borrowers, and offered by lenders, may include larger value loans, such as those typically offered by banks, but may also include smaller value loans, including those for individual consumer transactions (e.g. a routine, daily transaction for the purchase of consumer goods, groceries, etc.) performed at a merchant terminal. Additionally, loan requests may also take the form of other transfers of value aside from fiat currency, such as requests for cryptocurrency, credit towards a future transaction, an exchange of tokens having value, and the like.

Additionally, while loans comprising amounts to lend are contemplated, other types of financial securities are contemplated and included within the scope of the invention. More specifically, security offers may be received from offerors and comprising offer terms, and security seller requests may be received from sellers and comprising seller terms. The security offers may be recorded to security offer smart contracts, which may then be recorded to security offer pool smart contract, defining security offer pools, the same as for lending pools. The terms of the security offers may define the security offer pool terms. The terms of the security seller may be compared to the security offer pool terms and, upon determining the security seller terms fall within the security offer pool terms, the security seller request smart contract may be recorded to the security offer pool smart contract.

Such securities include, but are not limited to, options contracts. In such embodiments, a buyer option may be received and recorded to a buyer option smart contract, which may include at least one offer term which may comprise at least one of a designation of the asset associated with the buyer option smart contract, a quantity of the associated asset, an expiration date, a transaction type (e.g. a call or put, as known in the art), and/or a strike price or range of strike prices for the asset. Such a buyer option smart contract may be recorded to a blockchain network similar to the recordation of lender smart contracts described hereinabove. Similarly, a seller option may be received and recorded to a smart contract may comprise the same fields as the buyer option, with the seller being obligated to either sell the associated asset at the strike price in exchange currency, fiat or crypto, at the strike price on the expiration date for a call, or purchase the associated asset at the strike price using currency, either fiat or crypto, on the expiration date for a put.

Additionally, security offers may be received and interpreted to determine their type (e.g. loan, offer, etc.) with the determined security offer type being recorded to the associated security offer smart contract. Similarly, security seller requests may be received and have their type determined, the determined security seller type being recorded to the associated security seller smart contract. An indication of the security offer types and the security seller requests may be recorded to the respective associated security offer smart contracts and security seller request smart contracts.

Figure 22:
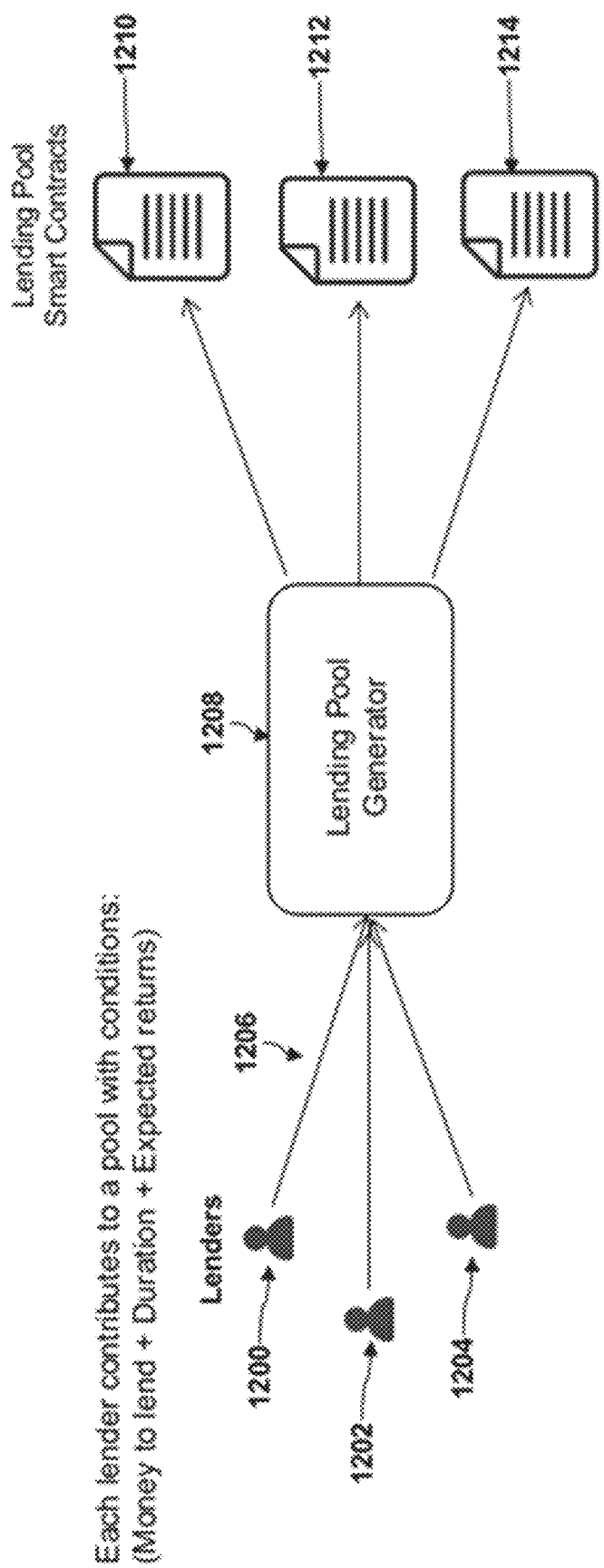
FIG. 22 is an illustration of a lending pool generator for generating lending pool smart contracts, according to an embodiment of the invention.

Referring now to FIG. 22 an illustration of a lending pool generator for generating lending pool smart contracts is described in more detail. Each lender 1200, 1202, 1204 contributes 1206 to a lending pool with conditions including the amount of money to lend, duration of lending and expected returns. Lenders 1200, 1202, 1204 can have different conditions and may contribute to one or more lending pools. A lending pool smart contract generator 1208 is used to generate smart contracts 1210, 1212, 1214 which represent the lending pools.

Figure 23:
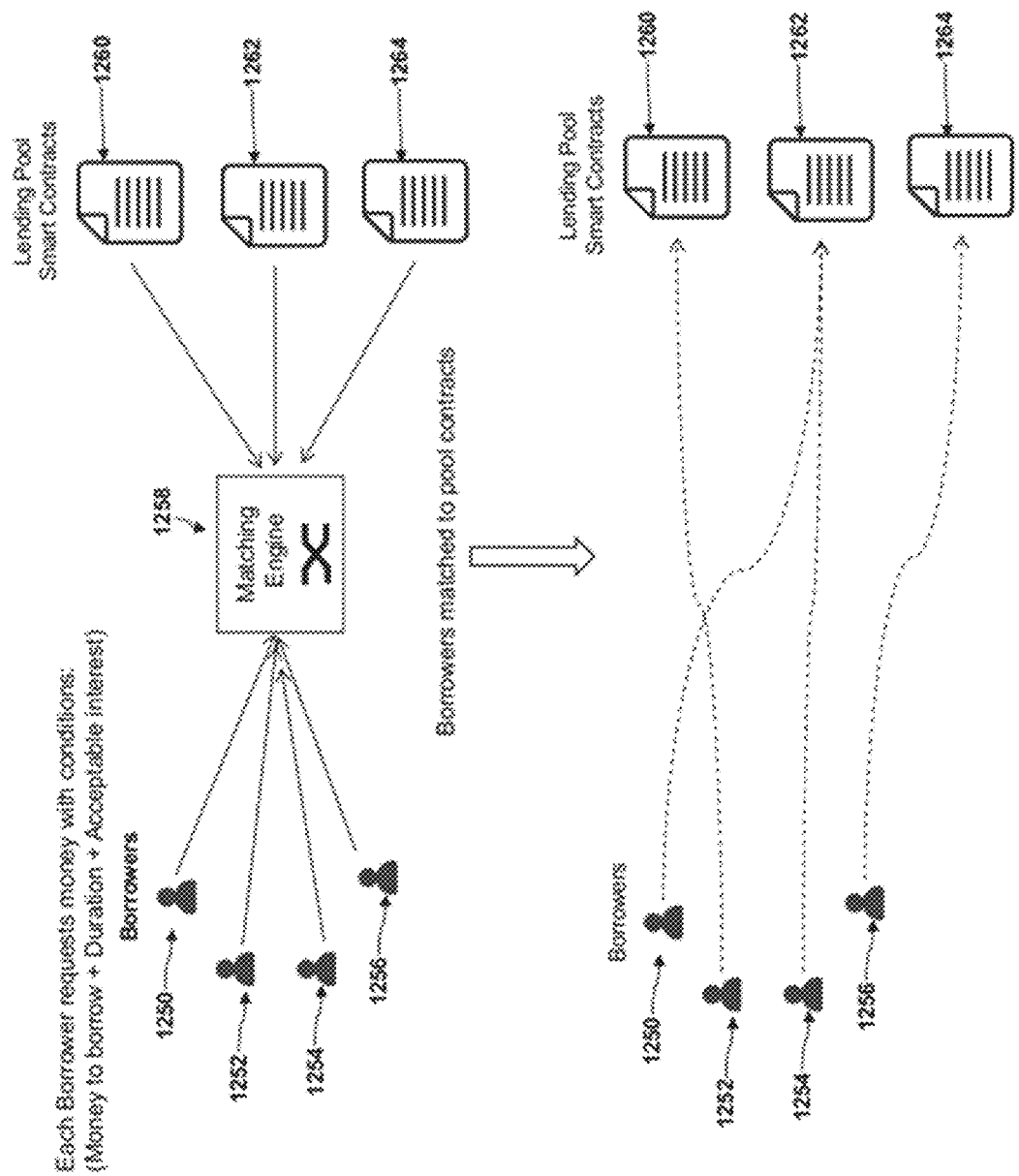
FIG. 23 is an illustration of a matching engine for matching borrowers to lending pools, according to an embodiment of the invention.

Referring now to FIG. 23 an illustration of a matching engine for matching borrowers to lending pools is described in more detail. Each borrower 1250, 1252, 1254, 1256 requests money with conditions including the amount of money to borrow, duration for which money is to be borrowed and acceptable rate of interest. A matching engine 1258 matches the borrowers 1250, 1252, 1254, 1256 to lending pool smart contracts 1260, 1262, 1264 such that the borrower level and pool level conditions are satisfied. A borrower 1250, 1252, 1254, 1256 may be matched to more than one lending pool.

Figure 24:
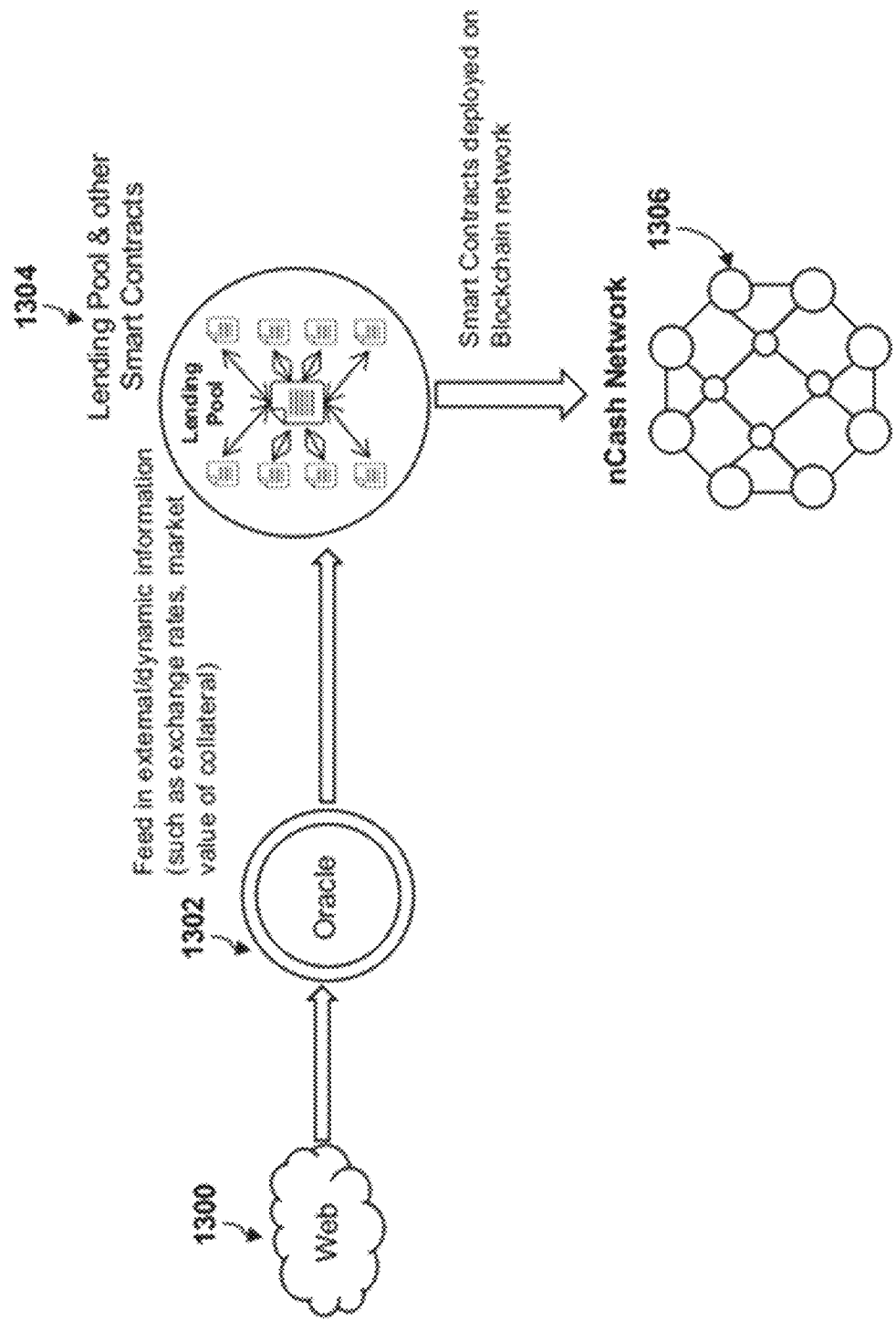
FIG. 24 is an illustration of feeding external data to lending pool contracts using an oracle, according to an embodiment of the invention.

Referring now to FIG. 24 an illustration of feeding external data to lending pool contracts using an oracle is described in more detail. Lending pool and related smart contracts 1304 are deployed on a blockchain network 1306. An oracle 1302 is used to feed in external or dynamic information (such as exchange rates, market value of collateral) to the lending pool smart contracts. The oracle 1302 may obtain such information from external sources and the web 1300.

Figure 25:
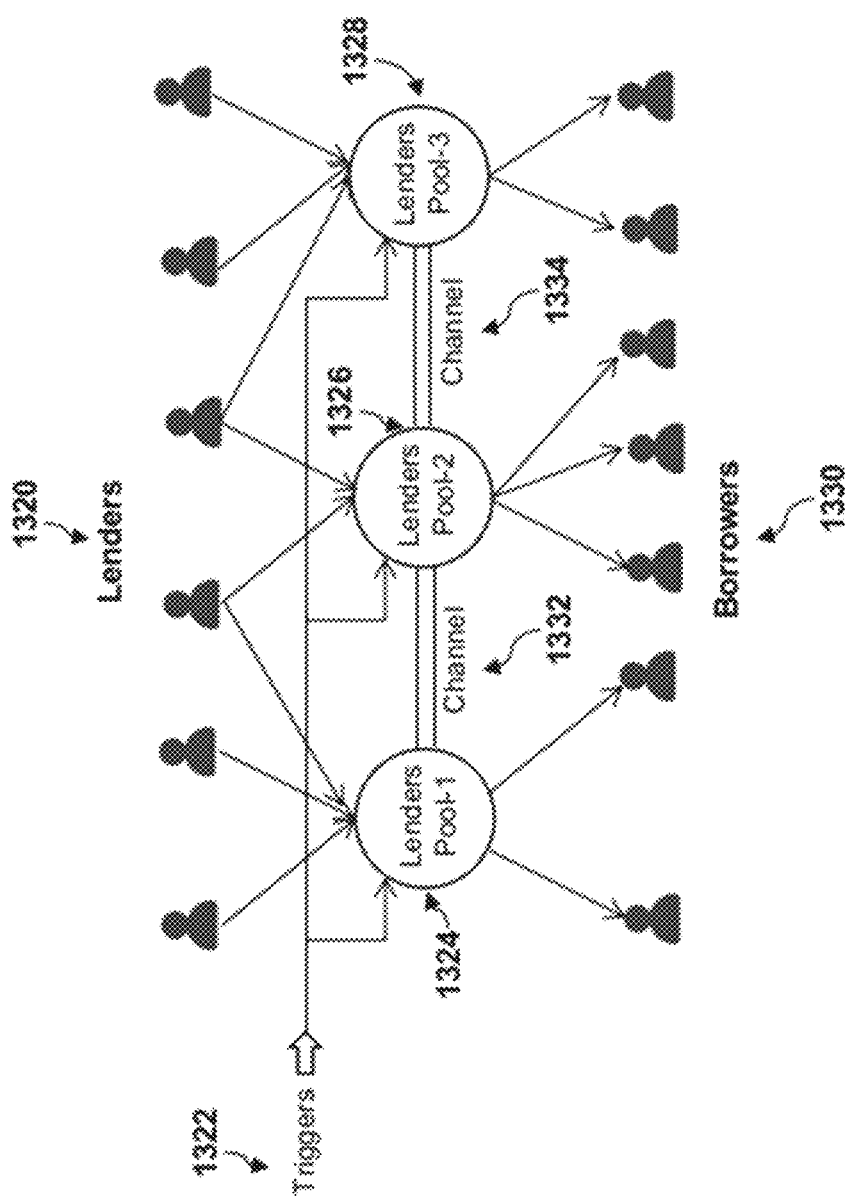
FIG. 25 is an illustration of channels and triggers for lending pools, according to an embodiment of the invention.

Referring now to FIG. 25 an illustration of channels and triggers for lending pools is described in more detail. Lending pools 1324, 1326, 1328 comprising Lenders 1320 and distributing to Borrowers 1330 can have channels 1332, 1334 between them for transfer of pooled funds between the pools based on external triggers 1322. Moving funds from one pool to another pool may be required when a pool is not performing well and the high-level (pool-level) and low-level (lender and borrower level) constraints are not being satisfied. The P2P2P lending platform may monitor the performance of each lending pool and generate triggers for transfer of funds from one pool to another.

Figure 26:
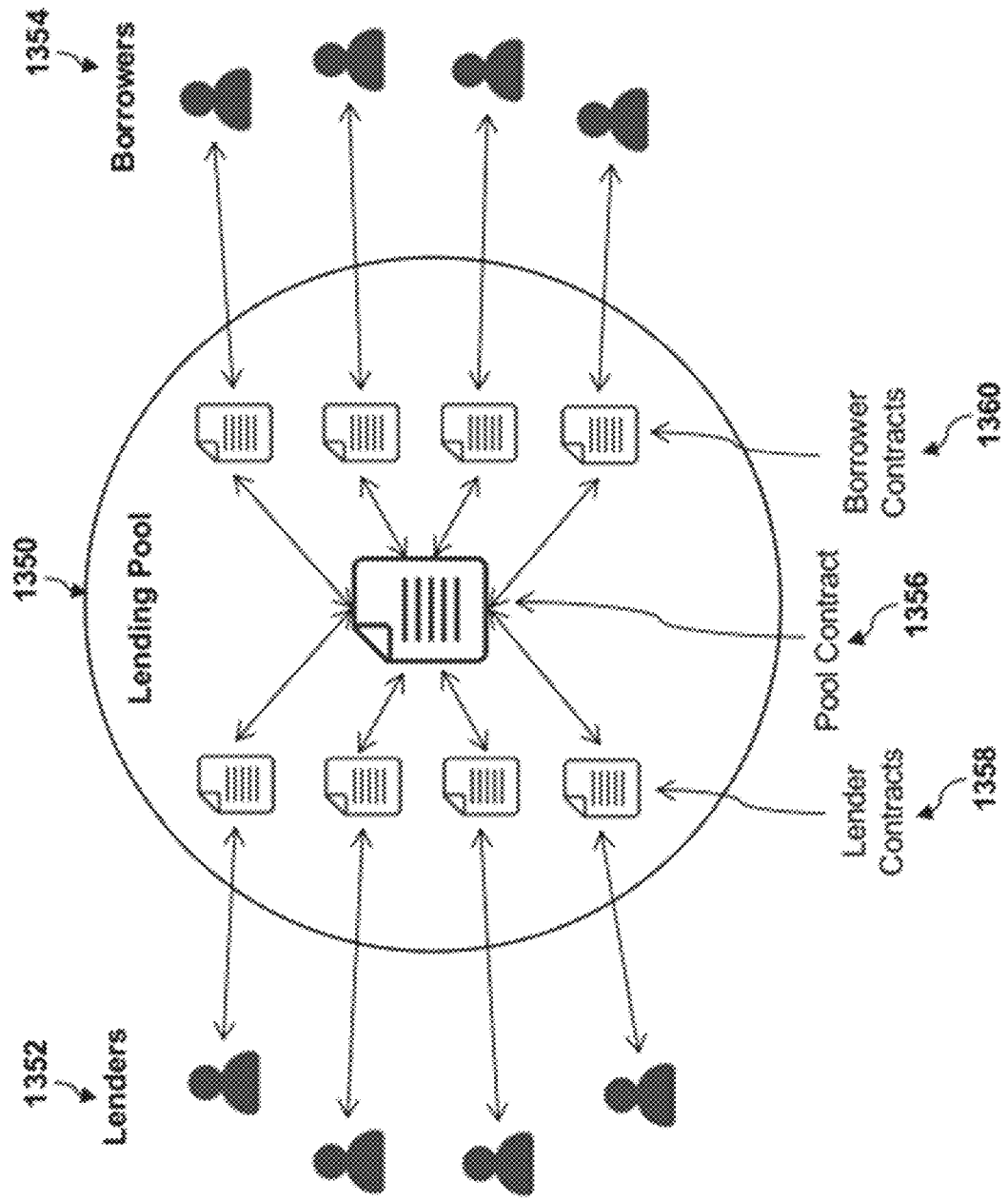
FIG. 26 is an illustration of smart contracts involved in a lending pool, according to an embodiment of the invention.

Referring now to FIG. 26 an illustration of the smart contracts involved in a lending pool is described in more detail. Each lender 1352 is represented by an individual smart contract 1358 in the lending pool 1350. Similarly, each borrower 1354 is represented by an individual smart contract 1360 in the lending pool 1350. The lender smart contracts 1358 link lenders 1352 to the lending pool 1350 via the lending pool contract 1356. The borrower smart contracts 1360 link borrowers 1354 to the pool lending 1350 via the lending pool contract 1356. There is no direct link between the lenders 1352 and borrowers 1354 like traditional smart contracts used in blockchain based peer-to-peer lending solutions.

In current lending schemes (especially computer-implemented lending schemes or blockchain based peer-to-peer lending schemes), if there are a large number of investors in a lending pool, each specifying an investment amount they would like to invest, the rates they would like to receive in combination with time periods (such as 2.3% over 3 months, or 2.2% over 6 months) and with various exit strategies, and large number of borrowers specifying various terms and repayment periods and early payoff options, the following problems arise:

Manual reconciliation is not possible when the number of active and passive investors enter and leave the pool.

A scalable and secure solution is not possible.

Abstracting the lenders and borrowers with "linked" smart contracts in a lending pool solves the problems of manual reconciliation and scalability. Additionally, this approach provides the following benefits:

Borrowers with good credit may borrow at better rates and lend to other borrowers with bad credit with the borrowed money at higher rates.

A seamless lending environment can be created with options to borrow or lend at certain rates and offer these derivatives for trading as well.

Figure 27:
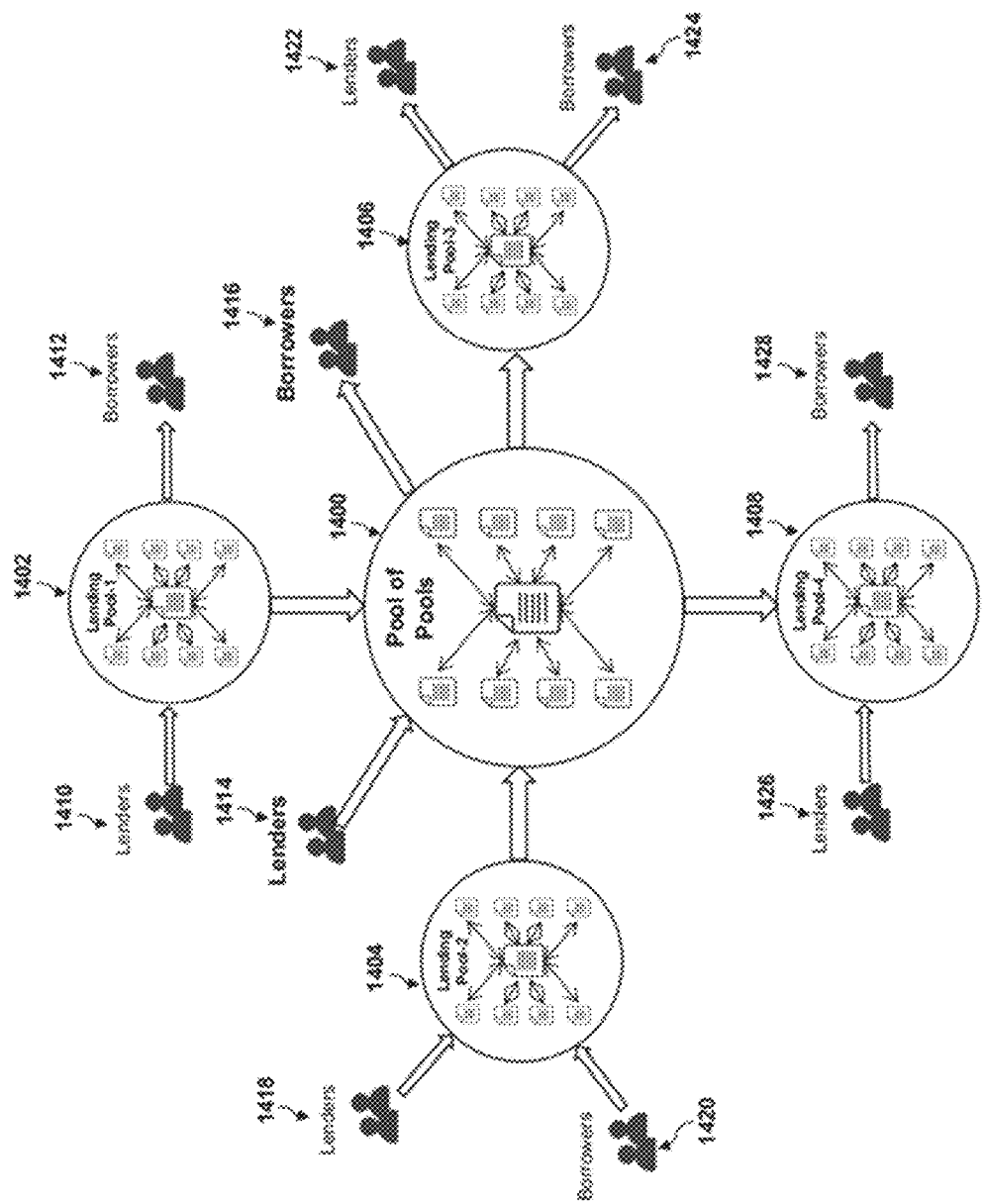
FIG. 27 is an illustration of a pool-of-pools comprised of multiple lending pools, according to an embodiment of the invention.

Referring now to FIG. 27 an illustration of pool-of-pools comprised of multiple lending pools, is described in more detail. Multiple lending pools can be clubbed together to create a pool-of-pools. The pool-of-pools approach is beneficial for highly volatile pools in which borrowers and lenders keep entering and exiting and it is difficult to meet the high-level (pool-level) and low-level (lender and borrower level) constraints. Combining multiple pools into a pool-of-pools brings stability to the P2P2P lending platform. A pool-of-pools approach may comprise a plurality of lending pools 1402, 1404, 1406, 1408 that each interact with a pool of pools 1400. Each of the plurality of lending pools

1402, 1404, 1406, 1408 may comprise borrower smart contracts with respective borrowers 1412, 1420, 1424, 1428 and lender smart contracts with respective lenders 1410, 1418, 1422, 1426. Additionally, some borrowers 1416 and lenders 1414 may interact directly with the pool of pools 1400.

Figure 28:
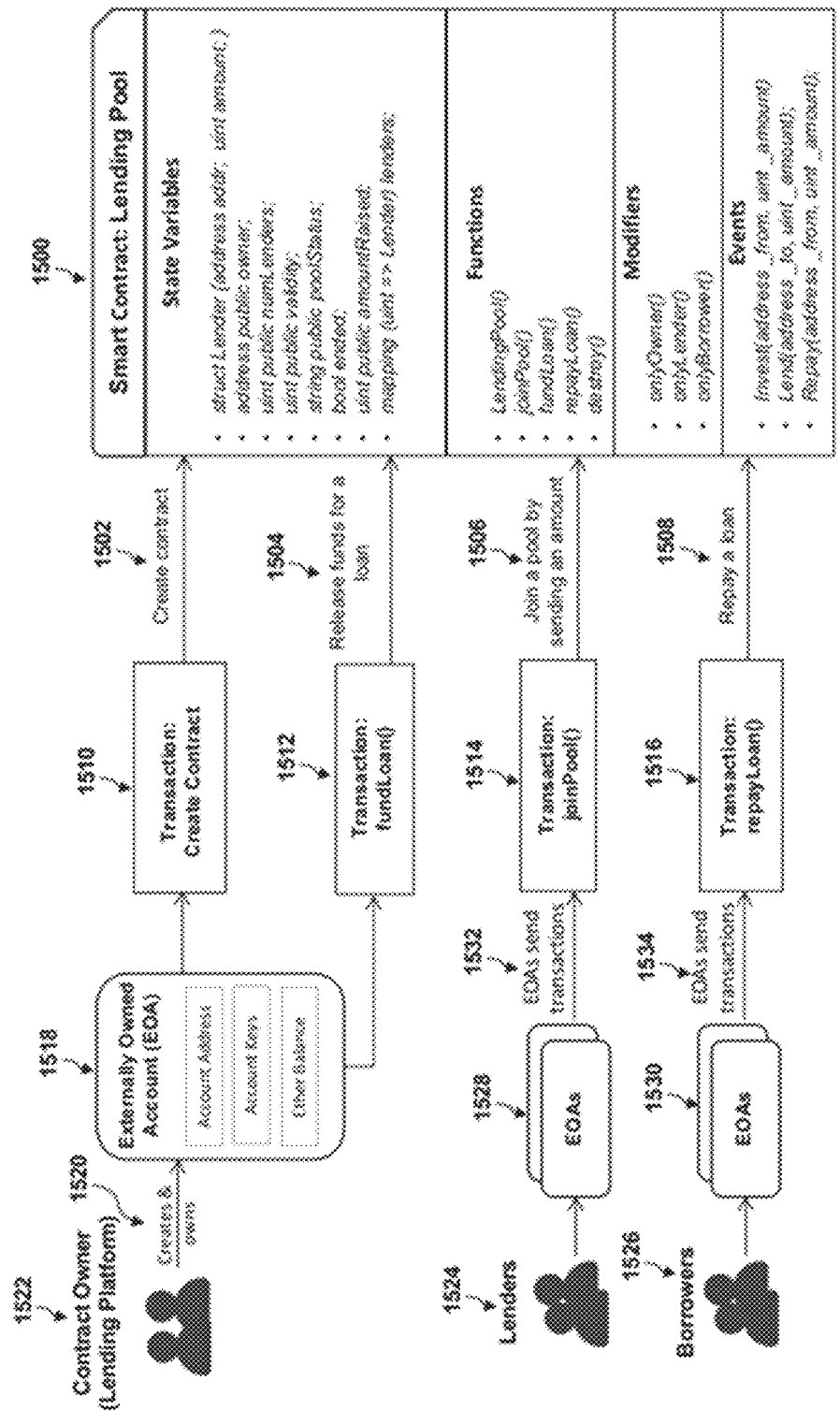
FIG. 28 is an illustration of a lending pool smart contract structure and transactions, according to an embodiment of the invention.

Referring now to FIG. 28 an illustration of lending pool smart contract structures and transactions is described in more detail. A contract owner (or the lending platform) 1522 creates and owns 1520 a lending pool contract 1500. The lending pool contract 1500 is created from an externally owned account (EOA) 1518 of the contract owner (or the lending platform) 1522 when a create contract transaction 1510 is performed by the EOA 1518 thereby creating 1502 the lending pool contract 1500. Lenders 1524 use their EOAs 1528 to send transactions 1532 to the lending pool contract 1500. A lender 1524 can join 1506 a lending pool by sending a joinPool transaction 1514. Borrowers 1526 use their EOAs 1530 to send transactions 1534 to the lending pool contract 1500. A borrower 1526 can repay a loan 1508 taken from the lending pool by sending a repayLoan transaction 1516.

Figure 29:
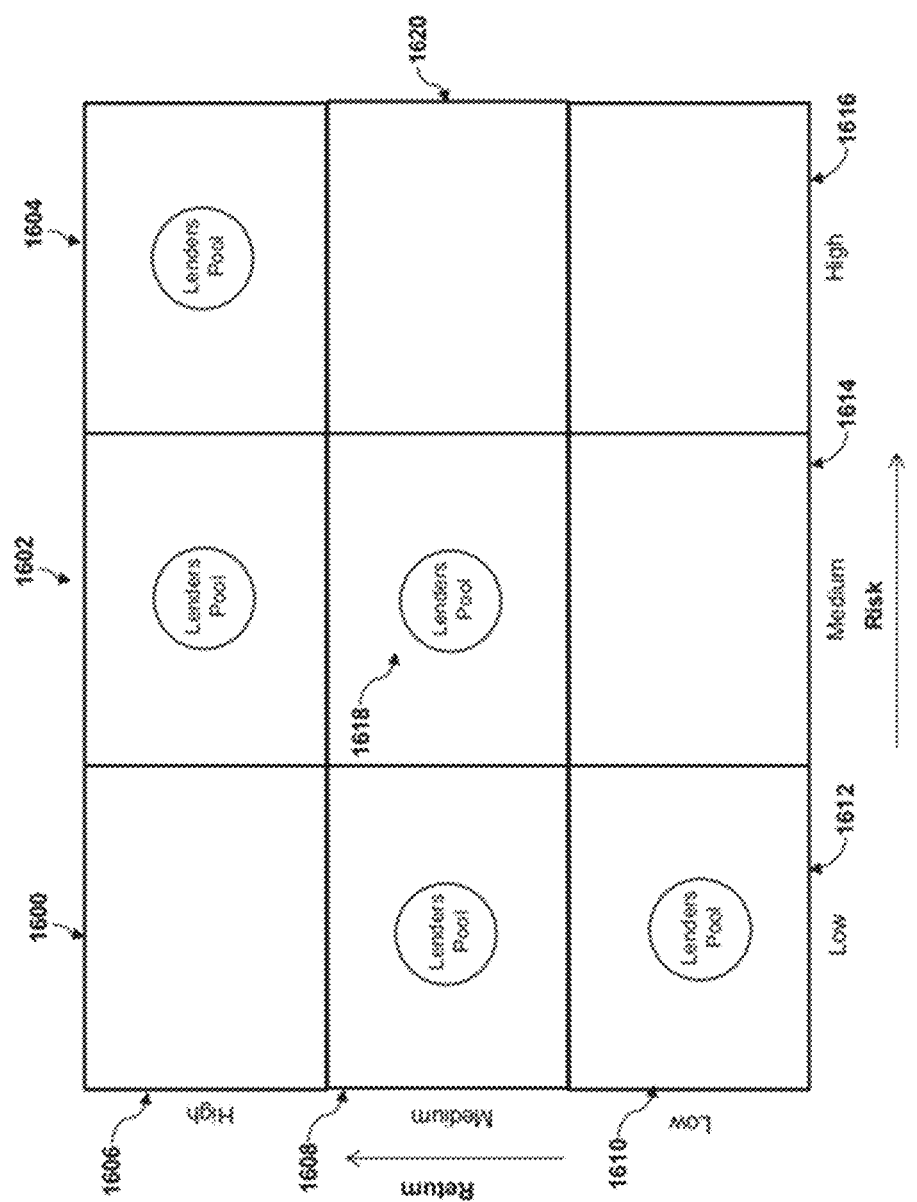
FIG. 29 is an exemplary classification of lending pools based on their risk and returns, according to an embodiment of the invention.

Referring now to FIG. 29 an exemplary classification of lending pools based on their risks and returns is described in more detail. Lending pools are classified based on their risks and returns. The lending pools with lower risk have lower returns and the lending pools with higher risk have higher returns. The risk level for a lending pool is computed based on the reputation and credit scores of the borrowers and lenders linked to the pool. The pools which lend money to borrowers with high credit scores usually lend at low rates of interest as these loans are considered to be safe. Similarly the pools which lend money to borrowers with low credit scores usually lend at high rates of interest as these loans are considered to be risky. In some embodiments, the loan risk may be categorized as low, medium, and high, and the returns may also be characterized as low, medium and high. This may result in risk-reward categories of low risk-high returns 1600, medium risk-high returns 1602, high risk-high returns 1604, low risk-medium returns 1608, medium risk-medium returns 1618, high risk-medium returns 1620, low risk-low returns 1612, medium risk-low returns 1614, and high risk-low returns 1616. Most lending pools will fall into one of low risk-low returns 1612, low risk-medium returns 1608, medium risk-medium returns 1618, medium risk-high returns 1602, and high risk-high returns 1604.

Figure 30:
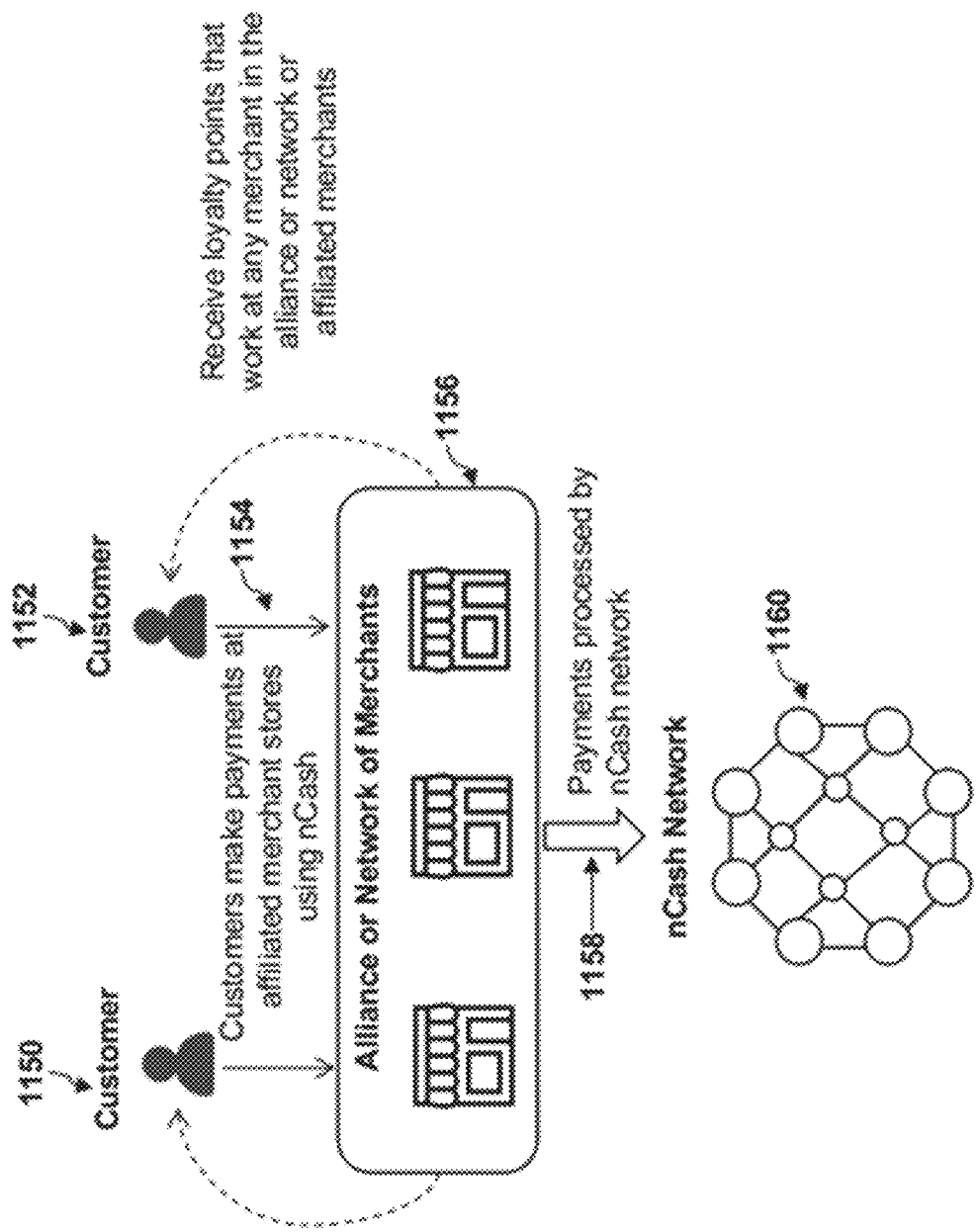
FIG. 30 is an illustration of an alliance of merchants with interoperable loyalty points, according to an embodiment of the invention.

Referring now to FIG. 30 an illustration of an alliance of merchants with interoperable loyalty points is described in more detail. Customers 1150 and 1152 make payments 1154 at affiliated merchant stores 1156 using nCash. The merchant payments are processed 1158 by the nCash network 1160. Customer's receive loyalty points that work at any merchant in the alliance or network or affiliated merchants 1156. These loyalty points are interoperable across all the merchants in the alliance and can be applied towards a discount for the next purchase.

Figure 31:
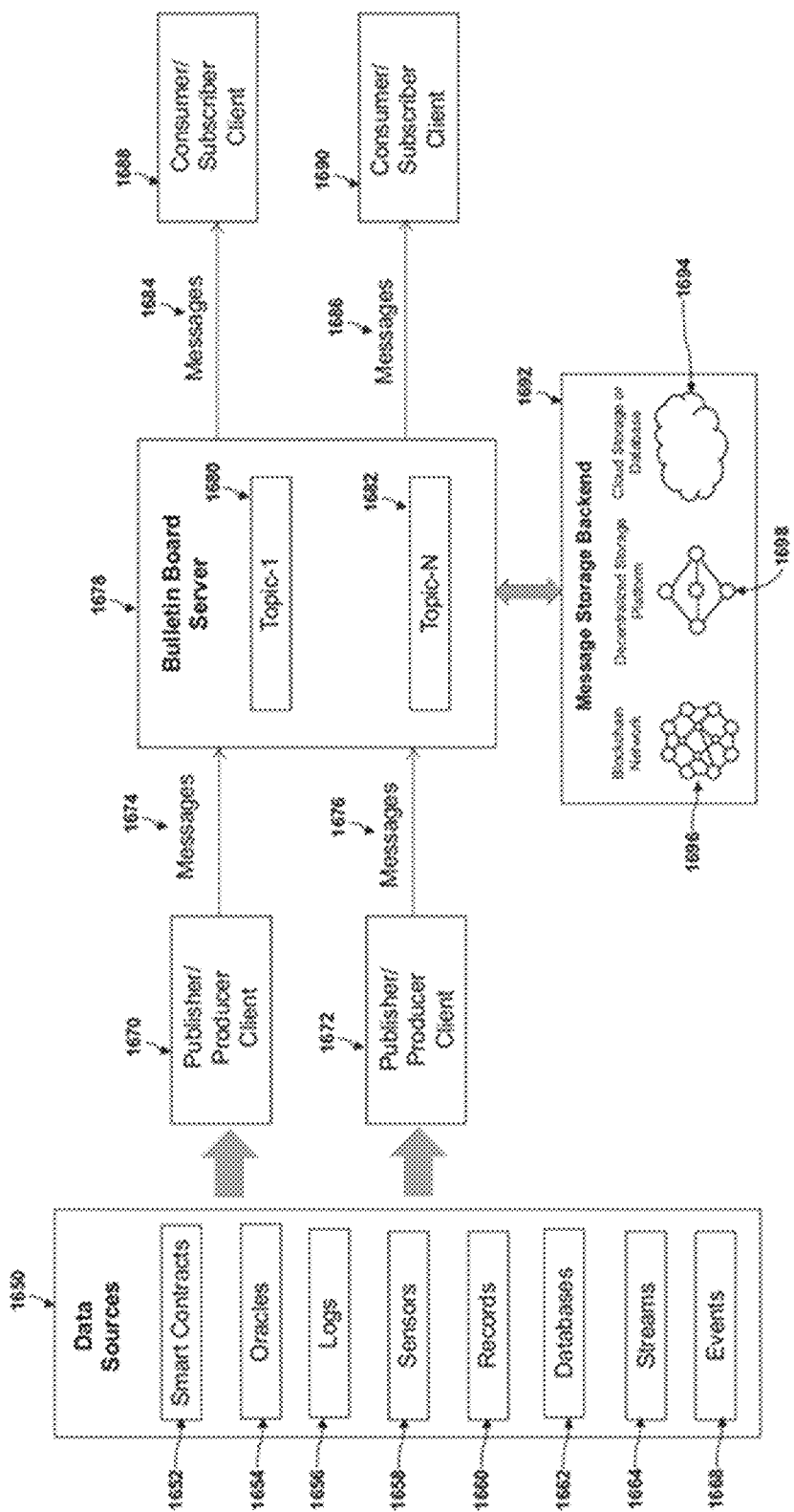
FIG. 31 is an illustration of a distributed messaging framework called Bulletin Board Messaging Framework (BBMF) according to an embodiment of the invention.

Referring now to FIG. 31 an illustration of a distributed messaging framework, is described in more detail. The distributed publish-subscribe messaging framework described here is referred to as Bulleting Board Messaging Framework (BBMF) or "Bulletin Board". The Bulletin Board Server 1678 manages Topics 1680, 1682. Bulletin Board Clients can be Publisher/Producer Clients 1670, 1672 or Consumer/Subscriber Clients 1688, 1690. The Publisher/Producer Clients 1670, 1672 publish data or messages to Topics 1680, 1682. Data pushed to the topics 1680, 1682 from the Publisher/Producer Clients 1670, 1672 may originate from data sources 1650, which may comprise smart contracts 1652, oracles 1654, logs 1656, sensors 1658, records 1660, databases 1662, streams 1664, and events 1668. Consumer/Subscriber Clients 1688, 1690 consume data from the Topics 1680, 1682, receiving messages 1684, 1686 from the Bulletin Board Server 1678. Bulletin Board Server 1678 supports a plug-in Message Storage Backend 1692 to store and replay messages. The Message Storage Backend 1692 persists the messages using two options: (1) a Cloud Database or Cloud Storage 1694, (2) Decentralized Storage Platform (such as IPFS or Swarm) 1698 with regular checkpointing of message hashes to a Blockchain 1696. Messages in the Bulletin Board can be either Ephemeral or Persistent. Ephemeral messages are not stored by the Message Storage Backend. For Persistent messages Time-to-Live (TTL) can be specified. The Producers and Consumers support both Cloud and Blockchain protocols such as HTTP-REST or Web3 for Ethereum. This allows existing Smart Contracts (such as Solidity smart contracts) to publish and consume data to/from the Bulletin board, and existing Oracles to feed-in data from the web to the smart contracts through the Bulletin board. A smart contract implemented in the Solidity language, for example, is a data source which generates notifications in the form of Solidity events which are published to the Bulletin Board server by a Publisher Client. Solidity smart contracts require an external Publisher Client to publish messages to the Bulletin board. Extensions to smart contract languages such as Solidity may be implemented to support Bulletin board APIs to publish data without the need for an external publisher client. These extensions and/or stubs can be through use of pragma directives that may be pre-processed by pre-processors to generate suitable code for implementing the interfaces to the bulletin board, or they could involve extensions to the language itself to support global variable names. Topics are managed in-memory with regular snapshots on the disk which are later stored in the Message Storage Backend 1692. A compaction process is defined for moving the messages in the snapshots to the Message Storage Backend 1692 (Cloud and/or Blockchain). The Bulletin Board itself may be implemented in part through use of a cloud-based service and/or a blockchain and may also include hardware accelerators (such as ASICs or FPGAs) and graphical processing units (GPUs) to provide this high throughput low latency service. Additional redundancy, authorization, and encryption layers may also be provided in hardware and software using known techniques for cloud and internet networks to secure the messages and values stored from system failures or hacking attacks.

The BBMF is designed for high throughput and low latency messaging. The Bulletin Board server 1678 can be deployed in a cloud computing environment and scaled either vertically or horizontally based on demand. In vertical scaling larger virtual machine instance size (in terms of compute capacity, memory and storage) is used for the Bulletin Board server. In horizontal scaling multiple instances of the Bulletin Board server are launched with each instance managing a subset of the topics managed by the Bulletin Board.

BBMF supports both push/pull and publish/subscribe data ingestion models and data delivery models. Furthermore, the data delivery may be either at-least once delivery or exactly-once delivery. BBMF can be implemented in hardware and software, using a combination of servers, ASICs/FPGAs and GPUs as part of a cloud-based or a locally configured computing system.

As Bulletin Board is a distributed messaging framework, a trade-off exists between consistency and availability. This trade-off is explained with the CAP Theorem, which states that under partitioning, a distributed data system can either be consistent or available but not both at the same time. Bulletin Board adopts an eventually consistent model. In an eventually consistent system, after an update operation is performed by a writer, it is eventually seen by all the readers. When a read operation is performed by a consumer, the response might not reflect the results of a recently completed write operation.

The Bulletin Board messaging framework supports prioritized processing of messages. The priority can be set in the message header field. Various priority classes for messages can be defined and specified in the priority header field. This priority classification of messages is crucial for the Peer-to-Pool-Peer (P2P2P) lending system when a large number of updates have to be propagated to linked smart contracts in the lending system.

Figure 32:
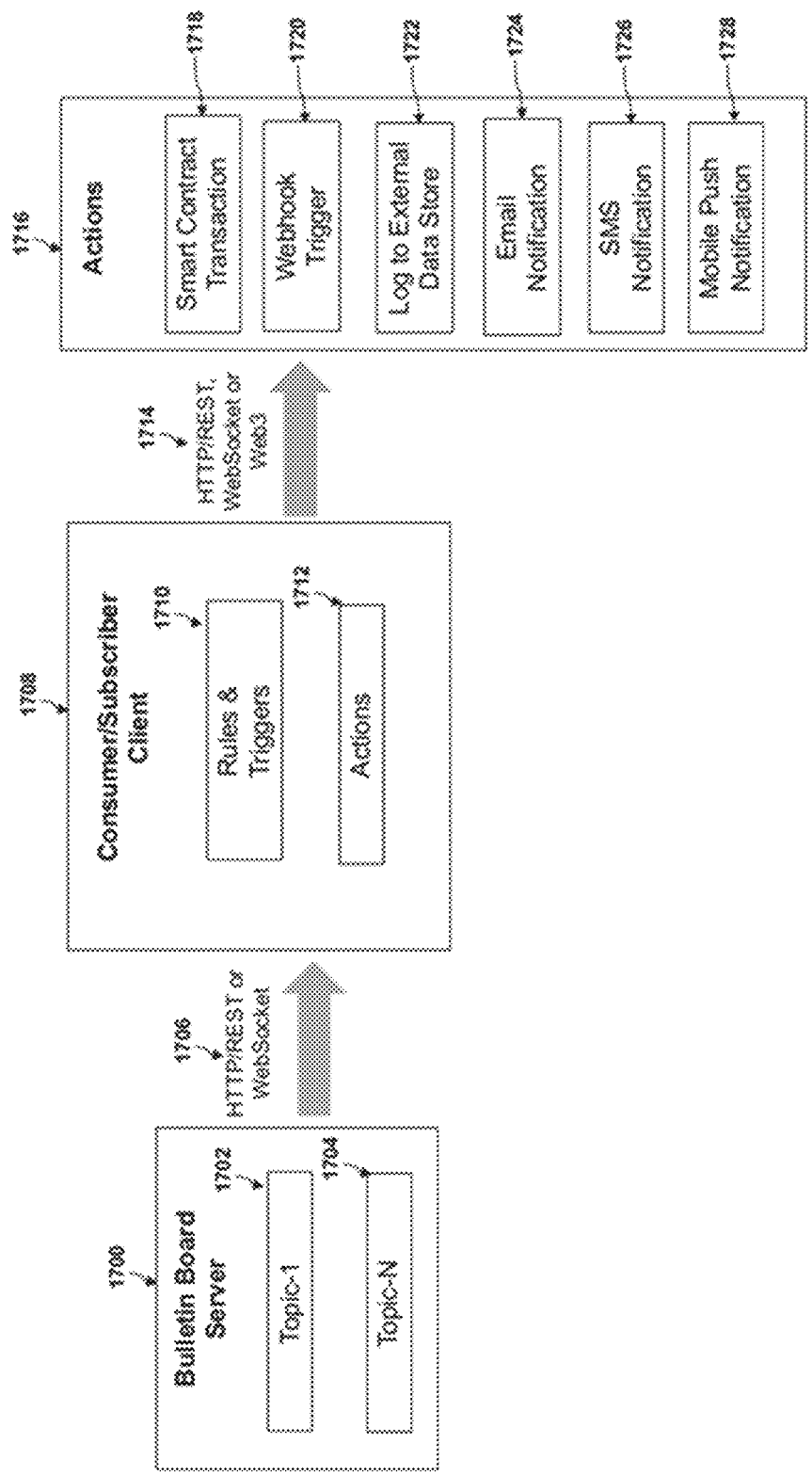
FIG. 32 is an illustration of consumer/subscriber actions supported in the publish-subscribe messaging framework illustrated in FIG. 31.

Referring now to FIG. 32 an illustration of the consumer/subscriber actions supported in the publish-subscribe messaging framework are described in more detail. For Consumers or Subscribers 1708 various actions Rules & Triggers 1710 and Actions 1712 can be defined. Rules & Triggers 1712 specify how to filer and select data and trigger actions. The supported actions 1716 include Smart Contract Transaction 1718, Webhook Trigger 1720, Log to External Data Store 1722, Email Notification 1724, SMS Notification 1726, and Mobile Push Notification 1728. An action is performed when a message 1706 matching a rule is received (for example temperature >60 or ETH price <$500) from the Bulletin Board Server 1700, being related to one of the Topics 1702, 1704 managed by the Bulletin Board Server 1700. The message may be transmitted to the Consumer or Subscriber Client 1708 by any means or method known in the art, including, but not limited to, HTTP/REST applications and WebSocket. The smart contract transaction action is particularly useful for the P2P2P lending system described above where a large number of linked smart contracts (such as smart contracts in a lending pool) can be executed when a message notifying a change in the lending conditions is received.

Figure 33:
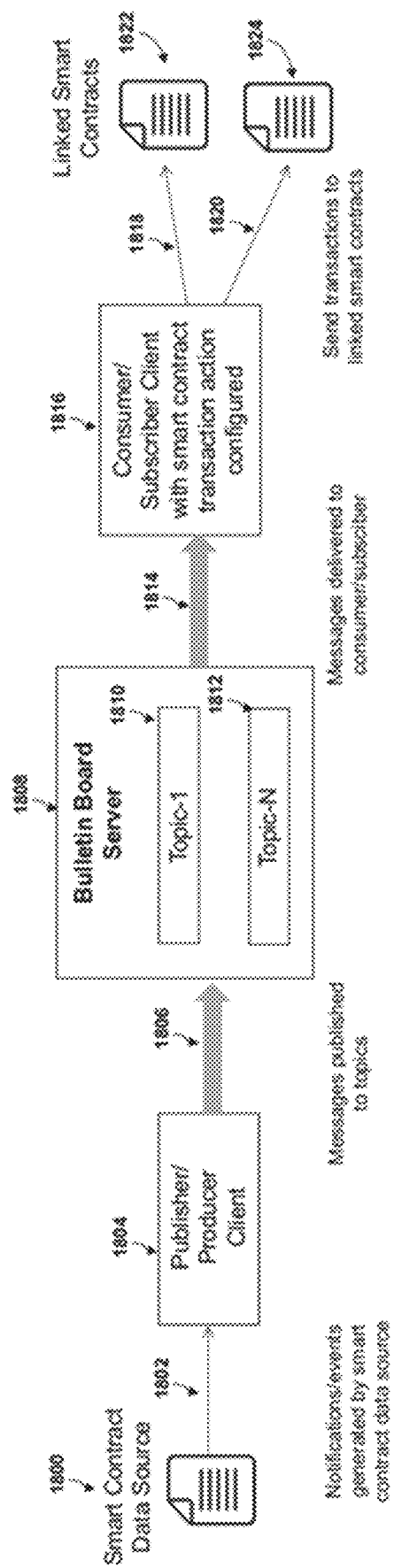
FIG. 33 is an illustration of a smart contract data source that uses an external publisher client to publish messages to the publish-subscribe messaging framework, according to an embodiment of the invention.

Referring now to FIG. 33 an illustration of a smart contract data source that uses an external publisher client to publish messages to the publish-subscribe messaging framework is described in more detail. A smart contract data source 1800 such as a Solidity smart contract generates notifications or events 1802. A publisher/producer client 1804 watches for the notifications or events generated by the smart contract 1800. When a notification or event is generated, the messages are published 1806 to the topics 1810, 1812 managed by the Bulletin Board 1808. These messages are delivered 1814 to the consumer/subscriber client 1816 which has subscribed to the topics 1810, 1812. The consumer/subscriber client 1816 has a smart contract transaction action configured which sends transactions 1818, 1820 to the linked smart contracts 1822, 1824 on receiving the messages.

Figures 34, 35:
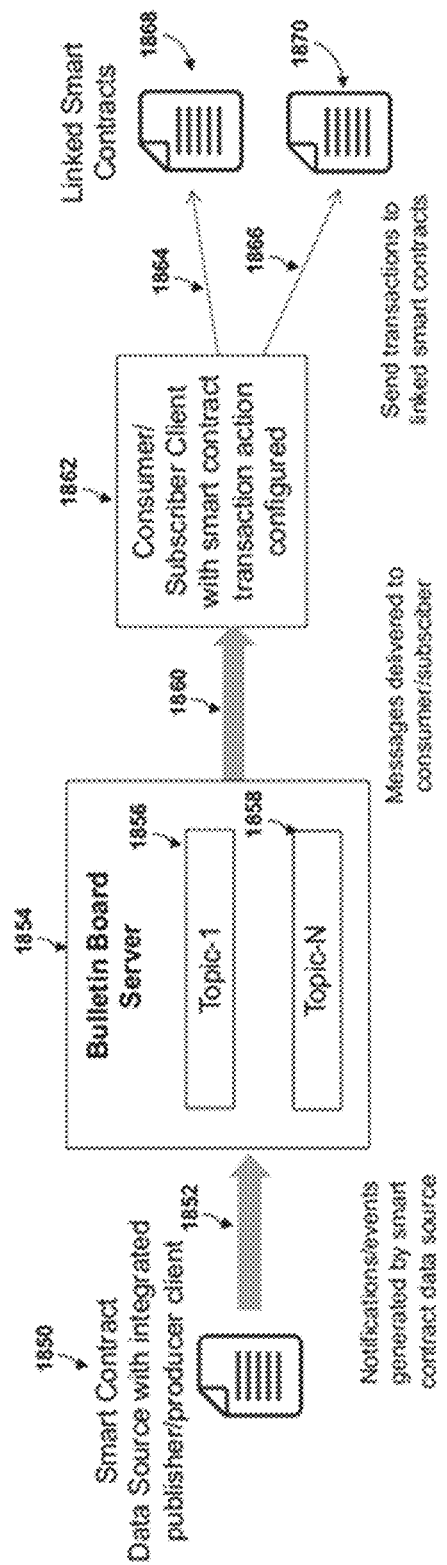
FIG. 34 is an illustration of a smart contract data source that uses an integrated publisher client to publish messages to the publish-subscribe messaging framework, according to an embodiment of the invention.
FIG. 35 is an illustration of the message format for the publish-subscribe messaging framework, according to an embodiment of the invention.

Referring now to FIG. 34 an illustration of a smart contract data source that uses an integrated publisher client to publish messages to the publish-subscribe messaging framework, is described in more detail. A smart contract data source with integrated publisher/producer client 1850 generates notifications or events. The notifications or events are published as messages 1852 to the topics 1856, 1858 managed by the Bulletin Board 1854. These messages are delivered 1860 to the consumer/subscriber client 1862 which has subscribed to the topics 1856, 1858. The consumer/subscriber client 1862 has a smart contract transaction action configured which sends transactions 1864, 1866 to the linked smart contracts 1868, 1870 on receiving the messages.

Referring now to FIG. 35 an illustration of the message format for the publish-subscribe messaging framework is described in more detail. The Message Type field 1750 defines the type of the message. Supported message types in the Bulletin Board framework are as follows:
  CONNECT: A CONNECT message is sent by a client (producer or consumer) to connect to the server.
  DISCONNECT: A DISCONNECT message is sent by a client to disconnect from the server.
  PUBLISH: Used to publish a new message
  SUBSCRIBE: Used to subscribe to a topic managed by the Bulletin Board
  UNSUBSCRIBE: Used to unsubscribe from a topic
  PINGREQUEST: Used to send a ping request to the server
  PINGRESPONSE: Used to respond to a ping request
  DATAREQUEST: Used to request a message or data item
  DATARESPONSE: Used to respond to a request for a message or data item.

The Data Payload field 1752 includes the message as a JSON data payload. The message may be signed by the sender and/or encrypted. The Topics field 1754 includes a list of topics to which the message is published. The Headers field 1756 includes headers such as:
  Sender or receiver identity
  Message signature
  QoS Level
  Priority
  Persistent or Ephemeral message
  Additional flags to help in processing of message The Time-to-Live (TTL) field 1758 is used to specify the validity or life of the message. The Nonce field 1760 is an integer value which can be used to prove that a given amount of work was done in composing the message.

Figure 36:
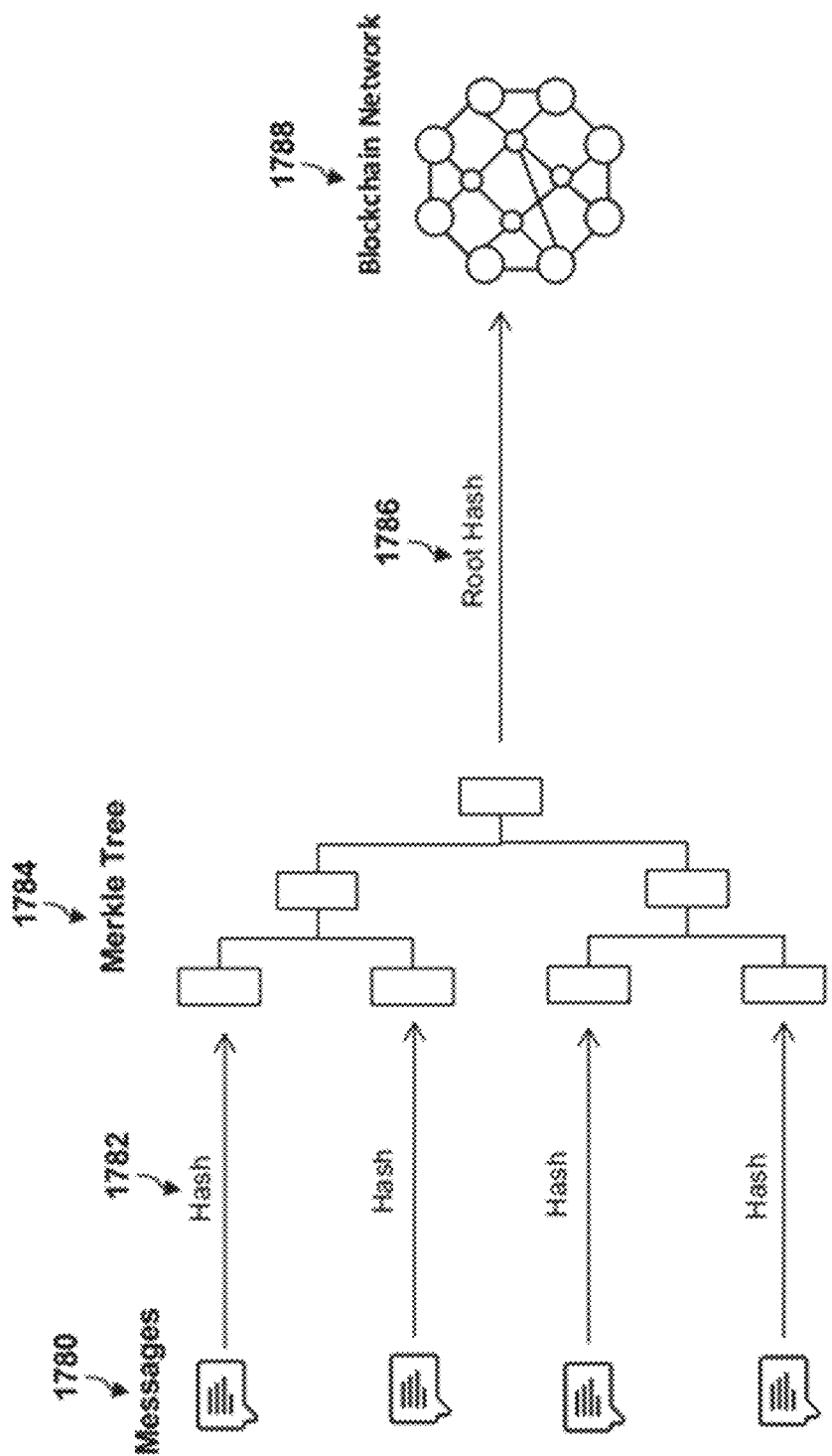
FIG. 36 is an illustration of a global variable name system being updated by a consumer of the publish-subscribe messaging framework, according to an embodiment of the invention.

Referring now to FIG. 36 an illustration of a blockchain checkpointing approach in the publish-subscribe messaging framework, is described in more detail. When using Blockchain and Decentralized Storage Platform (IPFS or Swarm) based Message Storage Backend, the messages 1780 are hashed 1782 and are added to a Merkle Tree 1784. The root hash 1786 of the Merkle Tree 1784 (after every N messages) is recorded on the Blockchain 1788. This ensures messages cannot be tampered with later.

Figure 37:
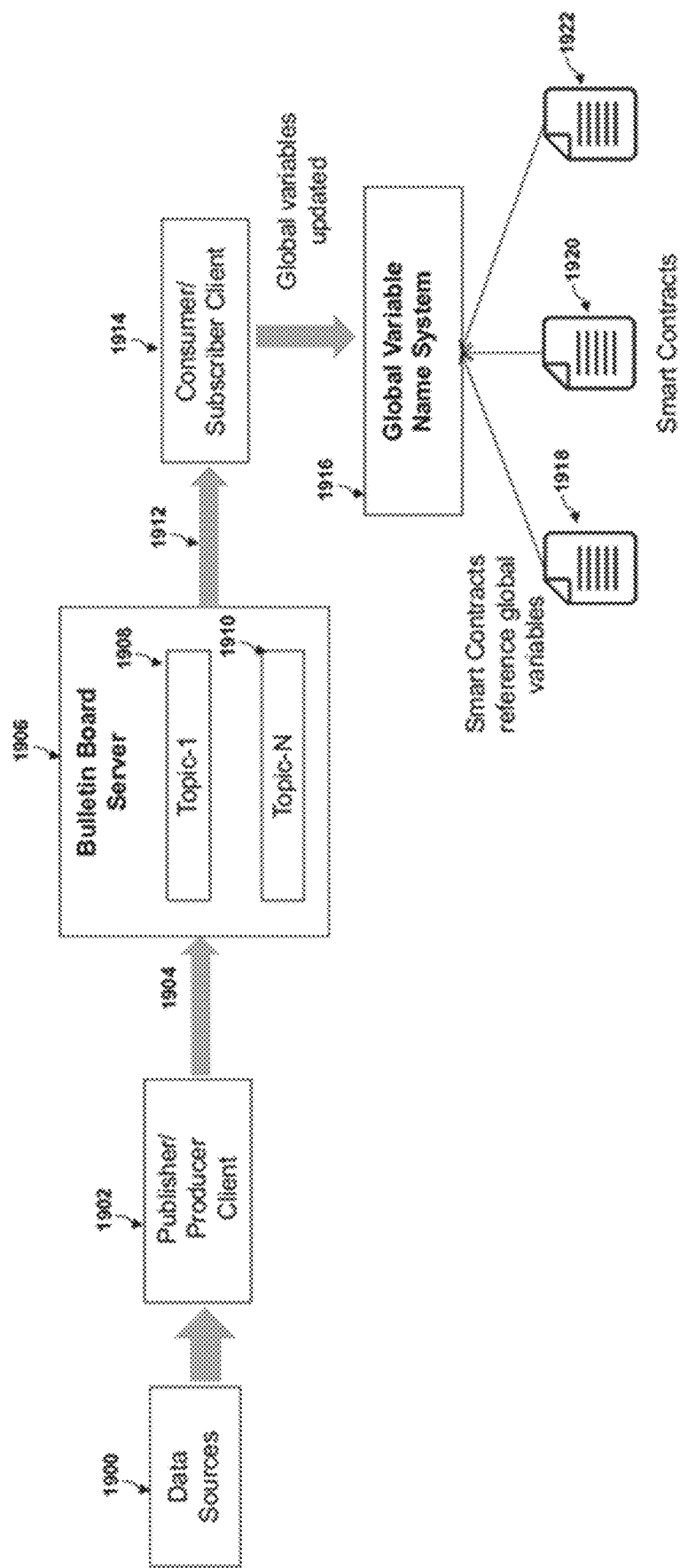
FIG. 37 is an illustration of the architecture of a global variable name system, according to an embodiment of the invention.

Referring now to FIG. 37 an illustration of a global variable name system being updated by a consumer of the publish-subscribe messaging framework, is described in more detail. The Global Variable Name System (GVNS) 1916 maintains records of global variables and the owners and resolvers for the global variables. Data sources 1900 such as a smart contract, oracle, log, sensor, record, database, stream or event, produce data or notifications which are sent to a publisher/producer client 1902. The publisher/producer client 1902 publishes the data or notification as a message 1904 to one or more topics 1908, 1910 managed by the Bulletin Board server 1906. The consumer/subscriber client 1914 receives the messages 1912 and updates the value of global variables registered in the GVNS 1916. Smart contracts 1918, 1920, 1922 reference the global variable registered in the GVNS 1916.

Figure 38:
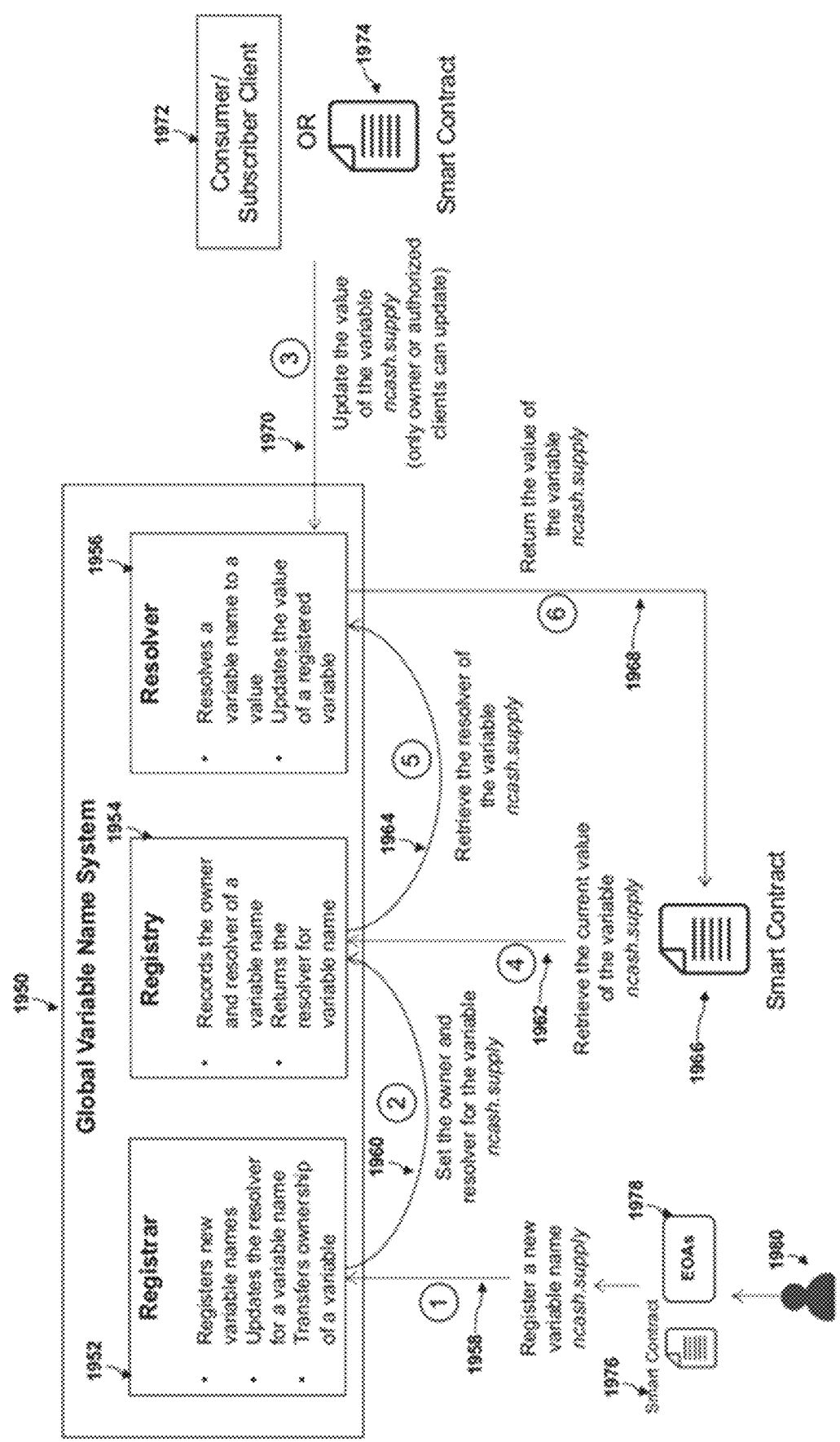
FIG. 38 is an illustration of a blockchain checkpointing approach in the publish-subscribe messaging framework, according to an embodiment of the invention.

Referring now to FIG. 38 an illustration of the architecture of a global variable name system, is described in more detail. The Global Variable Name System (GVNS) 1950 comprises Registrar 1952, Registry 1954 and Resolver 1956 components. The Registrar 1952 is responsible for registering new variable names, updating the resolver for a variable name, and transferring the ownership of a variable. The Registry 1954 is responsible for recording the owner and resolver of a variable name, and returning the resolver for a variable name. The Resolver 1956 is responsible for resolving a variable name to a value and updating the value of a registered variable. The steps involved in registering a global variable in the GVNS 1950, updating the variable and retrieving the current value of the variable are explained as follows. At step-1 1958 a user 1980 sends a request (through an externally owned account 1978 or a smart contract 1976) to register a new global variable name (for example, ncash.supply) to the Registrar 1952. At step-2 1960, the Registrar 1952 sets the owner and resolver for the variable in the Registry 1954. At step-3 1970, a consumer/subscriber client 1972 or a smart contract 1974 sends a request to update the value of the global variable to the Resolver 1956. At step-4 1962, a smart contract 1966 requests the value of the global variable from the Registry 1954. At step-5 1964, the Registry 1954 retrieves the Resolver 1956 for the variable. At step-6 1968, the Resolver 1956 returns the value of the global variable.

Figure 39:
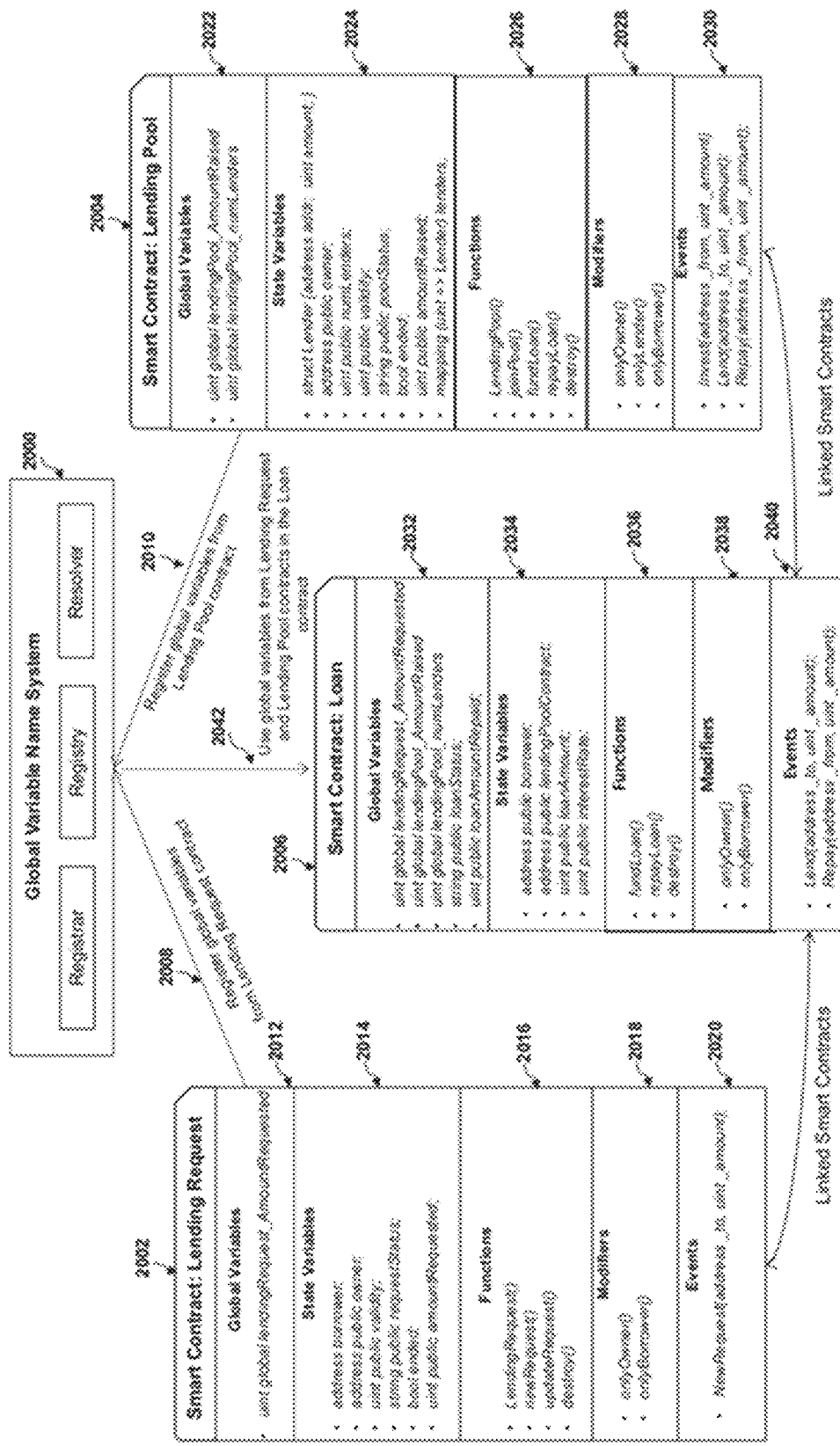
FIG. 39 is an illustration of global variable sharing across smart contracts, according to an embodiment of the invention.

Referring now to FIG. 39 an illustration of global variable sharing across smart contracts is described in more detail. The Lending Pool smart contract 2004, Lending Request smart contract 2002 and Loan smart contract 2006 are linked smart contracts in a Peer-to-Pool-Peer (P2P2P) lending system that are used in loan making and loan servicing processes. The Lending Request smart contract 2002 is used in the loan making process. Borrowers send lending requests to the lending system and a Lending Request smart contract is created for each lending request. The Lending Pool smart contract 2004 is used to manage a lending pool. When the lending system matches a lending request to a lending pool, a new Loan smart contract 2006 is created. The Loan smart contract 2006 manages the loan servicing aspects of a loan from the time the loan is disbursed until the loan is paid off. The Loan smart contract 2006 captures the loan details such as loan principal, loan interest rate, address of lending pool contract from where the loan is disbursed as state variables. Loan smart contract 2006 also registers global variables 2042 such as for the loan amount repaid (loanAmountRepaid) and loan status (loanStatus). The Lending Pool smart contract 2004 and Lending Request smart contract 2002 have global variables 2022, 2012 which are registered 2010, 2008 with the Global Variable Name Systems (GVNS) 2000 (lendingPool_AmountRaised, lendingPool_numLenders, lendingRequest_AmountRequested). These global variables are referenced 2032 in the Loan smart contract 2006.

Each of the smart contracts 2002, 2004 and 2006 have state variables 2014, 2024, 2034, functions 2016, 2026, 2036, modifiers 2018, 2028, 2038, and events 2020, 2030, 2040, which are existing elements/types/constructs in the Solidity smart contracts language. Support for global variables which are shared across multiple smart contracts through GVNS 2000 within Solidity smart contracts language, is added through extensions to the Solidity language specification. Furthermore, extensions are done within the Ethereum Virtual Machine (EVM) which is the runtime environment for smart contracts in Ethereum to add support for global variables shared through GVNS 2000. While Solidity and Ethereum have support for a limited set of global variables that provide information about the blockchain (such as block.coinbase, block. difficulty, block-.gaslimit, block. number, block.blockhash, block.timestamp, msg.data, msg.gas, msg.sender, msg.value, tx.gasprice, tx.origin, this.balance, addr.balance), it is not possible for two or more linked smart contracts to share global variables. This additional support for global variables is enabled by the GVNS 2000, extensions to the Solidity language specification and extensions to the Ethereum Virtual Machine (EVM). The global variable support is crucial for linked smart contracts (such as in a P2P2P lending system) to work.

The BBMF when used in combination with GVNS could provide information to an "analytics engine" as to the number of updates of the global variables and their type, and also to "advertising engines" as to the global variables referenced and their types.

Referring now to FIG. 40 an exemplary implementation of a Bulletin Board Publisher/Producer client and Consumer/Subscriber client is described in more detail. In the Publisher/Producer client implementation an instance of the Bulletin Board client class is created. The connect( ) method of the client class is used to establish a connect to the Bulletin Board server by passing the Bulletin Board server address, clientID and client secret. The publish( ) method of the client class is used to publish a message to the Bulletin Board server. The message object published to the Bulletin Board server contains the list of topics, data payload, headers, time-to-live and nonce fields. In the Consumer/Subscriber Client implementation, subscribe( ) method of the client class is used to subscribe to all or selected topics on the Bulletin Board server. A callback function on_message( ) is defined which is executed every time a new message is delivered.

Figure 41:
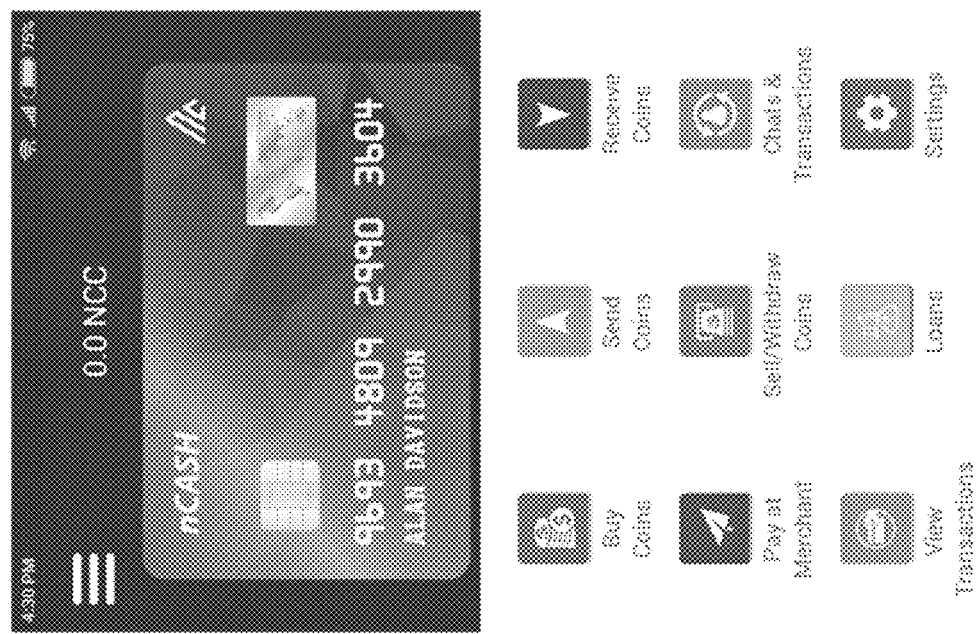
FIG. 41 is an exemplary interface of the nCash mobile application, according to an embodiment of the invention.

Referring now to FIG. 41 an exemplary interface of the nCash mobile application is described in more detail. The exemplary interface shows options to buy coins, send coins, receive coins, pay coins at a merchant, sell or withdraw coins, chat and transact with contacts, view list of transactions, loans and settings options. The customer's account details such as account number, name and account balance is also shown.

Figure 42:
FIG. 42 is an exemplary interface of the nCash mobile application showing peer-to-peer lending options, according to an embodiment of the invention.

Referring now to FIG. 42 an exemplary interface of the nCash mobile application showing peer-to-peer lending options is described in more detail. A customer is eligible to request loans after completing the lending profile that includes customer's financial and education information. Customer can view the nCash credit score from the mobile application. Borrowing peers (borrowers), can create new loan requests, view the status of existing loan requests, view loan offers received from lending peers (lenders) for the loan requests, and repay a loan. Lending peers (lenders) can view open loan requests submitted by all borrowing peers (borrowers) on the network, search for specific loan requests by date range or loan request ID, send loan offers for the loan requests, and release funds for accepted loan offers.

Figure 43:
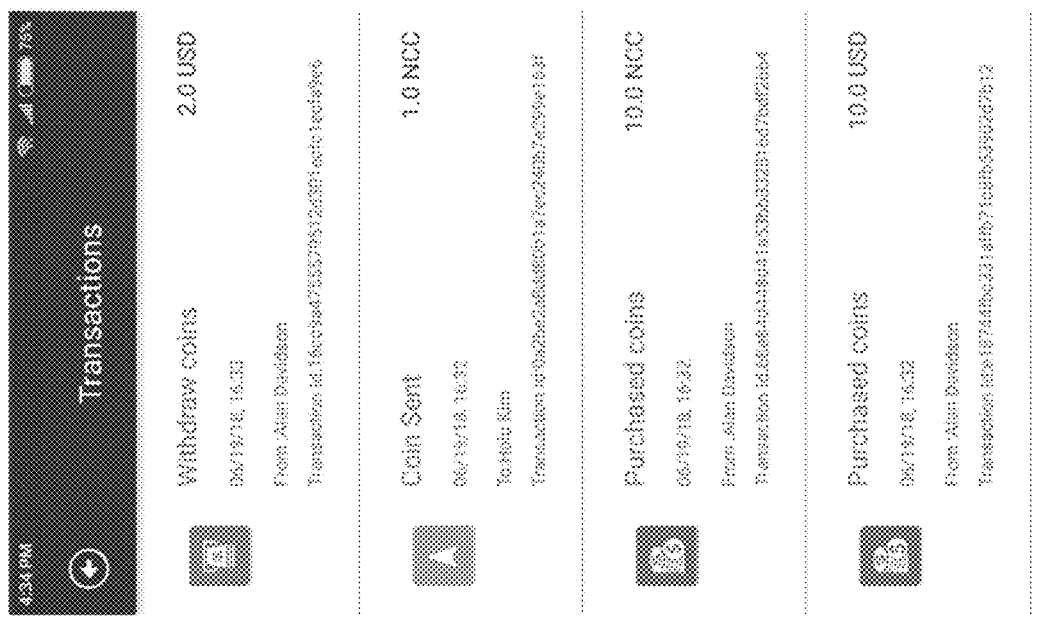
FIG. 43 is an exemplary interface of the nCash mobile application showing different types of transactions, according to an embodiment of the invention.

Referring now to FIG. 43 an exemplary interface of the nCash mobile application showing different types of transactions is described in more detail. The transactions involved are of following types:

Transaction for buying new coins by paying in fiat currency (such as USD) with credit/debit card or ACH bank transfer Transaction for buying new coins by paying in cryptocurrency (such as Bitcoin)

Transaction for selling coins and withdraw coins to a linked bank account

Transaction for transferring coins to another user

Transaction for a cashback received on availing a cashback offer.

Transaction for coins received on claiming a voucher

Figure 44:
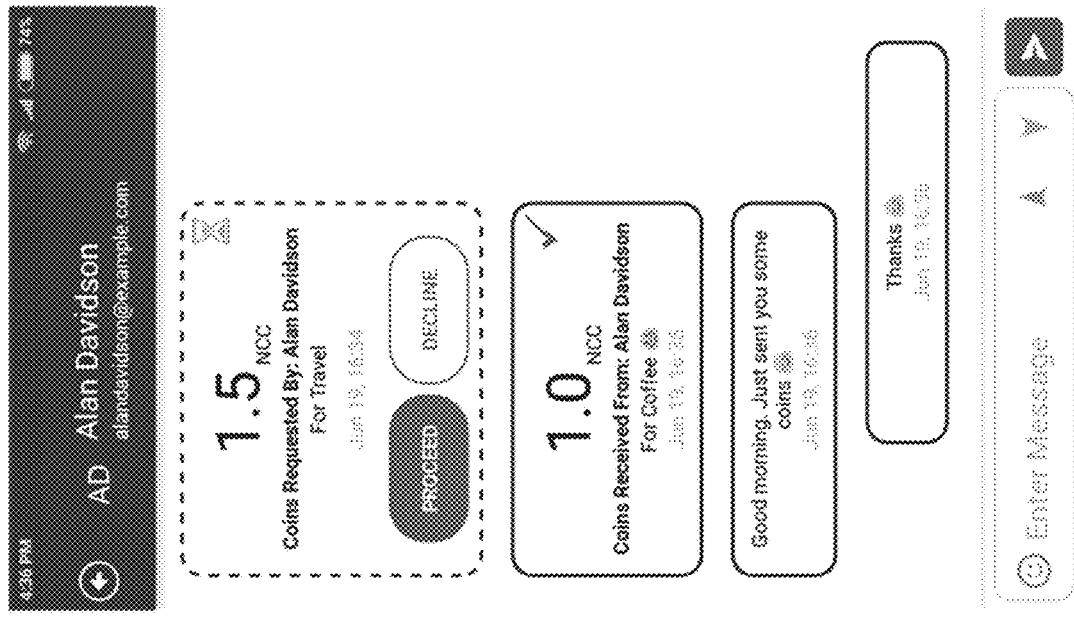
FIG. 44 is an exemplary interface of the nCash mobile application showing chats and payments interface, according to an embodiment of the invention.

Referring now to FIG. 44 an exemplary interface of the nCash mobile application showing chats and payments interface is described in more detail. The chats and transactions interface allows two customers to chat with each other and send or request payments. A payment request received by a user can be approved or declined from the chats and transactions interface itself.

Figure 45:
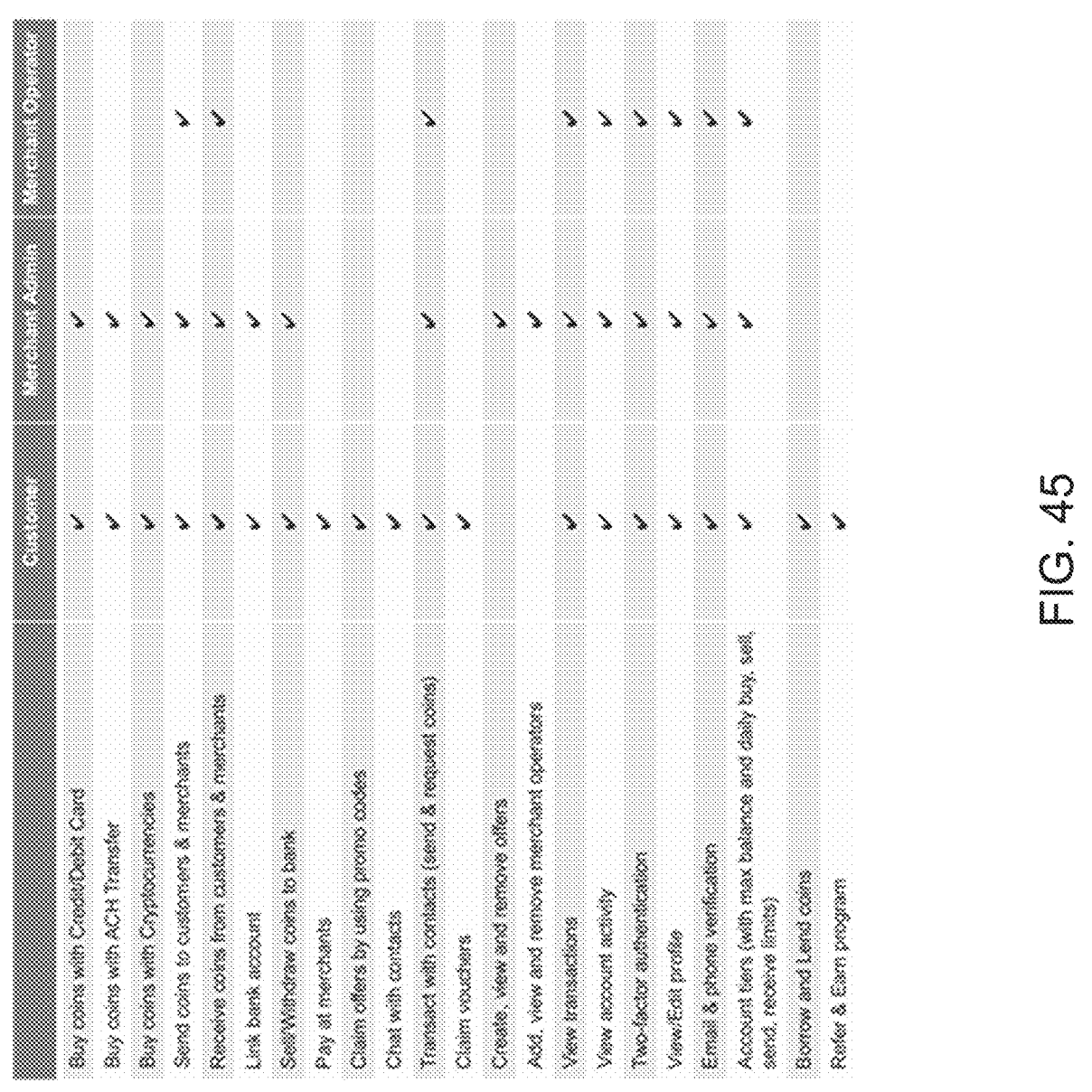

Referring now to FIG. 45 an illustration of the nCash mobile application features for different types of accounts is depicted.

Figure 46:
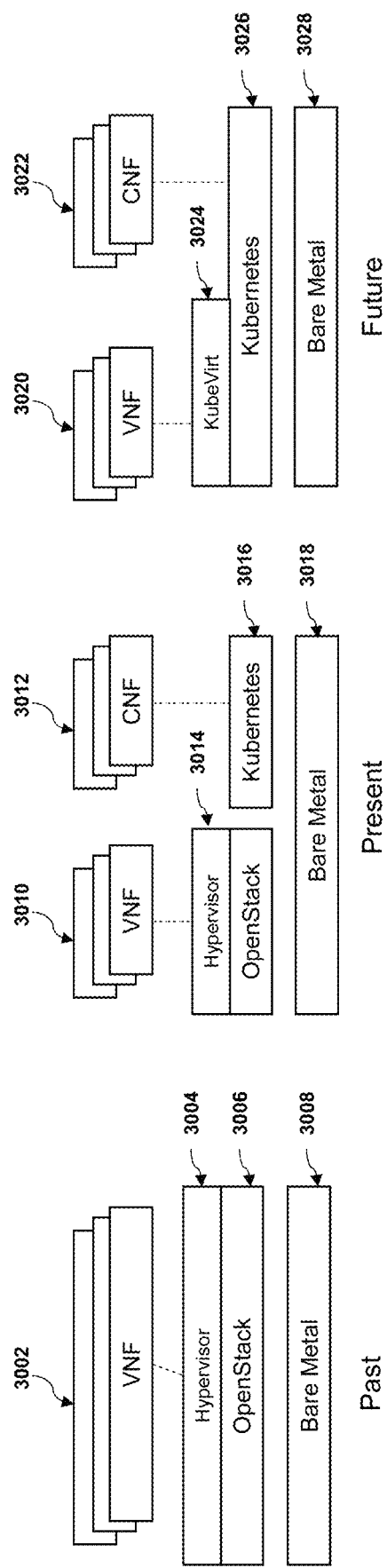
FIG. 46 is an illustration of the evolution of Network Function Virtualization from virtual machines to containers.

Referring now to FIG. 46 an illustration of the evolution of Network Function Virtualization from virtual machines to containers, is described in more detail.

The development of 5G is being driven by technologies like Virtualization, Cloud native, Containers and Microservices. Network Function Virtualization (NFV) was created to facilitate and drive virtualization of the telecoms networks. In the recent years, there is evolution of NFV from virtual machines to containers. VNF (Virtual Network Function), implements a virtualized network function on a general-purpose physical server. VNF (Virtual Network Function) is a virtual network function based on NFV (Network Function Virtualization). Virtual Network Functions (VNFs) 3002 deployed in virtual machines are being replaced by Containerized Network Functions or Cloud-Native Network Functions (CNFs) 3012. CNFs are ultra-lightweight, more portable and scalable compared to VNFs. CNF is a network function that runs on the open source container orchestration system such as Kubernetes 3016. CNF architecture is deployable over bare-metal server 3018 that brings down the cost. 5G Core uses cloud-native technologies such as container orchestration systems, Service-mesh, Micro-services for streamlining network function development. 5G Core Network uses SBA (Service Based Architecture) where each function of Core is regarded as a service, and the interface between each function (service) is standardized as a web-based interface (HTTP/REST).

Figure 47:
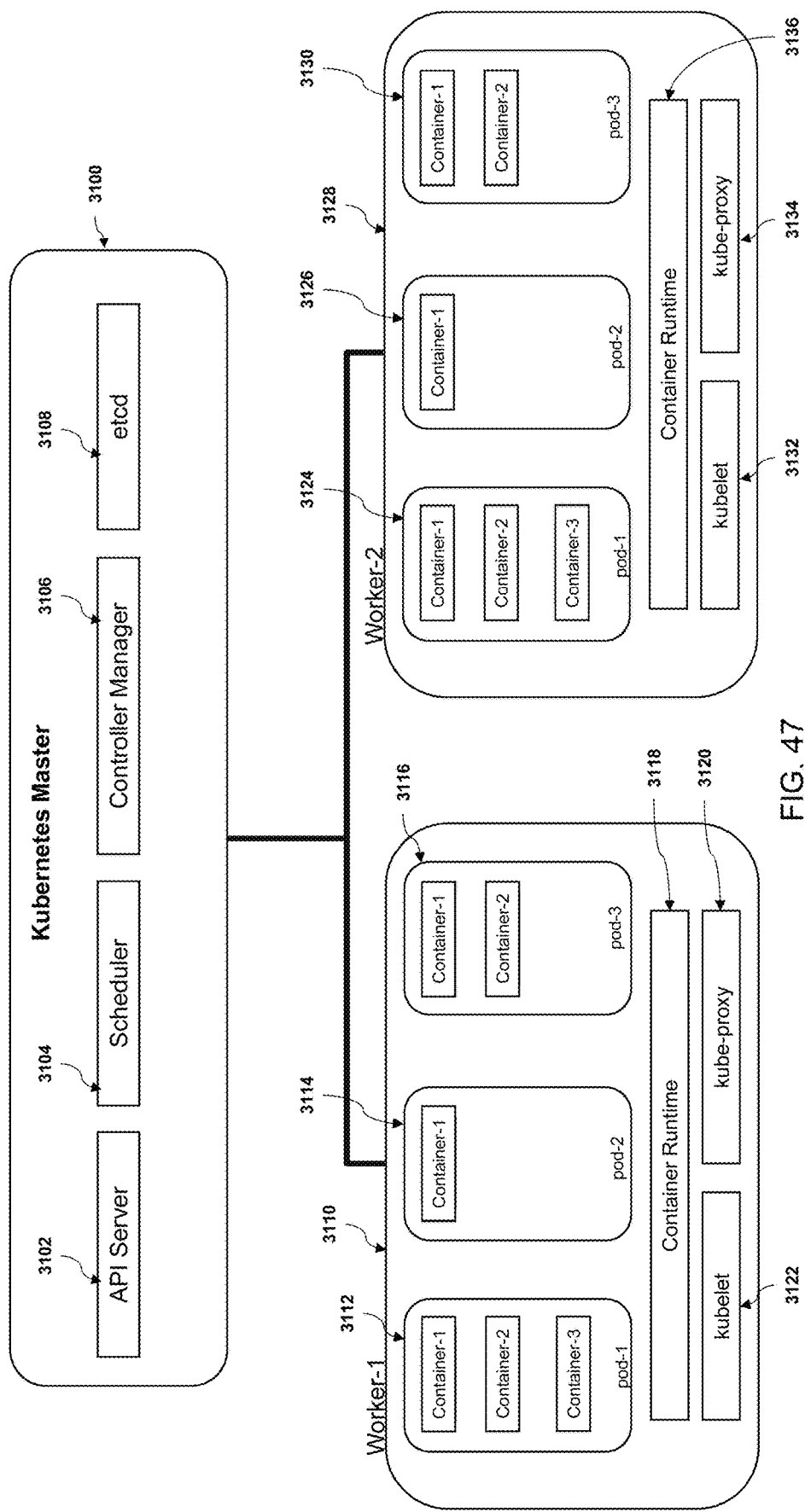
FIG. 47 is an illustration of the Kubernetes architecture.

Referring now to FIG. 47 an illustration of the Kubernetes architecture, is described in more detail. Kubernetes also known as K8s is an open-source container orchestration system. A node or worker 3110, 3128 is a machine, physical or virtual, on which Kubernetes is installed. Containers are launched on the worker machines. A cluster is a set of nodes grouped together. The master 3100 is another node with Kubernetes installed in it, and is configured as a Master. The master 3100 watches over the nodes in the cluster and is responsible for the actual orchestration of containers on the worker nodes. Kubernetes includes various components including an API Server 3102, ETCD service 3108, kubelet service 3122, 3132, container runtime 3118, 3136, controllers 3106 and schedulers 3104. The API server 3102 acts as the front-end for kubernetes. The users, management devices, command line interfaces all talk to the API server 3102 to interact with the Kubernetes cluster. ETCD 3108 is a distributed reliable key-value store used by Kubernetes to store all data used to manage the cluster. The Scheduler 3104 is responsible for distributing work or containers across multiple nodes. Scheduler looks for newly created containers and assigns them to Nodes. The Controllers 3106 are the brain behind orchestration and responsible for noticing and responding when nodes, containers or endpoints goes down. The controllers 3106 makes decisions to bring up new containers in such cases. The container runtime 3118, 3136 is the underlying software that is used to run containers (such as Docker). Kubelet 3122, 3132 is the agent that runs on each node in the cluster. The agent is responsible for making sure that the containers are running on the nodes as expected.

Figure 48:
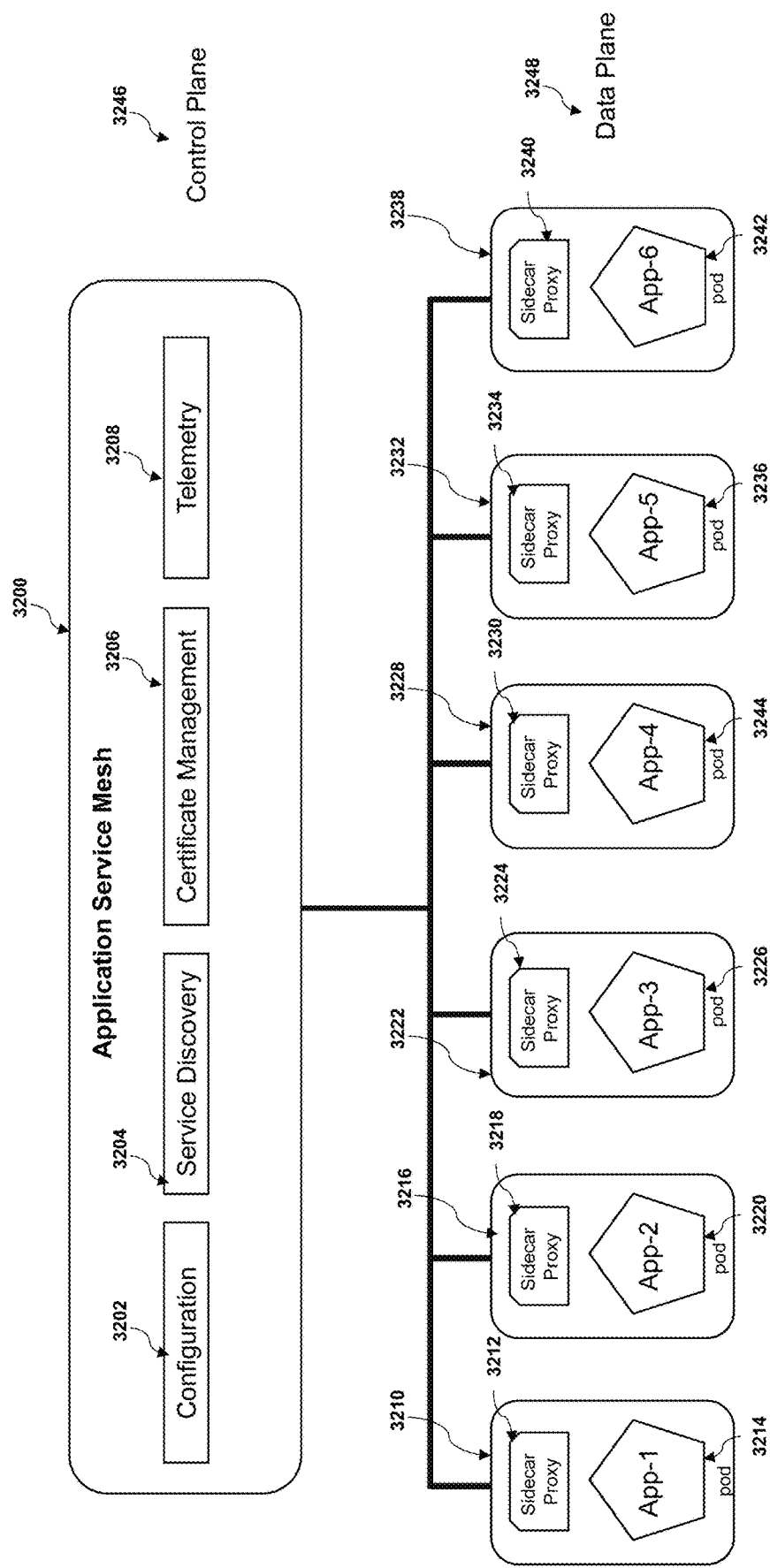
FIG. 48 is an illustration of the architecture of an application service mesh.

Referring now to FIG. 48 an illustration of the architecture of an application service mesh, is described in more detail. Application Service Mesh provides a framework to off-load many application level tasks such as Security, Retries, Logging & tracing. Application Service Mesh makes it easy to create a network of deployed services with load balancing, service-to-service authentication, monitoring, and more, with few or no code changes in service code. Application Service Mesh enables layer 7 functionality. Application service mesh adds the following properties to Kubernetes:

i) Automatic load balancing for HTTP, gRPC, WebSocket, and TCP traffic.
ii) Fine-grained control of traffic behavior with rich routing rules, retries, failovers, and fault injection.
iii) A pluggable policy layer and configuration API supporting access controls, rate limits and quotas.
iv) Automatic metrics, logs, and traces for all traffic within a cluster, including cluster ingress and egress.
v) Secure service-to-service communication in a cluster with strong identity-based authentication and authorization.

An application service mesh (such as Istio) is logically split into a data plane 3248 and a control plane 3246. The data plane 3248 is composed of a set of intelligent proxies (such as the Envoy proxy) deployed as sidecars 3212, 3218, 3224, 3230, 3234, 3240. The sidecar proxies are deployed on the pods 3210, 3216, 3222, 3228, 3232, 3238. These proxies mediate and control all network communication between microservices and applications 3214, 3220, 3226, 3244, 3236, 3242. Sidecar proxies also collect and report telemetry on all mesh traffic. The control plane 3246 manages and configures the proxies to route traffic. The control plane 3246 includes components for Configuration 3202, Service Discovery 3204, Certificate Management 3206 and Telemetry 3208.

Figure 49:
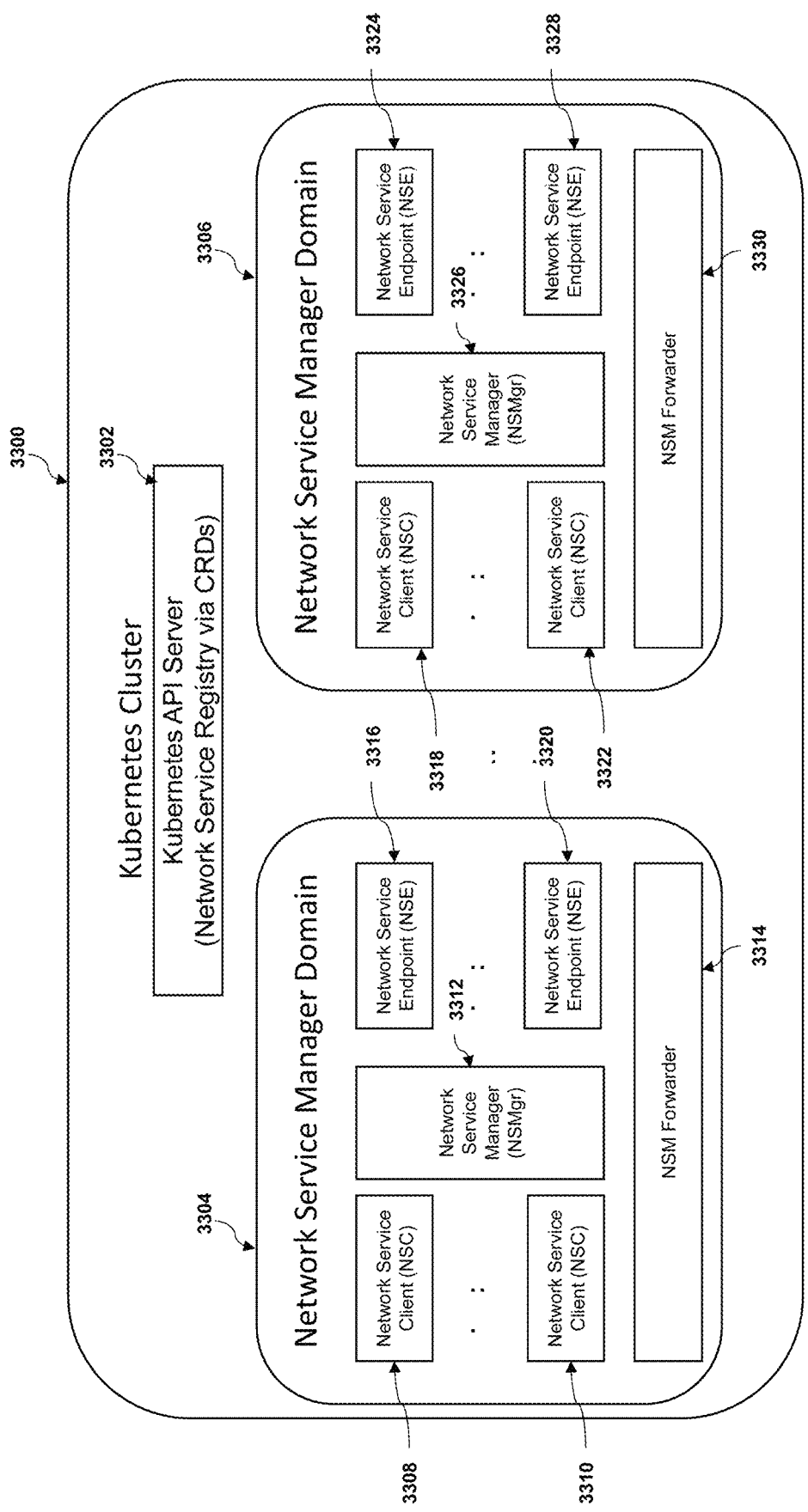
FIG. 49 is an illustration of the architecture of a network service mesh.

Referring now to FIG. 49 an illustration of the architecture of a network service mesh, is described in more detail. Network Service Mesh (NSM) enables sophisticated layer 2 and 3 network configuration and options. 5G Core Networks are typically deployed hybrid cloud environments where each cloud has very different requirements on layer 2 & 3 setup and protocols supported. NSM allows these requirements to be fulfilled in a cloud native way. NSM can be used to connect different clusters or domains. NSM maps the concept of an application service mesh to L2/L3 payloads. NSM adds the following properties to networking in Kubernetes:

i) Heterogeneous network configurations
ii) Exotic protocols
iii) Tunneling as a first-class citizen
iv) Networking context as a first-class citizen
v) Policy-driven service function chaining (SFC)
vi) Minimal need for changes to Kubernetes
vii) On-demand, dynamic, negotiated connections NSM comprises components such as Network Service Manager 3312, 3326, Network Service Endpoint 3316, 3320, 3324, 3328 Network Service Client 3308, 3310, 3318, 3322 and Network Service Forwarder 3314, 3330. Network Service Endpoint is the component that provides network functionality requested by a Network Service Client. Some examples of network functionalities requested by a Network Service Client and provided by a Network Service Endpoint are listed below:

i) Requesting access to an external interface, for example a radio network service.
ii) Requesting a tunnel to a network service through an SDN
iii) Requesting access to an external device by hooking up two network services.
iv) L2 bridge service
v) Distributed bridge domain The functionality requested by a Network Service Client is provided by a Network Service Endpoint in the form an L2/L3 connection through Network Service Forwarder 3314, 3330. The L2/L3 connection can carry payloads such as IP packets, Ethernet frames or MPLS frame. A Network Service Registry 3302 keeps records of what network service are present, their respective network service endpoints and the network service managers. Every node in a Kubernetes cluster has a Network Service Manager which publish to the Network Service Registry 3302 for discovery. The Network Service Managers advertise the Network Service Endpoints managed by them to the Network Service Registry 3302. Network Service Managers communicate peer-to-peer with to setup the L2/L3 connections. Network Service Registry 3302 is implemented via Custom Resource Definitions (CRDs) in the Kubernetes API server. Every node in a Kubernetes cluster is a Network Service Manager domain. Every node also runs a Network Service Forwarder which serves as a data plane doing the cross connects.

Figure 50:
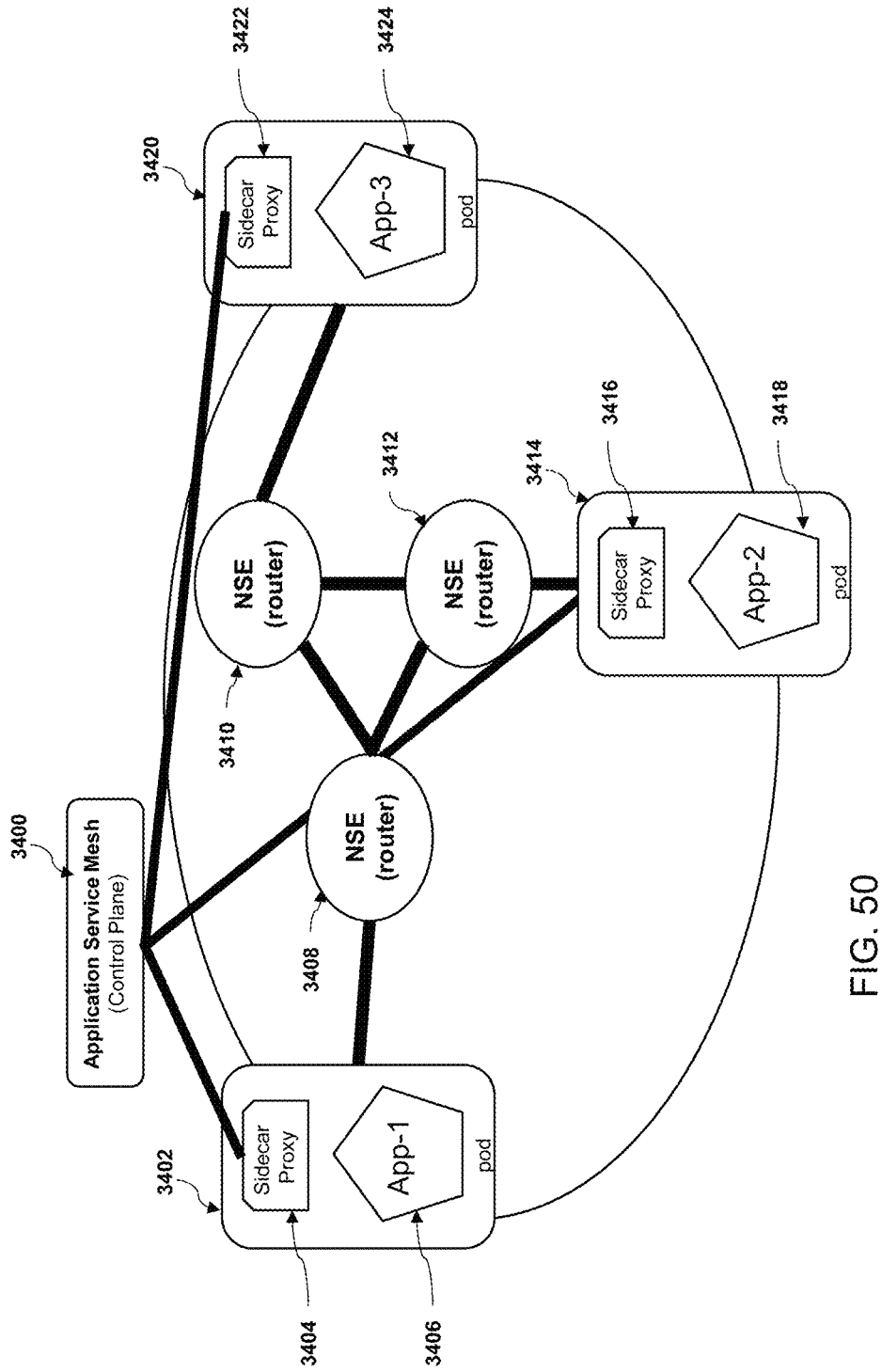
FIG. 50 is an illustration of an Application Service Mesh over a Network Service Mesh, according to an embodiment of the invention.

Referring now to FIG. 50 an illustration of an Application Service Mesh over a Network Service Mesh, according to an embodiment of the invention, is described in more detail. Application Service Mesh can be deployed over a Network Service Mesh. Network Service Mesh 3410, 3408, 3412 orchestrates the connectivity between different clusters, domains or clouds. Application Service Mesh 3400 provides functionalities such as secure service to service communication, observability, logging, telemetry, advance policies, intelligent routing rules, traffic management and canary deployments.

Figure 51:
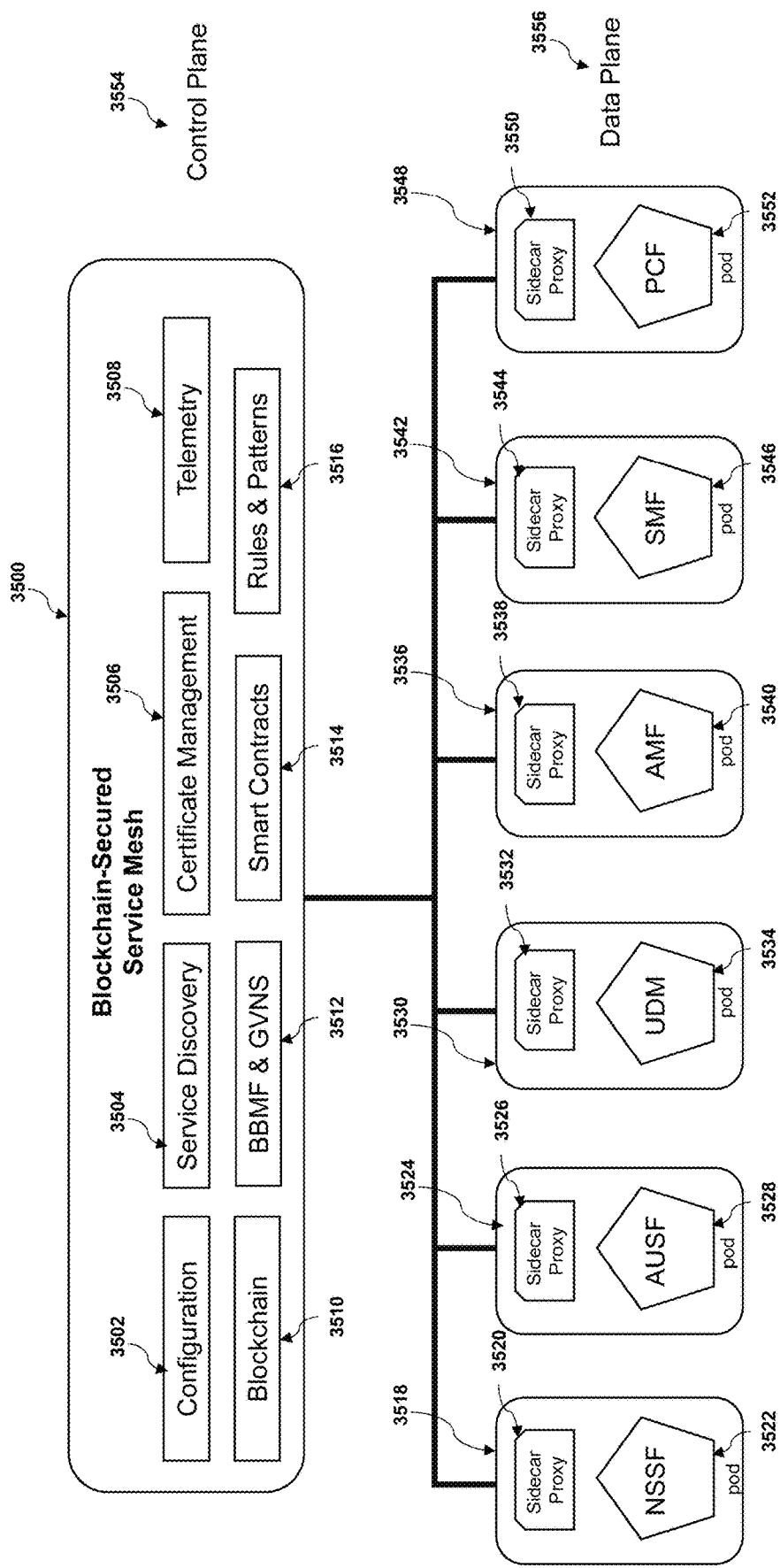
FIG. 51 is an illustration of a Blockchain-Secured Service Mesh, according to an embodiment of the invention.

Referring now to FIG. 51 an illustration of a Blockchain-Secured Service Mesh 3500, according to an embodiment of the invention, is described in more detail. The Zero-Trust model assumes that there are no longer trusted interfaces, applications, traffic, network or users. Blockchain-Secured Service Mesh 3500 meets the following requirements of Zero-Trust model:
i) All resources must be accessed in a secure manner
ii) Access control must be on a need-to-know basis and strictly enforced
iii) Systems must verify and never trust
iv) All traffic must be inspected, logged and reviewed
v) Systems must be designed from the inside out instead of outside in Blockchain-Secured Service Mesh 3500 is logically split into a data plane 3556 and a control plane 3554. The data plane 3556 comprises a set of intelligent proxies (such as the Envoy proxy) deployed as sidecars 3520, 3526, 3532, 3538, 3544, 3550. The sidecar proxies are deployed on the pods 3522, 3528, 3534, 3540, 3546, 3552. These proxies mediate and control all network communication between the CNFs 3522, 3528, 3534, 3540, 3546, 3552. Sidecar proxies also collect and report telemetry on all mesh traffic. The control plane 3554 manages and configures the proxies to route traffic. The control plane 3554 includes components for Configuration 3502, Service Discovery 3504, Certificate Management 3506, Telemetry 3508, Blockchain 3510, BBMF & GVNS 3512, Smart Contracts 3514 and Rules & Patterns 3516.

Figure 52:
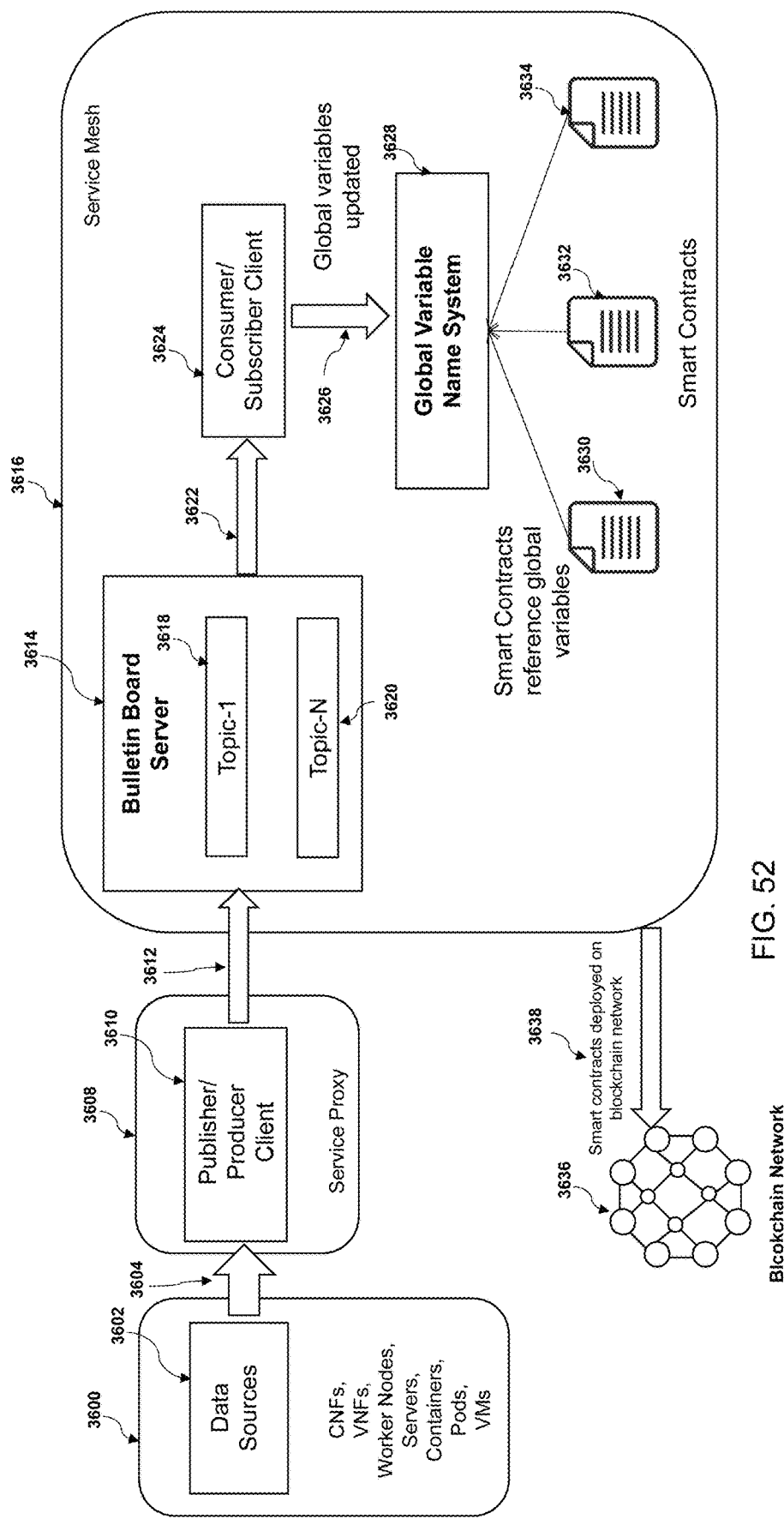
FIG. 52 is an illustration of the process for Logging Traffic on Blockchain through Bulletin Board Messaging Framework (BBMF) and Global Variable Name System (GVNS), according to an embodiment of the invention.

Referring now to FIG. 52 an illustration of the process for Logging Traffic on Blockchain 3636 through Bulletin Board Messaging Framework (BBMF) 3614 and Global Variable Name System (GVNS) 3628, according to an embodiment of the invention, is described in more detail. The Global Variable Name System (GVNS) 3628 maintains records of global variables and the owners and resolvers for the global variables. Data sources 3600 such as CNFs, VNFs, Worker Nodes, Servers, Containers, Pods, VMs, produce data or notifications which are sent to a publisher/producer client 3610 running on a service proxy 3608. The publisher/producer client 3610 publishes the data or notification as a message 3612 to one or more topics 3618, 3620 managed by the Bulletin Board server 3614. The consumer/subscriber client 3624 receives the messages 3622 and updates the value of global variables registered in the GVNS 3628. Smart contracts 3630, 3632, 3534 reference the global variable registered in the GVNS 3628.

All network traffic and transactions between the CNFs (Containerized Network Functions) or VNFs (Virtualized Network Functions) are logged on the blockchain through the BBMF-GVNS components of the Blockchain-Secured Service Mesh 3616. Blockchain 3636 is used to ensure that the CNFs/VNFs do not act maliciously against each other. All interactions are stored in a blockchain 3636 and use smart contracts to enforce security guidelines. Every transaction is logged and cleared before it is processed and committed. No CNF/VNF trusts the other CNFs/VNFs.

Figure 53:
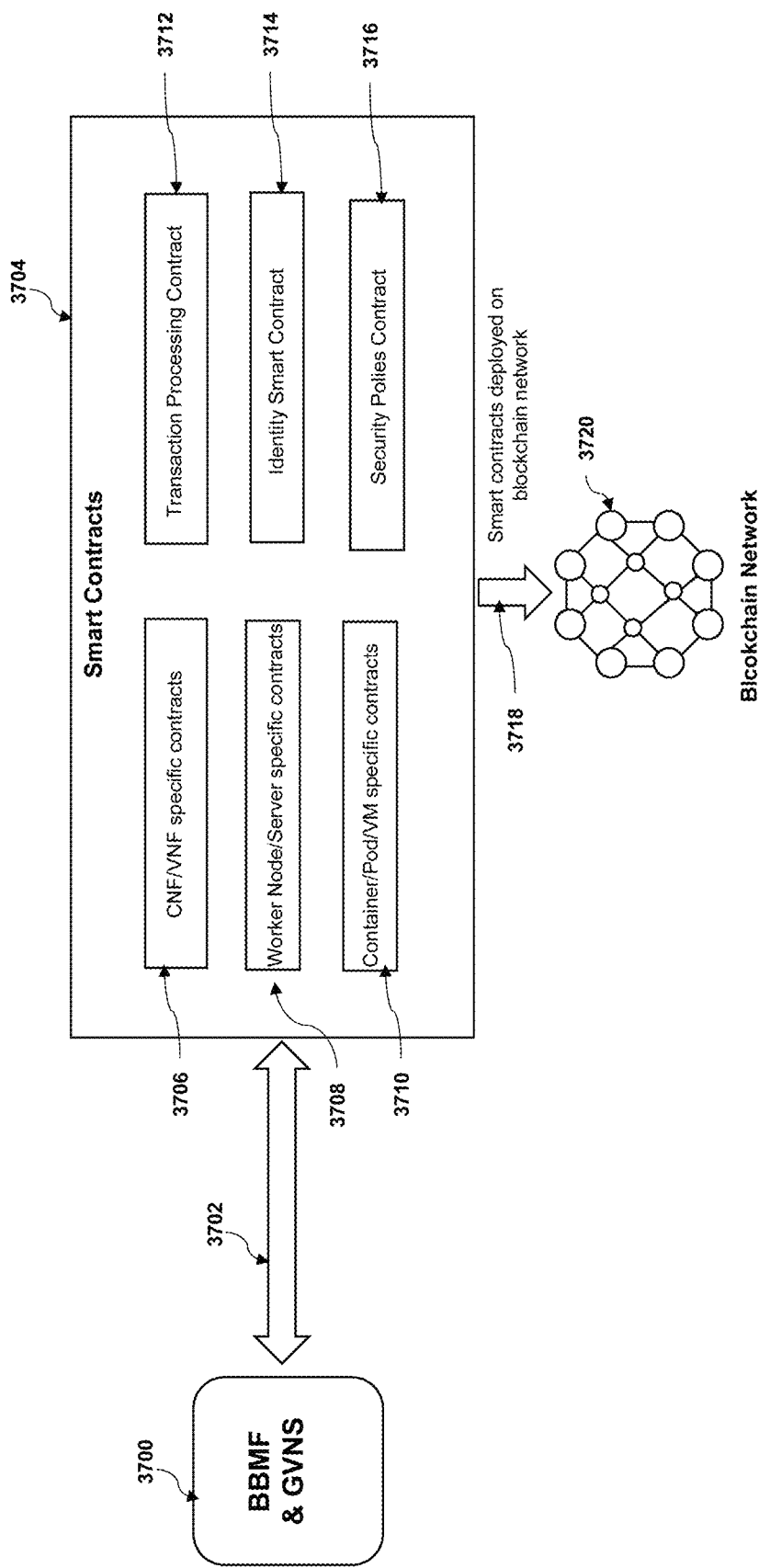
FIG. 53 is an illustration of the Smart Contracts involved in the Blockchain-Secured Service Mesh, according to an embodiment of the invention.

Referring now to FIG. 53 an illustration of the Smart Contracts involved in the Blockchain-Secured Service Mesh, according to an embodiment of the invention, is described in more detail. The smart contracts are deployed on blockchain 3720 and interact with BBMF & GVNS 3700. The smart contracts involved are as follows:
CNF/VNF specific contracts 3706
Transaction Processing Contract 3712
Worker Node/Server specific contracts 3708
Identity Smart Contract 3714
Container/Pod/VM specific contracts 3710
Security Policies Contract 3716

Figure 54:
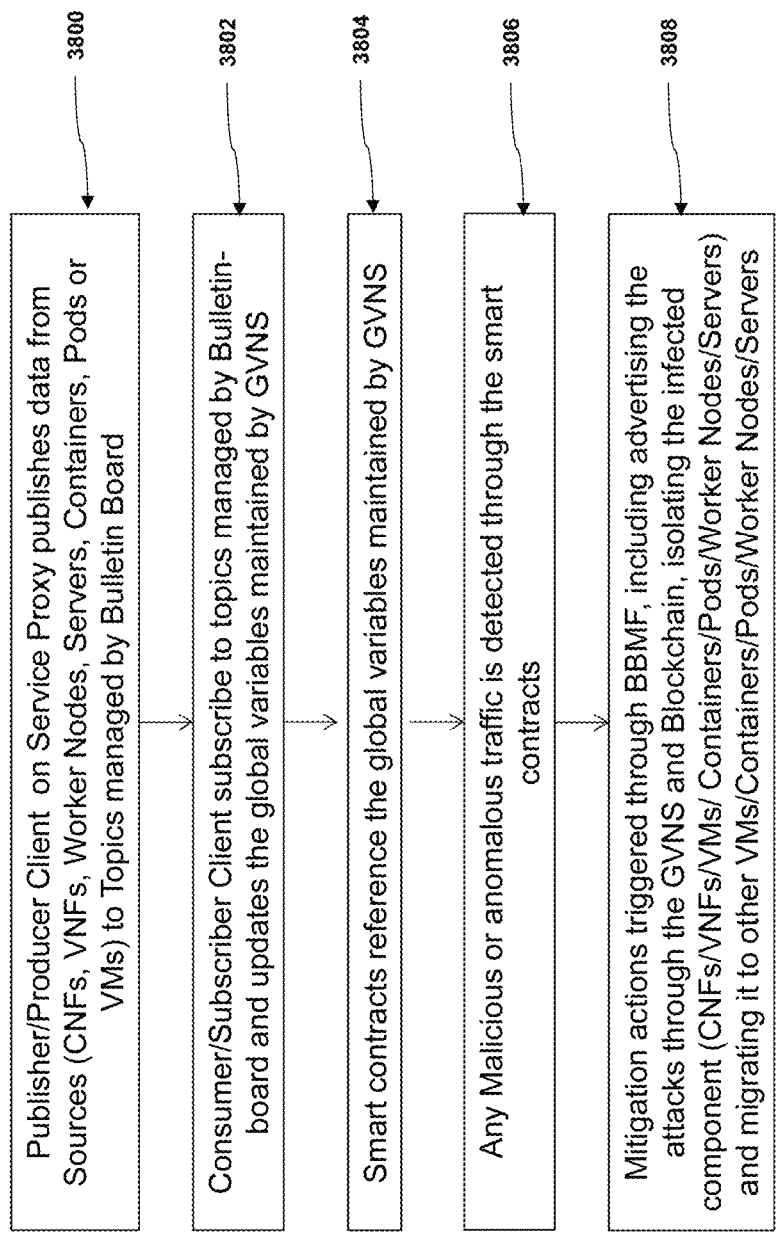
FIG. 54 is an illustration of the steps for detecting and mitigating attacks (such as DDoS) with the Blockchain-Secured Service Mesh, according to an embodiment of the invention.

Referring now to FIG. 54 an illustration of the steps for detecting and mitigating attacks (such as DDoS) with the Blockchain-Secured Service Mesh, according to an embodiment of the invention, is described in more detail. The blockchain-secured service mesh logs all traffic including the network and transactions data, processes and clears transactions, prevents CNFs/VNFs/VMs/Containers/Pods/Worker Nodes/Servers from acting maliciously against each other and enforces security policies. Detection and mitigation countermeasures can be provided in an on-demand manner through the use of the blockchain-secured service mesh. All traffic from CNFs/VNFs/VMs/Containers/Pods/Worker Nodes/Servers is logged using the bulletin board server and the corresponding global variables and smart contracts are updated. Any Malicious or anomalous traffic is detected through the smart contracts. Smart contracts are used to match patterns and the results are used to change mapping of the CNFs/VNFs based on risk and scalability. Corresponding mitigation actions triggered through BBMF. Mitigation actions involve advertising the attacks through the GVNS and Blockchain, isolating the infected component (CNFs/VNFs/VMs/Containers/Pods/Worker Nodes/Servers) and migrating it to other VMs/Containers/Pods/Worker Nodes/Servers. At step-3800, Publisher/Producer Client on Service Proxy publishes data from Sources (CNFs, VNFs, Worker Nodes, Servers, Containers, Pods or VMs) to Topics managed by Bulletin Board. At step-3802, Consumer/Subscriber Client subscribe to topics managed by Bulletin-board and updates the global variables maintained by GVNS. At step-3804, Smart contracts reference the global variables maintained by GVNS. At step-3806, Any Malicious or anomalous traffic is detected through the smart contracts. At step-3808, Mitigation actions triggered through BBMF, including advertising the attacks through the GVNS and Blockchain, isolating the infected component (CNFs/VNFs/VMs/Containers/Pods/Worker Nodes/Servers) and migrating it to other VMs/Containers/Pods/Worker Nodes/Servers.

Figure 55:
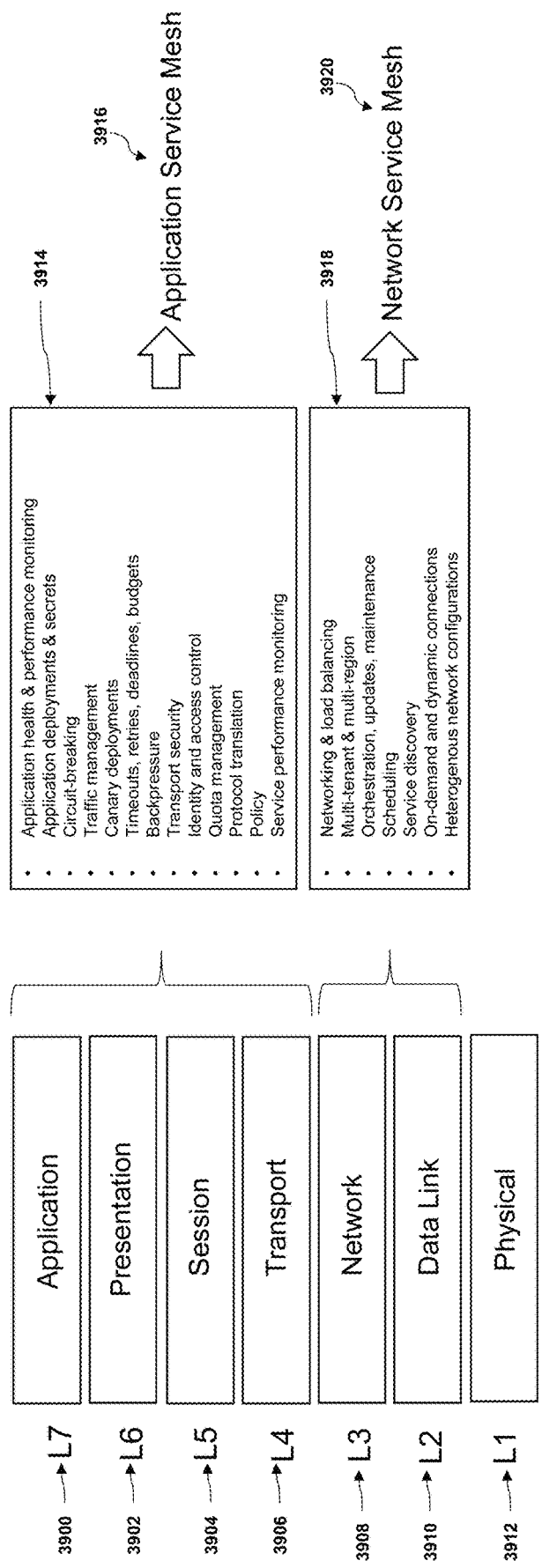
FIG. 55 is an illustration of the challenges and requirements for Containerized Network Functions (CNFs) at different layers, according to an embodiment of the invention.

Referring now to FIG. 55 an illustration of the challenges and requirements for Containerized Network Functions (CNFs) at different layers, according to an embodiment of the invention, is described in more detail. The challenges at layer-2 (data link layer 3910) and layer-3 (network layer 3908) include:

Networking & load balancing
  Multi-tenant & multi-region
  Orchestration, updates, maintenance
  Scheduling
  Service discovery
  On-demand and dynamic connections
  Heterogenous network configurations
  Network Service Mesh 3920 addresses the challenges at layers 2 and 3.

The challenges at layer-4 (transport layer 3906), layer-5 (session layer 3904), layer-6 (presentation layer 3902) and layer-6 (application layer 3900) include:

Application health & performance monitoring
  Application deployments & secrets
  Circuit-breaking
  Traffic management
  Canary deployments
  Timeouts, retries, deadlines, budgets
  Backpressure
  Transport security
  Identity and access control
  Quota management
  Protocol translation
  Policy
  Service performance monitoring
  Application Service Mesh 3916 addresses the challenges at layers 4, 5, 6 and 7.

Figure 56:
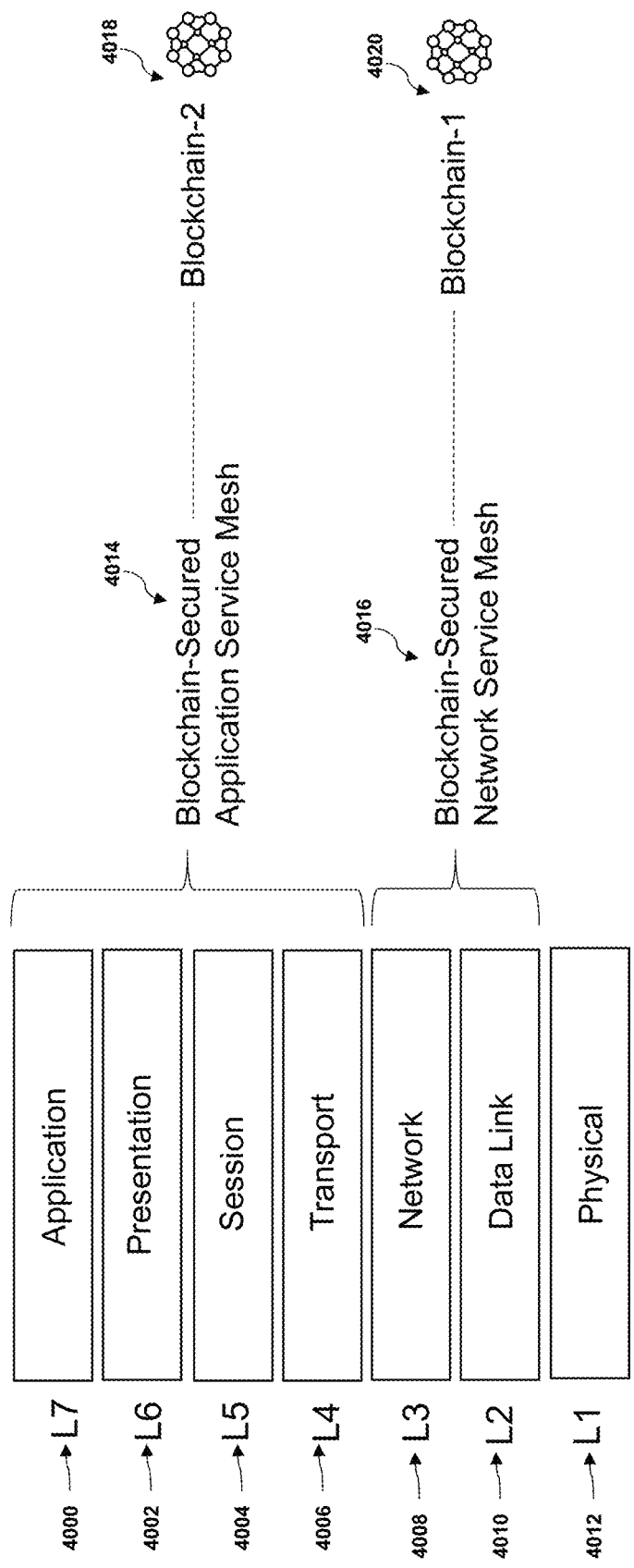
FIG. 56 is an illustration of the multi-layer protection approach using a Blockchain-Secured Application Service Mesh and Blockchain-Secured Network Service Mesh, according to an embodiment of the invention.

Referring now to FIG. 56 an illustration of the multi-layer protection approach using a Blockchain-Secured Application Service Mesh (BSASM) 4014 and Blockchain-Secured Network Service Mesh (BSNSM) 4016, according to an embodiment of the invention, is described in more detail. BSASM 4014 and BSNSM 4016 have their own blockchains 4018 and 4020. Each blockchain has its own smart contracts and own GVNS variables that can be shared. BSASM and BSNSM have their own smart contracts or each layer has its own smart contracts.

Figure 57:
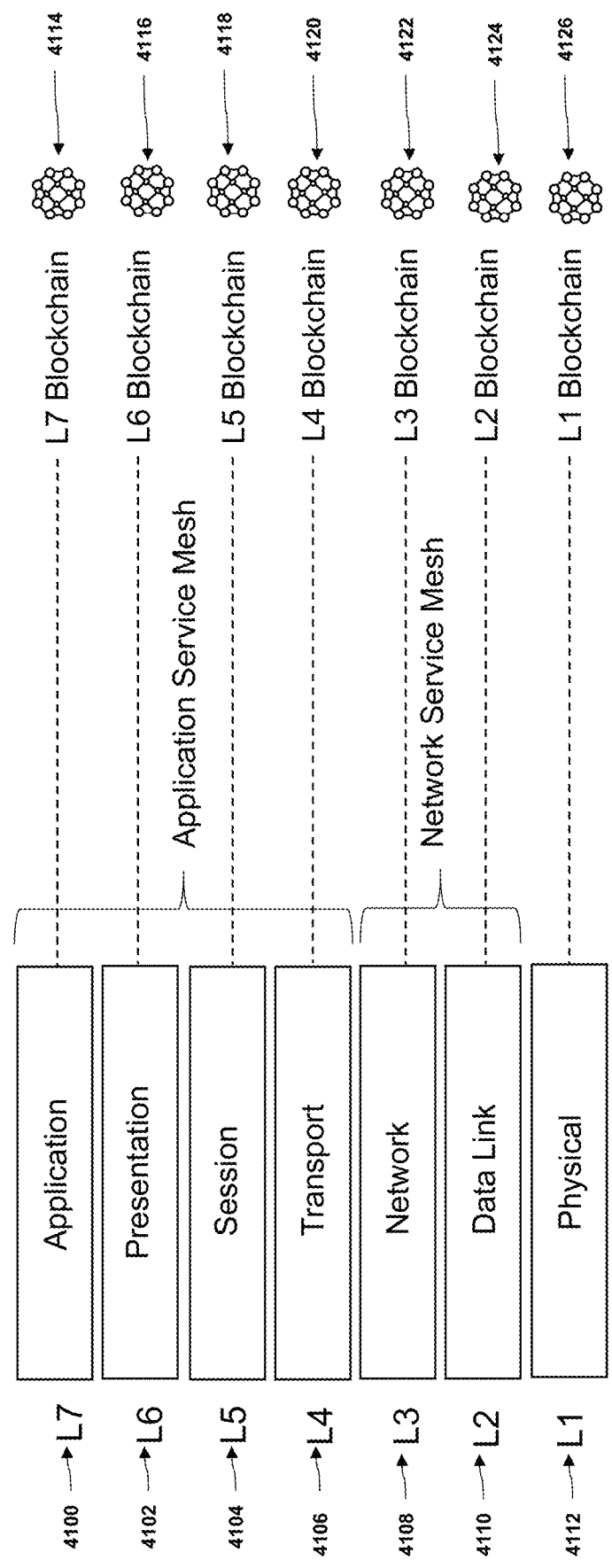
FIG. 57 is an illustration of the multi-layer protection approach using different blockchains at different layers, according to an embodiment of the invention.

Referring now to FIG. 57 an illustration of the multi-layer protection approach using different blockchains at different layers, according to an embodiment of the invention, is described in more detail. Each layer blockchain 4116, 4116, 4118, 4120, 4122, 4124, 4126 can communicate across other layer blockchain. Each layer 4100, 4102, 4104, 4106, 4108, 4110, 4112 can have its own blockchain, or subsets of layers can share a blockchain. Or neighboring layers can share blockchain. Or the subsets can overlap and the bordering layer can be part of both blockchains. Alternatively, one blockchain with multiple smart contracts for each layer or subsets of layers L1 through L7. A Block can belong to one or more subsets. Each Smart contract can belong to a blockchain or across blockchains. A zero trust graph sets up the assignments. Subsets can overlap and each subset need not contain all adjacent layers. It could contain only layers L1 and L6 and L7.

Figure 58:
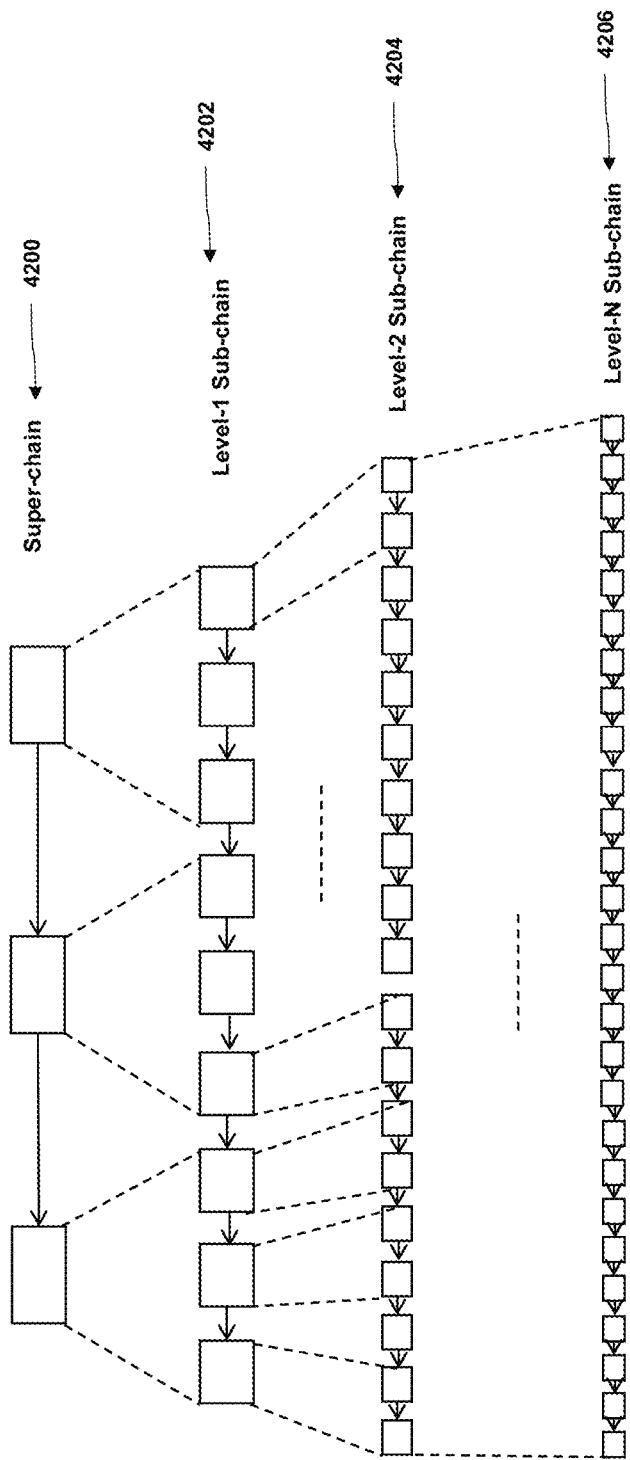
FIG. 58 is an illustration of the super-chain and sub-chains in multi-layer protection approach, according to an embodiment of the invention.

Referring now to FIG. 58 an illustration of the super-chain and sub-chains in multi-layer protection approach, according to an embodiment of the invention, is described in more detail. The multi-layer protection approach involves one super-chain 4200 and one or more levels of sub-chains 4202, 4204, 4206. The super-chain acts as summarized version of the level-1 sub-chain. Similarly, level-(N−1) sub-chain acts as a summarized version of the level-N sub-chain. A single block in the super-chain can include summarized transactions from multiple blocks in the sub-chain.

Figure 59:
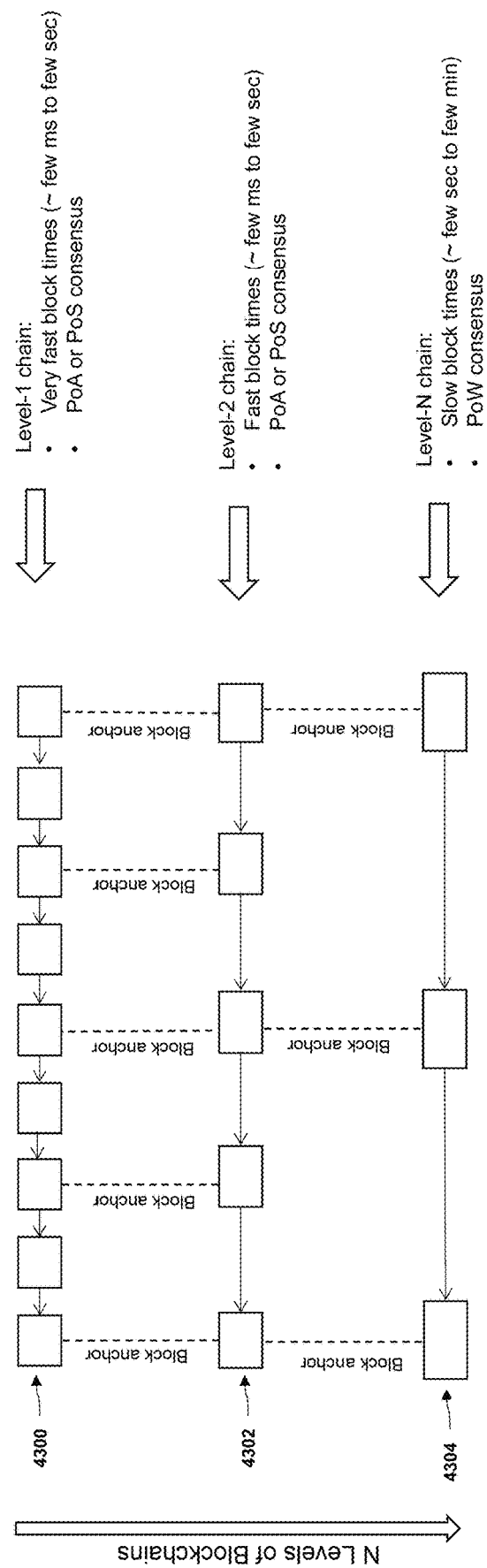
FIG. 59 is an illustration of BlockGrid architecture for multi-layer protection, according to an embodiment of the invention.

Referring now to FIG. 59 an illustration of BlockGrid architecture for multi-layer protection, according to an embodiment of the invention, is described in more detail. BlockGrid is a multi-chain architecture comprising N-levels of blockchains with increasing block-times and increasing levels of decentralization. Level-1 4300 chain is the "fastest" chain which has block times in the range of few milli-second to few seconds and a Proof-of-Authority (PoA) or Proof-of-Stake (PoS) consensus. The Level-N chain 4304 is a Proof-of-Work (PoW) chain with slow block times in the range of few seconds to few minutes and high level of decentralization. The blocks in the successive levels in the BlockGrid architecture are connected through block anchors. A Block Anchor is a link between a block on level N−1 chain and a block on level N chain where these blocks are linked by a cryptographic hash. More specifically, a Block Anchor may exist between a block on the Level-1 4300 chain and a block on the Level N−1 chain 4302, and another Block Anchor may exist between block on the Level N−1 chain 4302 and a block on the Level N 4304 chain.

The BlockGrid network can be seen as a hybrid of fully centralized and fully decentralized blockchain networks. Level-1 chain 4300 can be centralized as it needs to be fast and have fast block times, whereas Level-N chain 4304 can be fully decentralized. The Bulletin board messaging system may be used to coordinate the N-levels of chains in the BlockGrid where messages and event notifications have to be exchanged between different levels of chains.

Figure 60:
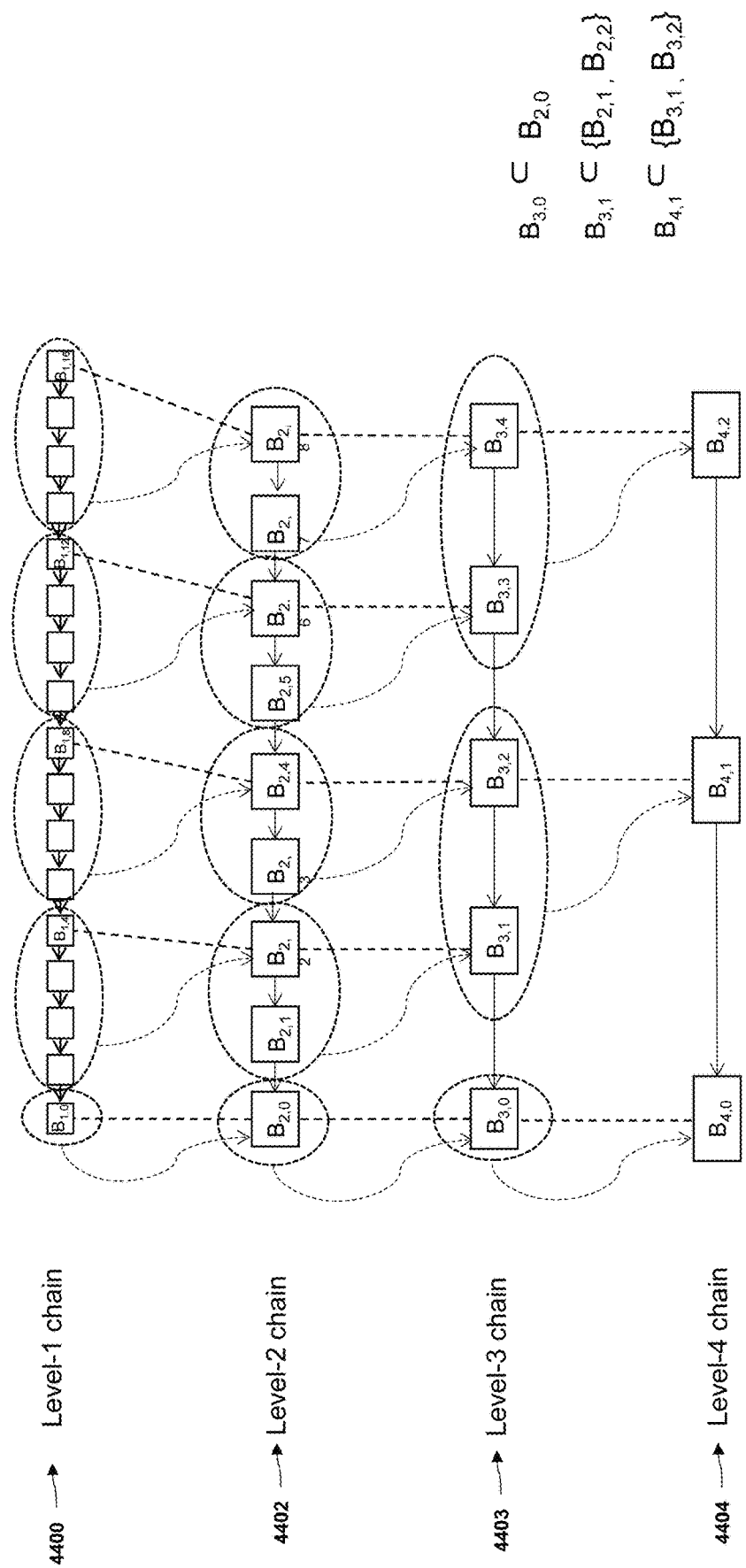
FIG. 60 is an illustration of relationships between blocks on different blockchains within the BlockGrid architecture, according to an embodiment of the invention.

Referring now to FIG. 60 an illustration of relationships between blocks on different blockchains within the BlockGrid architecture, according to an embodiment of the invention, is described in more detail. The figure illustrates a four level BlockGrid network with four blockchains 4400, 4402, 4403, 4404. The blocks in a level N chain contain all the transactions of the corresponding blocks in a level N−1 chain or a summarized form of transactions in the corresponding blocks. For example, block B4,0 on the level-4 chain 4404 contains all the transactions in the corresponding block B3,0 on level-3 chain 4403, which in turn contains all the transactions in the corresponding block B2,0 in the level-2 chain 4402, which in turn contains all the transactions in the corresponding block B1,0 in the level-1 chain 4400. Similarly block B3,1 on level-3 chain contains all the transactions in the corresponding blocks B2,1, and B2,2 1914 in the level-2 chain 1942.

The block times (or block intervals) and block generation times of the different blockchains may be synchronized. For example, if level-1 chain has a block time of 100 ms and level-2 chain has a block time of 1 second then a new block of level-2 chain may be generated after every 10 blocks on level-1 chain. In such a case every block on level-2 chain would contain transactions from previous 10 blocks on the level-1 chain.

Figure 61:
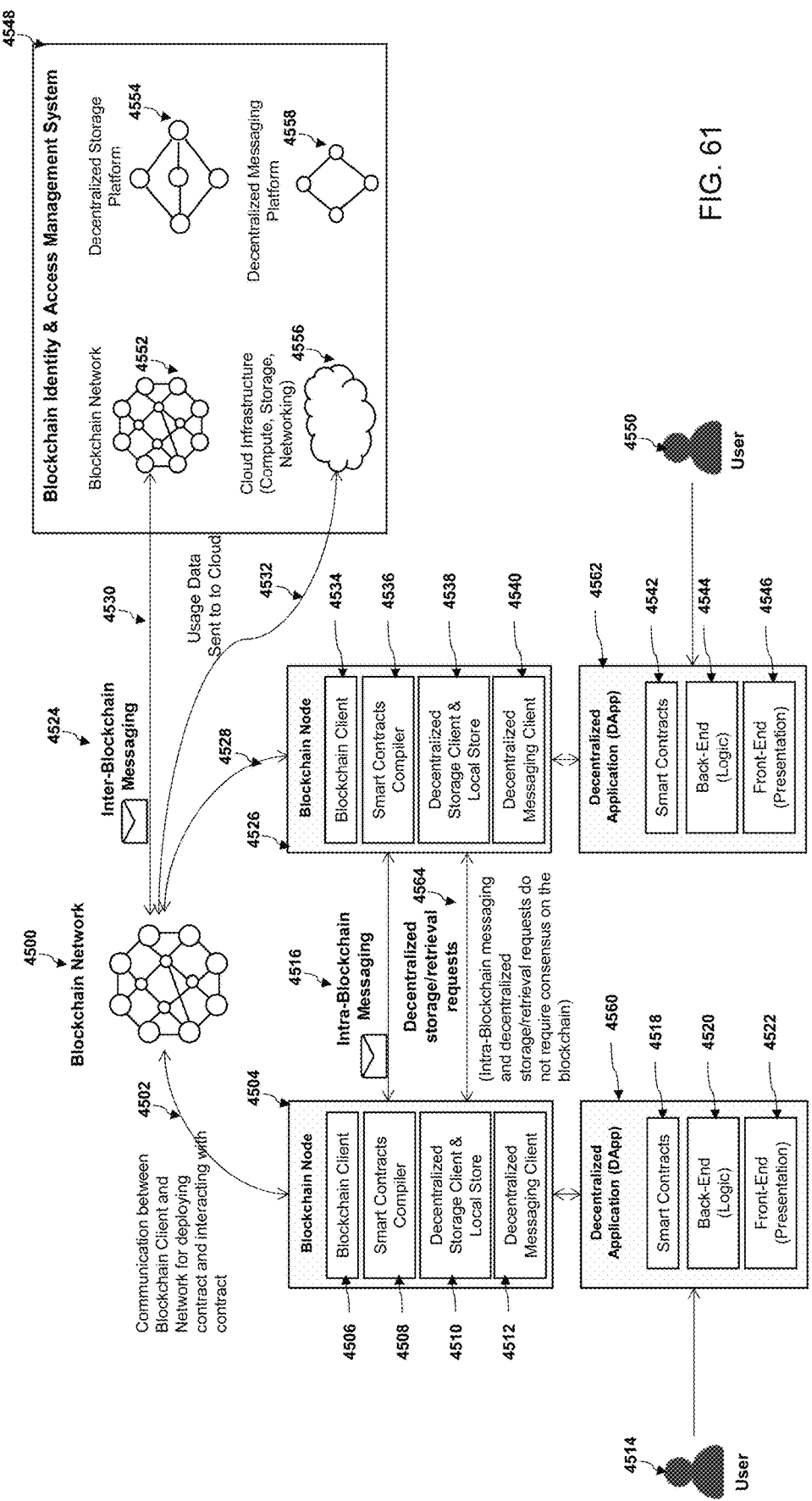
FIG. 61 is an illustration of Blockchain Identity & Access Management platform, according to an embodiment of the invention.

Referring now to FIG. 61 an illustration of Blockchain Identity & Access Management (B-IAM) system, according to an embodiment of the invention, is described in more detail. The B-IAM system's infrastructure layer 4654 comprises a blockchain network 4634, a decentralized storage platform 4636, decentralized messaging platform 4638 and cloud infrastructure 4640. All the smart contracts related to user identity management (such as the Seal Contract, Certification Contract, Roles & Privileges Contract) deployed on the blockchain network 4634. For 4634, a blockchain platform such as Ethereum can be used. The decentralized messaging platform 4638 is used for messaging between the decentralized applications (Dapps), which are built on the B-IAM system. For 4648, a decentralized messaging platform such as Whisper, can be used. Whisper messages are transient in nature and have a time-to-live (TTL) set. Each message has one or more topics associated with it. The Dapps running on a blockchain node inform the node about the topics to which they want to subscribe. Whisper uses topic-based routing where the nodes advertise their topics of interest to their peers. Topics are used for filtering the messages which are delivered to a node which are then distributed to the Dapps running on the blockchain node. The decentralized storage platform 4636 is used for storing user data such as user photos, and scanned identity documents. For 4636, a decentralized storage platform such as Swarm can be used. Swarm is a decentralized storage platform and content distribution service for the Ethereum blockchain platform. Swarm is a peer-to-peer storage platform which is maintained by the peers who contribute their storage and bandwidth resources. Swarm has been designed to dynamically scale up to serve popular content and has a mechanism to ensure the availability of the content which is not popular or frequently requested. The cloud infrastructure 4640, is used for collection, storage and analysis of application usage data.

The B-IAM system's platform and application services layer 4618 comprises Integration Services 4628, Identity & Authentication Services 4650, User Registration & Certification Services 4652, Data Management & Analytics Services 4620. The Integration Services 4628, comprise Inter-Blockchain and Intra-blockchain Messaging Services 4630, and various connectors for applications, cloud services and other blockchain networks 4632. The Identity & Authentication Services 4650 comprise a User Identity & Access Management Service 4642, and a B-IAM portal 4644. The B-IAM portal 4644 allows users 4600 to access and monitor their identity data recorded in the B-IAM system and view identity requests made by different applications. The User Registration & Certification Services 4652 comprise a User Registration Service 4646 and a User Certification Service 4648. The Data Management & Analytics Services 4620, are deployed on the cloud infrastructure 4640. These include an analytics service 4622, reporting service 4624, and an alerting service 4626. The analytics service 4622, can analyze multi-blockchain behavior of a user account to ensure compliance. It is contemplated and included within the scope of the invention that all of these platforms and applications services are operable on a computerized device comprising a processor, a network communication device, and a data storage device as described hereinabove.

The B-IAM system can be used for providing identity, access management and authentication services for a wide range of applications 4614. Some exemplary applications that can benefit from the B-IAM system include an identity verification application 4602, access control application 4604 and a blockchain-based payments application 4608. All of these may communicate with third party devices and applications 4614 that identifies and/or authenticates the users 4600.

Figure 62:
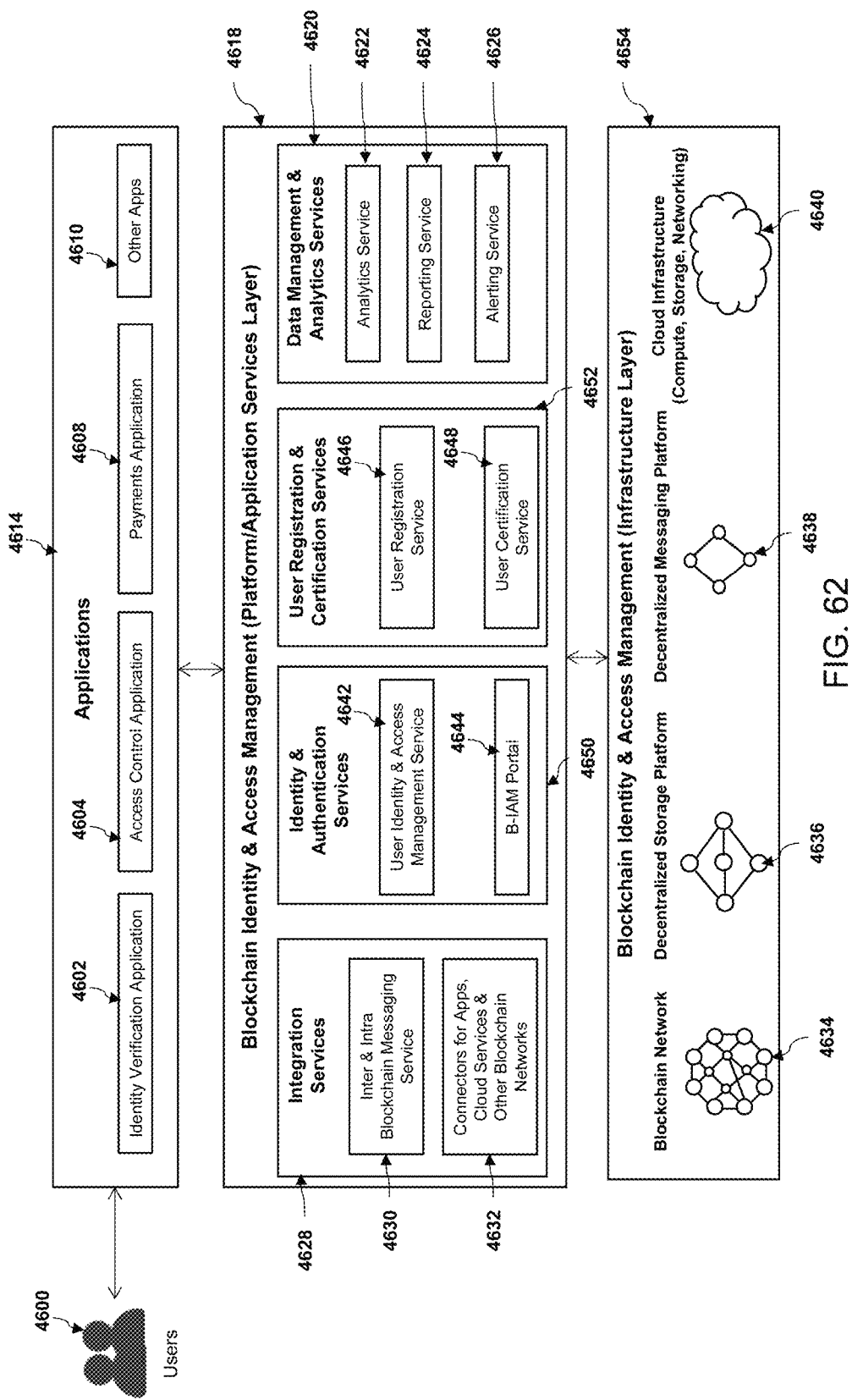
FIG. 62 is an illustration of the interactions between the B-IAM system and other blockchain networks and decentralized applications, according to an embodiment of the invention.

Referring now to FIG. 62 an illustration of the interactions between the B-IAM system 4548 and other blockchain networks 4500 and decentralized applications 4560, 4562, according to an embodiment of the present invention are now described in detail. The B-IAM system can be used to provide user identity and access management services for various decentralized applications deployed on different blockchain networks. The B-IAM allows a user to work on multiple blockchain networks, or multiple applications deployed on the same blockchain networks, while maintaining the same identity. The blockchain network 4500 can communicate with the B-IAM system using an Inter-Blockchain Messaging protocol 4524. The blockchain network 4500 can also send usage data 4532 (such as application usage and user interactions data) to the B-IAM system. Applications deployed on a blockchain network 4500 are either in the form of smart contracts 4518, 4542 or Dapps 4560, 4562. A smart contract is a piece of code which is deployed on the blockchain network and is uniquely identified by an address. While smart contracts can directly be used by end users 4514, 4550 who can send transactions or calls to the smart contracts through blockchain clients, however, to provide a more user-friendly interface to smart contracts, Dapps can be developed and applied over these smart contracts. A Dapp 4560 includes one or more associated smart contracts 4518, a front-end user interface 4522 (which is typically implemented in HTML and CSS) and a back-end 4520 (which is typically implemented in JavaScript). Users can submit transactions to the smart contract 4518 associated with a Dapp from the Dapp's web interface itself. The Dapp's web interface forwards the transactions to the blockchain platform 4500 and displays the transaction receipts or state information in the smart contracts in the web interface. A Dapp is deployed on a blockchain node 4504 which serves the Dapp's web-based user interface. The Dapp logic is controlled by the associated smart contracts 4518 which are deployed on the blockchain platform 4500. Dapps which have special storage requirements can make use of a decentralized storage platform (such as Swarm). Similarly, Dapps which have special messaging requirements can leverage a decentralized messaging platform (such as Whisper). A blockchain node 4504 typically comprises a blockchain client 4506 that sends transactions to the blockchain network 4500, a smart contracts compiler 4508, a decentralized storage client & local store 4510, and a decentralized messaging client 4512. While the smart contracts are deployed on the blockchain network, intra-blockchain messaging 4516 (over a decentralized messaging platform) and decentralized storage/retrieval requests 4564 (over a decentralized storage platform) work off the chain as they do not require a consensus on the blockchain.

Figure 63:
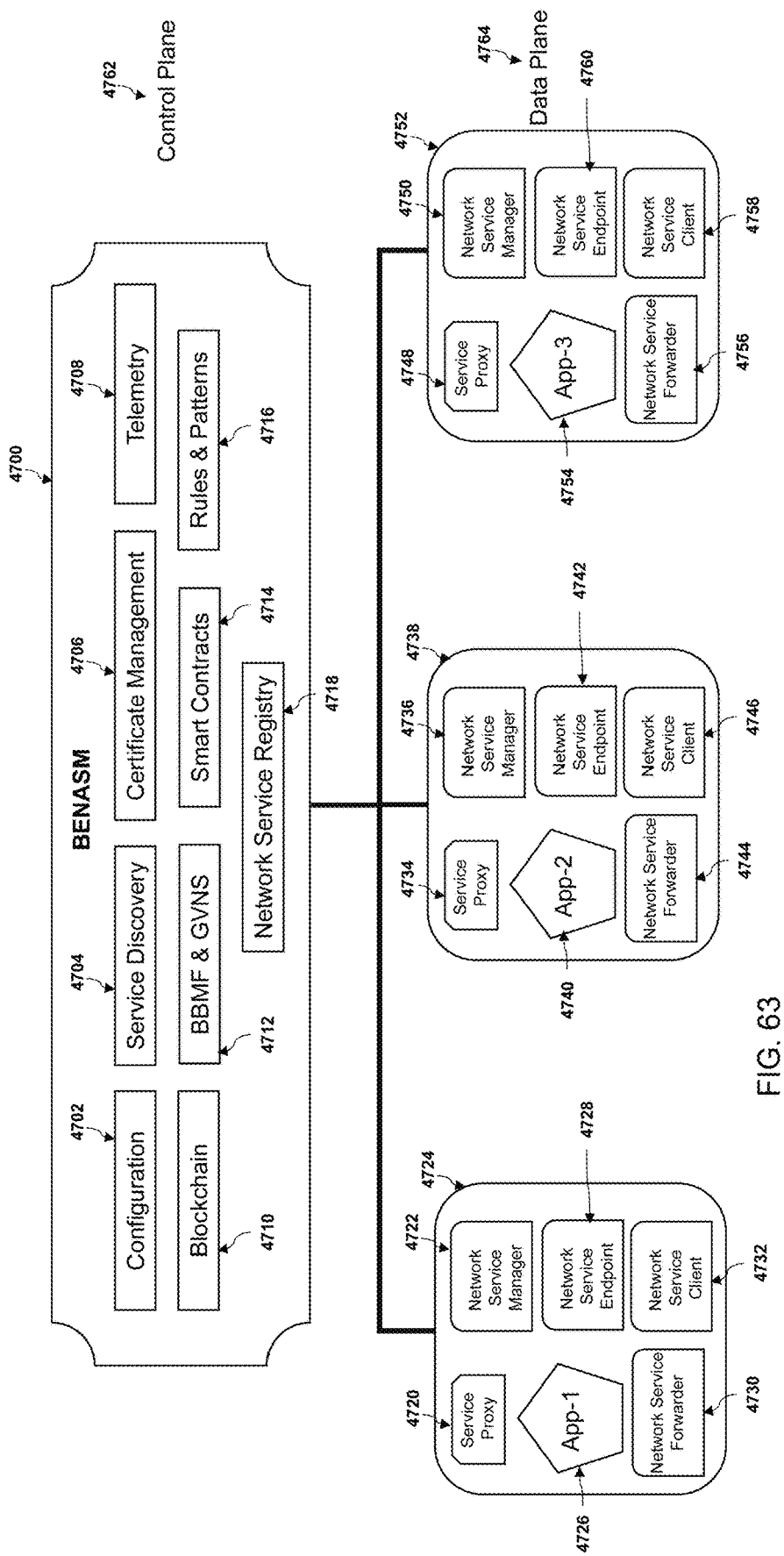
FIG. 63 is an illustration of Blockchain-Enabled Network & Application Service Mesh (BENASM), according to an embodiment of the invention.

Referring now to FIG. 63 an illustration of Blockchain-Enabled Network & Application Service Mesh (BENASM) 4700, according to an embodiment of the invention, is described in more detail. BENASM 4700 is a combined blockchain-enabled network and application service mesh. The combined mesh can have a single blockchain or there can be separate blockchains for network and application layers. Each blockchain has its own smart contracts and own GVNS variables that can be shared. Each layer blockchain can communicate across other layer blockchain. At the network layer, BENASM enables layer 2 and 3 functionality such as network configuration and connectivity different clusters or domains. At the application layer, BENASM enables layer 7 functionality such as load balancing, service-to-service authentication, monitoring, security, retries, logging & tracing and more. The combined mesh enables visibility at both network and application layers and cross layer information passing. For example, from a security point of view if a port is opened at one layer it may be cross checked or correlated against an application action. From Observability point of view, ASM gives application metrics, but it doesn't give network and packet level metrics. The combined mesh can give visibility at all layers with option to drill top-down from higher to lower layers.

BENASM is logically split into a data plane 4764 and a control plane 4762. The data plane 4764 comprises a set of intelligent proxies (such as the Envoy proxy) deployed as sidecars 4720, 4734, 4748. The sidecar proxies are deployed on the pods 4724, 4738, 4752. These proxies mediate and control all network communication between the microservices, applications or CNFs 4726, 4740, 4754. Sidecar proxies also collect and report telemetry on all mesh traffic. The network service mesh specific components such as Network Service Manager 4722, 4736, 4750, Network Service Endpoint 4728, 4742, 4760, Network Service Client 4732, 4746, 4758 and Network Service Forwarder 4730, 4744, 4756 are also deployed on the pods 4724, 4738, 4752. The control plane 4762 manages and configures the proxies to route traffic. The control plane 4762 includes components for Configuration 4702, Service Discovery 4704, Certificate Management 4706, Telemetry 4708, Blockchain 4710, BBMF & GVNS 4712, Smart Contracts 4714, Rules & Patterns 4716 and Network Service Registry 4718.

Figure 64:
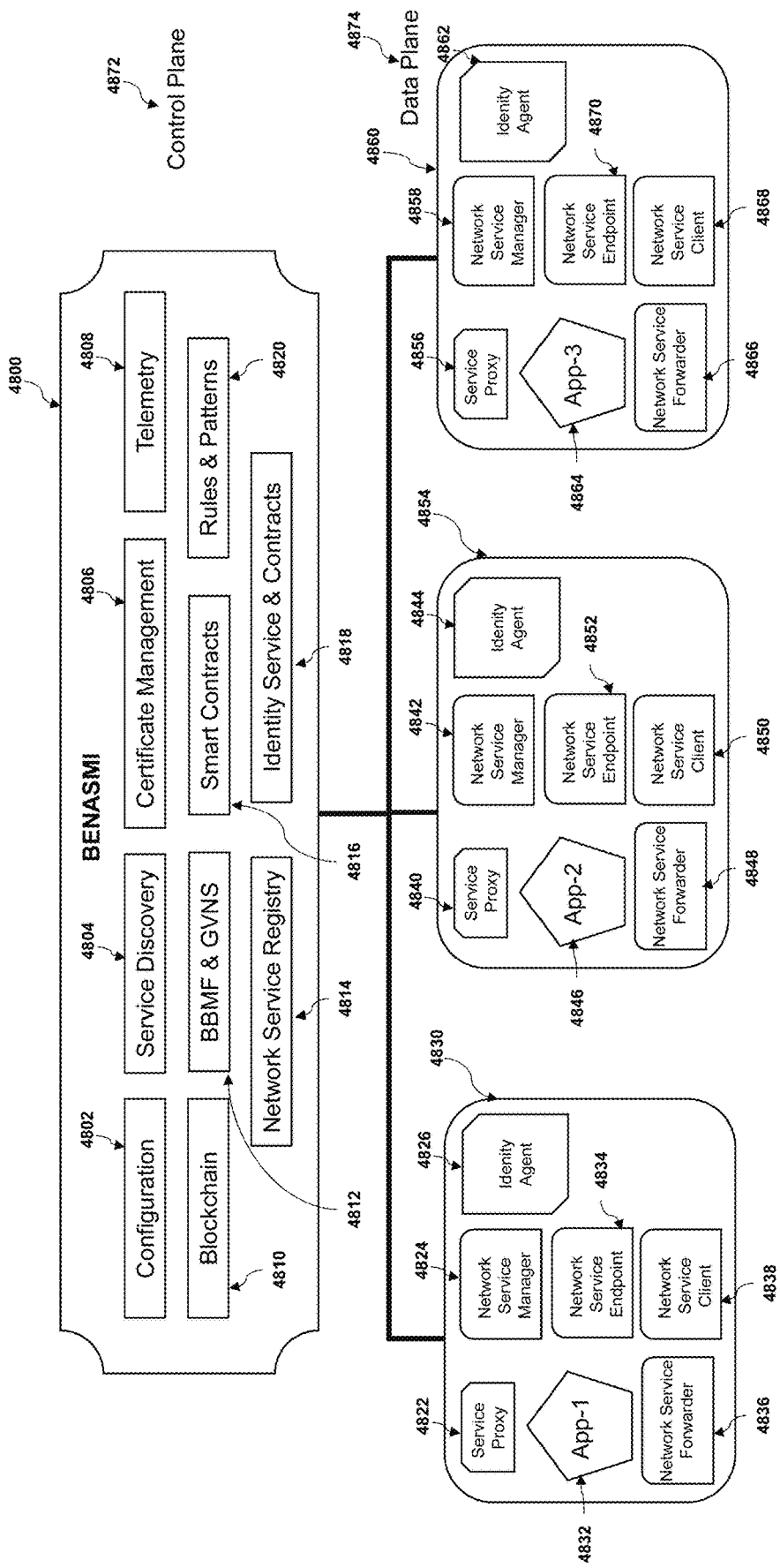
FIG. 64 is an illustration of Blockchain-Enabled Network & Application Service Mesh with Identity (BENASMI), according to an embodiment of the invention.

Referring now to FIG. 64 an illustration of Blockchain-Enabled Network & Application Service Mesh with Identity (BENASMI), according to an embodiment of the invention, is described in more detail. A blockchain-enabled network and application service mesh with an identity framework is proposed. The combined mesh provides functionality at network and application layers as well as secure identity for workloads/services. BENASMI assigns unique identity to each workload/service in the cluster or domain. BENASMI works across multiple domains or clusters. A blockchain smart contract based trust certificate is assigned to each workload/service.

BENASMI is logically split into a data plane 4874 and a control plane 4872. The data plane 4874 comprises a set of intelligent proxies (such as the Envoy proxy) deployed as sidecars 4822, 4840, 4856. The sidecar proxies are deployed on the pods 4830, 4854, 4860. These proxies mediate and control all network communication between the microservices, applications or CNFs 4832, 4846, 4864. Sidecar proxies also collect and report telemetry on all mesh traffic. The network service mesh specific components such as Network Service Manager 4824, 4842, 4858, Network Service Endpoint 4834, 4852, 4870, Network Service Client 4838, 4850, 4868 and Network Service Forwarder 4836, 4848, 4866 are also deployed on the pods 4830, 4854, 4860. The control plane 4872 manages and configures the proxies to route traffic. The control plane 4872 includes components for Configuration 4802, Service Discovery 4804, Certificate Management 4806, Telemetry 4808, Blockchain 4810, BBMF & GVNS 4812, Smart Contracts 4816, Rules & Patterns 4720, Network Service Registry 4814 and Identity Service & Contracts 4818.

Figure 65:
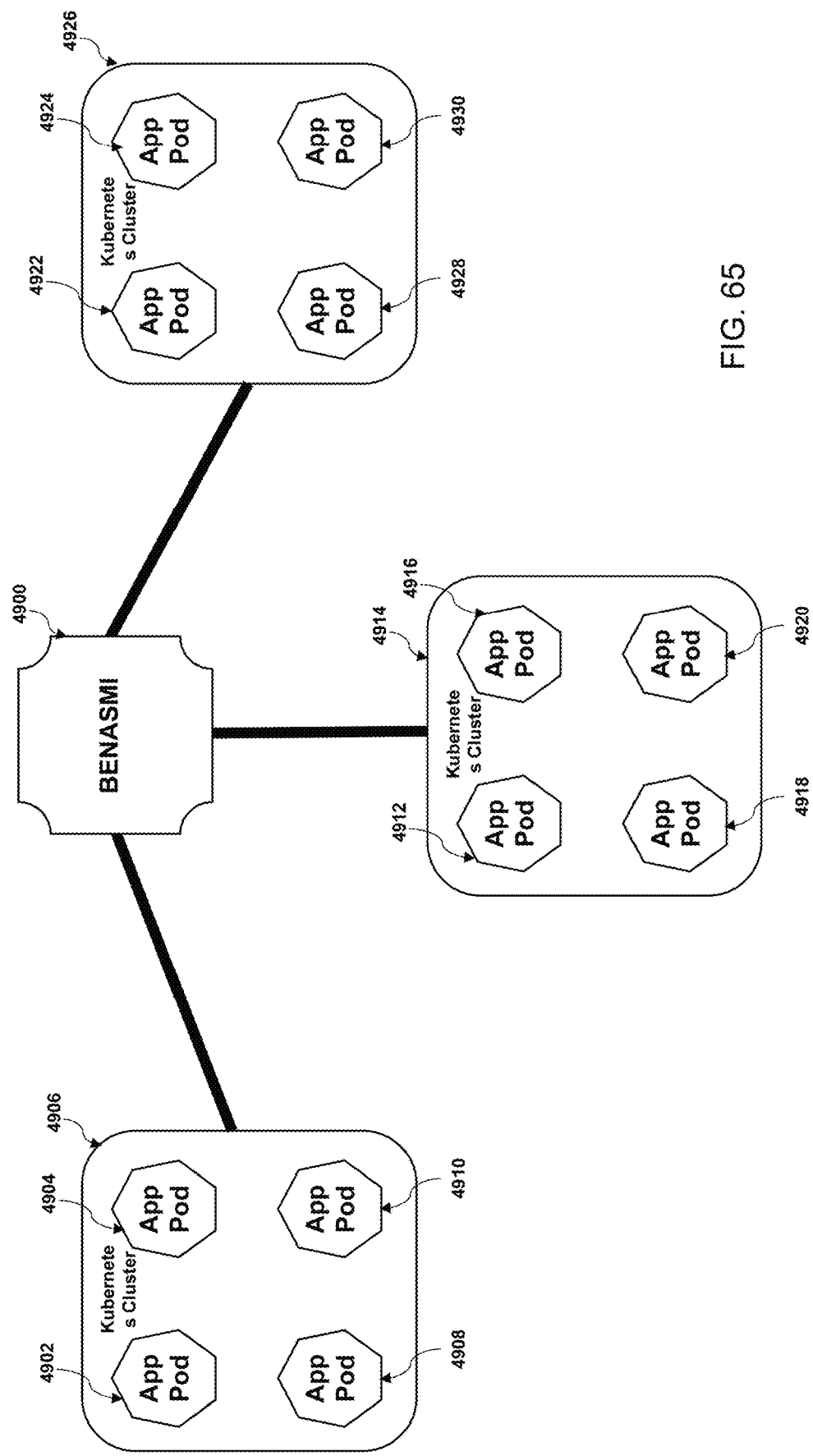
FIG. 65 is an illustration of cross-cluster/cross-domain connectivity, identity and observability with Blockchain-Enabled Network & Application Service Mesh with Identity (BENASMI), according to an embodiment of the invention.

Referring now to FIG. 65 an illustration of cross-cluster/cross-domain connectivity, identity and observability with Blockchain-Enabled Network & Application Service Mesh with Identity (BENASMI), according to an embodiment of the invention, is described in more detail. BENASMI 4900 can provide connectivity, identity and observability functionality across multiple Kubernetes clusters/domains 4906, 4914, 4926 where each cluster/domain has multiple pods 4902, 4904, 4908, 4910, 4922, 4924, 4928, 4930, 4912, 4916, 4918, 4920 running microservices (or services), applications or CNFs.

Figure 66:
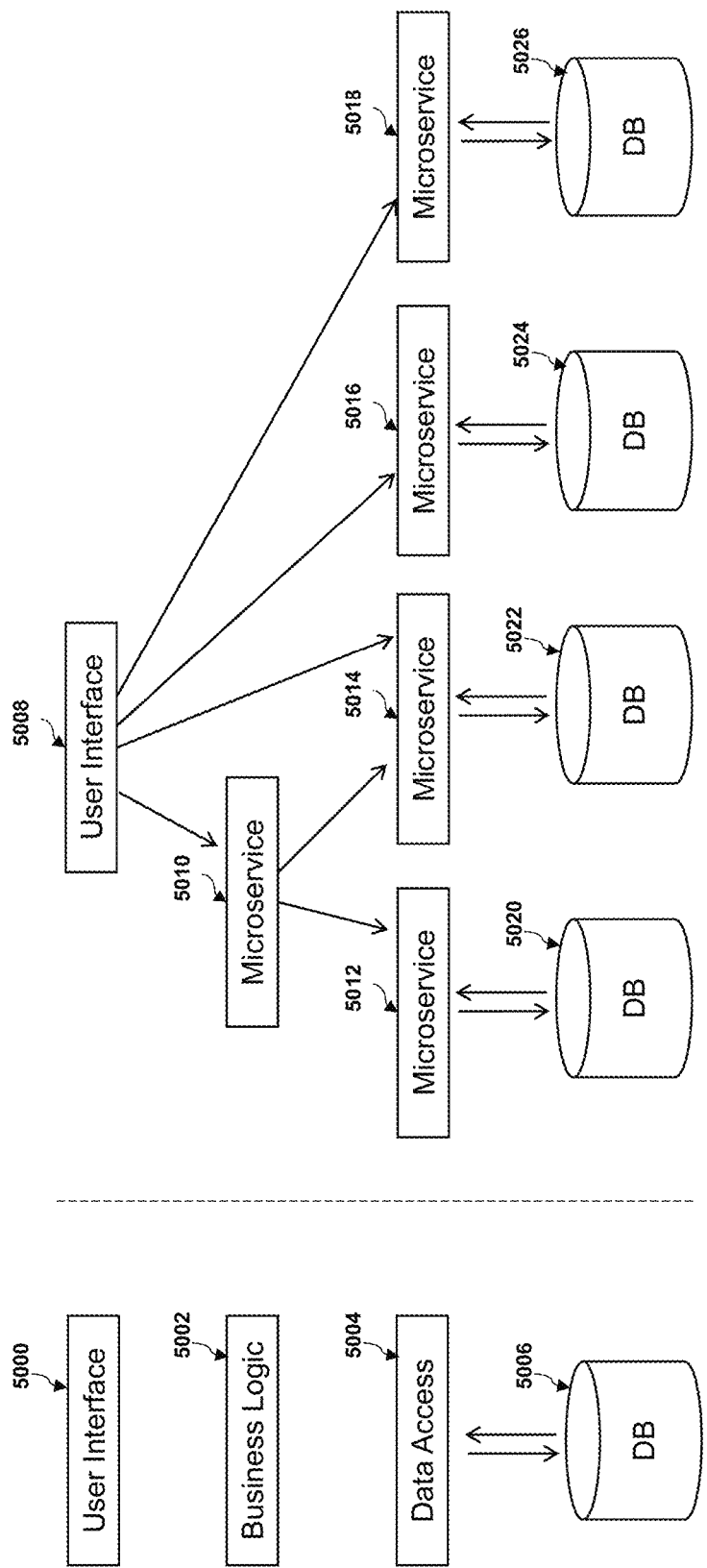
FIG. 66 is a schematic view of a microservices architecture according to an embodiment of the invention.

Referring now to FIG. 66 an illustration of microservices architecture, according to an embodiment of the invention, is described in more detail. Microservices are an architectural approach to software development where instead of developing monolithic software, a number of small independent services are developed that communicate over well-defined APIs. Microservices or services-based architectures make scaling easier, and accelerate the time to market. Microservices architectures leverage Virtualization and Containerization technologies.

In certain embodiments, in the context of 5G, Microservices architectures along with Virtualization and Containerization technologies can allow dynamic allocation and placement of resources, network orchestration and creation of network slices on-demand without prior knowledge of service requirements. Resource allocations can be automated through the use of blockchain and smart contracts to meet the varying levels of QoS. While network slices or container-based microservices applications may be utilized in a 5G context, it is contemplated and included within the scope of the invention that network slices may be employed in a variety of other contexts, particularly those utilizing microservice-based applications utilizing CNFs, such as, but not limited to, Kubernetes, Docker, Google Kubernetes Engine (GKE), Amazon Elastic Kubernetes Service (EKS), and Azure Kubernetes Service, as supported by most cloud-computing environments. Particularly, network slices may be any Kubernetes-based microservices-based application.

With a rapid growth in microservices various problems related to service discovery, routing between multiple services, versions, identity, authorization, authentication, security, and load balancing arise. While Kubernetes and application service meshes address some of these problems, however, there are issues such as multi-layer security, DDoS prevention and zero-trust approach to securing microservices. The Blockchain-Enabled Network & Application Service Mesh with Identity (BENASMI) addresses these issues.

Figure 67:
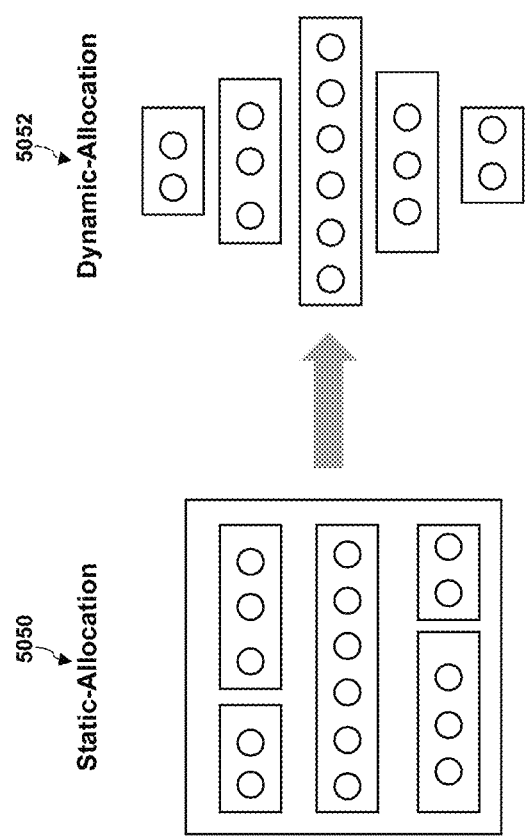
FIG. 67 is a representative view of dynamic allocation of resources in 5G using virtualization and containerization according to an embodiment of the invention.

Referring now to FIG. 67 an illustration of dynamic allocation of resources in 5G using Virtualization and Containerization, according to an embodiment of the invention, is described in more detail. The ideas of Virtualization and Containerization as in Cloud Computing can be extended to the Carrier 5G networks where different containers are modeled by their types and each consumes its own types of slice coins and resources and smart contracts ensure that enterprises, carriers and cloud providers can all run smoothly while not interfering with existing relationship and operational constraints imposed by the other entities. Virtualization and Containerization technologies enable the 5G network operators to quickly build application-aware networks and network-aware applications to deliver customized services and business models. Blockchain and smart contracts enable end-to-end resource allocation/sharing, network management and orchestration delivering desired services.

Figure 68:
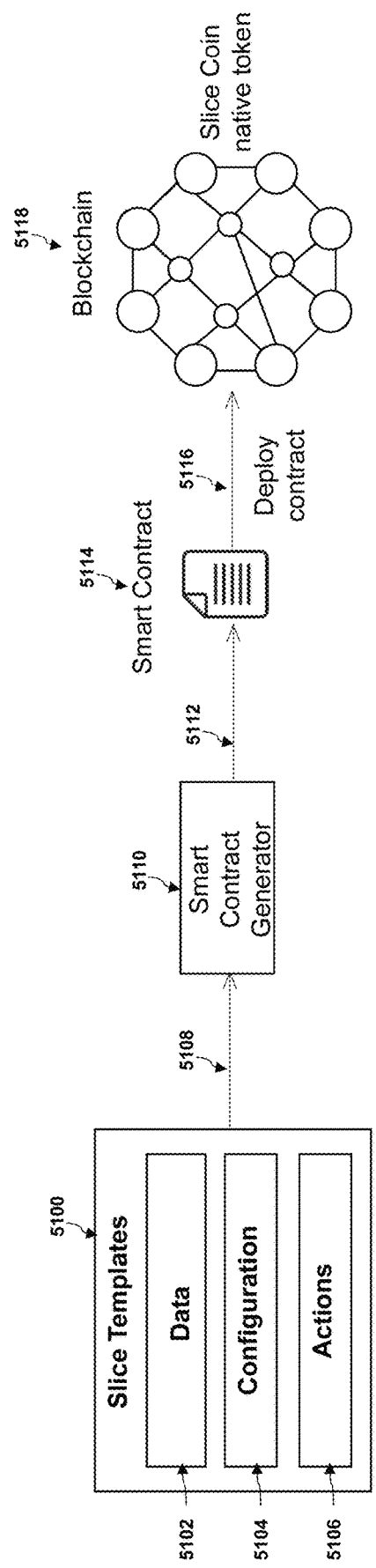
FIG. 68 is a schematic view of network slice coins according to an embodiment of the invention.

Referring now to FIG. 68 an illustration of network slice coins, according to an embodiment of the invention, is described in more detail. Network Slicing is a technology in 5G that allows creating logical networks called network slices on top of a common and shared infrastructure layer, to realize a wanted network characteristic and provide specific network capabilities to address a specific customer need.

For regulating the network slices, a new type of virtual currency named "Slicecoin" is proposed. Slices are regulated by different types of Slicecoins such as coins for resources, coins for different types of services, and coins for different type of functions—control, computing, management. These coins are allocated, consumed, created and burned in a temporal and spatial manner utilizing smart contracts that can be run on single or multiple blockchains, utilizing IDs and decentralization for management and provisions and operations and control subject to resource, quality, performance and cost and security constraints. Network Slicecoins allow non-trusting parties to co-manage the 5G network with slices.

Slice templates 5100, specification and configurations of resources, management models and system parameters are used to generate smart contracts 5114 which automate the process of resource allocation and network orchestration. Slice coin serves as the native token on the blockchain enabling customized service delivery and new charging and business models in 5G and rewarding the entities involved. Smart contract 5114 agreements between users and network operators are used to charge the users. Since charging happens automatically when conditions agreed in smart contracts are met, this brings greater transparency and minimize frauds. Blockchain 5118 allows maintaining a complete audit trail of transactions making financial reconciliations easier.

Figure 69:
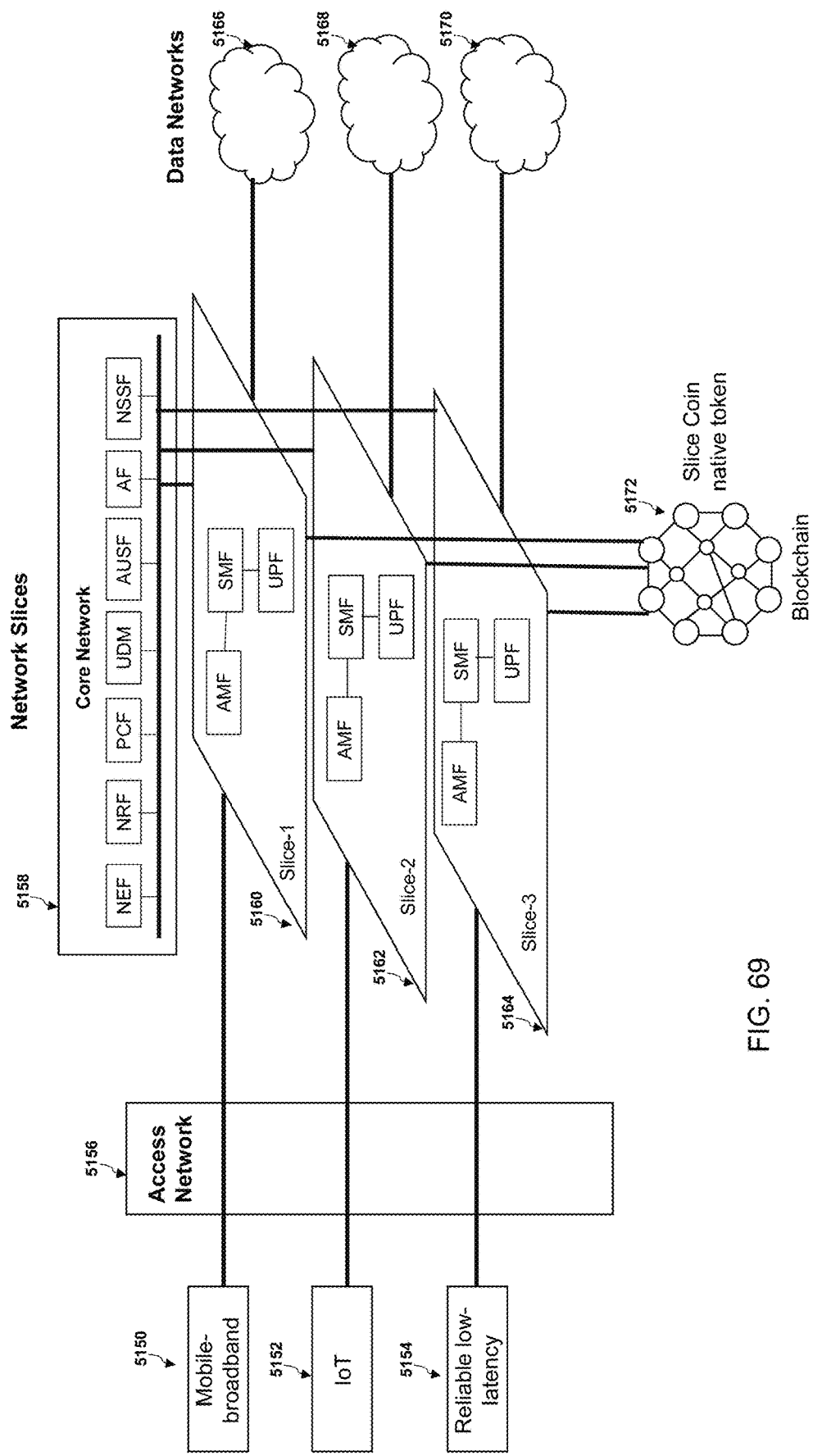
FIG. 69 is a schematic view of network slice management using a blockchain according to an embodiment of the invention.

Referring now to FIG. 69 an illustration network slice management using blockchain, according to an embodiment of the invention, is described in more detail. A Network Slice is a set of network functions, and resources to run these network functions, forming a complete instantiated logical network to meet certain performance levels required by specific types of services. Network slices can address different service requirements such as end-to-end latency, mobility, user density, priority, coverage area, traffic capacity, and degree of isolation. The physical or virtual infrastructure resources may be dedicated to one network slice or shared with other network slices. Some examples of service types and slice performance needs are described as follows:

1. High-speed broadband for fixed wireless access (high capacity and throughput) 5150.
2. Massive IoT for remote metering (low power, high-scale device connectivity) 5152.
3. Mission-critical services for factory automation (ultra-low latency and high reliability) 5154.

Each of the slices 5160, 5162, 5164 deliver a mix of performance capabilities along three core dimensions:

1. capacity and throughput
2. reliability and latency
3. scale of connectivity

Slices 5160, 5162, 5164 are regulated by different types of Slicecoins such as coins for resources, coins for different types of services, and coins for different type of functions—control, computing, management, which are deployed on a Blockchain Network 5172.

Figure 70:
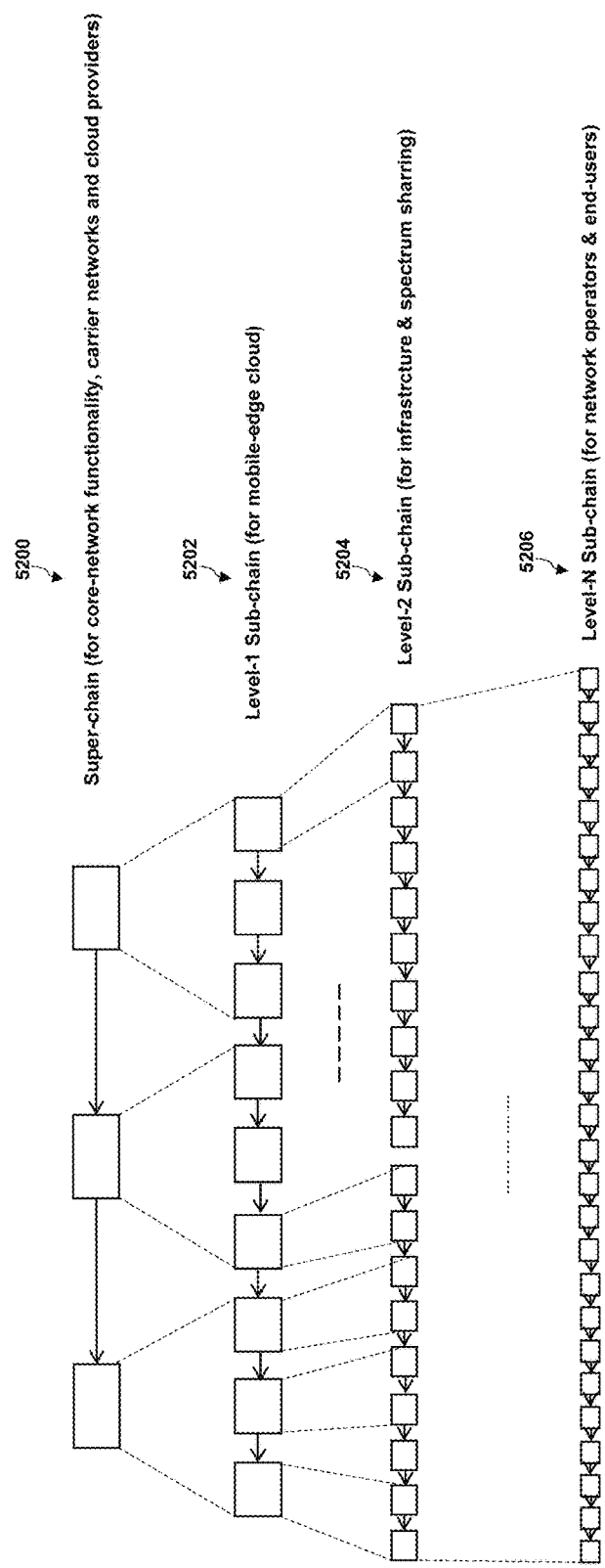
FIG. 70 is a representation of a hierarchical consensus model in 5G according to an embodiment of the invention.

Referring now to FIG. 70 an illustration of Hierarchical Consensus Models in 5G, according to an embodiment of the invention, is described in more detail. A proof of authority model is applied at higher level domains and within each domain a different consensus model may be used, for example. One consensus model can be embedded within another consensus models. At the highest level—carrier networks (5G), cloud providers, and enterprises can have one consensus models where they assign, allocate, and consume 5G and computing resources, and within their domains they may have their own consensus models. Hierarchical Consensus Models in 5G will allow efficiently managing a large number of interactions in a highly heterogeneous network, for use cases such as:

1. Securely creating an end to end slices and allocating resources based on the agreed smart contracts.
2. Handling slice requests from various industry verticals and passing them to mobile infrastructure resource orchestrator.

Figure 71:
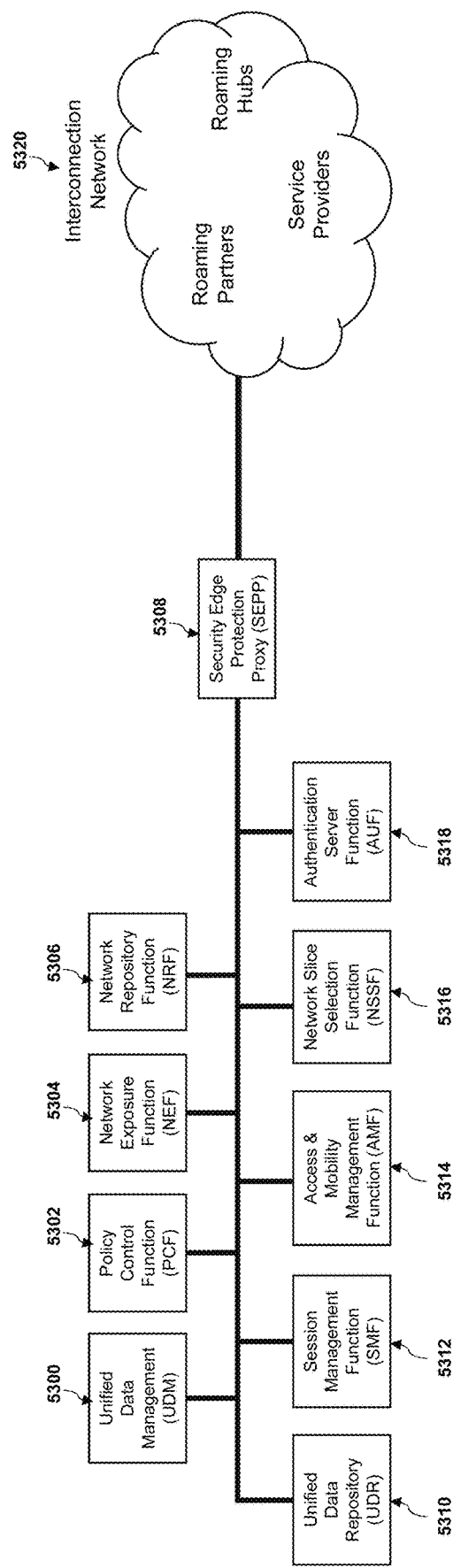
FIG. 71 is a schematic view of a Service Based Architecture in 5G according to an embodiment of the invention.

Referring now to FIG. 71 an illustration of Service Based Architecture (SBA) in 5G, according to an embodiment of the invention, is described in more detail. A major difference in 5G Core compared to previous generations of network architectures is the introduction a new architectural concept called the Service Based Architecture (SBA) that uses service-based interactions between Network Functions. The network functions used in 5G core include Unified Data Management (UDM) 5300, Policy Control Function (PCF) 5302, Network Exposure Function (NEF) 5304, Network Repository Function (NRF) 5306, Unified Data Repository (UDR) 5310, Session Management Function (SMF) 5312, Access & Mobility Management Function (AMF) 5314, Network Slice Selection Function (NSSF) 5316, Authentication Server Function (AUF) 5318, for instance. By using the Service Based Architecture, the Network Functions can be virtualized and provide their services, using the common HTTP/2 Internet protocol and REST API based Service Based Interfaces (SBI), to other network functions or external parties. The 3GPP specifications (3GPP TS 23.501, TS 29.510, and TS 33.501 Release 16 onwards are incorporated by reference). While 3GPP is incorporated by reference specifically, it is contemplated and included within the scope of the invention that any standard protocol as is known in the art may be utilized and the invention disclosed herein configured to conform to.

Figure 72:
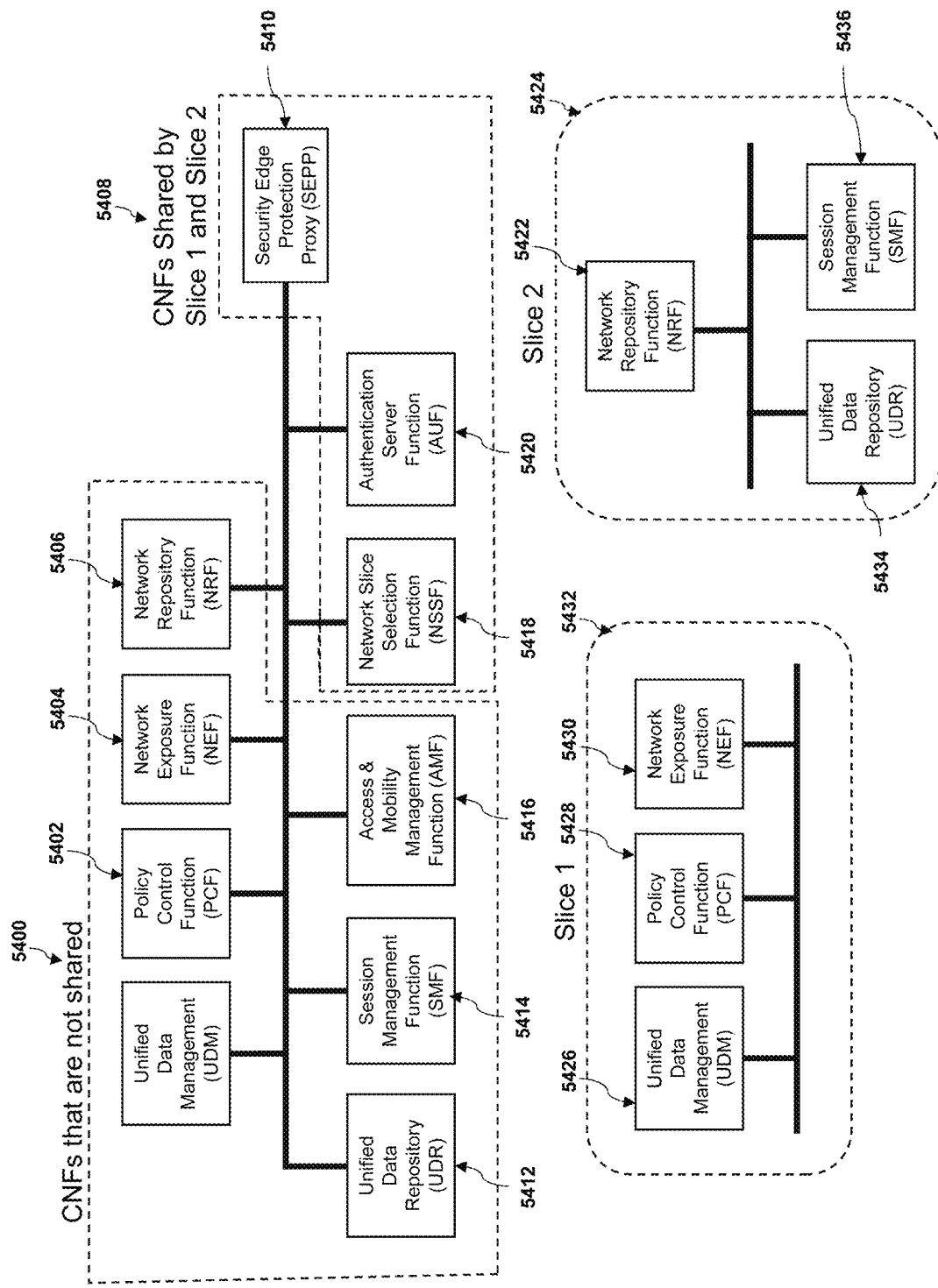
FIG. 72 is a schematic view of an implementation of shared, slice-specific, and unshared network functions for slices according to an embodiment of the invention.

Referring now to FIG. 72 an illustration of an exemplary approach for using Shared, Slice-Specific and Unshared network functions for Slices, according to an embodiment of the invention, is described in more detail. A slice is a logical block in the 5G core network to serve a specific purpose. The 3rd Generation Partnership Project (3GPP) currently defined in TS 23.501, which is incorporated by reference, the following four types of network slice types, based on their quality of service features:

1. massive Machine Type Communication (mMTC)
2. enhanced Mobile Broadband (eMBB)
3. Ultra-Reliable Low Latency Communications (URLLC)
4. Vehicle to X (V2X)

A slice in the core network may consist of a group of Network Functions (NFs) that support that slice. Those network functions can be exclusively assigned to that slice or be shared among different slices. A shared network function can provide services to several slices. Exemplary Slices (Slice-1 5432 and Slice-2 5424) with Shared, Slice-Specific and Unshared CNFs are shown.

Figure 73:
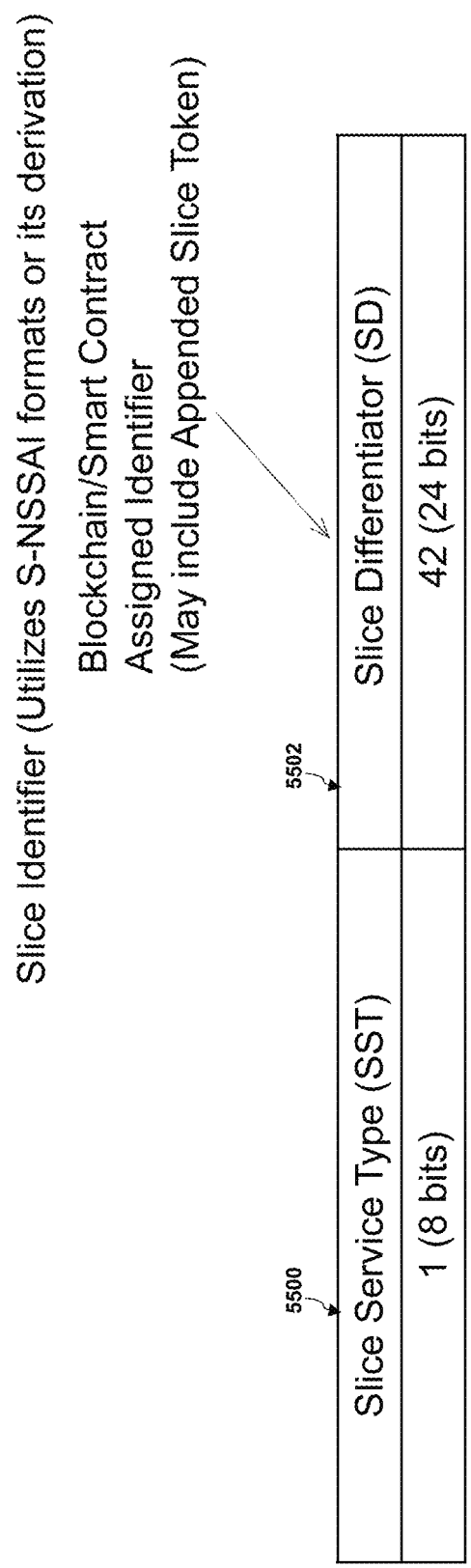
FIG. 73 is an illustration of an exemplary S-NSSAI (Single Network Slice Selection Assistance Information) that uses blockchain-based slice identifiers according to an embodiment of the invention.

Referring now to FIG. 73 an illustration of an exemplary S-NSSAI (Single Network Slice Selection Assistance Information) that uses blockchain-based slice identifiers, according to an embodiment of the invention, is described in more detail. Blockchain and Smart Contracts will assign identity to slices. Each slice instance is identified across the 5G core, the 5G RAN and in the User Equipment (UE) by a slice identity which is called the Single-Network Slice Selection Assistance Information (S-NSSAI) in TS 23.501. This identifier has two parts:
 1. Slice Service Type (SST) 5500 is a predefined value for eMBB or mMTC, etc.
 2. Slice Differentiator (SD) 5502 is an optional MNO specific value for differentiating between slices of the same type.

The Blockchain network within BENASMI stores identities to slices. Slices may be tracked and monitored and configured/control/reconfigured through these identities using smart contracts. Access to resources, such as network, computing, storage and radio (RAN slicing at the MAC level, for instance) resources are regulated by smart contracts utilizing smart tokens that may be issued at many different levels of granularity—from access to a service itself, or to particular information elements within the service, ensuring fine-grained control and security provisions. Blockchain-stored and smart contract-based slice identities, including differentiators, are used to prevent malicious slices from utilizing services and/or resources reserved for the assigned slice.

Figure 74:
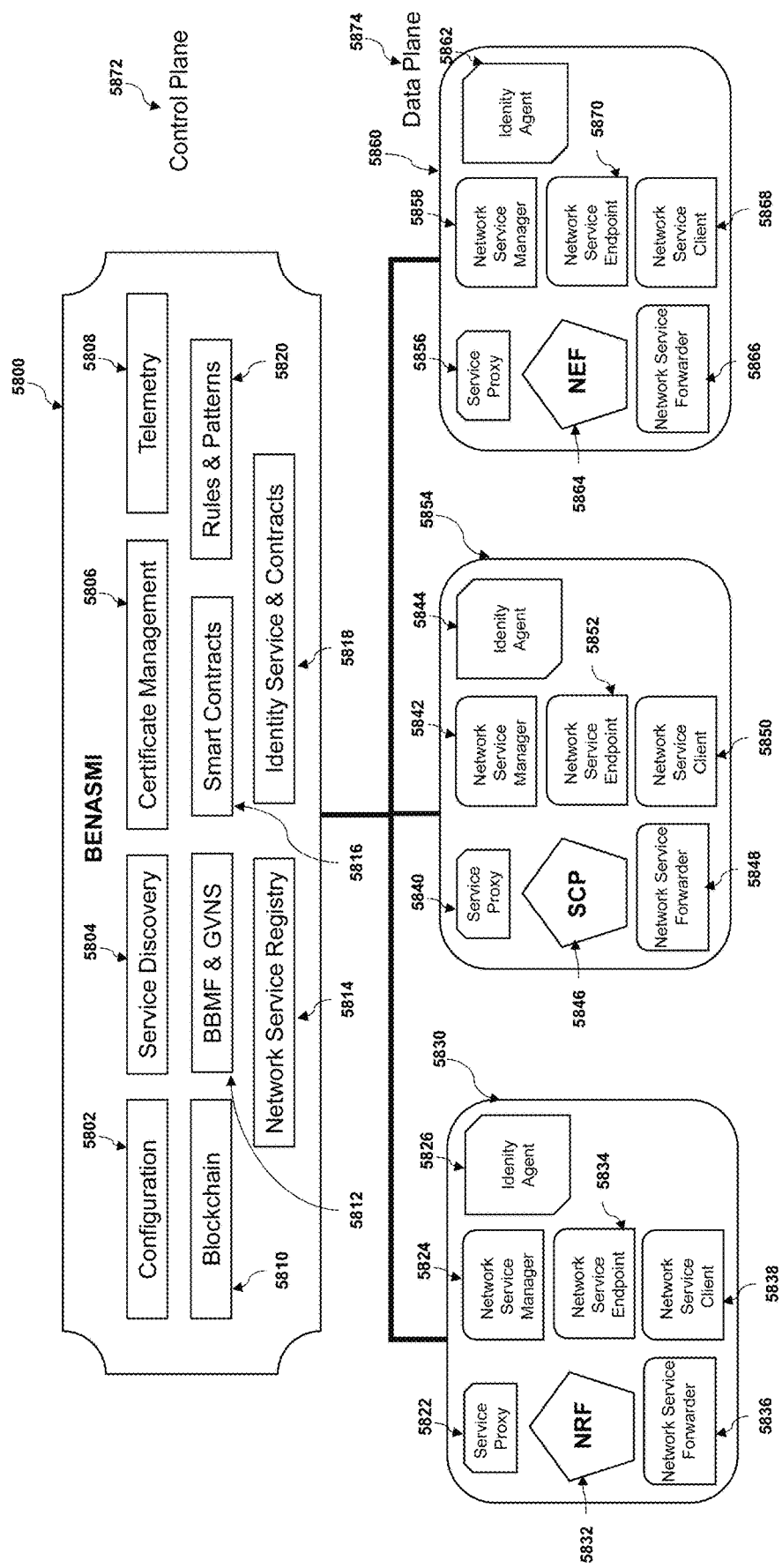
FIG. 74 is a schematic view of an augmented NRF, SCP and NEF network functions with the inventive approach BENASMI according to an embodiment of the invention.

Referring now to FIG. 74 an illustration of an augmented NRF, SCP and NEF network functions with the inventive approach BENASMI, according to an embodiment of the invention, is described in more detail. NRF 5832 (as per 3GPP TS 29.510) supports Network Function Management, Network Function Discovery and Authorization Service. Blockchain-based Smart Contracts implement and/or support these three functions. Blockchain-based Smart Contracts provide additional support to regulate access to individual Information Elements selectively, even if high-level access to the entire service is allowed by the NRF Authorization Service of the NRF, thus allowed fine-grained control of control plane and management plane information. The SCP 5846 supports (as per 3GPP TS 23.501 and TS 33.501, which are incorporated by reference) communications (typically, but not limited to, API REST/HTTP calls) between different network functions, message forwarding and routing communication security network reliability (monitoring, overload control, and load balancing, for example), and also discovery on behalf of CNFs. All transactions and messages processed by the NEF 5864 are stored and audited by smart contracts associated with the blockchain network. Smart contracts monitor slice activity for malicious events through monitoring of the NEF in BENASMI. The same techniques may also be applied to proprietary and vendor-specific control-plane and management-plane CNFs supporting the service-based architecture, without restriction, to enhance security and performance through use of smart contracts and/or a blockchain.

Figure 75:
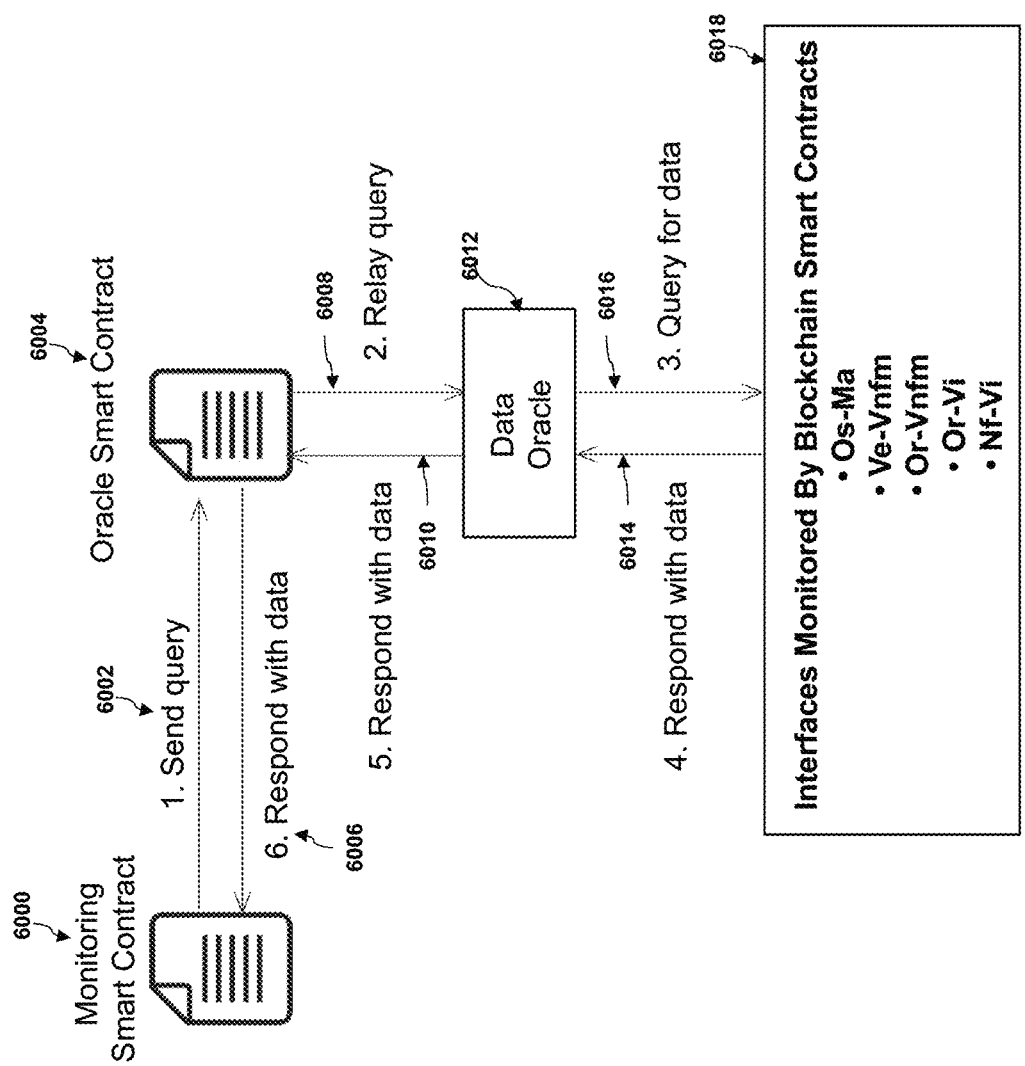
FIG. 75 is an illustration of process for collecting data from NFV MANO interfaces using Oracles with BENASMI/BECNX environments, according to an embodiment of the invention.

Referring now to FIG. 75, an illustration of process for collecting data from NFV MANO interfaces using Oracles with BENASMI/BECNX environments, according to an embodiment of the invention, is described in more detail. Oracles are used to get data from an outside source onto the blockchain. Oracles are a way of verifying and communicating real-world data to blockchains. Oracles provide off-chain data for both blockchain and enterprise use, and can often be referred to as a bridge between the outside world and blockchains. Oracles can be categorized into:
 1. Data carrier oracles that relay query results from a trusted data source to a smart contract.
 2. Computation oracles that not only relay query results, but also perform the relevant computation themselves. Computation oracles can be used as building blocks to construct off-chain computation markets.

The Smart Contracts Orchestrator monitors the following interfaces in the CNF/NFV MANO architecture: Os-Ma, Ve-Vnfm, Or-Vnfm, Or-Vi, Nf-Vi.
Steps involves are as follows:
 1. Monitoring Smart Contract 6000 sends a query to the Oracle Smart Contract 6004.
 2. Oracle Smart Contract 6004 relays the query to the Data Oracle 6012.
 3. The Data Oracle 6012 gets data from the NFV MANO interfaces 6018.
 4. Response is sent back to the Oracle Smart Contract 6004.
 5. Once the Oracle Smart Contract 6004 gets a result from the monitored interface, it calls a function named _callback in the monitoring Smart Contract and passes it the result as an input.

Figure 76:
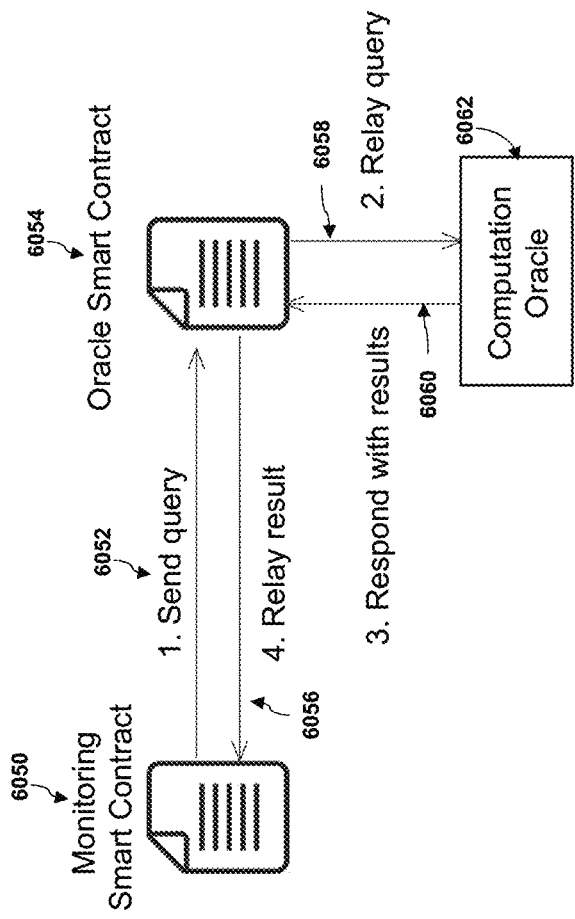
FIG. 76 is an illustration of process for Offloading Computations to Oracles, according to an embodiment of the invention.

Referring now to FIG. 76, an illustration of process for Offloading Computations to Oracles, according to an embodiment of the invention, is described in more detail. While Blockchain Networks enable arbitrary computations to be run in a decentralized and trust minimized manner, but in reality developers are much more limited in the types of computation they can include in their smart contracts. Computationally heavy tasks quickly become prohibitively expensive to run on-chain due to gas costs. Their execution time is also bounded by the time it takes for the network to achieve consensus.

As a result, on-chain execution of computationally heavy tasks such (such as network traffic analysis, deep packet inspection, etc) are infeasible. Such complex computations can be offloaded to Computation Oracles. A number of models for computation oracles have been proposed:
 1. SchellingCoin protocol: The SchellingCoin protocol incentivizes a decentralized network of oracles to perform computation by rewarding participants who submit results that are closest to the median of all submitted results in a commit-reveal process.
 2. M-of-N Oracles: A model for verifiable computation oracles involves m-of-n oracles performing computation and voting on the correct result with the ability to challenge results by submitting a security deposit—in the scenario of a challenge, the computation is performed on-chain to decide whether to penalize the challenger or a misbehaving oracle.

Steps involves are as follows:
 1. Monitoring Smart Contract 6050 sends a query to the Oracle Smart Contract 6054.
 2. Oracle Smart Contract 6054 relays the query to the Computation Oracle 6062.
 3. The Computation Oracle 6062 responds with the results. Response is sent back to the Oracle Smart Contract 6054.
 4. Once the Oracle Smart Contract 6054 gets a result from the monitored interface, it calls a function named _callback in the monitoring Smart Contract and passes it the result as an input.

Referring now to FIG. 77, an illustration of exemplary reference smart contract that uses a data oracle to update OAuth token within the smart contract, according to an embodiment of the invention, is described in more detail. The interaction between Monitoring Smart Contract and Oracle is asynchronous. Any request for data is composed of two steps. Firstly, a transaction executing a function of a smart contract is broadcasted by a client/user. The function contains a special instruction which manifest to the Oracle Service, which is constantly monitoring the Blockchain for such instruction, a request for data. Secondly, according to the parameters of such request, the Oracle Service will fetch or compute a result, build, sign and broadcast the transaction carrying the result. In the default configuration, such transaction will execute the _callback function which is placed in the monitoring smart contract. The Oracle Service has the capability of returning data to a smart contract together with one or more proofs of authenticity of the data (such as TLSNotary Proof or Ledger Proof).

Figure 78:
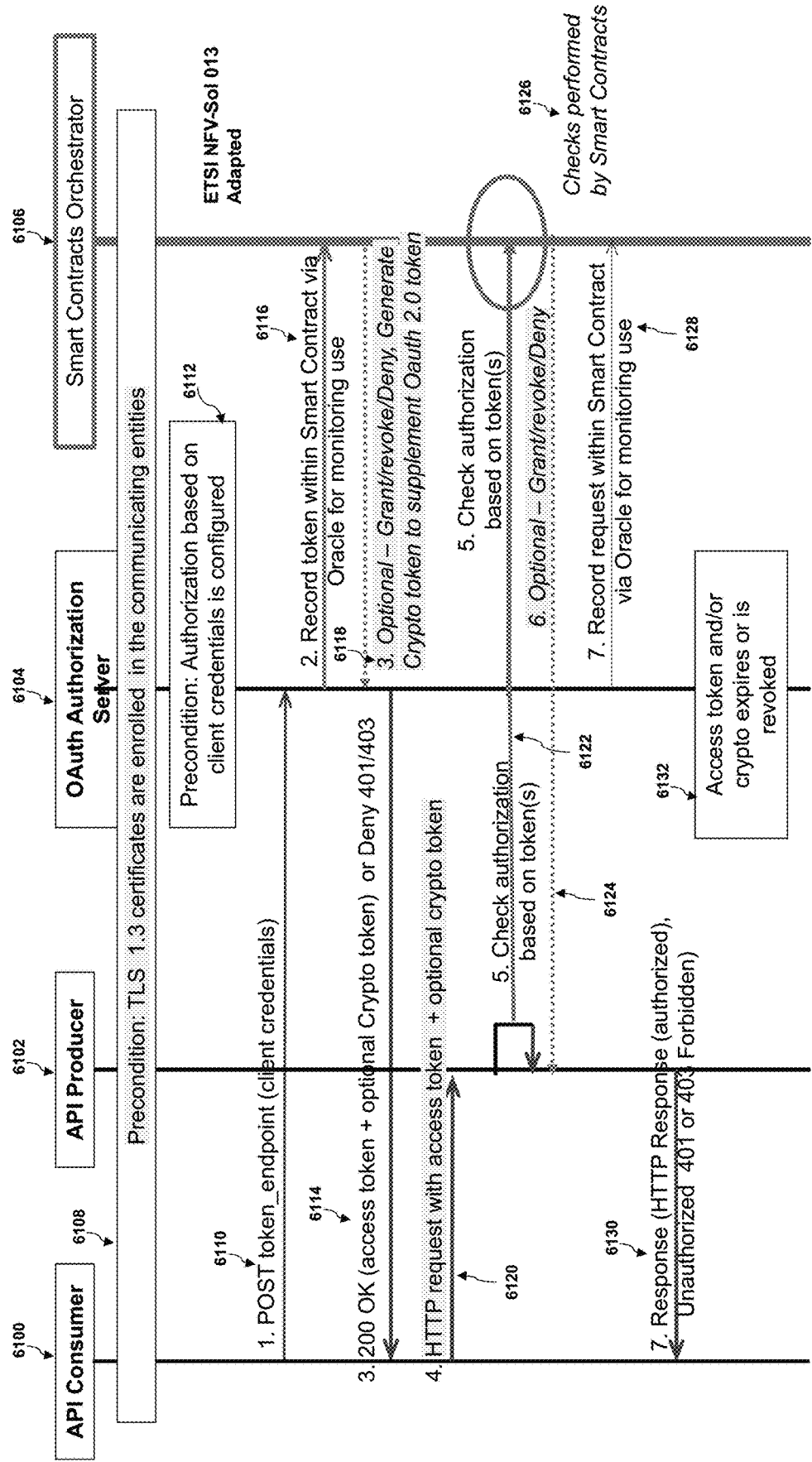
FIG. 78 is an illustration of exemplary flow for authorization of service mesh CNF API requests using OAuth 2.0 access tokens, according to an embodiment of the invention.

Referring now to FIG. 78, an illustration of exemplary flow for authorization of service mesh CNF API requests using OAuth 2.0 access tokens, according to an embodiment of the invention, is described in more detail. Smart Contracts Orchestrator 6106 is part of an extended authorization server 6104, where the OAuth server does an additional step of communicating with Smart Contract Orchestrator 6106. Uses of OAuth token are also monitored by the smart contracts. API requests are also sent to the smart contracts. The smart contract can revoke access token. It can regulate use of token further in a fine-grained manner and add additional issued tokens. A gatekeeper pattern of a new kind is proposed based on smart contracts. The gatekeeper is an additional layer and in some cases supplements Oauth2 for Zero Trust. Currently if we authorize with Oauth2 the requester has unrestricted use of the resource through use of the granted token. We regulate and monitor each use of the token as a basic matter. We can also create different types of tokens with different levels of authorization. The tokens are added or concatenated to OAuth tokens to provide fine grained access to selected information elements for selected time periods unlike OAuth as lone. Current art is OAuth 2.0. We make it better with (1) monitoring use of OAuth 2.0 tokens and as a layer of additional protection (2) a as augmented (with a slice or crypto token) token that is a security chaperone for the microservices CNF/slice function APIs. Additional optimizations are disclosed that ensure that expiring authorization tokens may be refreshed as needed through use of suitable procedures and policies.

Figure 79:
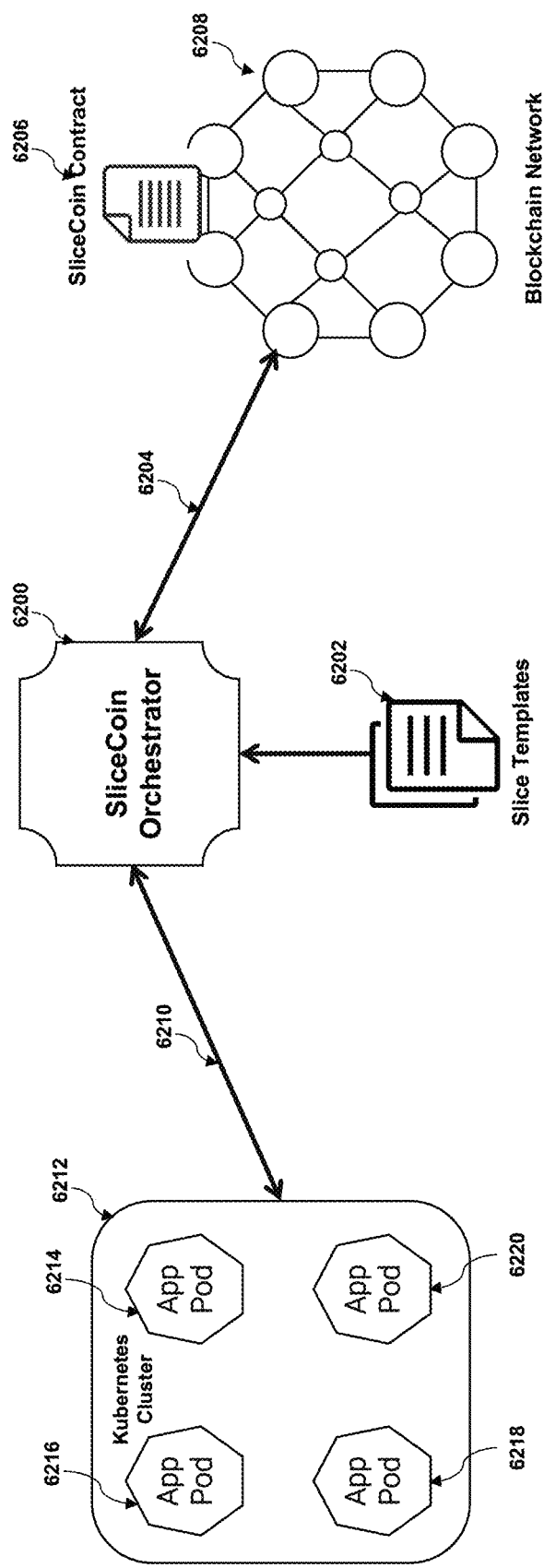
FIG. 79 is an illustration of a reference implementation of SliceCoin Orchestrator, according to an embodiment of the invention.

Referring now to FIG. 79, an illustration of a reference implementation of SliceCoin Orchestrator, according to an embodiment of the invention, is described in more detail. The SliceCoin Orchestrator 6200 interacts with the SliceCoin smart contract 6206 deployed on the blockchain network 6208. Users can purchase SliceCoins from the SliceCoin Orchestrator 6200 by sending a transaction to the SliceCoin smart contract 6206 and paying in the native cryptocurrency associated with the blockchain network 6208. Users can create slices from slice templates 6202 on the Kubernetes Cluster 6212 from the SliceCoin Orchestrator 6200. A slice is collection of resources provisioned on the Kubernetes Cluster 6212 such as pods, services and deployments.

Figure 80:
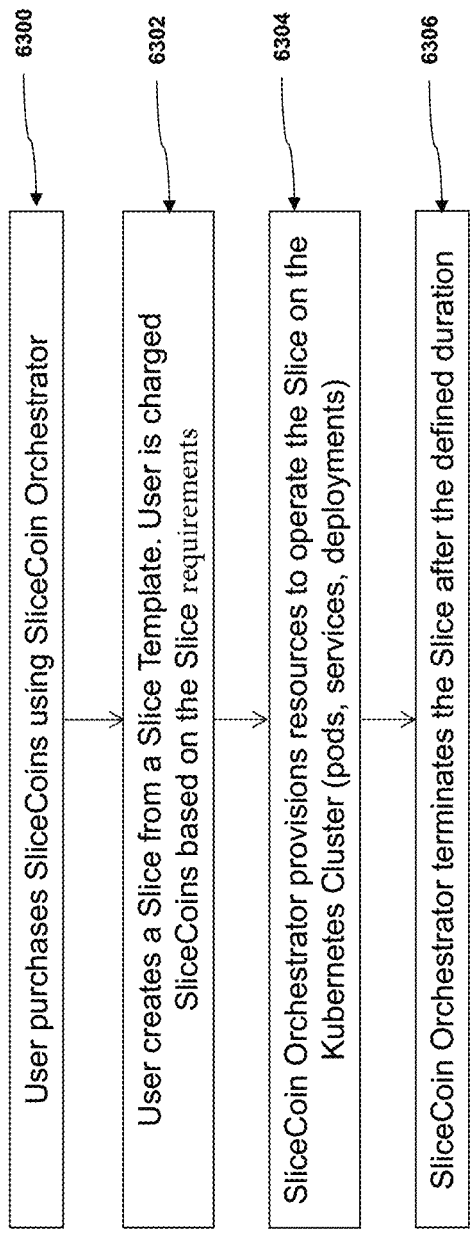
FIG. 80 is an illustration of the steps involved in creating a slice using SliceCoin Orchestrator, according to an embodiment of the invention.

Referring now to FIG. 80, an illustration of the steps involved in creating a slice using SliceCoin Orchestrator, according to an embodiment of the invention, is described in more detail. At step-1 6300, user purchases SliceCoins using SliceCoin Orchestrator. At step-2 6302, user creates a Slice from a Slice Template. User is charged SliceCoins based on the Slice priority and duration. At step-3 6304, SliceCoin Orchestrator provisions resources to operate the Slice on the Kubernetes Cluster (pods, services, deployments). At step-4 6306, SliceCoin Orchestrator terminates the Slice after the defined duration.

Referring now to FIG. 81, an illustration of a reference implementation of resource quotas used by SliceCoin Orchestrator, according to an embodiment of the invention, is described in more detail. Three resource quotas for high priority 6350, medium priority 6352 and low priority 6354 resources are defined.

Referring now to FIG. 82, an illustration of a reference implementation of priority classes used by SliceCoin Orchestrator, according to an embodiment of the invention, is described in more detail. Three classes for high priority, medium priority and low priority pods are defined, for example, in a non-limiting manner. Other examples of priorities could be Quality of Service (QoS) indicators applied to voice, video, or background data traffic packets as commonly used, but not limited to, in DiffServ and IntServ protocols.

Referring now to FIG. 83, an illustration a reference implementation of a slice template used by SliceCoin Orchestrator, according to an embodiment of the invention, is described in more detail. The slice template shown is a collection of a Kubernetes service 6380 and a Kubernetes deployment 6382.

Figure 84:
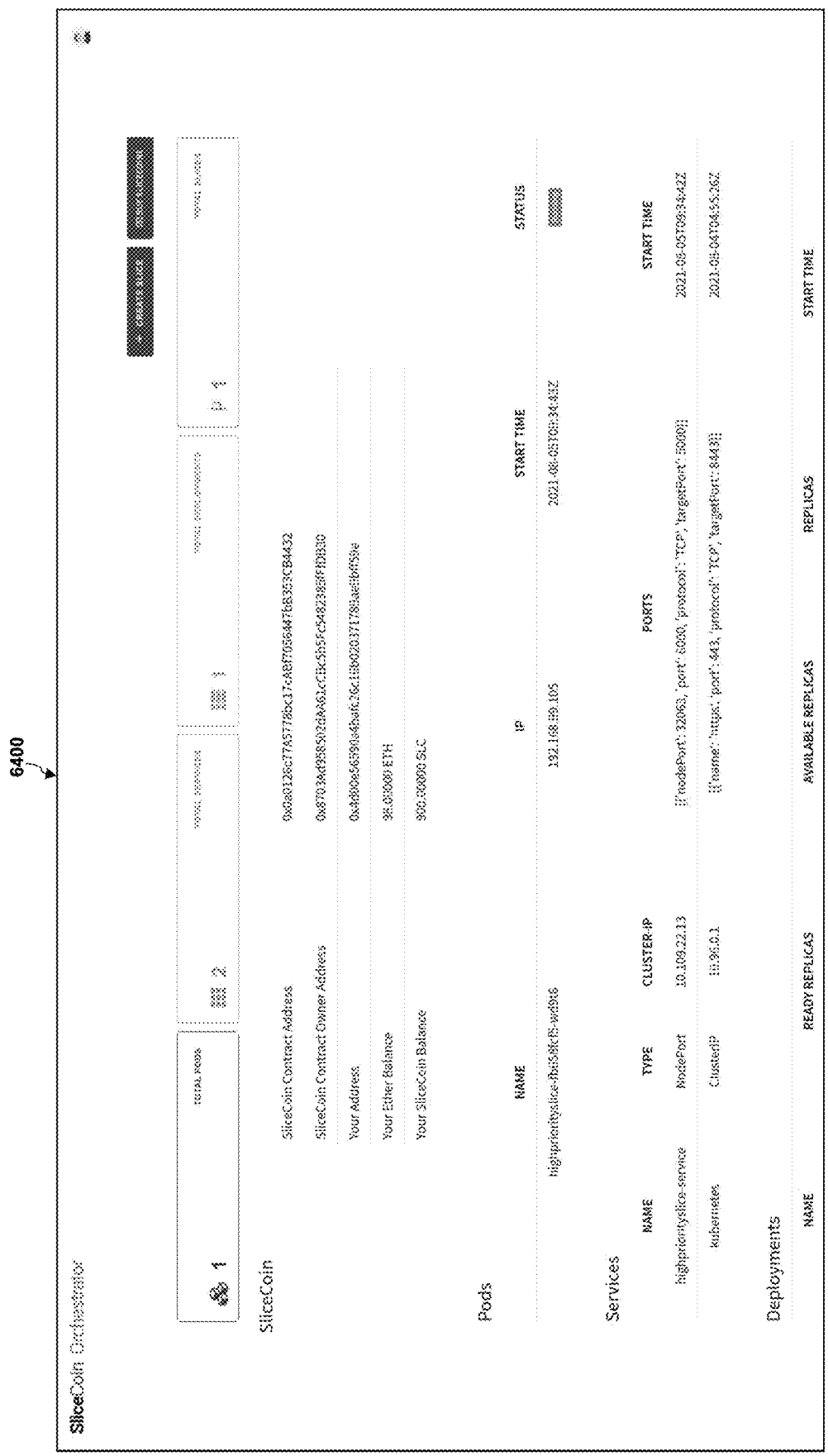
FIG. 84 is an illustration of an exemplary interface of SliceCoin Orchestrator, according to an embodiment of the invention.

Referring now to FIG. 84 and FIG. 85, an exemplary interface of SliceCoin Orchestrator, according to an embodiment of the invention, is described in more detail. The SliceCoin Orchestrator dashboard allows users to view the details of the SliceCoin smart contract and purchase SliceCoins. Users can connect their blockchain wallets to the SliceCoin Orchestrator using the Metamask browser extension. The SliceCoin Orchestrator dashboard allows users to create slices from slice templates. When a slice is created, the user is charged SliceCoins depending on at least one of the priority of the network slice, a security level of the slice, a security indication of the network slice, and the duration of the slice. The SliceCoin Orchestrator dashboard shows the status of pods, services, deployments, slices and resource quotas of the Kubernetes cluster.

Figure 86:
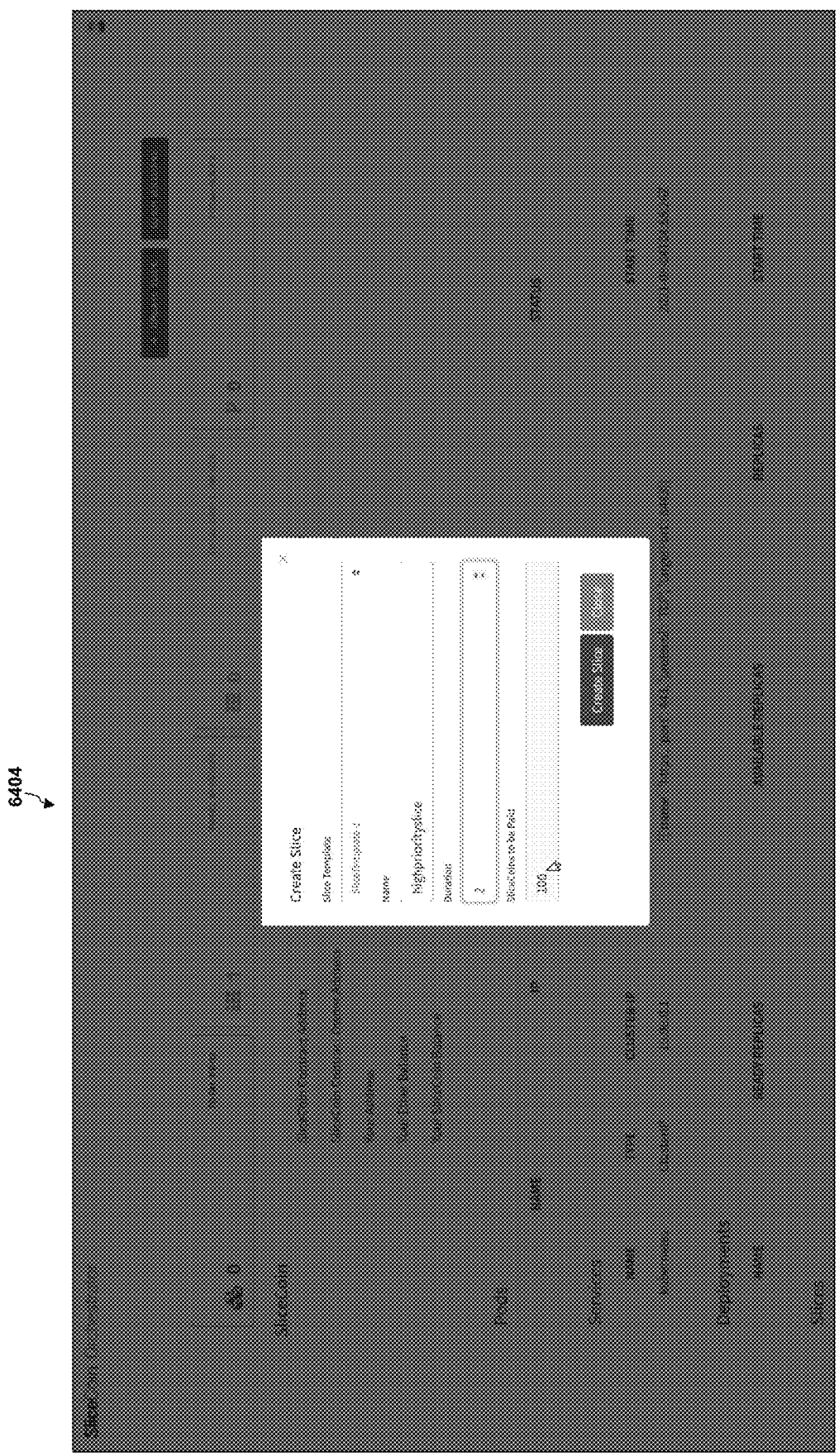
FIG. 86 is an illustration of the process of creating a new network slice, or a microservices-based application from the SliceCoin Orchestrator, according to an embodiment of the invention.
Figure 87:
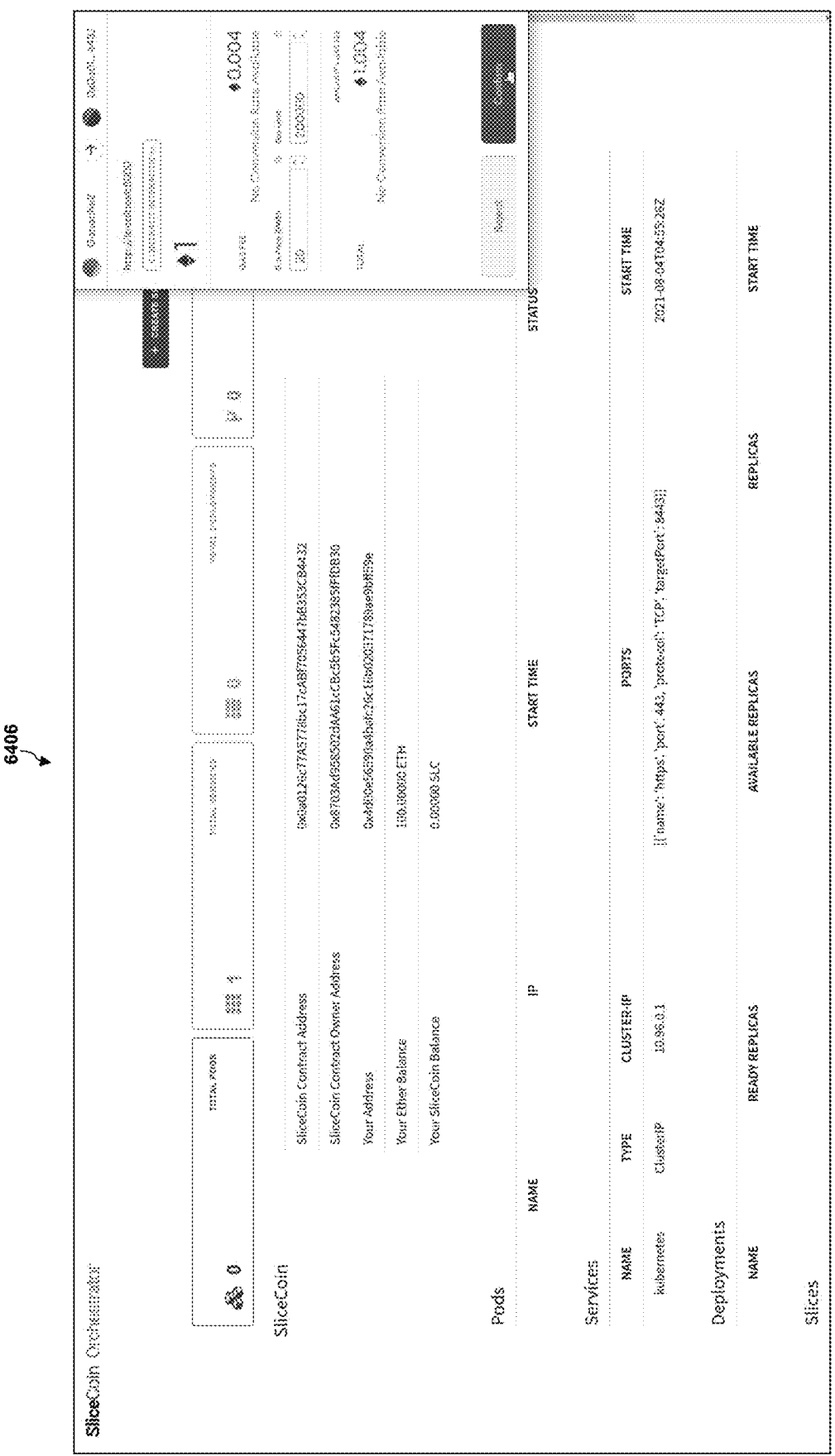
FIG. 87 is an illustration of the process of creating a new network slice, or a microservices-based application from the SliceCoin Orchestrator, according to an embodiment of the invention.
Figure 88:
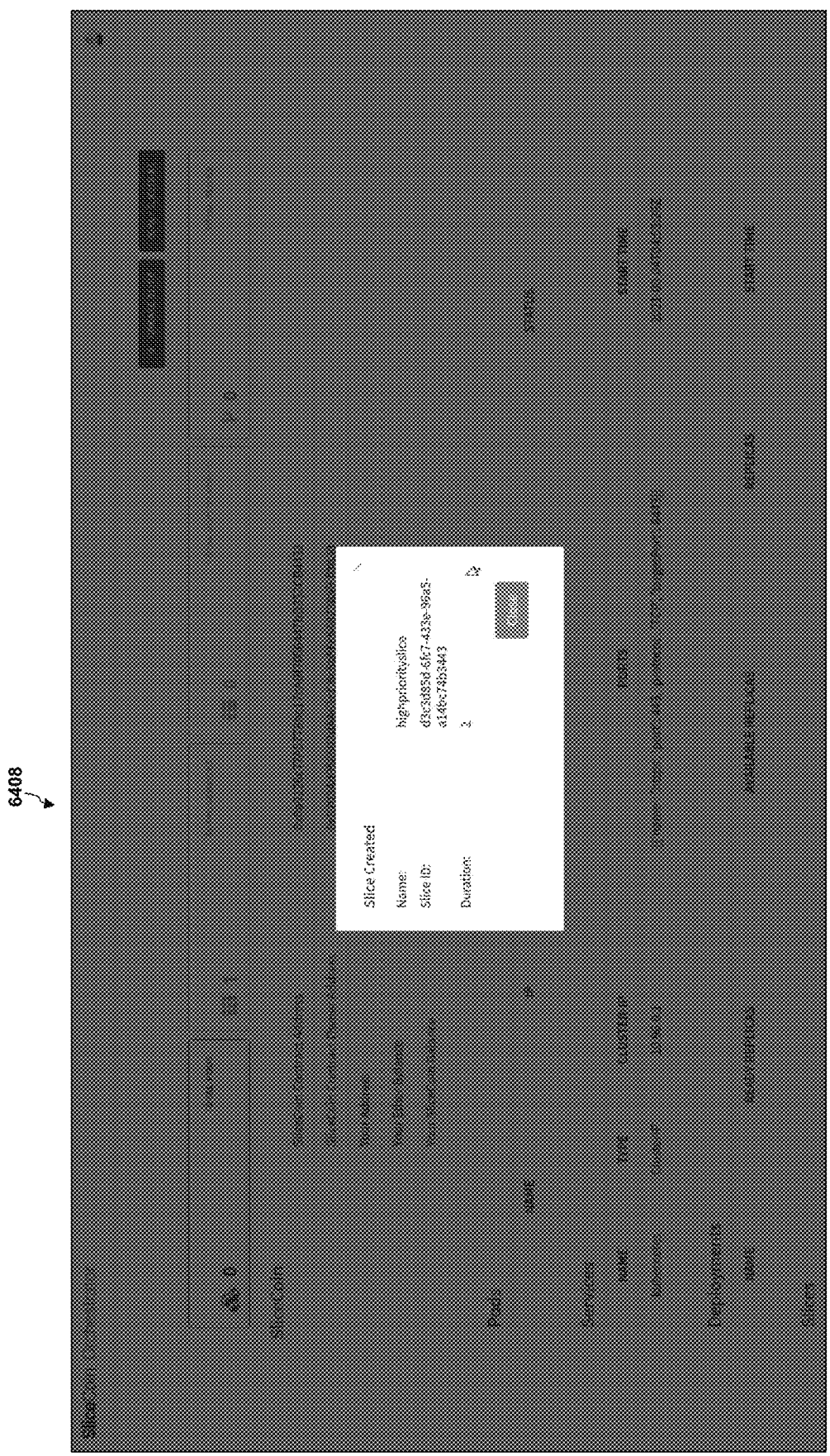
FIG. 88 is an illustration of the process of creating a new network slice, or a microservices-based application from the SliceCoin Orchestrator, according to an embodiment of the invention.

Referring now to FIG. 86, FIG. 87 and FIG. 88, the process of creating a new network slice, or a microservices-based application from the SliceCoin Orchestrator, according to an embodiment of the invention, is described in more detail. To create a network slice, the user selects a network slice template and provides a name for the network slice. The user may further provide at least one of a priority for the network slice, a security level for the slice, a security indication for the slice (the security indication can, without limitation, refer to specific Service Level Agreement (SLA) conditions related to security between the operator and the customer, for example, as related to firewalls, SCTP/TCP/UDP/IP/TLS layer-level and cross-layer traffic inspection requirements, denial of service protections, and other such considerations, including traffic/packet log filtering and inspection based alarms), and a duration for the network slice, including those defined as network slice requirements. The SliceCoins to be paid are estimated based on at least one of the template and the network slice requirements. At the next step, the user confirms the transaction. The details of the created network slice can be seen in the SliceCoin Orchestrator dashboard.

Figure 89:
FIG. 89 shows the process of development of a SliceCoin smart contract used by the Slicecoin Orchestrator, according to an embodiment of the invention.

FIG. 89 shows the process of development of a SliceCoin smart contract used by the Slicecoin Orchestrator, according to an embodiment of the invention, is described in more detail.

Figure 90:
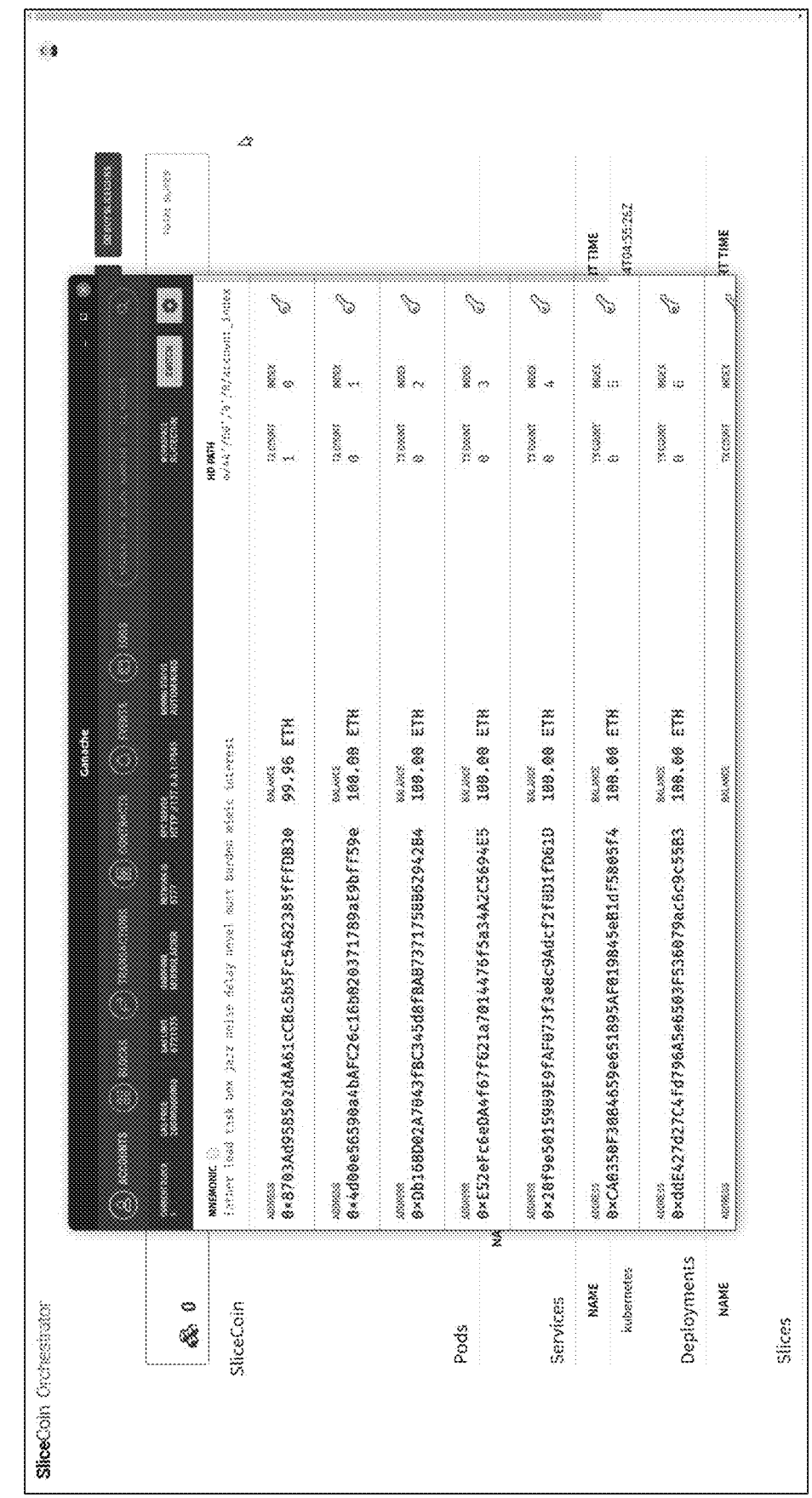
FIG. 90 shows the private blockchain network setup using the Ganache tool which is used by the SliceCoin Orchestrator.

FIG. 90 shows the private blockchain network setup using the Ganache tool which is used by the SliceCoin Orchestrator.

Figure 91:
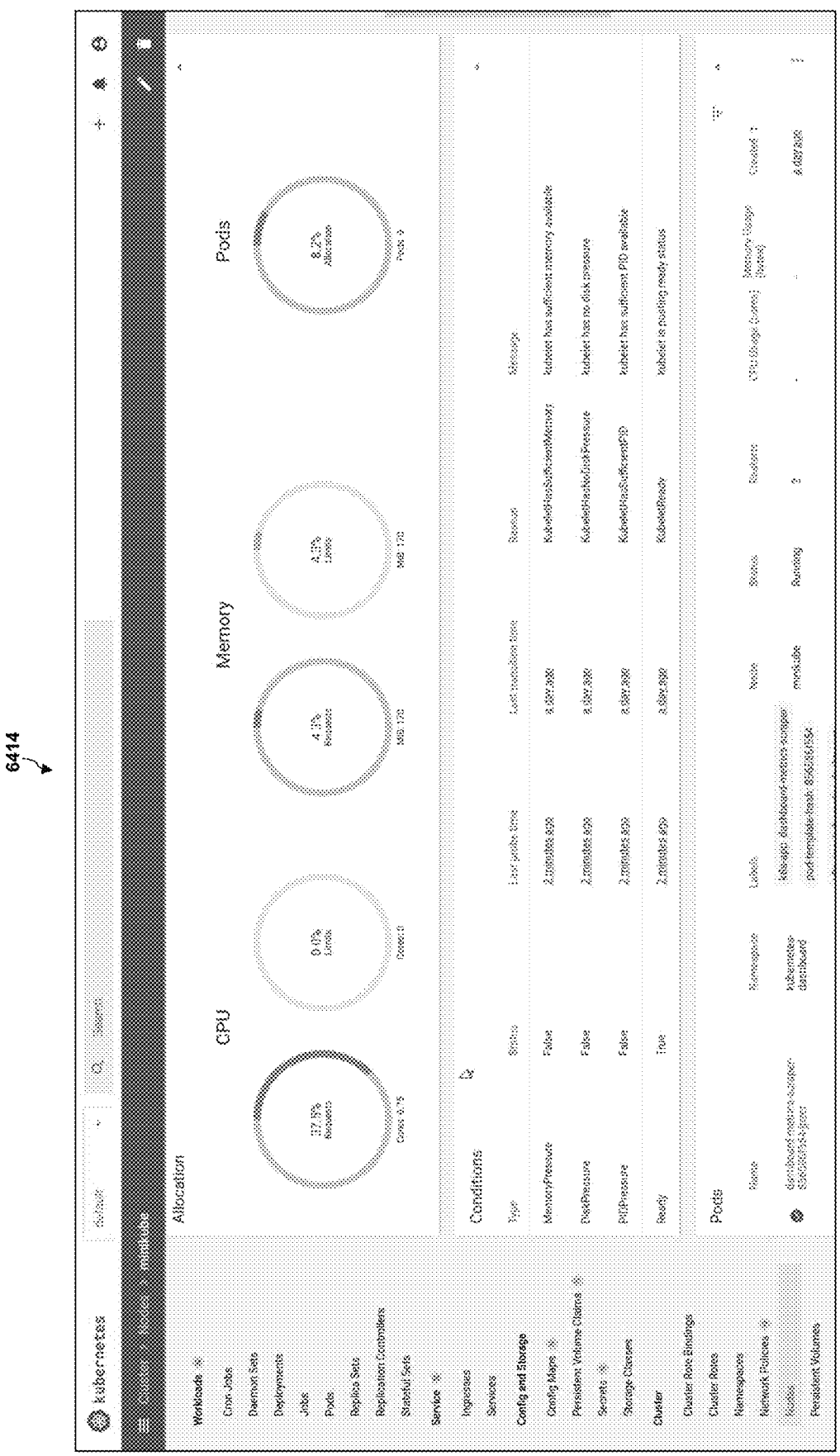
FIG. 91 shows the Kubernetes dashboard for the Kubernetes cluster on which the slices are deployed from the SliceCoin Orchestrator.

FIG. 91 shows the Kubernetes dashboard for the Kubernetes cluster on which the slices are deployed from the SliceCoin Orchestrator.

Figure 92:
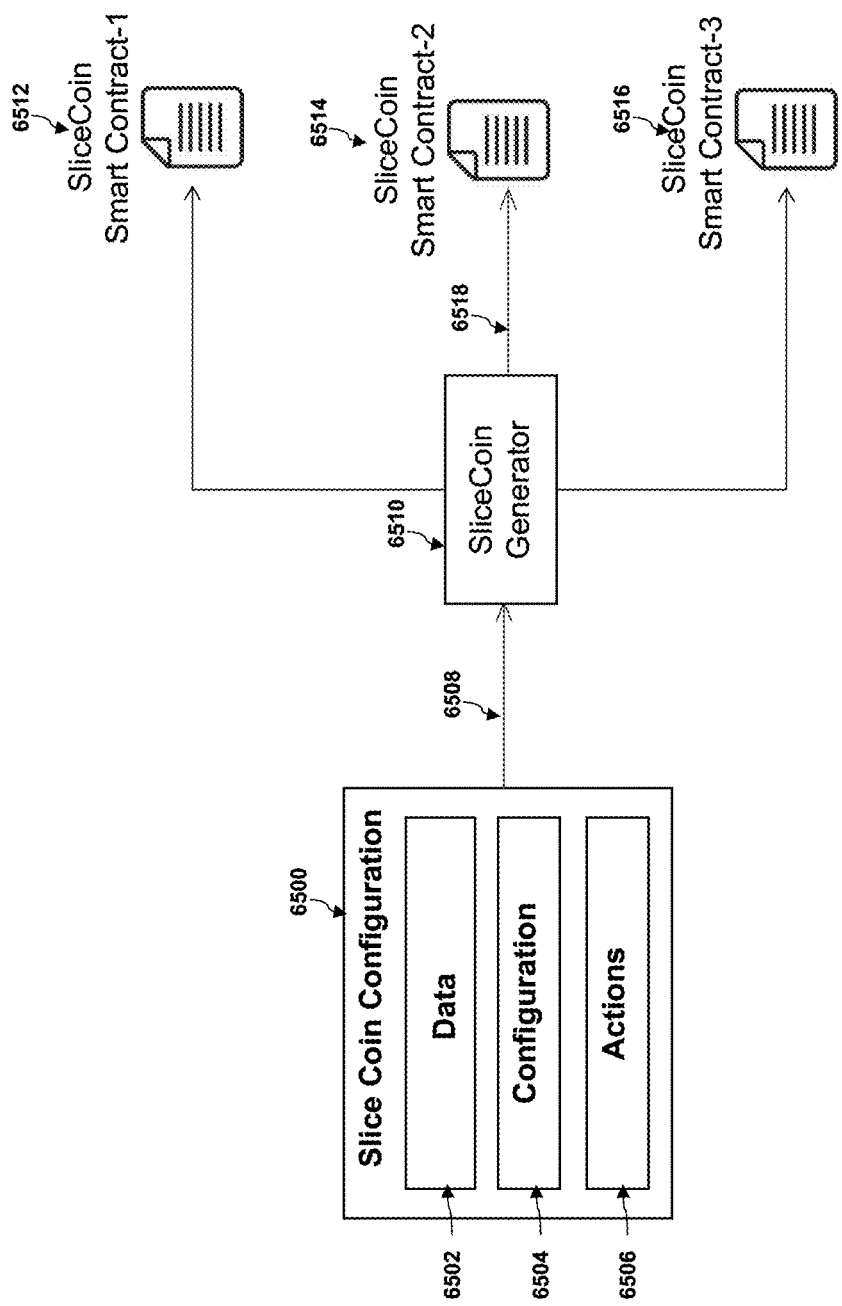
FIG. 92 is an illustration of the process of creating different SliceCoin smart contracts using a SliceCoin Generator, according to an embodiment of the invention.

Referring now to FIG. 92, the process of creating different SliceCoin smart contracts using a SliceCoin Generator, according to an embodiment of the invention, is described in more detail. The slice coins can be programmed to generate suitable smart contracts by providing the configuration, data and actions within a Slice Coin Configuration object that is passed to the SliceCoin Generator.

Figure 93:
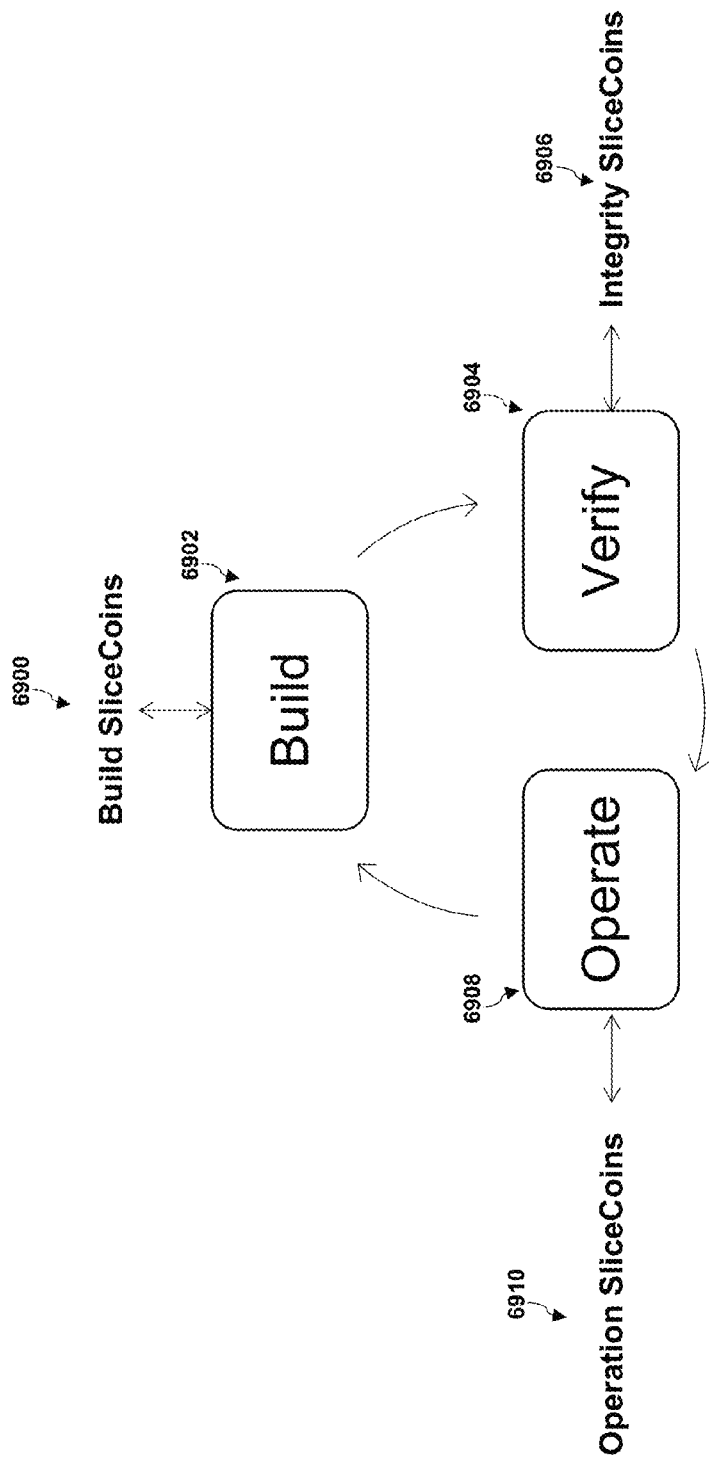
FIG. 93 is an illustration of the different types of Slice-Coins, according to an embodiment of the invention.

Referring now to FIG. 93, the different types of Slice-Coins, according to an embodiment of the invention, is described in more detail. SliceCoins can be of different types:
1. Build SliceCoins: Build SliceCoins (B-SliceCoins or build coins) 6900 are consumed during the build process 6902 for container images or APIs;
2. Integrity SliceCoins: Integrity SliceCoins (I-SliceCoins or integrity coins) 6906 are consumed during the integrity verification process 6904 while instantiating container images or verifying API calls; and
3. Operation SliceCoins: Operation SliceCoins (O-SliceCoins operation coins) 6910 are consumed during slice creation and operation 6908.

Figure 94:
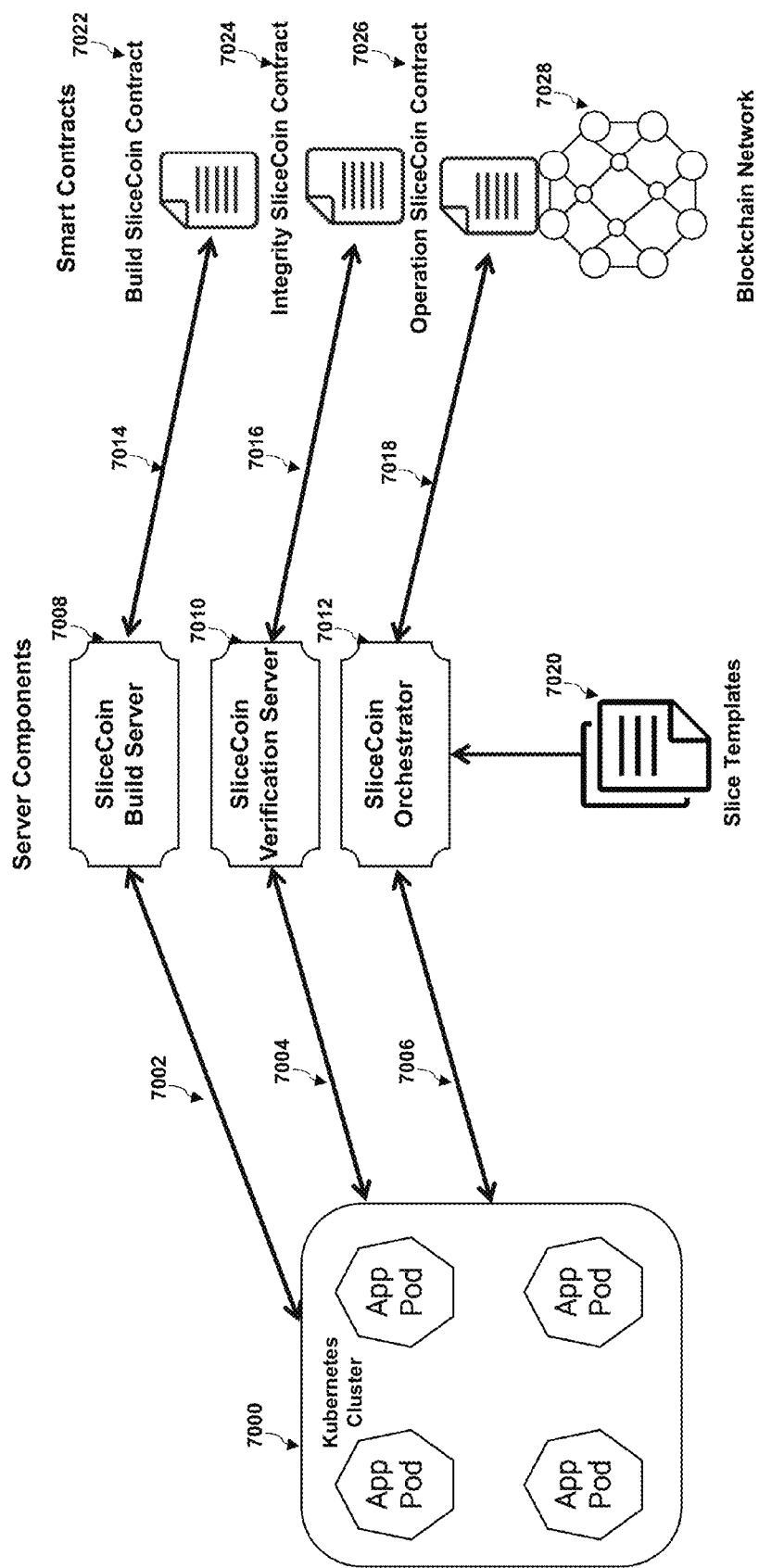
FIG. 94 is an illustration of a software bill of materials (SBOM), according to an embodiment of the invention.

Referring now to FIG. 94, a software bill of materials (SBOM), according to an embodiment of the invention, is described in more detail. Network slices are created from Containerized Network Functions (CNFs) on a Kubernetes cluster 7000. The CNFs are packaged in the form of container images (such as Docker images). Each container image may include a number of third-party software components, packages and libraries. Any security vulnerabilities in these third-party components may pose a risk to the 5G network. To address this issue, a novel blockchain token-based software bill of materials (SBOM) model is proposed. In this model, a list of all software components used in a container image that is used to instantiate a network slice is created. The software components, packages and libraries are identified with unique identifiers and the verified packages that have a known "bill of materials" are labeled. Only identified packages that are verified can then be able to execute via tokens/coins that are issued to software being executed only if they include verifiable and secure components. Each package included in bill of materials (BOM) has a unique ID and hash and when building an app build coins are consumed to verify that each identified package included is verified and used. Packages that are tampered cannot be included in builds. This regulates how open-source software is used. Checks are done on code structure and its sources. This approach is used working inside the image build process. This approach uses hashes, IDs and blockchain and coins in the build process to prevent tampering or corruption of the gold packages used in the build process. Any rebuilding requires a call to the Build agent.

The server components include a SliceCoin build server 7008, SliceCoin verification server 7010 and SliceCoin orchestrator 7012. The SliceCoin build server 7008 interacts 7014 with the Build SliceCoin Contract 7022. The SliceCoin verification server 7010 interacts 7016 with the Integrity SliceCoin Contract 7024. The SliceCoin orchestrator 7012 interacts 7018 with the Operation SliceCoin Contract 7026. Each of the above three contracts are deployed on a blockchain network 7028. The SliceCoin orchestrator 7012 uses slice templates 7020 as input to create network slices. The Kubernetes cluster 7000 may be interacted with 7002, 7004, 7006 by one or more of the SliceCoin Build Server 7008, the SliceCoin Verification Server 7010, and the SliceCoin Orchestrator 7012 in the deployment of network slices thereon. Each of the SliceCoin Build Server 7008, SliceCoin Verification Server 7010, and SliceCoin Orchestrator 7012 may be run on separate servers, either virtual or physical, or may be run on the same server in any combination.

Figure 95:
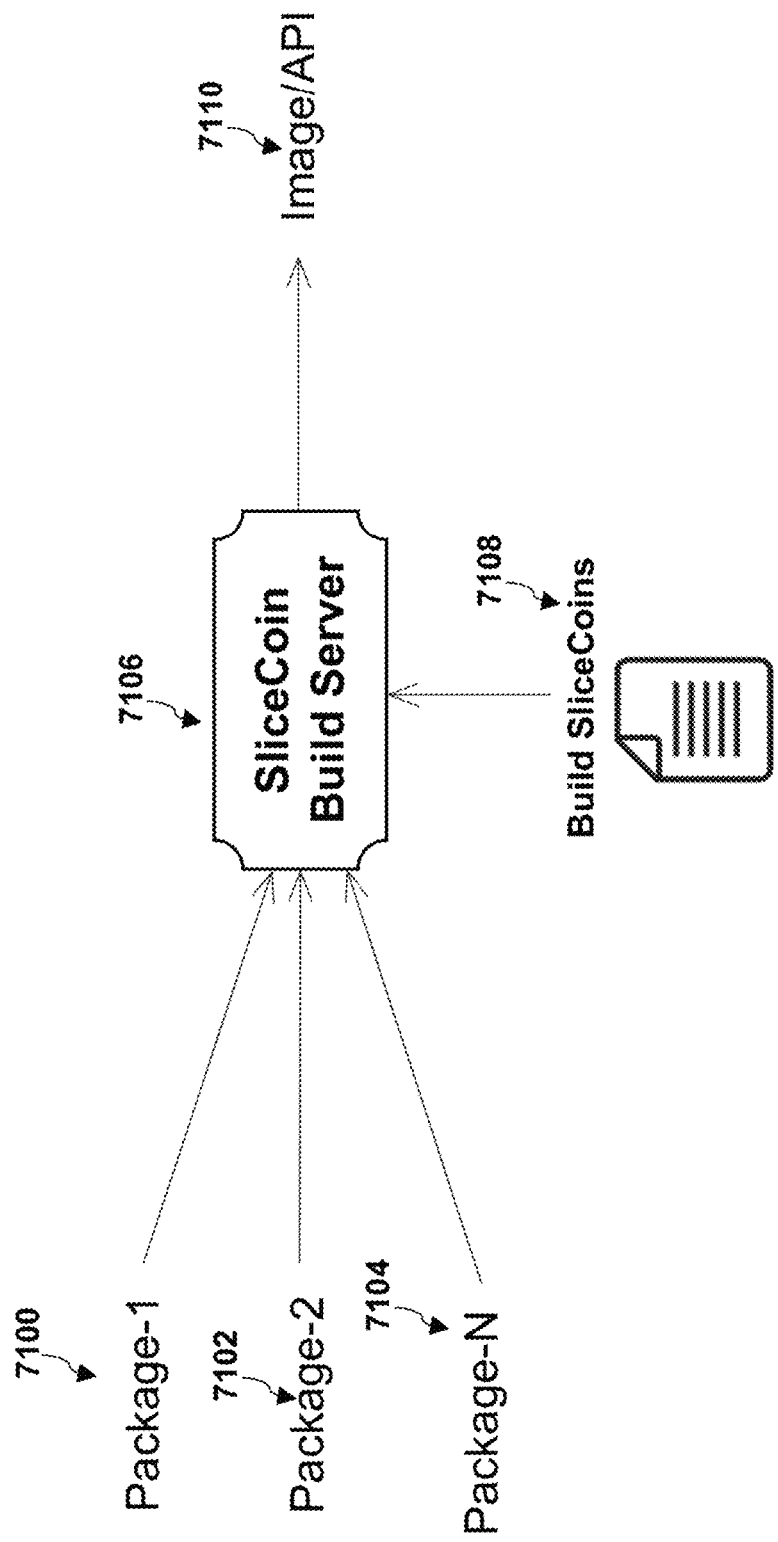
FIG. 95 is an illustration of the SliceCoin build server and the build process, according to an embodiment of the invention.

Referring now to FIG. 95, the SliceCoin build server and the build process, is described in more detail. SliceCoin Build Server 7106 accepts verified packages 7100, 7102, 7104 as input, consumes Build SliceCoins 7108 responsive to the input, and produces a container image 7110.

Figure 96:
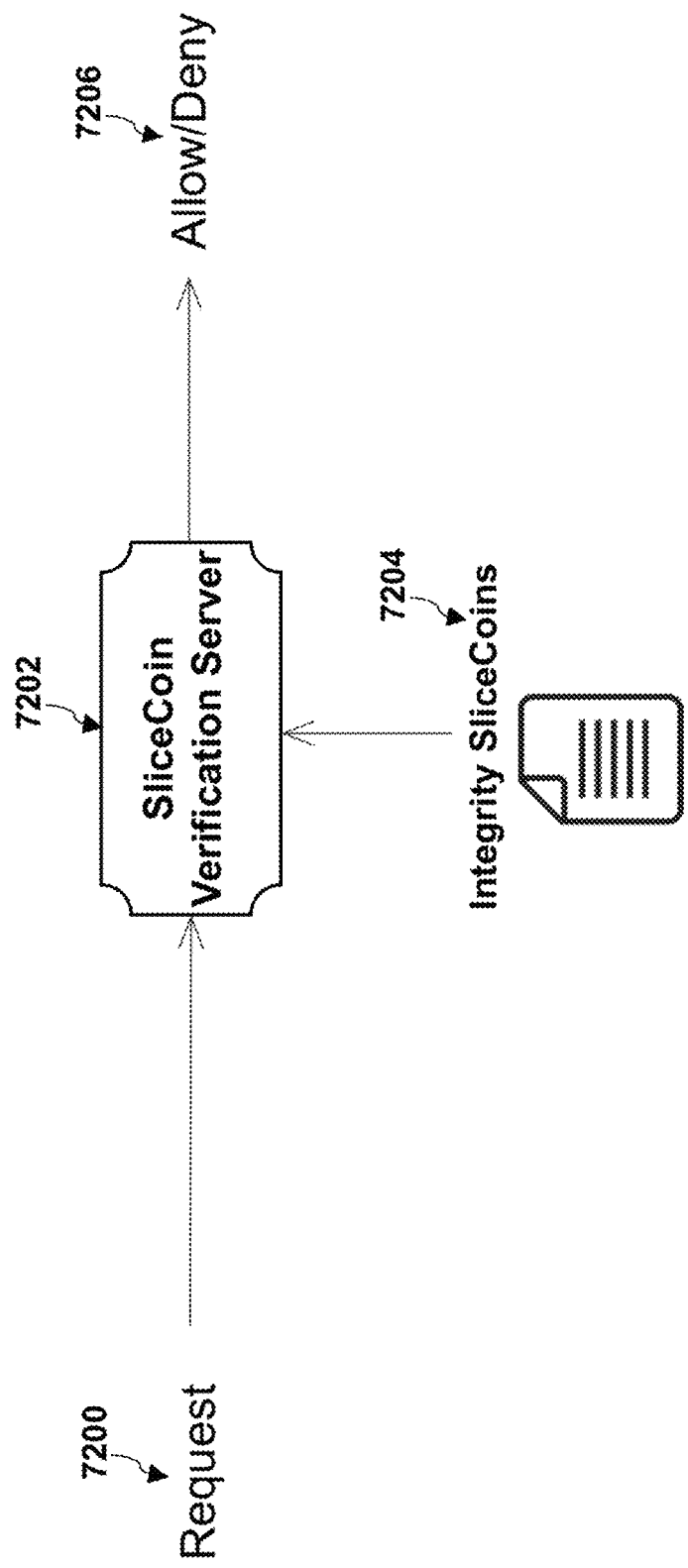
FIG. 96 is an illustration of the SliceCoin verification server and the verification process, according to an embodiment of the invention.

Referring now to FIG. 96, the SliceCoin verification server and the verification process, is described in more detail. SliceCoin Verification Server 7202 accepts requests 7200 to instantiate container images or use APIs as input, consumes Integrity SliceCoins 7204 responsive to the received request, verifies integrity of the image and allows or denies the request 7206. Verifying the integrity of the build product comprises comparing the hashes of the packages in the build product with the hashes of the same packages computed on the server.

Figure 97:
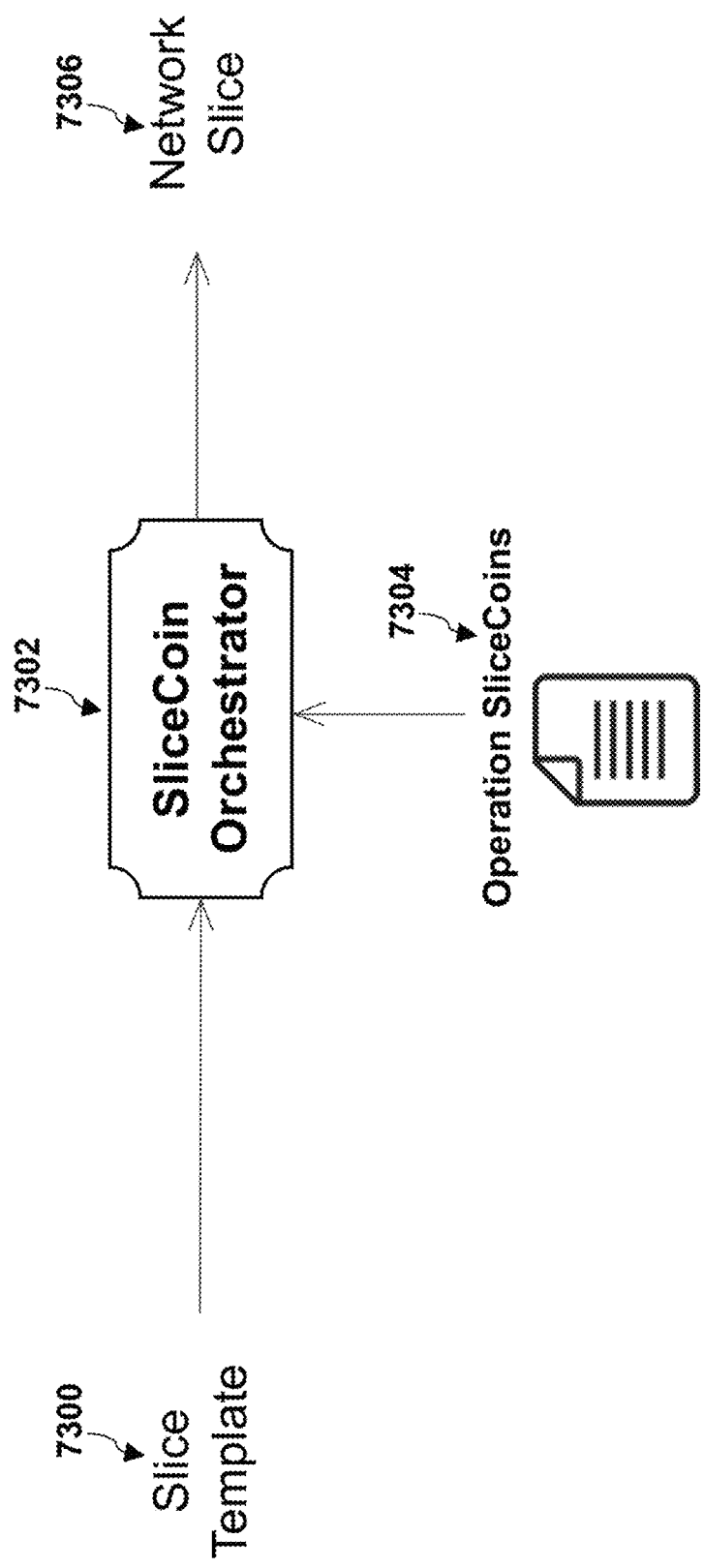
FIG. 97 is an illustration of the SliceCoin orchestrator and the operation process, according to an embodiment of the invention.

Referring now to FIG. 97, the SliceCoin orchestrator and the operation process, is described in more detail. SliceCoin Orchestrator 7302 accepts Slice Template 7300 as input, consumes Operation SliceCoins 7304, and creates a network slice 7306. For provisioning, allocation and regulation of network slices which are deployed on a Kubernetes cluster, a tool named SliceCoin Orchestrator has been developed. SliceCoin Orchestrator is a tool for orchestrating and provisioning network slices on a Kubernetes cluster that are regulated by coins/tokens called SliceCoins. SliceCoin Orchestrator interacts with the SliceCoin smart contract deployed on a blockchain network. Users can purchase SliceCoins from the SliceCoin Orchestrator by sending a transaction to the SliceCoin smart contract and paying in the native cryptocurrency associated with the blockchain network. Users can create slices from slice templates on the Kubernetes Cluster from the SliceCoin Orchestrator. A slice is a collection of resources provisioned on a Kubernetes Cluster such as pods, services and deployments.

Figure 98:
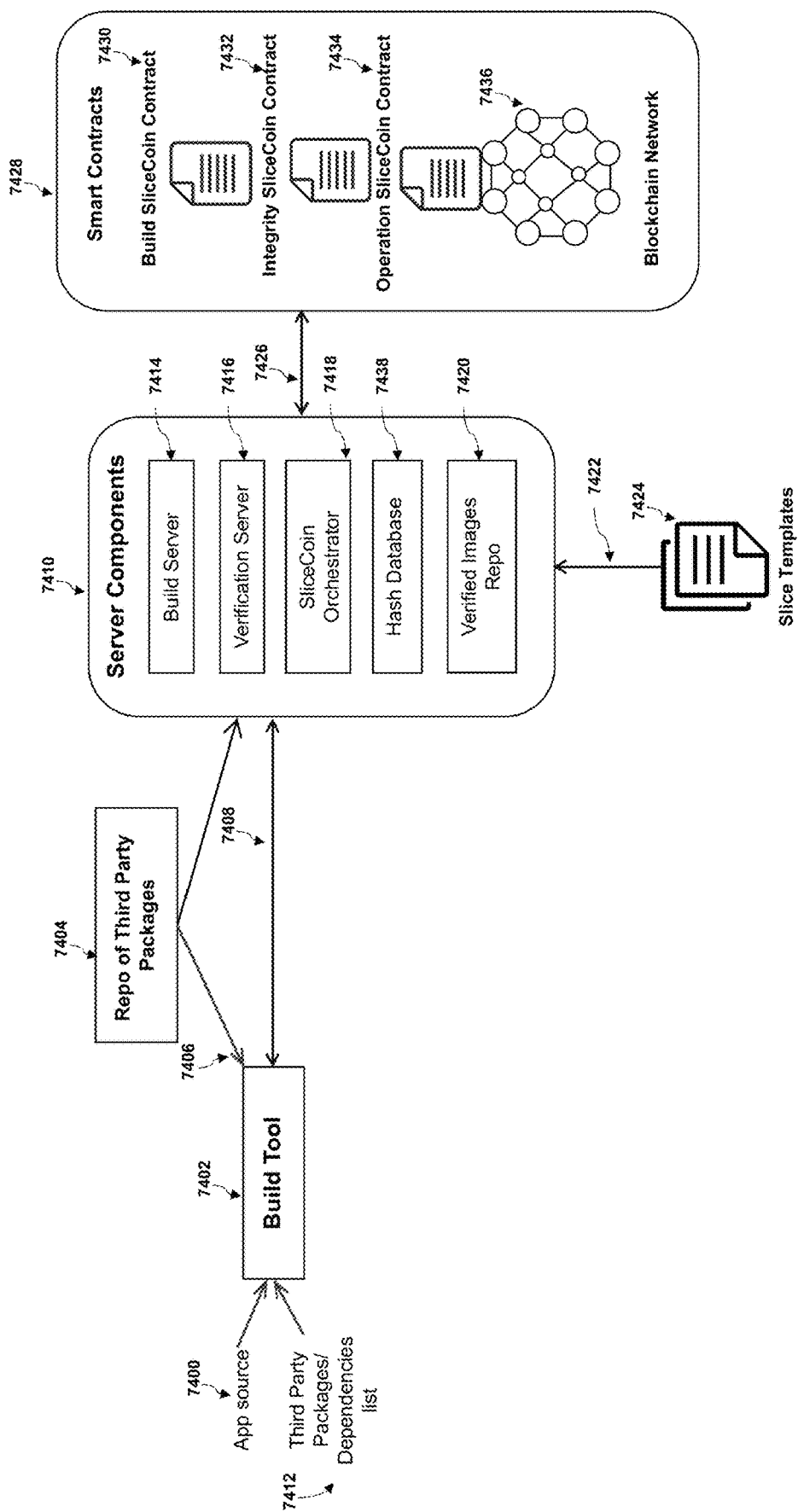
FIG. 98 is an illustration of the process of building container images, according to an embodiment of the invention.

Referring now to FIG. 98, an illustration of the process of building container images, is described in more detail. A build tool 7402 is used to build container images from the application source and list of third party packages. The process of building images involves the following steps:
1. User starts the container image creation process by providing the application source 7400 and list of third party packages 7412 to the build tool 7402
2. Build tool 7402 sends a request 7408 to the build server 7414.
3. The build server 7414 deducts build coins from the user's account balance which is maintained in the Build SliceCoin smart contract 7430. Build server 7414 sends an acknowledgment 7408 to the build tool 7402.
4. Build tool 7402 downloads the third-party packages from the repository of third-party packages 7404.
5. Build tool 7402 hashes the third-party packages and submits the hashes to the build server 7414.
6. Build server 7414 fetches the packages from the repository of third-party packages 7404 and stores the hashes in the hash database 7438.
7. Build server 7414 compares the hashes sent by the build tool 7402 with its own hashes stored in the hash database 7438.
8. If the hashes match the build server 7414 sends an acknowledgment to the build tool 7402.
9. Build tool 7402 generates the image from the retrieved third-party packages.
10. Build tool 7402 uploads the image to the verification server 7416.

11. Verification server 7416 verifies the image and stores it in the verified images repository 7420. Integrity coins managed by the Integrity SliceCoin Contract 7432 are consumed at this step.

12. SliceCoin orchestrator 7418 uses the verified images stored in the verified images repository 7420 and the slice definitions in the slice templates 7424 to create network slices. Operation SliceCoins managed by the Operation SliceCoin Contract 7434 are consumed at this step.

Figure 99:
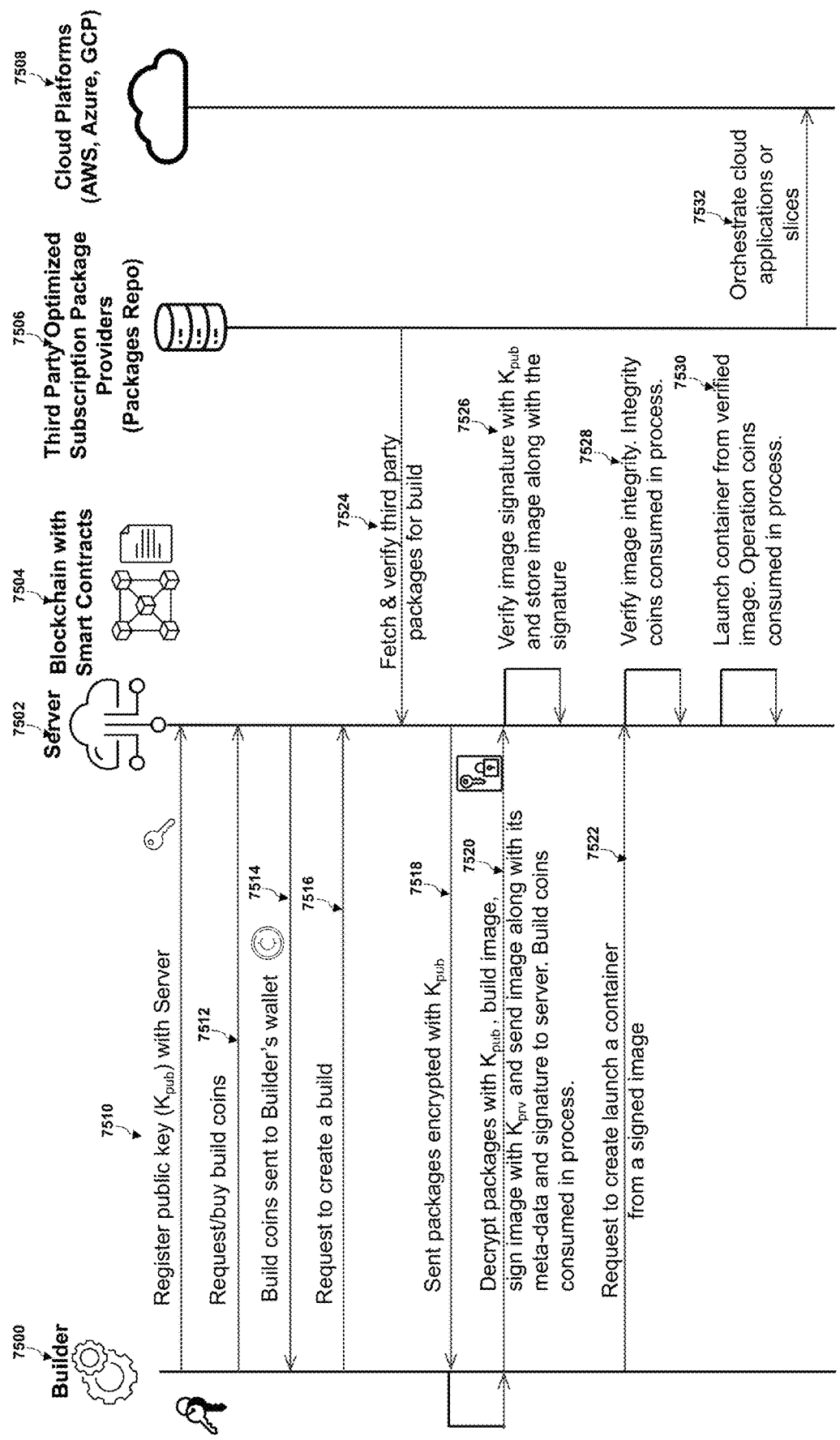
FIG. 99 is an illustration of the process of building container images where server verifies and distributes packages, according to an embodiment of the invention.

Referring now to FIG. 99, an illustration of the process of building container images where server verifies and distributes packages, is described in more detail. Builder 7500 has a public-private keypair which controls the Builder Wallet deployed on a blockchain 7504. At step 7510, the Builder 7500 registers its public key ($K_{pub}$) with Server 7502. At step 7512, Builder 7500 sends a request to buy build coins from Server 7502. At step 7514, Server 7502 sends build coins sent to Builder's wallet on the blockchain 7504. At step 7516 Builder 7500 sends a request to create a build to the Server 7502. The request to create a build contains a list of third-party packages required for the build. At step 7524, the Server 7502 fetches the third-party packages required for the build from a Third-Party Packages Repository 7506 provided by third-party optimized subscription package providers. The Server 7502 verifies the packages for integrity and other security vulnerabilities. At step 7518, the Server 7502 sends third-party packages encrypted with public key ($K_{pub}$) to the Builder 7500. At step 7520, the Builder 7500 decrypts packages with public key ($K_{pub}$) and builds the image. The image building process involves packaging the application source along with the dependencies (third party packages) into a container image. Build coins are consumed in process of building a container image. The Builder 7500 signs the container image using its private key ($K_{prv}$). The signing process involves creating a hash of the container image and encrypting the hash using the private key ($K_{prv}$). The Builder 7500 then sends the container image along with its meta-data and signature to the Server 7502. The meta-data file contains information on the image hash, a list of third-party packages and their hashes, a build creation timestamp, information of the Builder, and information of the packaged application(s) within the image. The Server 7502 verifies the container image signature by decrypting the hash of the image using public key ($K_{pub}$) and stores the image along with the signature and meta-data for later use at step 7526. At step 7522, the Builder 7500 sends a request to launch a container from the container image built earlier and stored on the Server 7502. The Server 7502 verifies the image integrity at step 7528. Integrity coins are consumed in the image verification process. Integrity verification involves checking the image signature and hash and comparing with the image hash stored in the image meta-data file. Additionally, hashes of all third-party packages listed in the meta-data file are also compared with the hashes computed from the third packages retrieved from the Packages Repo 7506. At step 7530 the Server 7502 launches a container from image. Operation coins (SliceCoins) consumed in process. Launching a container from the image creates a network slice. The Server 7502 can optionally orchestrate cloud applications or network slices 7532 on Cloud Platforms 7508 such as AWS, Azure, Google Compute Platform, for instance.

The Builder's keys used in the build process can be symmetric or asymmetric keys. The keys are associated with the Builder's wallet which stores Build coins. The keys can be generated by the Builder or requested from the Server 7502. Symmetric encryption is also possible. Package Repo 7506 can be connected to either the Server 7502, or Builder 7500, or both and contains optimized packages used to build the application. This way there is no tampering of packages by malicious parties anywhere in the supply chain, from build to deployment.

The Server 7502 can distribute optimized packages to Cloud Platforms 7508 such as AWS, Azure, Google Compute Platform, for instance, where Package Stores can distribute secure and verified packages to be used in Cloud Docker, Kubernetes and container environments to paying subscribers. Third party vendors (such as Nvidia, AMD, Intel for instance) can have their GPU optimized packages available in parallel with non optimized ones. The vendors can charge for the optimized packages with build coins issued by the Server 7502. Third parties can market optimized libraries and packages, for example GPU optimized versions, through the Server 7502 as components that can be used as licensed encrypted components using build coins.

Also, in another embodiment, the entire image is built on the Server 7502 and sent to the launch container, in response to the "Request to Create a Build" from the Builder 7500.

All of the above-described methods are performable on computerized systems, such systems comprising a processor, a data store (such as memory) positioned in communication with the processor, and a network communication device position in communication with the processor and operable to communicate across a network, as are all known in the art.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

What is claimed is:

1. A method for creating a build product, verifying the integrity of the build product and securely operating network slices from the build product comprising:
   receiving a build request from a request source comprising a list of one or more packages and an application source;
   consuming, by a build tool, one or more build tokens deployed on a blockchain network responsive to receiving the build request; and
   sending a notification to the request source indicating the consuming of the one or more build tokens.

2. The method of claim 1 wherein consuming one or more build tokens comprises:
   identifying a user associated with the build request;
   accessing a build token smart contract deployed on the blockchain network associated with the user; and
   deducting the one or more build tokens from the build token smart contract associated with the user.

3. The method of claim 1 further comprising:
   receiving a hash value for each package of the one or more packages, defining a received hash value for each package;
   downloading the one or more packages identified in the list from a package repository, defining retrieved packages; and
   hashing the retrieved packages to generate a hash value for each retrieved package, defining a generated hash value for each package of the retrieved packages; and
   comparing the received hash value for each package to the generated hash value for the same package.

4. The method of claim 3 wherein the package repository comprises a plurality of third-party packages.

5. The method of claim 1 wherein the build product is one of a container image and an API.

6. The method of claim 1 further comprising:
   receiving from the request source a build product, the one or more packages being an input for generating the build products, at a token verification server;
   consuming one or more integrity tokens deployed on the blockchain network responsive to receiving the build product;
   verifying the integrity of the build product;
   storing the build product in a build product repository;
   consuming, by a token orchestrator module, one or more operation tokens; and
   creating, at the token orchestrator module, a network slice using each of the build product in the build product repository and a slice template.

7. The method of claim 6 wherein the consuming one or more integrity tokens comprises:
   identifying a user associated with the build request;
   accessing an integrity token smart contract deployed on the blockchain network associated with the user; and
   deducting the one or more integrity tokens from the integrity token smart contract associated with the user.

8. The method of claim 6 wherein the consuming one or more operation tokens comprises:
   identifying a user associated with the build request;
   accessing an operation token smart contract deployed on the blockchain network associated with the user; and
   deducting the one or more operation tokens from the operation token smart contract associated with the user.

9. The method of claim 6 wherein the network slice is created on a Kubernetes cluster.

10. The method of claim 6 wherein the slice template defines one or more of pods, services, and deployments provisioned for the network slice.

11. The method of claim 6 wherein the verifying the integrity of the build product comprises comparing the hashes of the packages in the build product with the hashes of the same packages computed on the server.

12. The method of claim 11 wherein the slice template defines one or more of pods, services, and deployments provisioned for the network slice.

13. The method of claim 6 wherein the build product received from the request source is signed by a private key, defining a signed build product, the method further comprising:
    receiving a public key registration request comprising a public key;
    registering the public key in a public key database; and
    verifying the signed build product by decrypting the signed build product with the public key, producing a decrypted build product and a signature; and
    storing each of the decrypted build product and the signature.

14. The method of claim 6 wherein each of the build tokens, the integrity tokens, and the operation tokens are a single token type.

15. The method of claim 1 wherein:
    the build request is received from a build tool; and
    the build tool generates the build request responsive to receiving an application source and the list of one or more packages from a user.

16. The method of claim 1 further comprising:
    receiving a build token acquisition request comprising and a wallet address on the blockchain network; and
    sending one or more build tokens to the wallet address.

17. A method for verifying integrity and secure operation of cloud-based software services comprising:
    receiving from a request source a build product comprising a list of one or more packages and an application source, the one or more verified packages being an input for generating the build products, at a token verification server;
    consuming one or more integrity tokens deployed on a blockchain network responsive to receiving the build product;
    verifying the integrity of the build product;
    storing the build product in a build product repository;
    consuming, by a token orchestrator module, one or more operation tokens; and
    creating, at the token orchestrator module, a network slice using each of the build product in the build product repository and a slice template.

18. The method of claim 17 wherein the consuming one or more integrity tokens comprises:
    identifying a user associated with the build product;
    accessing an integrity token smart contract deployed on a blockchain network associated with the user; and
    deducting the one or more integrity tokens from the integrity token smart contract associated with the user.

19. The method of claim 17 wherein the consuming one or more operation tokens comprises:
    identifying a user associated with the build product;
    accessing an operation token smart contract deployed on the blockchain network associated with the user; and
    deducting the one or more operation tokens from the operation token smart contract associated with the user.

20. The method of claim 17 wherein the network slice is created on a Kubernetes cluster.

21. The method of claim 17 wherein the verifying the integrity of the build product comprises comparing the hashes of the packages in the build product with the hashes of the same packages computed on the server.

22. A method of building provisioned network slices comprising:
receiving an application source and a package list;
generating a build request comprising the application source and the package list;
sending the build request to a build server; and
receiving a notification indicating consumption of the one or more build tokens responsive to the build request from the build server.

23. The method of claim 22 further comprising:
retrieving each package listed in the package list from a package repository, defining retrieved packages;
hashing the retrieved packages to generate a hash value for each retrieved package, defining a generated hash value for each package of the retrieved packages; and
transmitting the generated hash value for each pack to a verification server.

24. The method of claim 22 further comprising:
sending a registration request to the build server to register a public key;
receiving a plurality of packages from the build server signed by the public key, defining received signed packages;
decrypting the received signed packages, defining decrypted packages;
building an image using the decrypted packages, defining a built image;
signing the built image with a private key that, along with the public key, define a public-private keypair, defining a signed image;
sending the signed image to the build server; and
sending a request to launch a container using the signed image to the build server.

25. The method of claim 22 further comprising:
sending a build token acquisition request to the build server; and
receiving an indication that the one or more build tokens were sent to a wallet deployed on a blockchain network responsive to the build token acquisition request.

* * * * *